(12) United States Patent
Tsukuba

(10) Patent No.: US 11,343,538 B2
(45) Date of Patent: May 24, 2022

(54) IMAGE PROCESSING APPARATUS AND METHOD

(71) Applicant: Sony Corporation, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/764,399

(22) PCT Filed: Nov. 12, 2018

(86) PCT No.: PCT/JP2018/041822
§ 371 (c)(1),
(2) Date: May 15, 2020

(87) PCT Pub. No.: WO2019/102889
PCT Pub. Date: May 31, 2019

(65) Prior Publication Data
US 2020/0280740 A1    Sep. 3, 2020

(30) Foreign Application Priority Data

Nov. 24, 2017  (JP) .............................. JP2017-226062

(51) Int. Cl.
*H04N 19/60* (2014.01)
*H04N 19/426* (2014.01)

(52) U.S. Cl.
CPC ........... *H04N 19/60* (2014.11); *H04N 19/426* (2014.11)

(58) Field of Classification Search
CPC ...... H04N 19/60; H04N 19/426; H04N 19/61; H04N 19/12; H04N 19/70
See application file for complete search history.

(56) References Cited

U.S. PATENT DOCUMENTS

| | | | | |
|---|---|---|---|---|
| 5,386,233 A | * | 1/1995 | Keith .................... | H04N 19/61 348/718 |
| 2008/0310504 A1 | * | 12/2008 | Ye ....................... | H04N 19/157 375/240.02 |

(Continued)

FOREIGN PATENT DOCUMENTS

| | | |
|---|---|---|
| CN | 101779464 A | 7/2010 |
| CN | 102986216 A | 3/2013 |

(Continued)

OTHER PUBLICATIONS

Meher Pramod Kumar et al:"Efficient Integer DCT Architectures for HEVC", IEEE Transactions on Circuits and Systems for Video Technology, Institute of Electrical and Electronics Engineers, US, vol. 24, No. 1, Jan. 1, 2014 (Jan. 1, 2014), pp. 168-178, XP011536733, ISSN: 1051-8215, DOI: 10 .1109/TCSVT. 2013. 2276862 [retrieved on Jan. 3, 2014] * Section II *, * figure 7 *.

(Continued)

*Primary Examiner* — Tracy Y. Li
(74) *Attorney, Agent, or Firm* — Xsensus LLP

(57) ABSTRACT

The present disclosure relates to an image processing apparatus and an image processing method for enabling suppression of an increase in a memory capacity required for orthogonal transform and inverse orthogonal transform.
A transformation matrix is derived using a submatrix configuring a part of the transformation matrix, a prediction residual of an image is orthogonally transformed using the derived transformation matrix, and coefficient data obtained by orthogonally transforming the prediction residual is encoded to generate a bit stream. The present disclosure can be applied to, for example, an image processing apparatus, an image encoding device, an image decoding device, or the like.

24 Claims, 102 Drawing Sheets

(56) References Cited

U.S. PATENT DOCUMENTS

| | | | |
|---|---|---|---|
| 2010/0128803 A1* | 5/2010 | Divorra Escoda | H04N 19/59 375/240.29 |
| 2012/0008675 A1* | 1/2012 | Karczewicz | H04N 19/61 375/240.02 |
| 2016/0134892 A1* | 5/2016 | Chen | H04N 19/70 375/240.2 |
| 2019/0281299 A1* | 9/2019 | Leleannec | H04N 19/61 |

FOREIGN PATENT DOCUMENTS

| | | |
|---|---|---|
| JP | 2007-523512 A | 8/2007 |
| JP | 2014-513898 A | 6/2014 |
| KR | 10-2016-0035317 A | 3/2016 |

OTHER PUBLICATIONS

Riabtsev (CSR) S:"SIMD Analysis of Some Core Spatial Transforms",7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16);URL:http://wftp3. itu. int/av-arch/jctvc-site/,,No. JCTVC-G857, Nov. 24, 2011 (Nov. 24, 2011), XP030110841 ,* p. 1-p. 4 *.

Chen J et al:"JVET-G1001-Algorithum description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 21, 2017; Torino,Aug. 19, 2017 (Aug. 19, 2017), pp. i-iv, 1,XP030150980, Retrieved from the Internet: URL: http://phenix.int-evry.fr/jvet/doc_end_user/documents/7_Torino/wg11/JVET-G0001-v1. zip [retrieved on Apr. 30, 2019] *Sections 2.4.2, 2.4.3 *.

International Search Report and Written Opinion dated Jan. 22, 2019 for PCT/JP2018/041822 filed on Nov. 12, 2018, 10 pages including English Translation of the International Search Report.

"The R Tips," Mar. 1, 2005, pp. 58.

"H.265/HEVC," Oct. 21, 2013, pp. 109-112.

Cohen, R et al., "CE7: Summary Report of Core Experiment on Additional Transforms", Joint Collaborative Team on Video Coding (JCT-VC) 8th Meeting, Document JCTVCH003_r2, San Jose, CA, USA, Feb. 1-10, 2012, pp. 1-14.

Lorcy, V and Philippe, P, "Proposed improvements to the Adaptive multiple Core transform", Joint Video Exploration Team (JVET) 3rd Meeting: Document: JVET-C0022, Geneva, CH, May 26-Jun. 1, 2016, 4 pages.

Chen, J et al., "Algorithm Description of Joint Exploration Test Model 7 (JEM 7)", Joint Video Exploration Team (JVET) 7th Meeting: Document JVET-GI00I-vl, Torino, IT, Jul. 13-21, 2017, pp. 1-46.

* cited by examiner

FIG. 1

Four pre-defined transform candidate sets ( LUT_TrSetToTrTypeIdx )

| Transform Set | TrSetIdx | Transform Candidates | |
|---|---|---|---|
| | | pt_[hor,ver]_flag==0 | pt_[hor,ver]_flag==1 |
| | 0 | 4 (DST-VII) | 2 (DCT-VIII) |
| | 1 | 4 (DST-VII) | 3 (DST-I) |
| | 2 | 4 (DST-VII) | 1 (DCT-V) |
| | 3 | 2 (DCT-VIII) | 4 (DST-VII) |
| | 4 | DCT-II | |

FOR INTRA PREDICTION (TrSetIdx 0–2)
FOR INTER PREDICTION (TrSetIdx 3)
CASE WHERE ADAPTIVE PRIMARY TRANSFORM IS NOT APPLIED (TrSetIdx 4)

*TrTypeIdx==0 IS DCT-II

FIG. 2

| TrType Idx | Transform Type | Basis function $T_i(j)$, $i,j=0,1,\cdots,N-1$ |
|---|---|---|
| 0 | DCT-II | $T_i(j) = \omega_0 \cdot \sqrt{\dfrac{2}{N}} \cdot \cos\left(\dfrac{\pi \cdot i \cdot (2j+1)}{2N}\right)$, where $\omega_0 = \begin{cases} \sqrt{\dfrac{1}{2}} & i=0 \\ 1 & i \neq 0 \end{cases}$ |
| 1 | DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{1}{2}} & i=0 \\ 1 & i \neq 0 \end{cases}$, $\omega_1 = \begin{cases} \sqrt{\dfrac{1}{2}} & j=0 \\ 1 & j \neq 0 \end{cases}$ |
| 2 | DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| 3 | DST-I | $T_i(j) = \sqrt{\dfrac{2}{N+1}} \cdot \sin\left(\dfrac{\pi \cdot (i+1) \cdot (j+1)}{N+1}\right)$ |
| 4 | DST-VII | $T_i(j) = \sqrt{\dfrac{4}{2N+1}} \cdot \sin\left(\dfrac{\pi \cdot (2i+1) \cdot (j+1)}{2N+1}\right)$ |

$N=2, 4, 8, 16, \cdots, 2^{**}M$
IN IMPLEMENTATION, VALUE OF EACH COEFFICIENT $T_i(j)$ OF ORTHOGONAL TRANSFORM IS HELD WITH k-bit INTEGER PRECISION

FIG. 3

Selected (H)orizontal and (V)ertical transform sets for each intra prediction mode (LUT_IntraModeToTrSet)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 0 | 0 | 0 | 2 |

| Intra Mode | 18 | 19 | 20 | 21 | 22 | 23 | 24 | 25 | 26 | 27 | 28 | 29 | 30 | 31 | 32 | 33 | 34 | |
|---|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 2 | 1 | 2 | 1 | 2 | 1 | 2 | 1 | 2 | 1 | 2 | |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 2 | 0 | 1 | 0 | 1 | 0 | 1 | 0 | 1 | 0 | 1 | 2 | 2 | 2 | 2 | 2 | 2 | 2 |
| H | 2 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 | 67(=IntraBC) |
|---|---|---|---|---|---|---|---|---|---|---|---|---|---|---|---|
| V | 2 | 0 | 1 | 0 | 1 | 0 | 1 | 0 | 1 | 0 | 1 | 0 | 1 | 0 | 4(=InterTrSetIdx) |
| H | 0 | 0 | 1 | 0 | 1 | 0 | 1 | 0 | 1 | 0 | 1 | 0 | 1 | 0 | 4(=InterTrSetIdx) |

FIG. 5

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 0 | 8 | 0 |
| 4 | 16 | 2 | 8 | 256 |
| 8 | 64 | 1 | 8 | 512 |
| 16 | 256 | 1 | 8 | 2048 |
| 32 | 1024 | 1 | 8 | 8192 |
| 64 | 4096 | 0 | 8 | 0 |
| 128 | 16384 | 0 | 8 | 0 |
| TOTAL | | | | 11008 (≈1.3KB) |

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 5 | 10 | 800 |
| 8 | 64 | 5 | 10 | 3200 |
| 16 | 256 | 5 | 10 | 12800 |
| 32 | 1024 | 5 | 10 | 51200 |
| 64 | 4096 | 5 | 10 | 204800 |
| 128 | 16384 | 1 | 10 | 163840 |
| TOTAL | | | | 436680 (≈53KB) |

B

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 7 | 10 | 1120 |
| 8 | 64 | 7 | 10 | 4480 |
| 16 | 256 | 7 | 10 | 17920 |
| 32 | 1024 | 7 | 10 | 71680 |
| 64 | 4096 | 7 | 10 | 286720 |
| 128 | 16384 | 1 | 10 | 163840 |
| TOTAL | | | | 545800 (≈67KB) |

FIG. 10

| CORRESPONDING EXAMPLE | FIRST TRANSFORM TYPE (BASE TRANSFORM TYPE) | SECOND TRANSFORM TYPE (TRANSFORM TYPE TO BE DERIVED) | SUBSTITUTABLE TRANSFORM TYPE | OPERATION OF BASE TRANSFORMATION MATRIX $t_{base}$ | | | FOCUS POINT | EFFECT |
|---|---|---|---|---|---|---|---|---|
| | | | | FLIP | TRANSPOSITION | SIGN INVERSION | | |
| 1-1 | DST7 | FlipDST7 | DCT8 | × | | | • SIMILARITY BETWEEN LOWEST-ORDER ROW VECTOR OF FIRST TRANSFORM TYPE AND LOWEST-ORDER ROW VECTOR OF SECOND TRANSFORM TYPE | • REDUCTION OF UNIQUE TRANSFORM TYPE (REDUCTION OF LUT SIZE)<br>• SECOND TRANSFORM TYPE HAS SIMILAR ENCODING EFFICIENCY TO DCT8<br>• DERIVE DECREASING TYPE SUBSTITUTION TRANSFORM BY ONE OPERATION |
| 1-1 | DST7 | TrDST7 | DST1 | | × | | • SIMILARITY BETWEEN LOWEST-ORDER COLUMN VECTOR OF FIRST TRANSFORM TYPE AND LOWEST-ORDER ROW VECTOR OF SECOND TRANSFORM TYPE | • UNIQUE TRANSFORM TYPE IS REDUCIBLE (REDUCTION OF LUT SIZE)<br>• SECOND TRANSFORM TYPE HAS SIMILAR ENCODING EFFICIENCY TO DCT1<br>• DERIVE DECREASING TYPE SUBSTITUTION TRANSFORM BY ONE OPERATION |
| 1-2 | DST7 | DCT8 | DCT8 | | | × | • FOCUSING ON CHARACTERISTICS BETWEEN PAIRED DCT/DST<br>- EVEN-NUMBERED ROW VECTORS HAVE AXIAL SYMMETRY<br>- ODD-NUMBERED ROW VECTORS HAVE POINT SYMMETRY | • UNIQUE TRANSFORM TYPE IS REDUCIBLE (REDUCTION OF LUT SIZE)<br>• SECOND TRANSFORM TYPE HAS SIMILAR ENCODING EFFICIENCY TO DCT8<br>• DERIVE TRANSFORM TO BE PAIRED BY ONE OPERATION |
| 1-3 | DCT8 | FlipDCT8 | DST7 | × | | | • SIMILARITY BETWEEN LOWEST-ORDER ROW VECTOR OF FIRST TRANSFORM TYPE AND LOWEST-ORDER ROW VECTOR OF SECOND TRANSFORM TYPE | • REDUCTION OF UNIQUE TRANSFORM TYPE (REDUCTION OF LUT SIZE)<br>• SECOND TRANSFORM TYPE HAS SIMILAR ENCODING EFFICIENCY TO DCT7<br>• DERIVE DECREASING TYPE SUBSTITUTION TRANSFORM BY ONE OPERATION |
| 1-3 | DCT8 | TrFlipDCT8 | DST1 | × | × | | • SIMILARITY BETWEEN LOWEST-ORDER COLUMN VECTOR OF FIRST TRANSFORM TYPE AND LOWEST-ORDER ROW VECTOR OF SECOND TRANSFORM TYPE | • UNIQUE TRANSFORM TYPE IS REDUCIBLE (REDUCTION OF LUT SIZE)<br>• SECOND TRANSFORM TYPE HAS SIMILAR ENCODING EFFICIENCY TO DCT1<br>• DERIVE DECREASING TYPE SUBSTITUTION TRANSFORM BY ONE OPERATION |
| 1-4 | DCT8 | DST7 | DST7 | | | × | • SIMILARITY BETWEEN PAIRED DCT/DST | • UNIQUE TRANSFORM TYPE IS REDUCIBLE (REDUCTION OF LUT SIZE)<br>• SECOND TRANSFORM TYPE HAS SIMILAR ENCODING EFFICIENCY TO DCT7<br>• DERIVE TRANSFORM TO BE PAIRED BY ONE OPERATION |
| 1-5 | DCT2 | DCT3 | DCT8 | | × | | • SIMILARITY BETWEEN LOWEST-ORDER COLUMN VECTOR OF FIRST TRANSFORM TYPE AND LOWEST-ORDER ROW VECTOR OF SECOND TRANSFORM TYPE | • UNIQUE TRANSFORM TYPE IS REDUCIBLE (REDUCTION OF LUT SIZE)<br>• SECOND TRANSFORM TYPE HAS SIMILAR ENCODING EFFICIENCY TO DCT8<br>• DERIVE DECREASING TYPE SUBSTITUTION TRANSFORM BY ONE OPERATION |
| 1-5 | DCT2 | FlipDCT3 | DST7 | × | × | | • SIMILARITY BETWEEN LOWEST-ORDER COLUMN VECTOR OF FIRST TRANSFORM TYPE AND LOWEST-ORDER ROW VECTOR OF SECOND TRANSFORM TYPE | • REDUCTION OF UNIQUE TRANSFORM TYPE (REDUCTION OF LUT SIZE)<br>• SECOND TRANSFORM TYPE HAS SIMILAR ENCODING EFFICIENCY TO DCT7<br>• DERIVE INCREASING TYPE SUBSTITUTION TRANSFORM BY TWO OPERATIONS |

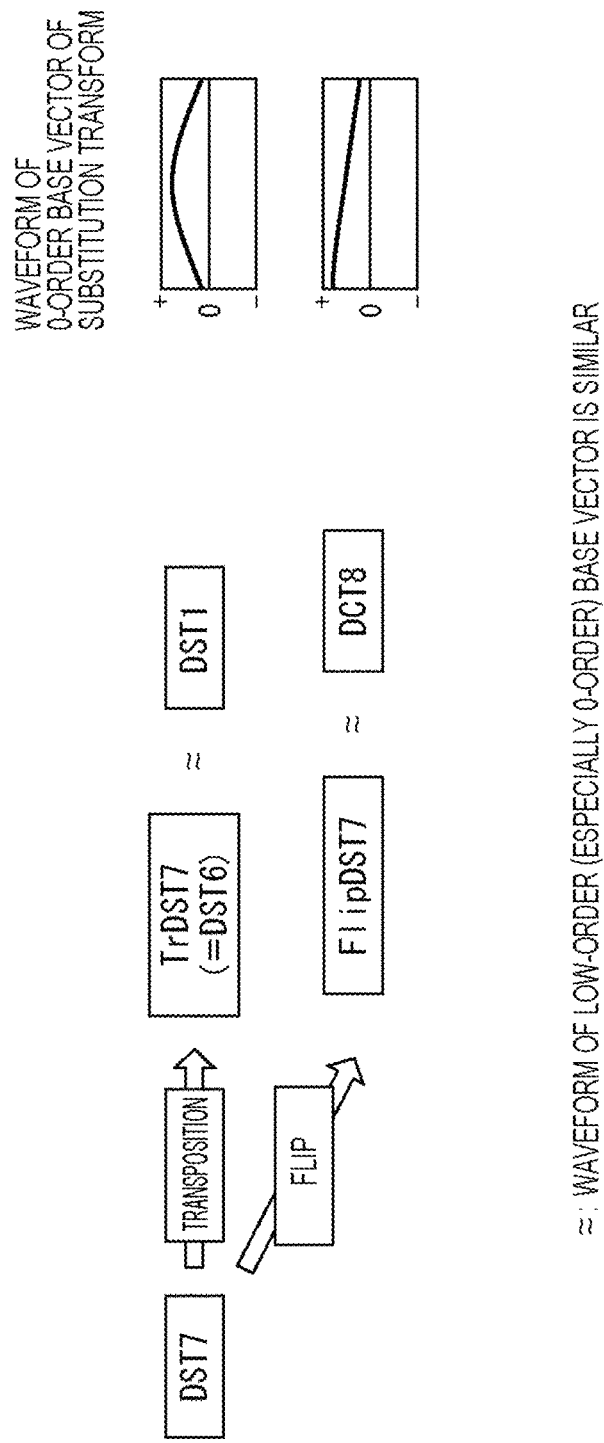

FIG. 20

$$S = DST7 = \begin{pmatrix} 117 & 219 & 296 & 336 \\ 296 & 296 & 0 & -296 \\ 336 & -117 & -296 & 219 \\ 219 & -336 & 296 & -117 \end{pmatrix}$$

$$= \begin{pmatrix} 336 & 296 & 219 & 117 \\ -296 & 0 & 296 & 296 \\ 219 & -296 & -117 & 336 \\ 117 & 296 & -336 & 219 \end{pmatrix} \cdot J$$

= FlipDST7

$$S^T = (DST7)^T = \begin{pmatrix} 117 & 219 & 296 & 336 \\ 296 & 296 & 0 & -296 \\ 336 & -117 & -296 & 219 \\ 219 & -336 & 296 & -117 \end{pmatrix}^T$$

$$= \begin{pmatrix} 117 & 296 & 336 & 219 \\ 219 & 296 & -117 & -336 \\ 296 & 0 & -296 & 296 \\ 336 & -296 & 219 & 117 \end{pmatrix}$$

= TrDST7

- MATRIX EXPRESSION IS AS FOLLOWS
  $C = D \cdot S \cdot J$
  - $S = DST$
  - $C = DCT$
  - $D = diag(1, -1, \ldots, (-1)^{N-1})$
  - $J = $ cross identity matrix

FIG. 21

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 3 | 10 | 480 |
| 8 | 64 | 3 | 10 | 1920 |
| 16 | 256 | 3 | 10 | 7680 |
| 32 | 1024 | 3 | 10 | 30720 |
| 64 | 4096 | 3 | 10 | 122880 |
| 128 | 16384 | 1 | 10 | 163840 |
| TOTAL | | | | 327560 (≈40KB) |

FIG. 31

| TrTypeIdx | TRANSFORM TYPE TrType | BASE TRANSFORM TYPE BaseTrType | BASE TRANSFORMATION MATRIX $T_{base}$ | FLIP FLAG FlipFlag | TRANSPOSITION FLAG TransposeFlag |
|---|---|---|---|---|---|
| 0 | DCT2 | DCT2 | $T_{N, DCT2}$ | F | F |
| 1 | DST7 | DST7 | $T_{N, DST7}$ | F | F |
| 2 | FlipDST7 | DST7 | $T_{N, DST7}$ | T | F |
| 3 | TrDST7 | DST7 | $T_{N, DST7}$ | F | T |
| 4 | DCT5 | DCT5 | $T_{N, DCT5}$ | F | F |

FIG. 44

$$C = DCT8 = \begin{bmatrix} 336 & 296 & 219 & -117 \\ 296 & 0 & -296 & -296 \\ 219 & -296 & -117 & 336 \\ -117 & -296 & 336 & -219 \end{bmatrix}$$

$$D = \begin{bmatrix} 1 & & & \\ & -1 & & \\ & & 1 & \\ & & & -1 \end{bmatrix}$$

$$S = DST7 = \begin{bmatrix} 117 & 219 & 296 & 336 \\ 296 & 296 & 0 & -296 \\ 336 & -117 & -296 & 219 \\ 219 & -336 & 296 & -117 \end{bmatrix}$$

$$J = \begin{bmatrix} & & & 1 \\ & & 1 & \\ & 1 & & \\ 1 & & & \end{bmatrix}$$

- MATRIX EXPRESSION IS AS FOLLOWS
  - $C = D \cdot S \cdot J$
  - $S = DST$
  - $C = DCT$
  - $D = \text{diag}(1, -1, \ldots, (-1)^{N-1})$
  - $J = \text{cross identity matrix}$

FIG. 45

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 4 | 10 | 640 |
| 8 | 64 | 4 | 10 | 2560 |
| 16 | 256 | 4 | 10 | 10240 |
| 32 | 1024 | 4 | 10 | 40960 |
| 64 | 4096 | 4 | 10 | 163840 |
| 128 | 16384 | 1 | 10 | 163840 |
| TOTAL | | | | 382120 (≈47KB) |

FIG. 49

| TrTypeIdx | TRANSFORM TYPE TrType | BASE TRANSFORM TYPE BaseTrType | BASE TRANSFORMATION MATRIX $T_{base}$ | FLIP FLAG FlipFlag | SIGN INVERSION FLAG InvSignFlag |
|---|---|---|---|---|---|
| 0 | DCT2 | DCT2 | $T_{N,DCT2}$ | F | F |
| 1 | DST7 | DST7 | $T_{N,DST7}$ | F | F |
| 2 | DCT8 | DST7 | $T_{N,DST7}$ | T | T |
| 3 | DST1 | DST1 | $T_{N,DST1}$ | F | F |
| 4 | DCT5 | DCT5 | $T_{N,DCT5}$ | F | F |

FIG. 53

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 3 | 10 | 480 |
| 8 | 64 | 3 | 10 | 1920 |
| 16 | 256 | 3 | 10 | 7680 |
| 32 | 1024 | 3 | 10 | 30720 |
| 64 | 4096 | 3 | 10 | 122880 |
| 128 | 16384 | 1 | 10 | 163840 |
| TOTAL | | | | 327560 (≈40KB) |

FIG. 55

| TrTypeIdx | TRANSFORM TYPE TrType | BASE TRANSFORM TYPE BaseTrType | BASE TRANSFORMATION MATRIX $T_{base}$ | FLIP FLAG FlipFlag | TRANSPOSITION FLAG TransposeFlag |
|---|---|---|---|---|---|
| 0 | DCT2 | DCT2 | $T_{N, DCT2}$ | F | F |
| 1 | DCT8 | DCT8 | $T_{N, DCT8}$ | F | F |
| 2 | FlipDCT8 | DCT8 | $T_{N, DCT8}$ | T | F |
| 3 | TrFlipDCT8 | DCT8 | $T_{N, DCT8}$ | T | T |
| 4 | DCT5 | DCT5 | $T_{N, DCT5}$ | F | F |

FIG. 57

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 4 | 10 | 640 |
| 8 | 64 | 4 | 10 | 2560 |
| 16 | 256 | 4 | 10 | 10240 |
| 32 | 1024 | 4 | 10 | 40960 |
| 64 | 4096 | 4 | 10 | 163840 |
| 128 | 16384 | 1 | 10 | 163840 |
| TOTAL | | | | 382120 (≈47KB) |

FIG. 58

| TrTypeIdx | TRANSFORM TYPE TrType | BASE TRANSFORM TYPE BaseTrType | BASE TRANSFORMATION MATRIX $T_{base}$ | FLIP FLAG FlipFlag | SIGN INVERSION FLAG InvSignFlag |
|---|---|---|---|---|---|
| 0 | DCT2 | DCT2 | $T_{N, DCT2}$ | F | F |
| 1 | DST7 | DCT8 | $T_{N, DCT8}$ | T | T |
| 2 | DCT8 | DCT8 | $T_{N, DCT8}$ | F | F |
| 3 | DST1 | DST1 | $T_{N, DST1}$ | F | F |
| 4 | DCT5 | DCT5 | $T_{N, DCT5}$ | F | F |

FIG. 60

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 3 | 10 | 480 |
| 8 | 64 | 3 | 10 | 1920 |
| 16 | 256 | 3 | 10 | 7680 |
| 32 | 1024 | 3 | 10 | 30720 |
| 64 | 4096 | 3 | 10 | 122880 |
| 128 | 16384 | 1 | 10 | 163840 |
| TOTAL | | | | 327560 (≈40KB) |

FIG. 62

| TrTypeIdx | TRANSFORM TYPE TrType | BASE TRANSFORM TYPE BaseTrType | BASE TRANSFORMATION MATRIX $T_{base}$ | FLIP FLAG FlipFlag | TRANSPOSITION FLAG TransposeFlag |
|---|---|---|---|---|---|
| 0 | DCT2 | DCT2 | $T_{N,DCT2}$ | F | F |
| 1 | DCT3 (TrDCT2) | DCT2 | $T_{N,DCT2}$ | F | T |
| 2 | FlipDCT3 (FlipTrDCT2) | DCT2 | $T_{N,DCT2}$ | T | T |
| 3 | DST1 | DST1 | $T_{N,DST1}$ | F | F |
| 4 | DCT5 | DCT5 | $T_{N,DCT5}$ | F | F |

FIG. 67

| CORRESPONDING EXAMPLE | FIRST TRANSFORM TYPE (BASE TRANSFORM TYPE) | SECOND TRANSFORM TYPE (TRANSFORM TYPE TO BE DERIVED) | SUBSTITUTABLE TRANSFORM TYPE | OPERATION OF BASE TRANSFORMATION MATRIX T_base | | OPERATION OF PREDICTION RESIDUAL | FOCUS POINT | EFFECT |
|---|---|---|---|---|---|---|---|---|
| | | | | TRANSPOSITION | SIGN INVERSION | FLIP | | |
| 2-1 | DST7 | FlipDST7 | FlipDST7 | | | × | - TWO DIFFERENT TWO-DIMENSIONAL ORTHOGONAL TRANSFORMS HAVE AXIAL SYMMETRY BETWEEN ONE-DIMENSIONAL ORTHOGONAL TRANSFORMS IN CERTAIN DIRECTION (HORIZONTAL OR VERTICAL) (DST7 ⇔ FlipDST7) | - REDUCTION OF UNIQUE TRANSFORM TYPE (REDUCTION OF LUT SIZE) (SAME AS INVENTION #) <br> - SECOND TRANSFORM TYPE HAS SIMILAR ENCODING EFFICIENCY TO DST8 <br> - NUMBER OF FLIP OPERATIONS IS REDUCIBLE (REDUCTION OF PROCESSING AMOUNT) BECAUSE TWO-DIMENSIONAL FLIP OPERATION CAN BE COLLECTIVELY PERFORMED FOR PREDICTION RESIDUAL, AS COMPARED WITH FLIP OPERATION FOR TRANSFORMATION MATRIX OF ONE-DIMENSIONAL ORTHOGONAL TRANSFORM (→ PROCESSING AMOUNT IS SMALLER THAN 2-2) |
| 2-2 (1-2) | DST7 | DCT8 | DCT8 | | × | | - TWO DIFFERENT TWO-DIMENSIONAL ORTHOGONAL TRANSFORMS HAVE SIMILARITY BETWEEN ONE-DIMENSIONAL ORTHOGONAL TRANSFORMS IN CERTAIN DIRECTION (HORIZONTAL OR VERTICAL) <br> - ODD-NUMBERED ROW VECTORS HAVE AXIAL SYMMETRY | - UNIQUE TRANSFORM TYPE IS REDUCIBLE (REDUCTION OF LUT SIZE) <br> - SECOND TRANSFORM TYPE HAS SIMILAR ENCODING EFFICIENCY TO DCT8 <br> - (→ PROCESSING AMOUNT INCREASES BY AMOUNT OF SIGN INVERSION, AS COMPARED WITH 2-1) |
| 2-3 (1-3) | DCT8 | FlipDCT8 | FlipDCT8 | | | × | - TWO DIFFERENT TWO-DIMENSIONAL ORTHOGONAL TRANSFORMS HAVE AXIAL SYMMETRY BETWEEN ONE-DIMENSIONAL ORTHOGONAL TRANSFORMS IN CERTAIN DIRECTION (HORIZONTAL OR VERTICAL) (DCT8 ⇔ FlipDCT8) | - REDUCTION OF UNIQUE TRANSFORM TYPE (REDUCTION OF LUT SIZE) <br> - SECOND TRANSFORM TYPE HAS SIMILAR ENCODING EFFICIENCY TO DCT7 <br> - NUMBER OF FLIP OPERATIONS IS REDUCIBLE (REDUCTION OF PROCESSING AMOUNT) BECAUSE TWO-DIMENSIONAL FLIP OPERATION CAN BE COLLECTIVELY PERFORMED FOR PREDICTION RESIDUAL, AS COMPARED WITH FLIP OPERATION FOR TRANSFORMATION MATRIX OF ONE-DIMENSIONAL ORTHOGONAL TRANSFORM (→ PROCESSING AMOUNT IS SMALLER THAN 2-3) |
| 2-4 (1-4) | DCT8 | DST7 | DST7 | | × | | - TWO DIFFERENT TWO-DIMENSIONAL ORTHOGONAL TRANSFORMS HAVE SIMILARITY BETWEEN ONE-DIMENSIONAL ORTHOGONAL TRANSFORMS IN CERTAIN DIRECTION (HORIZONTAL OR VERTICAL) <br> - ODD-NUMBERED ROW VECTORS HAVE POINT SYMMETRY | - UNIQUE TRANSFORM TYPE IS REDUCIBLE (REDUCTION OF LUT SIZE) <br> - SECOND TRANSFORM TYPE HAS SIMILAR ENCODING EFFICIENCY TO DCT7 <br> - (→ ENCODING EFFICIENCY IS BETTER BUT PROCESSING AMOUNT INCREASES BY AMOUNT OF SIGN INVERSION, AS COMPARED WITH 2-3) |

FIG. 68

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 4 | 10 | 640 |
| 8 | 64 | 4 | 10 | 2560 |
| 16 | 256 | 4 | 10 | 10240 |
| 32 | 1024 | 4 | 10 | 40960 |
| 64 | 4096 | 4 | 10 | 163840 |
| 128 | 16384 | 1 | 10 | 163840 |
| TOTAL | | | | 382120 (≈47KB) |

FIG. 72

| TrTypeIdx | TRANSFORM TYPE TrType | BASE TRANSFORM TYPE BaseTrType | BASE TRANSFORMATION MATRIX $T_{base}$ | FLIP FLAG FlipFlag |
|---|---|---|---|---|
| 0 | DCT2 | DCT2 | $T_{N,DCT2}$ | F |
| 1 | DST7 | DST7 | $T_{N,DST7}$ | F |
| 2 | FlipDST7 | DST7 | $T_{N,DST7}$ | T |
| 3 | DST1 | DST1 | $T_{N,DST1}$ | F |
| 4 | DCT5 | DCT5 | $T_{N,DCT5}$ | F |

FIG. 75

| TRANSFORM SIZE N | NUMBER OF ELEMENTS | TYPE OF TRANSFORMATION MATRIX | BIT PRECISION bit | LUT SIZE bits |
|---|---|---|---|---|
| 2 | 4 | 1 | 10 | 40 |
| 4 | 16 | 4 | 10 | 640 |
| 8 | 64 | 4 | 10 | 2560 |
| 16 | 256 | 4 | 10 | 10240 |
| 32 | 1024 | 4 | 10 | 40960 |
| 64 | 4096 | 4 | 10 | 163840 |
| 128 | 16384 | 1 | 10 | 163840 |
| TOTAL | | | | 382120 (≈47KB) |

FIG. 79

| TrTypeIdx | TRANSFORM TYPE TrType | BASE TRANSFORM TYPE BaseTrType | BASE TRANSFORMATION MATRIX $T_{base}$ | FLIP FLAG FlipFlag | SIGN INVERSION FLAG InvSignFlag |
|---|---|---|---|---|---|
| 0 | DCT2 | DCT2 | $T_{N, DCT2}$ | F | F |
| 1 | DST7 | DST7 | $T_{N, DST7}$ | F | F |
| 2 | DCT8 | DST7 | $T_{N, DST7}$ | T | T |
| 3 | DST1 | DST1 | $T_{N, DST1}$ | F | F |
| 4 | DCT5 | DCT5 | $T_{N, DCT5}$ | F | F |

*FIG. 82*

| TrTypeIdx | TRANSFORM TYPE TrType | BASE TRANSFORM TYPE BaseTrType | BASE TRANSFORMATION MATRIX $T_{base}$ | FLIP FLAG FlipFlag |
|---|---|---|---|---|
| 0 | DCT2 | DCT2 | $T_{N, DCT2}$ | F |
| 1 | FlipDCT8 | DCT8 | $T_{N, DCT8}$ | T |
| 2 | DCT8 | DCT8 | $T_{N, DCT8}$ | F |
| 3 | DST1 | DST1 | $T_{N, DST1}$ | F |
| 4 | DCT5 | DCT5 | $T_{N, DCT5}$ | F |

FIG. 83

| TrTypeIdx | TRANSFORM TYPE TrType | BASE TRANSFORM TYPE BaseTrType | BASE TRANSFORMATION MATRIX $T_{base}$ | FLIP FLAG FlipFlag | SIGN INVERSION FLAG InvSignFlag |
|---|---|---|---|---|---|
| 0 | DCT2 | DCT2 | $T_{N,DCT2}$ | F | F |
| 1 | DST7 | DCT8 | $T_{N,DCT8}$ | T | T |
| 2 | DCT8 | DCT8 | $T_{N,DCT8}$ | F | F |
| 3 | DST1 | DST1 | $T_{N,DST1}$ | F | F |
| 4 | DCT5 | DCT5 | $T_{N,DCT5}$ | F | F |

FIG. 85

| EXAMPLE | TRANSFORM TYPE TO BE DERIVED | HELD SUBMATRIX (BASE SUBMATRIX) | SUBMATRIX TO BE GENERATED | OPERATION FOR TRANSFORMATION MATRIX | | | | | FOCUS POINT | EFFECT |
|---|---|---|---|---|---|---|---|---|---|---|
| | | | | HORIZONTAL FLIP | VERTICAL FLIP | TRANSPOSITION | ROTATION | SIGN INVERSION | | |
| 3-1 | DCT2, DST2 | LEFT SUBMATRIX | RIGHT SUBMATRIX | × | | | | × | • AXIAL SYMMETRIC PROPERTY TO VERTICAL AXIS | • SAME ENCODING EFFICIENCY<br>• REDUCTION OF RIGHT HALF IN TRANSFORMATION MATRIX<br>• LUT SIZE REQUIRED TO HOLD TARGET TRANSFORM TYPE BECOMES 1/2 |
| 3-2 | DCT1, DCT3, DST1, DST3 | UPPER SUBMATRIX | LOWER SUBMATRIX | | × | | | × | • SYMMETRIC PROPERTY TO HORIZONTAL AXIS | • SAME ENCODING EFFICIENCY<br>• REDUCTION OF LOWER SUBMATRIX IN TRANSFORMATION MATRIX |
| 3-3 | DCT4, DST4 | UPPER SUBMATRIX | LOWER SUBMATRIX | × | × | | (×) | × | • POINT SYMMETRIC PROPERTY | • SAME ENCODING EFFICIENCY<br>• REDUCTION OF LOWER SUBMATRIX IN TRANSFORMATION MATRIX |
| 3-4 | DCT5, DST5 (DCT4), DCT8 | UPPER RIGHT TRIANGULAR SUBMATRIX | LOWER LEFT TRIANGULAR SUBMATRIX | | | × | | × | • AXIAL SYMMETRIC PROPERTY TO DIAGONAL AXIS | • SAME ENCODING EFFICIENCY<br>• REDUCTION OF LOWER LEFT TRIANGULAR MATRIX IN TRANSFORMATION MATRIX<br>• SIGN INVERSION IS UNNECESSARY |
| 3-5 | DST7, DST6 | UPPER LEFT TRIANGULAR SUBMATRIX | LOWER RIGHT TRIANGULAR SUBMATRIX | × | × | | (×) | × | • AXIAL SYMMETRIC PROPERTY TO DIAGONAL AXIS AT CROSS POSITION | • SAME ENCODING EFFICIENCY<br>• REDUCTION OF LOWER RIGHT TRIANGULAR MATRIX IN TRANSFORMATION MATRIX |
| 3-6a | DST1, DCT1 | UPPER LEFT SUBMATRIX | UPPER RIGHT SUBMATRIX | × | | | | × | • AXIAL SYMMETRIC PROPERTY TO VERTICAL AXIS | • SAME ENCODING EFFICIENCY<br>• REDUCTION OF UPPER RIGHT SUBMATRIX IN TRANSFORMATION MATRIX<br>• REDUCTION RATE OF LUT IS LARGER BUT PROCESSING IS MORE COMPLICATED THAN GENERATION OF DCT1/DST1 BY 3-2) |
| 3-6b | | UPPER LEFT SUBMATRIX | LOWER LEFT SUBMATRIX | | × | | | × | • AXIAL SYMMETRIC PROPERTY TO HORIZONTAL AXIS | • SAME ENCODING EFFICIENCY<br>• REDUCTION OF LOWER LEFT SUBMATRIX IN TRANSFORMATION MATRIX<br>• REDUCTION RATE OF LUT IS LARGER BUT PROCESSING IS MORE COMPLICATED THAN GENERATION OF DCT1/DST1 BY 3-2) |
| 3-6c | | UPPER LEFT SUBMATRIX | LOWER RIGHT SUBMATRIX | × | × | | (×) | × | • POINT SYMMETRIC PROPERTY | • SAME ENCODING EFFICIENCY<br>• REDUCTION OF LOWER RIGHT SUBMATRIX IN TRANSFORMATION MATRIX<br>• REDUCTION RATE OF LUT IS LARGER BUT PROCESSING IS MORE COMPLICATED THAN GENERATION OF DCT1/DST1 BY 3-2) |

FIG. 95

| TrTypeIdx | TRANSFORM TYPE TrType | BASE SUBMATRIX C | METHOD OF DERIVING N×N TRANSFORMATION MATRIX T CORRESPONDING TO TRANSFORM TYPE TrType FROM BASE SUBMATRIX |
|---|---|---|---|
| 0 | DCT2 | $C_{DCT2}$ | EXECUTE BY METHOD DESCRIBED IN EXAMPLE #3-1 |
| 1 | DST7 | $C_{DST7}$ | EXECUTE BY METHOD DESCRIBED IN EXAMPLE #3-5 |
| 2 | DCT8 | $C_{DCT8}$ | EXECUTE BY METHOD DESCRIBED IN EXAMPLE #3-4 |
| 3 | DST1 | $C_{DST1}$ | EXECUTE BY METHOD DESCRIBED IN EXAMPLE #3-2 |
| 4 | DCT5 | $C_{DCT5}$ | EXECUTE BY METHOD DESCRIBED IN EXAMPLE #3-4 |
| ... | ... | ... | ... |
| X | TRANSFORM Z | $C_Z$ | EXECUTE BY METHOD CORRESPONDING TO TRANSFORM Z |
| ... | ... | ... | ... |

FIG. 98

| TRANSFORM SIZE N | NUMBER OF ELEMENTS PER ONE TRANSFORMATION MATRIX | NUMBER OF ELEMENTS OF HELD SUBMATRIX | TYPE OF BASE SUBMATRIX | BIT PRECISION bit | LUT SIZE bits |
|---|---|---|---|---|---|
| 2 | 4 | 2 | 1 | 10 | 20 |
| 4 | 16 | ABOUT 8 | 3 | 10 | 240 |
| 8 | 64 | ABOUT 32 | 3 | 10 | 960 |
| 16 | 256 | ABOUT 128 | 3 | 10 | 3840 |
| 32 | 1024 | ABOUT 512 | 3 | 10 | 15356 |
| 64 | 4096 | ABOUT 2048 | 3 | 10 | 61440 |
| 128 | 16384 | ABOUT 8192 | 1 | 10 | 81920 |
| | | TOTAL | | | 163780 (≈20KB) |

FIG. 101

| TrTypeIdx | TRANSFORM TYPE TrType | BASE TRANSFORM TYPE BaseTrType | BASE SUBMATRIX C | FLIP FLAG FlipFlag | TRANSPOSITION FLAG Transpose Flag | METHOD OF DERIVING N×N TRANSFORMATION MATRIX T CORRESPONDING TO BASE TRANSFORM TYPE BaseTrType FROM BASE SUBMATRIX |
|---|---|---|---|---|---|---|
| 0 | DCT2 | DCT2 | $C_{DCT2}$ | F | F | EXECUTE BY METHOD DESCRIBED IN EXAMPLE 3-1 |
| 1 | DST7 | DST7 | $C_{DST7}$ | F | F | EXECUTE BY METHOD DESCRIBED IN EXAMPLE 3-5 |
| 2 | FlipDST7 | DST7 | $C_{DCT8}$ | T | F | EXECUTE BY METHOD DESCRIBED IN EXAMPLE 3-4 |
| 3 | TrDST1 | DST7 | $C_{DST1}$ | F | T | EXECUTE BY METHOD DESCRIBED IN EXAMPLE 3-2 |
| 4 | DCT5 | DCT5 | $C_{DCT5}$ | F | F | EXECUTE BY METHOD DESCRIBED IN EXAMPLE 3-4 |

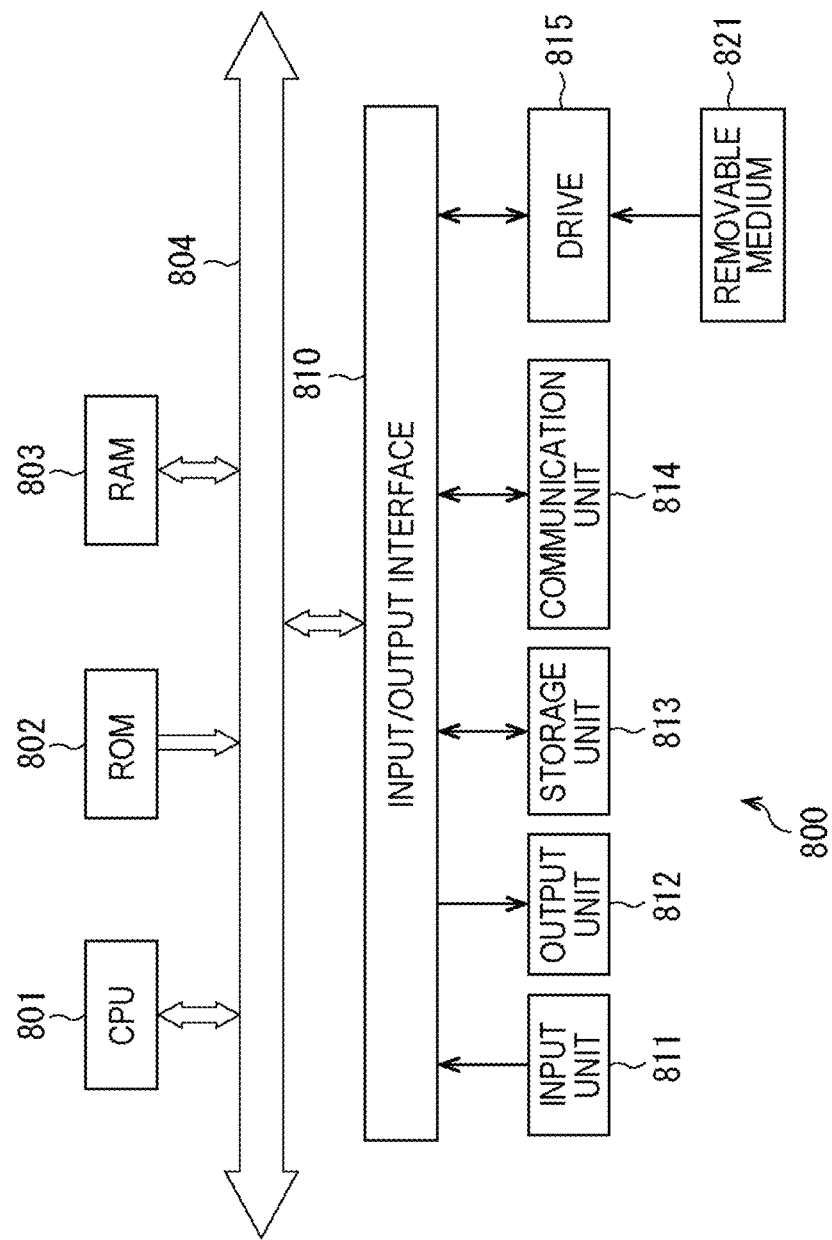

IMAGE PROCESSING APPARATUS AND METHOD

CROSS-REFERENCE TO RELATED APPLICATIONS

The present application is based on PCT filing PCT/JP2018/041822, filed Nov. 12, 2018, which claims priority to JP 2017-226062, filed Nov. 24, 2017, the entire contents of each are incorporated herein by reference.

TECHNICAL FIELD

The present disclosure relates to an image processing apparatus and a method, and particularly relates to an image processing apparatus and a method that enable suppression of an increase in memory capacity required for orthogonal transform and inverse orthogonal transform.

BACKGROUND ART

Conventionally, adaptive primary transform (adaptive multiple core transforms: AMT) has been disclosed regarding luminance, in which a primary transform is adaptively selected from a plurality of different orthogonal transforms for each horizontal primary transform PThor (also referred to as primary horizontal transform) and vertical primary transform PTver (also referred to as primary vertical transform) for each transform unit (TU) (for example, see Non-Patent Document 1).

In Non-Patent Document 1, there are five one-dimensional orthogonal transforms of DCT-II, DST-VII, DCT-VIII, DST-I, and DCT-VI as candidates for the primary transform. Furthermore, it has been proposed to add two one-dimensional orthogonal transforms of DST-IV and identity transform (IDT: one-dimensional transform skip), and to have a total of seven one-dimensional orthogonal transforms as candidates for the primary transform (for example, see Non-Patent Document 2).

CITATION LIST

Non-Patent Document

Non-Patent Document 1: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

Non-Patent Document 2: V. Lorcy, P. Philippe, "Proposed improvements to the Adaptive multiple Core transform", JVET-O0022, Joint Video Exploration Team (JVET) of ITU-T SG 16 WP 3 and ISO/IEC JTC 1/SC 29/WG 11 3rd Meeting: Geneva, CH, 26 May-1 Jun. 2016

SUMMARY OF THE INVENTION

Problems to be Solved by the Invention

However, in the case of these methods, there is a possibility that the size of a look up table (LUT) required to hold all of transformation matrices of the primary transformation increases. That is, in a case of considering hardware implementation of the primary transform, there is a possibility of an increase in the memory size required to hold coefficients of the transformation matrices increases.

The present disclosure has been made in view of such a situation, and enables suppression of an increase in memory capacity required for orthogonal transform and inverse orthogonal transform.

Solutions to Problems

An image processing apparatus according to one aspect of the present technology is an image processing apparatus including a derivation unit configured to derive a transformation matrix, using a submatrix configuring a part of the transformation matrix, an orthogonal transform unit configured to orthogonally transform a prediction residual of an image, using the transformation matrix derived by the derivation unit, and an encoding unit configured to encode coefficient data obtained by orthogonally transforming the prediction residual by the orthogonal transform unit to generate a bit stream.

An image processing method according to one aspect of the present technology is an image processing method including deriving a transformation matrix using a submatrix configuring a part of the transformation matrix, orthogonally transforming a prediction residual of an image, using the derived transformation matrix, and encoding coefficient data obtained by orthogonally transforming the prediction residual to generate a bit stream.

An image processing apparatus according to another aspect of the present technology is an image processing apparatus including a decoding unit configured to decode a bit stream to obtain coefficient data that is an orthogonally transformed prediction residual of an image, a derivation unit configured to derive a transformation matrix, using a submatrix configuring a part of the transformation matrix, and an inverse orthogonal transform unit configured to inversely orthogonally transform the coefficient data obtained by the decoding unit, using the transformation matrix derived by the derivation unit.

An image processing method according to another aspect of the present technology is an image processing method including decoding a bit stream to obtain coefficient data that is an orthogonally transformed prediction residual of an image, deriving a transformation matrix, using a submatrix configuring a part of the transformation matrix, and inversely orthogonally transforming the obtained coefficient data, using the derived transformation matrix.

In the image processing apparatus and the method according to the one aspect of the present technology, a transformation matrix is derived using a submatrix configuring a part of the transformation matrix, a prediction residual of an image is orthogonally transformed using the derived transformation matrix, and coefficient data obtained by orthogonally transforming the prediction residual is encoded to generate a bit stream.

In the image processing apparatus and the method according to the another aspect of the present technology, a bit stream is decoded to obtain coefficient data that is an orthogonally transformed prediction residual of an image, a transformation matrix is derived using a submatrix configuring a part of the transformation matrix, and the obtained coefficient data is inversely orthogonally transformed using the derived transformation matrix.

Effects of the Invention

According to the present disclosure, an image can be processed. In particular, an increase in memory capacity required for orthogonal transform and inverse orthogonal transform can be suppressed.

BRIEF DESCRIPTION OF DRAWINGS

FIG. 1 is a diagram illustrating a correspondence between a transform set and an orthogonal transform to be selected.

FIG. 2 is a diagram illustrating a correspondence between a type of orthogonal transform and a function to be used.

FIG. 3 is a diagram illustrating a correspondence between a transform set and a prediction mode.

FIG. 5 is a diagram illustrating examples of an LUT size required to hold a transformation matrix in HEVC.

FIG. 6 is a diagram illustrating examples of an LUT size required to hold a transformation matrix.

FIG. 10 is a diagram illustrating a list of main specific examples of substitution of a transformation matrix.

FIG. 19 is a diagram illustrating an example of transform type derivation.

FIG. 20 is a diagram illustrating a specific example of transform type derivation.

FIG. 21 is a diagram illustrating examples of an LUT size required to hold a transformation matrix.

FIG. 31 is a diagram illustrating examples of assignment of a transform type to a transform type identifier.

FIG. 44 is a diagram illustrating a specific example of transform type derivation.

FIG. 45 is a diagram illustrating examples of an LUT size required to hold a transformation matrix.

FIG. 49 is a diagram illustrating examples of assignment of a transform type to a transform type identifier.

FIG. 53 is a diagram illustrating examples of an LUT size required to hold a transformation matrix.

FIG. 55 is a diagram illustrating examples of assignment of a transform type to a transform type identifier.

FIG. 57 is a diagram illustrating examples of an LUT size required to hold a transformation matrix.

FIG. 58 is a diagram illustrating examples of assignment of a transform type to a transform type identifier.

FIG. 60 is a diagram illustrating examples of an LUT size required to hold a transformation matrix.

FIG. 62 is a diagram illustrating examples of assignment of a transform type to a transform type identifier.

FIG. 67 is a diagram illustrating a list of main specific examples of substitution of a transformation matrix involving transformation of a prediction residual.

FIG. 68 is a diagram illustrating examples of an LUT size required to hold a transformation matrix.

FIG. 72 is a diagram illustrating examples of assignment of a transform type to a transform type identifier.

FIG. 75 is a diagram illustrating examples of an LUT size required to hold a transformation matrix.

FIG. 79 is a diagram illustrating examples of assignment of a transform type to a transform type identifier.

FIG. 82 is a diagram illustrating examples of assignment of a transform type to a transform type identifier.

FIG. 83 is a diagram illustrating examples of assignment of a transform type to a transform type identifier.

FIG. 85 is a diagram illustrating a list of main specific examples of a transformation matrix derived from a submatrix.

FIG. 95 is a diagram illustrating examples of assignment of a transform type to a transform type identifier.

FIG. 98 is a diagram illustrating examples of an LUT size required to hold a transformation matrix.

FIG. 101 is a diagram illustrating examples of assignment of a transform type to a transform type identifier.

FIG. 102 is a block diagram illustrating a main configuration example of a computer.

MODE FOR CARRYING OUT THE INVENTION

Figure 4:
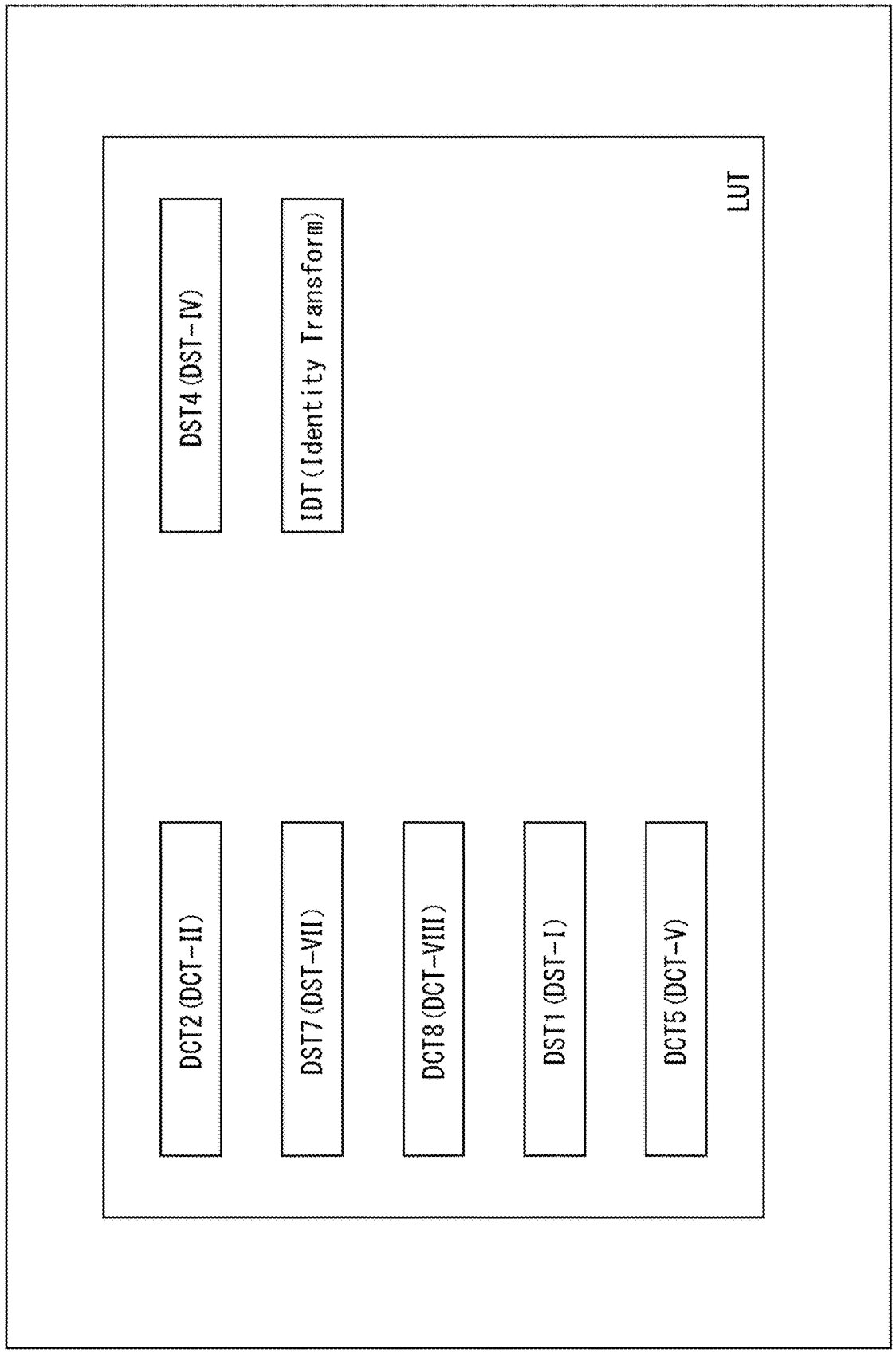
FIG. 4 is a diagram illustrating examples of types of orthogonal transform stored in an LUT.

Hereinafter, modes for implementing the present disclosure (hereinafter referred to as embodiments) will be described. Note that the description will be given in the following order.

1. Adaptive Primary Transform [0016]
2. First Embodiment (derivation of transformation matrix from transformation matrix) [0041]
   2-1. Common Concept
   2-2. Example 1-1
   2-3. Example 1-2
   2-4. Example 1-3
   2-5. Example 1-4
   2-6. Example 1-5
3. Second Embodiment (prediction residual transform) [0561]
   3-1. Common Concept
   3-2. Example 2-1
   3-3. Example 2-2
   3-4. Example 2-3
   3-5. Example 2-4
4. Third Embodiment (derivation of transformation matrix from submatrix) [0734]
   4-1. Common Concept
5. Fourth Embodiment (combination of embodiments)
   5-1. Common Concept
6. Appendix

1. ADAPTIVE PRIMARY TRANSFORM

<Documents that Support Technical Content and Technical Terms>

The range disclosed by the present technology includes not only the content described in the examples but also the content described in the following non-patent documents that are known at the time of filing.

Non-Patent Document 1: (described above)

Non-Patent Document 3: TELECOMMUNICATION STANDARDIZATION SECTOR OF ITU (International Telecommunication Union), "Advanced video coding for generic audiovisual services", H.264, April 2017

Non-Patent Document 4: TELECOMMUNICATION STANDARDIZATION SECTOR OF ITU (International Telecommunication Union), "High efficiency video coding", H.265, December 2016

That is, the content described in the above-mentioned non-patent documents also serves as a basis for determining the support requirements. For example, the quad-tree block structure described in Non-Patent Document 4 and the quad tree plus binary tree (QTBT) block structure described in Non-Patent Document 1 fall within the disclosure range of the present technology even in the case where these pieces of content are not directly described in the examples, and satisfy the support requirements of the claims. Furthermore, for example, technical terms such as parsing, syntax, and semantics are similarly fall within the disclosure range of the present technology even in the case where these technical terms are not directly described in the examples, and satisfy the support requirements of claims.

Furthermore, in the present specification, a "block" (not a block indicating a processing unit) used for description as a partial region or a unit of processing of an image (picture) indicates an arbitrary partial region in a picture unless otherwise specified, and the size, shape, characteristics, and the like of the block are not limited. For example, the "block" includes an arbitrary partial region (unit of processing) such as a transformation block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a transformation block, a subblock, a macro block, a tile, or a slice, described in Non-Patent Documents 1, 3, and 4.

Furthermore, in specifying the size of such a block, not only the block size is directly specified but also the block size may be indirectly specified. For example, the block size may be specified using identification information for identifying the size. Furthermore, for example, the block size may be specified by a ratio or a difference from the size of a reference block (for example, an LCU, an SCU, or the like). For example, in a case of transmitting information for specifying the block size as a syntax element or the like, information for indirectly specifying the size as described above may be used as the information. With the configuration, the amount of information can be reduced, and the coding efficiency can be improved in some cases. Furthermore, the specification of the block size also includes specification of a range of the block size (for example, specification of a range of an allowable block sizes, or the like).

<Adaptive Primary Transform>

In the test model (Joint Exploration Test Model 4 (JEM4)) described in Non-Patent Document 1, adaptive primary transform (adaptive multiple core transforms (AMT)) is disclosed, in which a primary transform is adaptively selected from a plurality of different one-dimensional orthogonal transforms for each horizontal primary transform PThor (also referred to as primary horizontal transform) and vertical primary transform PTver (also referred to as primary vertical transform) regarding a luminance transformation block.

Specifically, regarding the luminance transformation block, in a case where an adaptive primary transform flag apt_flag indicating whether or not to perform adaptive primary transform is 0 (false), discrete cosine transform (DCT)-II or discrete sine transform (DST)-VII is uniquely determined by mode information as primary transform, as in the table (LUT_TrSetToTrTypIdx) illustrated in FIG. 1, for example (TrSetIdx=4).

In a case where the adaptive primary transform flag apt_flag is 1 (true) and a current coding unit (CU) including the luminance transformation block to be processed is an intra CU, a transform set TrSet including orthogonal transform serving as a primary transform candidate is selected for each of a horizontal direction (x direction) and a vertical direction (y direction) from among three transform sets TrSet (TrSetIdx=0, 1, and 2) illustrated in FIG. 1, as in the table illustrated in FIG. 1. Note that DST-VII, DCT-VIII, and the like illustrated in FIG. 1 indicate types of orthogonal transform, and functions such as those illustrated in the table in FIG. 2 are used.

The transform set TrSet is uniquely determined on the basis of (intra prediction mode information of) a correspondence table of the mode information and the transform set illustrated in FIG. 3. For example, a transform set identifier TrSetIdx for specifying a corresponding transform set TrSet is set for each of transform sets TrSetH and TrSetV, as in the following expressions (1) and (2).

[Math. 1]

$$\text{TrSet}H = \text{LUT\_IntraModeToTrSet}[\text{IntraMode}][0] \quad (1)$$

$$\text{TrSet}V = \text{LUT\_IntraModeToTrSet}[\text{IntraMode}][1] \quad (2)$$

Here, TrSetH represents a transform set of the primary horizontal transform PThor, TrSetV represents a transform set of the primary vertical transform PTver, and the lookup table LUT_IntraModeToTrSet represents the correspondence table in FIG. 3. The first array of the lookup table LUT_IntraModeToTrSet [ ] [ ] has an intra prediction mode IntraMode as an argument, and the second array has {H=0, V=1} as an argument.

For example, in a case of the intra prediction mode number 19 (IntraMode==19), a transform set of the transform set identifier TrSetIdx=0 illustrated in the table in FIG. 1 is selected as the transform set TrSetH of the primary horizontal transform PThor (also referred to as primary horizontal transform set), and a transform set of the transform set identifier TrSetIdx=2 illustrated in the table in FIG. 1 is selected as the transform set TrSetV of the primary vertical transform PTver (also referred to as primary horizontal transform set).

Note that, in a case where the adaptive primary transform flag apt_flag is 1 (true) and the current CU including the luminance transformation block to be processed is an inter CU, the transform set InterTrSet (TrSetIdx=3) dedicated to inter CU is assigned to the transform set TrSetH of primary horizontal transform and the transform set TrSetV of primary vertical transform.

Next, which orthogonal transform of the selected transform sets TrSet is applied is selected according to a corresponding specification flag between a primary horizontal transform specification flag pt_hor_flag and a primary vertical transform specification flag pt_ver_flag, for each of the horizontal direction and the vertical direction.

For example, a transform set is derived from a transform set definition table (LUT_TrSetToTrTypeIdx) illustrated in FIG. 1, using the primary {horizontal, vertical} transform set TrSet {H, V} and the primary {horizontal, vertical} transfer specification flag pt_{_hor, ver}_flag as arguments, as in the following expressions (3) and (4).

[Math. 2]

$$\text{TrTypeIdx}H = \text{LUT\_TrSetToTrTypeIdx}[\text{TrSet}H][\text{pt\_hor\_flag}] \quad (3)$$

$$\text{TrTypeIdx}V = \text{LUT\_TrSetToTrTypeIdx}[\text{TrSet}V][\text{pt\_ver\_flag}] \quad (4)$$

For example, in a case of the intra prediction mode number 34 (IntraMode==34) (that is, the primary horizontal transform set TraSetH is 0) and the primary horizontal transform specification flag pt_hor_flag is 0, the value of the transform type identifier TrTypeIdxH of the expression (3) is 4 from the transform set definition table (LUT_TrSetToTrTypeIdx) in FIG. 1, and the transform type identifier TrTypeH corresponding to the value of the transform type identifier TrTypeIdxH is DST-VII by reference to FIG. 2. That is, DST-VII of the transform set with the transform set identifier TrSetIdx of 0 is selected as the transform type of the primary horizontal transform PThor. Furthermore, in the case where the primary horizontal transform specification flag pt_hor_flag is 1, DCT-VIII is selected as the transform type. Note that selecting the transform type TrType includes selecting a transform type specified with the transform type identifier TrTypeIdx via the transform type identifier TrTypeIdx.

Note that a primary transform identifier pt_idx is derived from the primary horizontal transform specification flag pt_hor_flag and the primary vertical transform specification flag pt_ver_flag on the basis of the following expression (5). That is, an upper 1 bit of the primary transform identifier pt_idx corresponds to the value of the primary vertical transform specification flag, and a lower 1 bit corresponds to the value of the primary horizontal transform specification flag.

[Math. 3]

$$pt\_idx = pt\_ver\_flag << 1) + pt\_hor\_flag \quad (5)$$

Encoding is performed by applying arithmetic coding to a derived bin string of the primary transform identifier pt_idx to generate a bit string. Note that the adaptive primary transform flag apt_flag and the primary transform identifier pt_idx are signaled in the luminance transformation block.

As described above, Non-Patent Document 1 proposes five one-dimensional orthogonal transforms of DCT-II (DCT2), DST-VII (DST7), DCT-VIII (DCT8), DST-I (DST1), and DCT-V (DCT5) as primary transform candidates. Furthermore, Non-Patent Document 2 proposes two one-dimensional orthogonal transforms of DST-IV (DST4) and identity transform (IDT: one-dimensional transform skip) in addition to the above to have a total of seven one-dimensional orthogonal transforms as primary transform candidates.

That is, in the case of Non-Patent Document 1, as illustrated in FIG. 4, one-dimensional orthogonal transforms are stored in the LUT as the primary transform candidates. Furthermore, in the case of Non-Patent Document 2, DST-IV (DST4) and IDT are further stored in the LUT in addition to the above (see FIG. 4).

In a case of high efficiency video coding (HEVC), the size of the lookup table (LUT) required to hold a transformation matrix is as illustrated in the table in FIG. 5. That is, the size of the LUT is about 1.3 KB in total. In contrast, in the case of the method described in Non-Patent Document 1, DCT2 needs to hold a transformation matrix for each size of 2/4/8/16/32/64/128 points on the LUT, for example. Furthermore, other one-dimensional transforms (DST7/DST1/DCT8) need to hold a transformation matrix for each size of 4/8/16/32/64 points on the LUT. In this case, assuming that bit precision of each coefficient of a transformation matrix is 10 bits, the size of the LUT required to hold all of transformation matrices of the primary transformation is illustrated in A in FIG. 6. That is, the size of the LUT in this case is about 53 KB in total. That is, the size of the LUT in this case increases about 50 times of the case of HEVC.

Similarly, in the case of the method described in Non-Patent Document 2, the size of the LUT required to hold all of transformation matrices of the primary transform is as illustrated in the table in B in FIG. 6. That is, the size of the LUT in this case is about 67 KB in total. That is, the size of the LUT in this case increases about 60 times of the case of HEVC.

In a case of considering hardware implementation of the primary transform, the size of the LUT is reflected in storage capacity (memory capacity). That is, in the case of the methods described in Non-Patent Documents 1 and 2, there is a possibility of an increase in a circuit scale (memory capacity required to hold coefficients of the transformation matrix) by about 50 to 60 times of the case of HEVC.

2. FIRST EMBODIMENT

2-1. Common Concept

<Derivation of Transformation Matrix>

Therefore, a second transformation matrix is derived using a first transformation matrix, a prediction residual of an image is orthogonally transformed using the derived second transformation matrix, and coefficient data obtained by orthogonally transforming the prediction residual is encoded to generate a bit stream.

For example, an image processing apparatus includes a derivation unit configured to derive a second transformation matrix using a first transformation matrix, an orthogonal transform unit configured to orthogonally transform a prediction residual of an image, using the second transformation matrix derived by the derivation unit, and an encoding unit configured to encode coefficient data obtained by orthogonally transforming the prediction residual by the orthogonal transform unit to generate a bit stream.

With the configuration, the transformation matrix can be derived from another transformation matrix. Therefore, an increase in the number of transformation matrices prepared for the orthogonal transform can be suppressed, and an increase in memory capacity required for the orthogonal transform can be suppressed.

Furthermore, a bit stream is decoded to obtain coefficient data that is an orthogonally transformed prediction residual of an image, a second transformation matrix is derived using a first transformation matrix, and the obtained coefficient data is inversely orthogonally transformed using the derived second transformation matrix.

For example, the image processing apparatus includes a decoding unit configured to decode a bit stream to obtain coefficient data that is an orthogonally transformed prediction residual of an image, a derivation unit configured to derive a second transformation matrix, using a first transformation matrix, and an inverse orthogonal transform unit configured to inversely orthogonally transform the coefficient data obtained by the decoding unit, using the second transformation matrix derived by the derivation unit.

With the configuration, the transformation matrix can be derived from another transformation matrix. Therefore, an increase in the number of transformation matrices prepared for the inverse orthogonal transform can be suppressed, and an increase in memory capacity required for the inverse orthogonal transform can be suppressed.

<Characteristics of Transformation Matrix>

One of main roles of the transformation matrix is to bias a signal of a low-order (particularly 0-order) frequency component in a DC component direction, and how to collect frequency components is an important characteristic. A waveform component of a low-order (particularly 0-order) base vector (row vector) is important for how to bias the frequency component. That is, transformation matrices having a similar tendency in the waveform component of the base vector can expect similar performance for orthogonal transform/inverse orthogonal transform (how to bias the frequency component is similar).

Therefore, attention is paid to the waveform of the low-order (particularly 0-order) base vector (row vector) of the transformation matrix. For example, in a transformation matrix 30 in FIG. 7, it is assumed that the waveform of a low-order (particularly 0-order) row vector (tendency of values of elements) in a frame 31 is illustrated as a graph 32.

The graph 32 illustrates (the tendency that) the value of the element of the frequency component becomes lower toward a left side and (the tendency that) the value of the element of the frequency component becomes higher toward a right side. Furthermore, the graph 32 illustrates that the value becomes larger toward an upper side and the value becomes lower toward a lower side in FIG. 7. Note that the center in the up-down direction in the graph 32 illustrates 0, and an upper side of the center illustrates a positive value and a lower side of the center illustrates a negative value.

A waveform 32A in the graph 32 illustrates the waveform of the 0-order row vector of the transformation matrix 30. As illustrated in the waveform 32A, in this case, the 0-order row vector of the transformation matrix 30 has a tendency that the value becomes larger from low frequency components to high frequency components.

Figure 7:
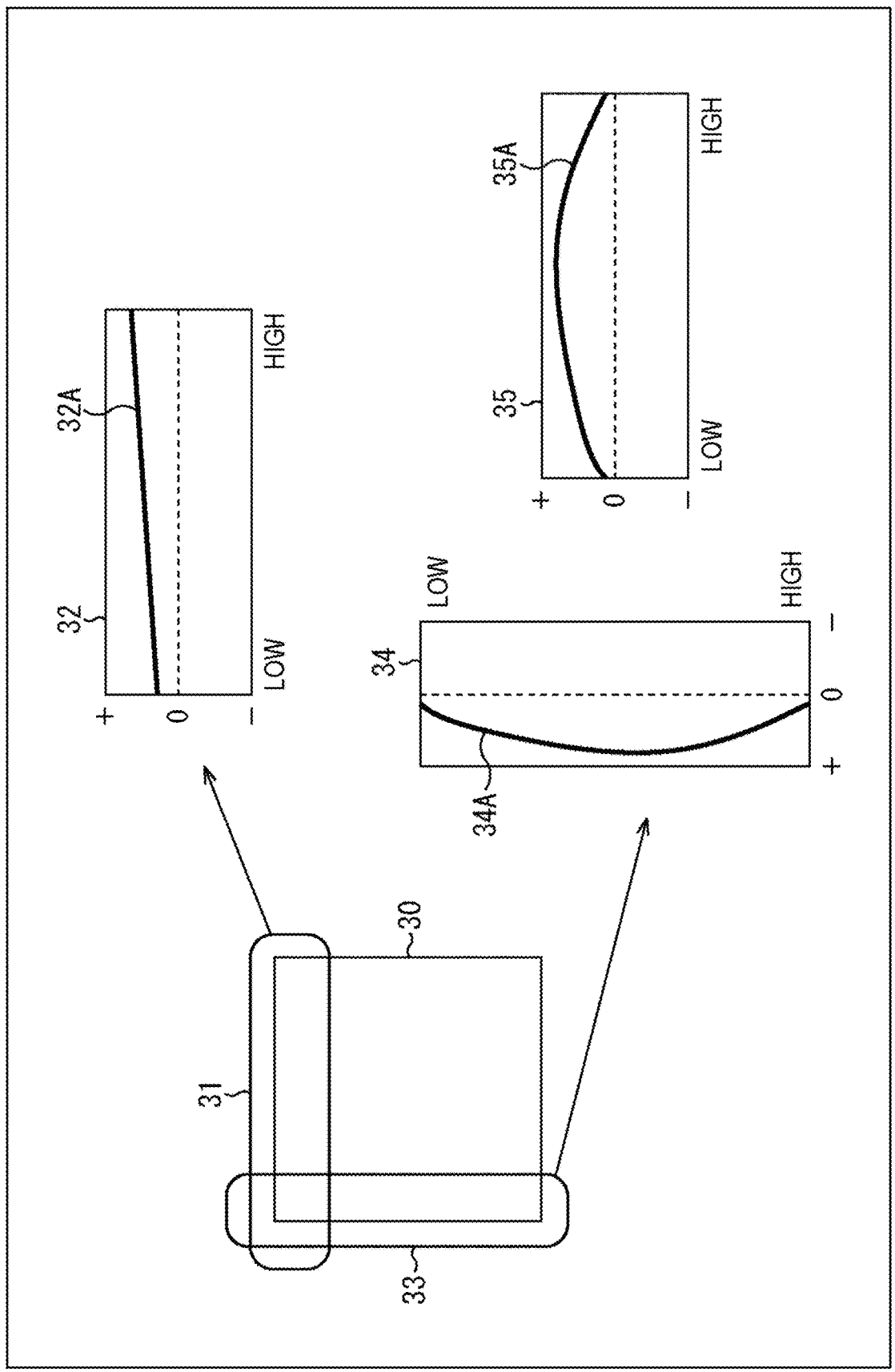
FIG. 7 is a diagram for describing an example of similarity between transformation matrices.

Furthermore, for example, in the transformation matrix 30 in FIG. 7, it is assumed that the waveform of a low-order (particularly 0-order) column vector (tendency of values of elements) in a frame 33 is illustrated as a graph 34. The graph 34 illustrates (the tendency that) the value of the element of the frequency component becomes lower toward an upper side and (the tendency that) the value of the element of the frequency component becomes higher toward a lower side in FIG. 7. Furthermore, the graph 34 illustrates that the value becomes larger toward a more left side and the value becomes lower toward a more right side in FIG. 7. Note that the center in the right-left direction in the graph 34 illustrates 0, and a left side of the center illustrates a positive value and a right side of the center illustrates a negative value.

A waveform 34A in the graph 34 illustrates the waveform of the 0-order column vector of the transformation matrix 30. As illustrated in the waveform 34A, in this case, the 0-order column vector of the transformation matrix 30 has a peak at an intermediate frequency component (that is, has a tendency that the value becomes smaller toward a lower frequency component on the low frequency side, and the value becomes smaller toward a higher frequency component at the high frequency side.

Note that in the present specification, the waveform of the 0-order column vector of the transformation matrix 30 may be illustrated in a transposed state as illustrated as a graph 35. The structure of the graph 35 is similar to that of the graph 32. A waveform 35A is equivalent to the waveform 34A.

As described above, transformation matrices having similar waveforms of low-order (particularly 0-order) base vectors (row vectors) have similar performance. In other words, a transformation matrix can be substituted by another transformation matrix having a similar waveform of a low-order (particularly 0-order) base vector (row vector). Therefore, an increase in the number of transformation matrices to be stored in the LUT can be suppressed by using the above characteristic.

Figure 8:
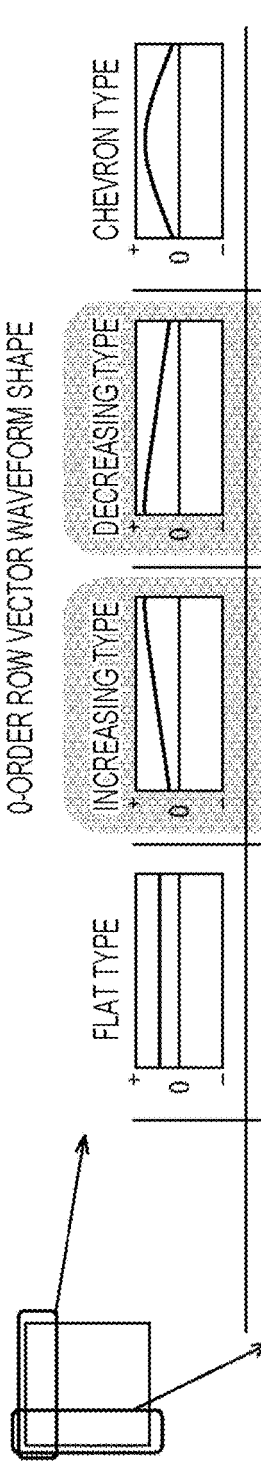
FIG. 8 is a diagram for describing examples of transformation types substitutable by flip.

Here, attention is paid to the transform types described in Non-Patent Document 1 and Non-Patent Document 2, the waveforms of the 0-order row vectors and the 0-order column vectors of the transformation matrices of these transform types can be classified into four types. FIG. 8 illustrates examples.

The first type is a flat type. The flat type is a waveform type in which the value is substantially uniform in each frequency component. The second type is an increasing type. The increasing type is a waveform type in which the value tends to increase from a low frequency component toward a high frequency component. The third type is a decreasing type. The decreasing type is a waveform type in which the value tends to decrease from a low frequency component toward a high frequency component. The fourth type is a chevron type. The chevron type is a waveform type in which the value tends to have a peak (maximum value) in a middle. That is, in the case of the chevron-type, the value of the waveform tends to decrease toward a lower frequency component on the low frequency component side, and the value tends to decrease toward a higher frequency component on the high frequency component side.

Note that each of these types exhibits an approximate shape of the waveform, and does not need to completely match. For example, in the case of the increasing type, the waveform does not need to strictly monotonically increase from the low frequency side to the high frequency side as long as the waveform as a whole tends to increase in the value from the low frequency side to the high frequency side.

Similarly, in the case of the decreasing type, the waveform does not need to strictly monotonically decrease from the low frequency side to the high frequency side as long as the waveform as a whole tends to decrease in the value from the low frequency side to the high frequency side.

Similarly, in the case of the chevron type, the value of the waveform does not need to monotonically decrease in directions away from the peak at both sides of the peak as long as the waveform as a whole has the peak (maximum value) near the center, and tends to decrease in values on the both sides in the directions away from the peak. Furthermore, the peak does not need to be formed by one component. For example, approximate position and value of the peak may be able to be specified from a plurality of components. Furthermore, the position of the peak does not need to be exactly at the center.

Similarly, in the case of the flat type, the waveform does not need to be strictly flat as long as the waveform as a whole is substantially uniform in the value. That is, there may be some variation in the value. In other words, a waveform that cannot be classified into the other three types may be classified into the flat type.

The above waveform classification is an example, and the classification is not limited to the above-described example. That is, waveforms may be classified into types other than those described above, and the number of types to be classified is arbitrary and is not limited to the above four types. Note that this classification is performed for convenience of description of the present technology, and is not performed as actual processing.

According to this classification, as illustrated in FIG. 8, the waveform of the 0-order row vector of the transformation matrix of DCT2 is classified into the flat type, and the waveform of the 0-order column vector is classified into the decreasing type. Furthermore, the waveform of the 0-order row vector of the transformation matrix of DST7 is classified into the increasing type, and the waveform of the 0-order column vector is classified into the chevron type. Furthermore, the waveform of the 0-order row vector of the transformation matrix of DCT8 is classified into the decreasing type, and the waveform of the 0-order column vector is classified into the decreasing type. Furthermore, the waveform of the 0-order row vector of the transformation matrix of DCT5 is classified into the flat type, and the waveform of the 0-order column vector is classified into the flat type. Note that the waveform of the 0-order row vector of the transformation matrix of DST4 is classified into the increasing type, and the waveform of the 0-order column vector is classified into the increasing type.

As described above, the transformation matrix can be substituted by another transformation matrix having a similar waveform of the 0-order row vector. That is, the transformation matrices can be substituted by each other between the transform types having the same type of waveforms of the 0-order row vectors.

That is, when deriving the second transformation matrix, using the above-described first transformation matrix, the derivation unit may derive the second transformation matrix in which the lowest-order row vector has a desired type of waveform. With the configuration, an increase in the number of transformation matrices prepared for the orthogonal transform/inverse orthogonal transform can be suppressed, and an increase in the memory capacity required for the orthogonal transform/inverse orthogonal transform can be suppressed.

For example, the derivation unit may derive the second transformation matrix in which the lowest-order row vector has the flat-type waveform, using the first transformation matrix. With the configuration, a transformation matrix having the flat-type waveform of the lowest-order row vector can be substituted by the derived second transformation matrix. Furthermore, for example, the derivation unit may derive the second transformation matrix in which a lowest-order row vector has an increasing-type waveform, using the first transformation matrix. With the configuration, a transformation matrix having the increasing-type waveform of the lowest-order row vector can be substituted by the derived second transformation matrix.

Furthermore, for example, the derivation unit may derive the second transformation matrix in which a lowest-order row vector has a decreasing-type waveform, using the first transformation matrix. With the configuration, a transformation matrix having the decreasing-type waveform of the lowest-order row vector can be substituted by the derived second transformation matrix. Furthermore, for example, the derivation unit may derive the second transformation matrix in which a lowest-order row vector has a chevron-type waveform, using the first transformation matrix. With the configuration, a transformation matrix having the chevron-type waveform of the lowest-order row vector can be substituted by the derived second transformation matrix.

For example, in FIG. 8, all the DST7, DST4, DST8, and DST3 have the increasing-type waveforms of the 0th-order row vectors, the transformation matrices can be substituted by one another. That is, the transformation matrices can be substituted even if the transformation matrices have different transformation types.

That is, when deriving the second transformation matrix, using the above-described first transformation matrix, the derivation unit may derive the second transformation matrix of a transform type different from that of the first transformation matrix. With the configuration, an increase in the number of transformation types prepared for the orthogonal transform/inverse orthogonal transform can be suppressed, and an increase in the memory capacity required for the orthogonal transform/inverse orthogonal transform can be suppressed.

Note that, in the derivation, the derivation unit may derive the second transformation matrix having the same number of rows and the same number of columns as the first transformation matrix. In a case of changing the number of rows and columns, there is a possibility that the waveform type unintentionally changes. Therefore, by setting the number of rows and columns to be the same as those of the first transformation matrix, the possibility of an unintended change in the waveform type can be suppressed and the second transformation matrix can be more easily derived.

Note that an operation for elements can be easily performed for a matrix. An example of the operation for elements of a matrix includes rearrangement of elements and the like. More specifically, for example, in a matrix, the arrangement order of an element group can be flipped (inverted) in a predetermined direction, or the element group can be transposed to interchange rows and columns. Note that transposition is equivalent to flip (inversion) around a diagonal line connecting an upper left end and a lower right end of the matrix. That is, transposition can be said to be a part of flip. Furthermore, it is also easy to invert the sign of each element (from positive to negative or from negative to positive).

By using such an operation, (the type of) the waveform of the 0th-order row vector can be intentionally changed. For example, when a matrix having the increasing-type waveform of the 0-order row vector is flipped in the row direction, the waveform of the 0-order row vector changes to the decreasing type. Conversely, when a matrix having the decreasing-type waveform of the 0-order row vector is flipped in the row direction, the waveform of the 0-order row vector changes to the increasing type.

That is, as illustrated in FIG. 8, by flipping the transformation matrix in which the waveform of the 0-order row vector is the increasing transform type (for example, DST7, DST4, DST8, or DST3) in the row direction, a transformation matrix that can substitute the transformation matrix in which the waveform of the 0-order row vector is the decreasing transform type (for example, DCT7, DCT4, DCT8, or DCT3) can be obtained.

Furthermore, for example, when a matrix is transposed, the waveform type of the 0-order row vector and the waveform type of the 0-order column vector are interchanged. That is, by transposition, the waveform of the 0-order row vector of the matrix becomes the same type as the waveform of the 0-order column vector of the matrix before transposition.

Figure 9:
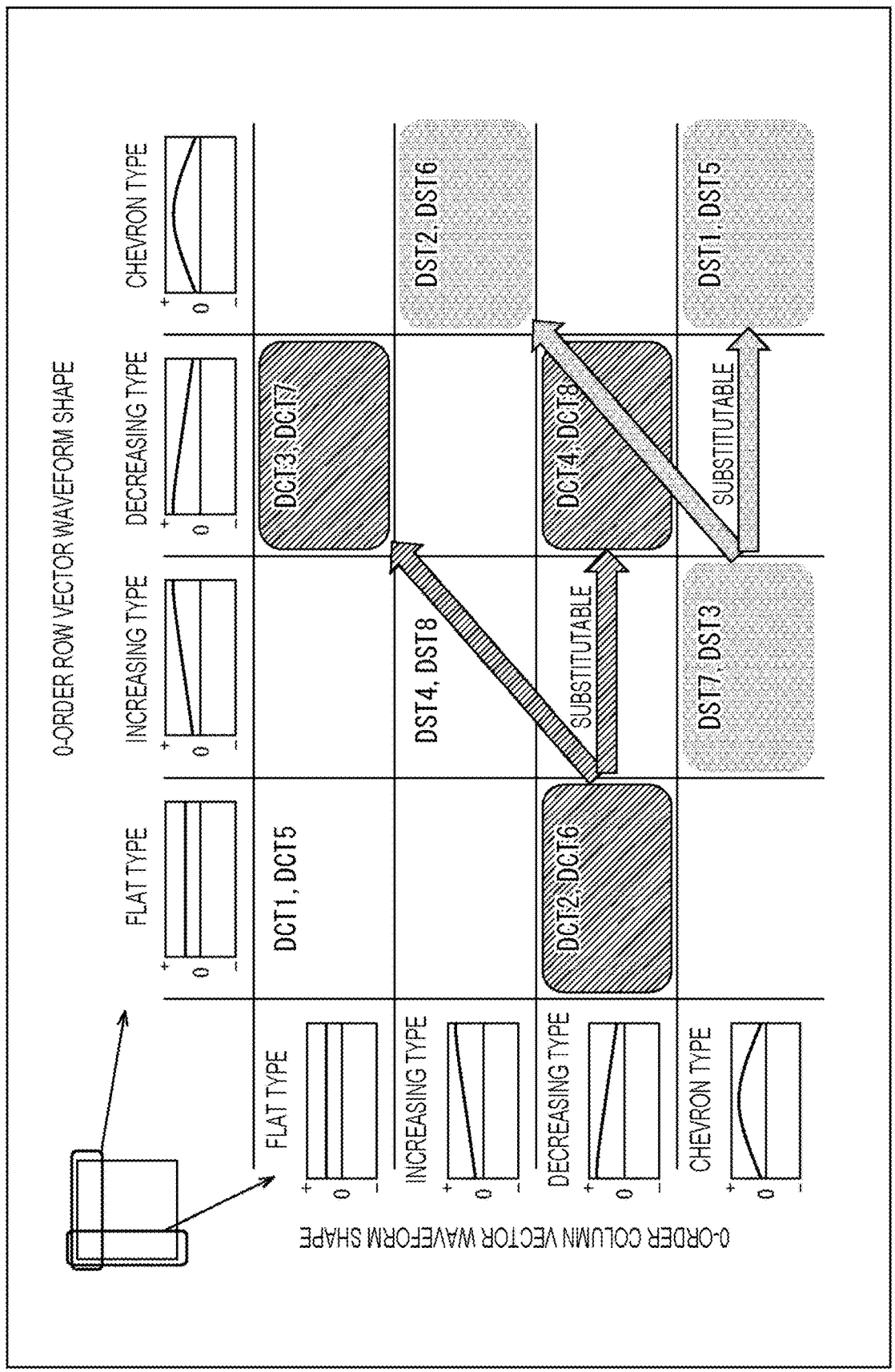
FIG. 9 is a diagram for describing examples of transformation types substitutable by transposition.

For example, as illustrated in FIG. 9, by transposing the transformation matrix of DCT2 (DCT6) in which the waveform of the 0-order column vector is the decreasing type, a transformation matrix that can substitute the transformation matrix in which the waveform of the 0-order row vector is the decreasing transform type (DCT3, DCT7, DCT4, or DCT8) can be obtained. Furthermore, as illustrated in FIG. 9, by transposing the transformation matrix of DST7 (DST3) in which the waveform of the 0-order column vector is the chevron type, a transformation matrix that can substitute the transformation matrix in which the waveform of the 0-order row vector is the chevron transform type (DST2, DST6, DST1, or DST5) can be obtained.

That is, the derivation unit may derive the second transformation matrix by an operation for an element of such a first transformation matrix. Then, the operation for an element may include the rearrangement of elements (change of the arrangement order) as described above. With the configuration, the type of the waveform can be intentionally changed, so that more diverse second transformation matrices can be derived from the first transformation matrix. Therefore, an increase in the number of transformation types prepared for the orthogonal transform/inverse orthogonal transform can be suppressed, and an increase in the memory capacity required for the orthogonal transform/inverse orthogonal transform can be suppressed.

Note that, of course, the derivation unit may perform such an operation a plurality of times to derive the second transformation matrix. For example, operations such as flip and transposition can be arbitrarily combined. Furthermore, the same operation may be repeated a plurality of times. By doing so, more various second transformation matrices can be derived from the first transformation matrix.

Note that, as described above, the transformation matrix used for the orthogonal transform/inverse orthogonal transform is stored in the LUT. Therefore, the derivation unit may derive the second transformation matrix, using the first transformation matrix stored in the lookup table (LUT). By doing so, an increase in the size of the LUT can be suppressed. Therefore, an increase in the memory capacity required for the orthogonal transform/inverse orthogonal transform can be suppressed.

<Derivation Example>

FIG. 10 illustrates a list of transformation matrix derivation examples involving the above operations. Note that the transformation matrix (first transformation matrix) used for derivation is also referred to as a base transformation matrix $T_{base}$. The transform type of the base transformation matrix is also called a base transform type or a first transform type. Furthermore, the transform type of the transformation matrix (second transformation matrix) to be derived is also referred to as a second transform type.

In the table illustrated in FIG. 10, the derivation of the first row example from the top except the uppermost row of item names focuses on similarity between the waveform of the lowest-order row vector of the first transform type and the waveform of the lowest-order row vector of the transform type of a transformation matrix to be substituted.

In this case, the derivation unit flips the first transformation matrix to derive the second transformation matrix. More specifically, the derivation unit uses the transformation matrix of DST7 as the base transformation matrix $T_{base}$, and flips the transformation matrix in the row direction to derive a transformation matrix of FlipDST7. Since the waveform of the 0-order row vector of the transformation matrix of DST7 is of the increasing type, the waveform of the 0-order row vector of the derived transformation matrix of FlipDST7 is of the decreasing type. Therefore, the transformation matrix of DCT8 having the decreasing-type waveform of the 0-order row vector can be substituted by the transformation matrix of FlipDST7.

By applying such derivation, it becomes unnecessary to prepare the transformation matrix of DCT8 as a candidate for a transformation matrix to be used for orthogonal transform/inverse orthogonal transform. That is, the number of unique transform types can be reduced. That is, an increase in the LUT size can be suppressed. Furthermore, by performing the orthogonal transform/inverse orthogonal transform using the transformation matrix of the derived second transform type (FlipDST7), similar coding efficiency to the case of using the transformation matrix of DCT8 for the orthogonal transform/inverse orthogonal transform can be obtained. Furthermore, in this case, the second transformation matrix (decreasing-type substitution transformation matrix) can be derived by one-time operation.

Furthermore, the derivation of an example one row below the first row example (the second row example from the top) focuses on similarity between the waveform of the lowest-order column vector of the first transform type and the waveform of the lowest-order row vector of the transform type of a transformation matrix to be substituted.

In this case, the derivation unit transposes the first transformation matrix to derive the second transformation matrix.

More specifically, the derivation unit uses the transformation matrix of DST7 as the base transformation matrix $T_{base}$, and transposes the transformation matrix to derive a transformation matrix of TrDST7. Since the waveform of the 0-order column vector of the transformation matrix of DST7 is of the chevron type, the waveform of the 0-order row vector of the derived transformation matrix of TrDST7 is of the chevron type. Therefore, the transformation matrix of DST1 having the chevron-type waveform of the 0-order row vector can be substituted by the transformation matrix of TrDST7.

By applying such derivation, it becomes unnecessary to prepare the transformation matrix of DST1 as a candidate for a transformation matrix to be used for orthogonal transform/inverse orthogonal transform. That is, the number of unique transform types can be reduced. That is, an increase in the LUT size can be suppressed. Furthermore, by performing the orthogonal transform/inverse orthogonal transform using the transformation matrix of the derived second transform type (TrDST7), similar coding efficiency to the case of using the transformation matrix of DST1 for the orthogonal transform/inverse orthogonal transform can be obtained. Furthermore, in this case, the second transformation matrix (chevron-type substitution transformation matrix) can be derived by one-time operation.

Furthermore, the derivation of an example one row below the second row example (the third row example from the top) focuses on characteristics between paired DCT and DST. More specifically, between DCT/DST to be paired (for example, DST7 and DCT8), attention is paid to the point that even-numbered row vectors are axially symmetric and odd-numbered row vectors are point-symmetric.

In this case, the derivation unit flips the first transformation matrix and inverts the sign of the odd-numbered row vector of the flipped first transformation matrix to derive the second transformation matrix. More specifically, the derivation unit uses the transformation matrix of DST7 as the base transformation matrix $T_{base}$, and flips the transformation matrix in the row direction and further inverts the sign of the odd-order row vector to derive a transformation matrix of DCT8. Note that row vector sign inversion is simply performed by transforming the most significant bit of each element of the row vector. Naturally, the transformation matrix of DST8 having the decreasing-type waveform of the 0-order row vector can be substituted by the derived transformation matrix of DCT8.

By applying such derivation, it becomes unnecessary to prepare the transformation matrix of DCT8 as a candidate for a transformation matrix to be used for orthogonal transform/inverse orthogonal transform. That is, the number of unique transform types can be reduced. That is, an increase in the LUT size can be suppressed. Furthermore, naturally, by performing the orthogonal transform/inverse orthogonal transform using the transformation matrix of the derived second transform type (DCT8), the same coding efficiency as the case of using the transformation matrix of DCT8 for the orthogonal transform/inverse orthogonal transform can be obtained. Furthermore, in this case, the second transformation matrix (substitution transformation matrix to be paired) can be derived by two-time operation.

Furthermore, the derivation of an example one row below the third row example (the fourth row example from the top) focuses on similarity between the waveform of the lowest-order row vector of the first transform type and the waveform of the lowest-order row vector of the transform type of a transformation matrix to be substituted, similarly to the case of the first row example from the top.

In this case, the derivation unit flips the first transformation matrix to derive the second transformation matrix. More specifically, the derivation unit uses the transformation matrix of DCT8 as the base transformation matrix $T_{base}$, and flips the transformation matrix in the row direction to derive a transformation matrix of FlipDCT8. Since the waveform of the 0-order row vector of the transformation matrix of DCT8 is of the decreasing type, the waveform of the 0-order row vector of the derived transformation matrix of FlipDCT8 is of the increasing type. Therefore, the transformation matrix of DST7 having the increasing-type waveform of the 0-order row vector can be substituted by the transformation matrix of FlipDCT8.

By applying such derivation, it becomes unnecessary to prepare the transformation matrix of DST7 as a candidate for a transformation matrix to be used for orthogonal transform/inverse orthogonal transform. That is, the number of unique transform types can be reduced. That is, an increase in the LUT size can be suppressed. Furthermore, by performing the orthogonal transform/inverse orthogonal transform using the transformation matrix of the derived second transform type (FlipDCT8), similar coding efficiency to the case of using the transformation matrix of DST7 for the orthogonal transform/inverse orthogonal transform can be obtained. Furthermore, in this case, the second transformation matrix (decreasing-type substitution transformation matrix) can be derived by one-time operation.

Furthermore, the derivation of an example one row below the fourth row example (the fifth row example from the top) focuses on similarity between the waveform of a highest-order column vector of the first transform type and the waveform of the lowest-order row vector of the transform type of a transformation matrix to be substituted.

In this case, the derivation unit flips the first transformation matrix and transposes the flipped first transformation matrix to derive the second transformation matrix. More specifically, the derivation unit uses the transformation matrix of DCT8 as the base transformation matrix $T_{base}$, and flips the transformation matrix in the row direction and further transposes the transformation matrix to derive a transformation matrix of TrFlipDCT8. Since the waveform of the highest-order column vector of the transformation matrix of DCT8 is of the chevron type, the waveform of the 0-order row vector of the derived transformation matrix of TrFlipDCT8 is of the chevron type. Therefore, the transformation matrix of DST1 having the chevron-type waveform of the 0-order row vector can be substituted by the transformation matrix of TrFlipDCT8.

By applying such derivation, it becomes unnecessary to prepare the transformation matrix of DST1 as a candidate for a transformation matrix to be used for orthogonal transform/inverse orthogonal transform. That is, the number of unique transform types can be reduced. That is, an increase in the LUT size can be suppressed. Furthermore, by performing the orthogonal transform/inverse orthogonal transform using the transformation matrix of the derived second transform type (TrFlipDCT8), similar coding efficiency to the case of using the transformation matrix of DST1 for the orthogonal transform/inverse orthogonal transform can be obtained. Furthermore, in this case, the second transformation matrix (chevron-type substitution transformation matrix) can be derived by two-time operation.

Furthermore, the derivation of an example one row below the fifth row example (the sixth row example from the top) focuses on characteristics between paired DCT and DST, similarly to the case of the third row example from the top. More specifically, between DCT/DST to be paired (for example, DCT8 and DST7), attention is paid to the point that even-numbered row vectors are axially symmetric and odd-numbered row vectors are point-symmetric.

In this case, the derivation unit flips the first transformation matrix and inverts the sign of the odd-numbered row vector of the flipped first transformation matrix to derive the second transformation matrix. More specifically, the derivation unit uses the transformation matrix of DCT8 as the base transformation matrix $T_{base}$, and flips the transformation matrix in the row direction and further inverts the sign of the odd-order row vector to derive a transformation matrix of DST7. Naturally, the transformation matrix of DST7 having the increasing-type waveform of the 0-order row vector can be substituted by the derived transformation matrix of DST7.

By applying such derivation, it becomes unnecessary to prepare the transformation matrix of DST7 as a candidate for a transformation matrix to be used for orthogonal transform/inverse orthogonal transform. That is, the number of unique transform types can be reduced. That is, an increase in the LUT size can be suppressed. Furthermore, of course, by performing the orthogonal transform/inverse orthogonal transform using the transformation matrix of the derived second transform type (DST7), the same coding efficiency as the case of using the transformation matrix of DST7 for the orthogonal transform/inverse orthogonal transform can be obtained. Furthermore, in this case, the second transformation matrix (substitution transformation matrix to be paired) can be derived by two-time operation.

Furthermore, the derivation of an example one row below the sixth row example (the seventh row example from the top) focuses on similarity between the waveform of the lowest-order column vector of the first transform type and the waveform of the lowest-order row vector of the transform type of a transformation matrix to be substituted.

In this case, the derivation unit transposes the first transformation matrix to derive the second transformation matrix. More specifically, the derivation unit uses the transformation matrix of DCT2 as the base transformation matrix $T_{base}$, and transposes the transformation matrix to derive a transformation matrix of DCT3. Since the waveform of the 0-order column vector of the transformation matrix of DCT2 is of the decreasing type, the waveform of the 0-order row vector of the derived transformation matrix of DCT3 is of the decreasing type. Therefore, the transformation matrix of DCT8 having the decreasing-type waveform of the 0-order row vector can be substituted by the transformation matrix of DCT3.

By applying such derivation, it becomes unnecessary to prepare the transformation matrix of DCT8 as a candidate for a transformation matrix to be used for orthogonal transform/inverse orthogonal transform. That is, the number of unique transform types can be reduced. That is, an increase in the LUT size can be suppressed. Furthermore, by performing the orthogonal transform/inverse orthogonal transform using the transformation matrix of the derived second transform type (DCT3), similar coding efficiency to the case of using the transformation matrix of DCT8 for the orthogonal transform/inverse orthogonal transform can be obtained. Furthermore, in this case, the second transformation matrix (decreasing-type substitution transformation matrix) can be derived by one-time operation.

Furthermore, the derivation of an example one row below the seventh row example (the eighth row example from the top) focuses on similarity between the waveform of the highest-order column vector of the first transform type and the waveform of the lowest-order row vector of the transform type of a transformation matrix to be substituted.

In this case, the derivation unit transposes the first transformation matrix and flips the transposed first transformation matrix to derive the second transformation matrix. More specifically, the derivation unit uses the transformation matrix of DCT2 as the base transformation matrix $T_{base}$, and transposes the transformation matrix and flips the transformation matrix in the row direction to derive a transformation matrix of FlipDCT3. Since the waveform of the highest-order column vector of the transformation matrix of DCT2 is of the chevron type, the waveform of the 0-order row vector of the derived transformation matrix of FlipDCT3 is of the increasing type. Therefore, the transformation matrix of DST7 having the increasing-type waveform of the 0-order row vector can be substituted by the transformation matrix of FlipDCT3.

By applying such derivation, it becomes unnecessary to prepare the transformation matrix of DST7 as a candidate for a transformation matrix to be used for orthogonal transform/inverse orthogonal transform. That is, the number of unique transform types can be reduced. That is, an increase in the LUT size can be suppressed. Furthermore, by performing the orthogonal transform/inverse orthogonal transform using the transformation matrix of the derived second transform type (FlipDCT3), similar coding efficiency to the case of using the transformation matrix of DST7 for the orthogonal transform/inverse orthogonal transform can be obtained. Furthermore, in this case, the second transformation matrix (increasing-type substitution transformation matrix) can be derived by two-time operation.

Note that each of the above-described derivation examples may be performed independently or may be performed in combination of a plurality of derivation examples.

<Image Encoding Device>

Figure 11:
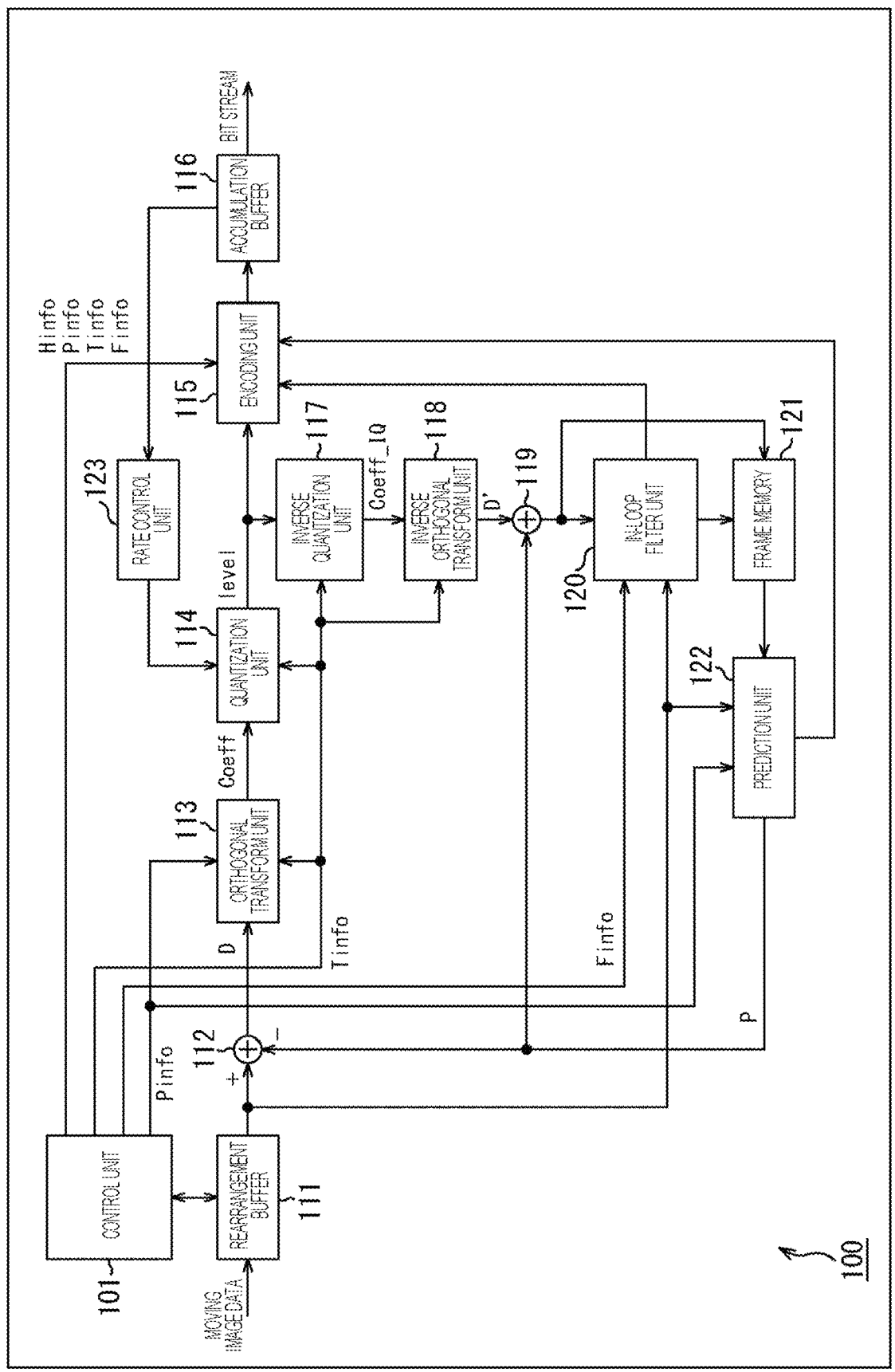
FIG. 11 is a block diagram illustrating a main configuration example of an image encoding device.

Next, a configuration for deriving the above transformation matrix will be described. FIG. 11 is a block diagram illustrating an example of a configuration example of an image encoding device that is one mode of the image processing apparatus to which the present technology is applied. An image encoding device 100 illustrated in FIG. 11 is a device that encodes image data of a moving image. For example, the image encoding device 100 implements the technology described in Non-Patent Document 1, Non-Patent Document 3, or Non-Patent Document 4, and encodes the image data of the moving image by a method conforming to the standard described in any of the aforementioned documents.

Note that FIG. 11 illustrates main processing units, data flows, and the like, and those illustrated in FIG. 11 are not necessarily everything. That is, in the image encoding device 100, there may be a processing unit not illustrated as a block in FIG. 11, or processing or data flow not illustrated as an arrow or the like in FIG. 11. This is similar in other drawings for describing a processing unit and the like in the image encoding device 100.

As illustrated in FIG. 11, the image encoding device 100 includes a control unit 101, a rearrangement buffer 111, a calculation unit 112, an orthogonal transform unit 113, a quantization unit 114, an encoding unit 115, an accumulation buffer 116, an inverse quantization unit 117, an inverse orthogonal transform unit 118, a calculation unit 119, an in-loop filter unit 120, a frame memory 121, a prediction unit 122, and a rate control unit 123.

<Control Unit>

The control unit 101 divides moving image data held by the rearrangement buffer 111 into blocks (CUs, PUs, transformation blocks, or the like) in units of processing on the basis of a block size in external or pre-designated units of processing. Furthermore, the control unit 101 determines encoding parameters (header information Hinfo, prediction mode information Pinfo, transform information Tinfo, filter information Finfo, and the like) to be supplied to each block on the basis of, for example, rate-distortion optimization (RDO).

Details of these encoding parameters will be described below. After determining the above-described encoding parameters, the control unit 101 supplies the encoding parameters to each block. Specifically, the encoding parameters are as follows.

The header information Hinfo is supplied to each block.

The prediction mode information Pinfo is supplied to the encoding unit 115 and the prediction unit 122.

The transform information Tinfo is supplied to the encoding unit 115, the orthogonal transform unit 113, the quantization unit 114, the inverse quantization unit 117, and the inverse orthogonal transform unit 118.

The filter information Finfo is supplied to the in-loop filter unit 120.

<Rearrangement Buffer>

Each field (input image) of the moving image data is input to the image encoding device 100 in reproduction order (display order). The rearrangement buffer 111 acquires and holds (stores) each input image in its reproduction order (display order). The rearrangement buffer 111 rearranges the input images in encoding order (decoding order) or divides the input images into blocks in units of processing on the basis of the control of the control unit 101. The rearrangement buffer 111 supplies the processed input image to the calculation unit 112. Furthermore, the rearrangement buffer 111 also supplies the input images (original images) to the prediction unit 122 and the in-loop filter unit 120.

<Calculation Unit>

The calculation unit 112 uses an image I corresponding to the block in units of processing and a predicted image P supplied from the prediction unit 122 as inputs, subtracts the predicted image P from the image I as illustrated in the following expression (6) to derive a prediction residual D, and supplies the prediction residual D to the orthogonal transform unit 113.

[Math. 4]

$$D=I-P \tag{6}$$

<Orthogonal Transform Unit>

The orthogonal transform unit 113 uses the prediction residual D supplied from the calculation unit 112 and the transform information Tinfo supplied from the control unit 101 as inputs, and orthogonally transforms the prediction residual D on the basis of the transform information Tinfo to derive a transform coefficient Coeff. The orthogonal transform unit 113 supplies the obtained transform coefficient Coeff to the quantization unit 114.

<Quantization Unit>

The quantization unit 114 uses the transform coefficient Coeff supplied from the orthogonal transform unit 113 and the transform information Tinfo supplied from the control unit 101 as inputs, and scales (quantizes) the transform coefficient Coeff on the basis of the transform information Tinfo. Note that a rate of this quantization is controlled by the rate control unit 123. The quantization unit 114 supplies a quantized transform coefficient obtained by the quantization, that is, a quantized transform coefficient level level to the encoding unit 115 and the inverse quantization unit 117.

<Encoding Unit>

The encoding unit 115 uses, as inputs, the quantized transform coefficient level level supplied from the quantization unit 114, the various encoding parameters (header information Hinfo, prediction mode information Pinfo, transform information Tinfo, filter information Finfo, and the like) supplied from the control unit 101, information regarding a filter such as a filter coefficient supplied from the in-loop filter unit 120, and information regarding an optimal prediction mode supplied from the prediction unit 122. The encoding unit 115 performs variable-length coding (for example, arithmetic coding) for the quantized transform coefficient level level to generate a bit string (coded data).

Furthermore, the encoding unit 115 derives residual information Rinfo from the quantized transform coefficient level level, and encodes the residual information Rinfo to generate a bit string.

Moreover, the encoding unit 115 includes the information regarding a filter supplied from the in-loop filter unit 120 to the filter information Finfo, and includes the information regarding an optimal prediction mode supplied from the prediction unit 122 to the prediction mode information Pinfo. Then, the encoding unit 115 encodes the above-described various encoding parameters (header information Hinfo, prediction mode information Pinfo, transform information Tinfo, filter information Finfo, and the like) to generate a bit string.

Furthermore, the encoding unit 115 multiplexes the bit string of the various types of information generated as described above to generate coded data. The encoding unit 115 supplies the coded data to the accumulation buffer 116.

<Accumulation Buffer>

The accumulation buffer 116 temporarily stores the coded data obtained by the encoding unit 115. The accumulation buffer 116 outputs the stored coded data to an outside of the image encoding device 100 as a bit stream or the like at predetermined timing. For example, the coded data is transmitted to a decoding side via an arbitrary recording medium, an arbitrary transmission medium, an arbitrary information processing device, or the like. That is, the accumulation buffer 116 is also a transmission unit that transmits coded data (bit stream).

<Inverse Quantization Unit>

The inverse quantization unit 117 performs processing regarding inverse quantization. For example, the inverse quantization unit 117 uses the quantized transform coefficient level level supplied from the quantization unit 114 and the transform information Tinfo supplied from the control unit 101 as inputs, and scales (inversely quantizes) the value of the quantized transform coefficient level level on the basis of the transform information Tinfo. Note that the inverse quantization is inverse processing of the quantization performed in the quantization unit 114. The inverse quantization unit 117 supplies a transform coefficient Coeff_IQ obtained by the inverse quantization to the inverse orthogonal transform unit 118.

<Inverse Orthogonal Transform Unit>

The inverse orthogonal transform unit 118 performs processing regarding inverse orthogonal transform. For example, the inverse orthogonal transform unit 118 uses the transform coefficient Coeff_IQ supplied from the inverse quantization unit 117 and the transform information Tinfo supplied from the control unit 101 as inputs, and inversely orthogonally transforms the transform coefficient Coeff_IQ on the basis of the transform information Tinfo to derive a prediction residual D'. Note that the inverse orthogonal transform is inverse processing of the orthogonal transform performed in the orthogonal transform unit 113. The inverse orthogonal transform unit 118 supplies the prediction residual D' obtained by the inverse orthogonal transform to the calculation unit 119. Note that, since the inverse orthogonal transform unit 118 is similar to an inverse orthogonal transform unit on the decoding side (to be described below), description (to be described below) to be given for the decoding side can be applied to the inverse orthogonal transform unit 118.

<Calculation Unit>

The calculation unit 119 uses the prediction residual D' supplied from the inverse orthogonal transform unit 118 and the predicted image P supplied from the prediction unit 122 as inputs. The calculation unit 119 adds the prediction residual D' and the predicted image P corresponding to the prediction residual D' to derive a locally decoded image $R_{local}$. The calculation unit 119 supplies the derived locally decoded image $R_{local}$ to the in-loop filter unit 120 and the frame memory 121.

<In-Loop Filter Unit>

The in-loop filter unit 120 performs processing regarding in-loop filter processing. For example, the in-loop filter unit 120 uses the locally decoded image $R_{local}$ supplied from the calculation unit 119, the filter information Finfo supplied from the control unit 101, and the input image (original image) supplied from the rearrangement buffer 111 as inputs. Note that the information input to the in-loop filter unit 120 may be information other than the aforementioned information. For example, information such as the prediction mode, motion information, a code amount target value, a quantization parameter QP, a picture type, a block (a CU, a CTU, or the like) may be input to the in-loop filter unit 120, as necessary.

The in-loop filter unit 120 appropriately performs filtering processing for the locally decoded image $R_{local}$ on the basis of the filter information Finfo. The in-loop filter unit 120 also uses the input image (original image) and other input information for the filtering processing as necessary.

For example, the in-loop filter unit 120 applies four in-loop filters of a bilateral filter, a deblocking filter (DBF), an adaptive offset filter (sample adaptive offset (SAO)), and an adaptive loop filter (adaptive loop filter (ALF)) in this order, as described in Non-Patent Document 1. Note that which filter is applied and in which order the filters are applied are arbitrary and can be selected as appropriate.

Of course, the filtering processing performed by the in-loop filter unit 120 is arbitrary, and is not limited to the above example. For example, the in-loop filter unit 120 may apply a Wiener filter or the like.

The in-loop filter unit 120 supplies the filtered locally decoded image $R_{local}$ to the frame memory 121. Note that, in a case of transmitting the information regarding filters such as filter coefficients to the decoding side, the in-loop filter unit 120 supplies the information regarding filters to the encoding unit 115.

<Frame Memory>

The frame memory 121 performs processing regarding storage of data relating to an image. For example, the frame memory 121 uses the locally decoded image $R_{local}$ supplied from the calculation unit 119 and the filtered locally decoded image $R_{local}$ supplied from the in-loop filter unit 120 as inputs, and holds (stores) the inputs. Furthermore, the frame memory 121 reconstructs and holds a decoded image R for each picture unit, using the locally decoded image $R_{local}$ (stores the decoded image R in a buffer in the frame memory 121). The frame memory 121 supplies the decoded image R (or a part thereof) to the prediction unit 122 in response to a request from the prediction unit 122.

<Prediction Unit>

The prediction unit 122 performs processing regarding generation of a predicted image. For example, the prediction unit 122 uses, as inputs, the prediction mode information Pinfo supplied from the control unit 101, the input image (original image) supplied from the rearrangement buffer 111, and the decoded image R (or a part thereof) read from the frame memory 121. The prediction unit 122 performs prediction processing such as inter prediction, intra prediction, or the like, using the prediction mode information Pinfo and the input image (original image), performs prediction, using the decoded image R as a reference image, performs motion compensation processing on the basis of a prediction result, and generates a predicted image P. The prediction unit 122 supplies the generated predicted image P to the calculation units 112 and 119. Furthermore, the prediction unit 122 supplies a prediction mode selected by the above processing, that is, the information regarding an optimal prediction mode to the encoding unit 115, as necessary.

<Rate Control Unit>

The rate control unit 123 performs processing regarding rate control. For example, the rate control unit 123 controls a rate of a quantization operation of the quantization unit 114 so that an overflow or an underflow does not occur on the basis of the code amount of the coded data accumulated in the accumulation buffer 116.

In the image encoding device 100 having the above-described configuration, the orthogonal transform unit 113 performs processing to which the above-described present technology is applied, as a derivation unit and an orthogonal transform unit. Furthermore, the encoding unit 115 performs processing to which the above-described present technology is applied, as an encoding unit. Furthermore, the inverse orthogonal transform unit 118 performs processing to which the above-described present technology is applied, as an inverse orthogonal transform unit and a derivation unit. Therefore, the image encoding device 100 can suppress an increase in the memory capacity required for the orthogonal transform/inverse orthogonal transform.

<Details of Orthogonal Transform Unit>

Figure 12:
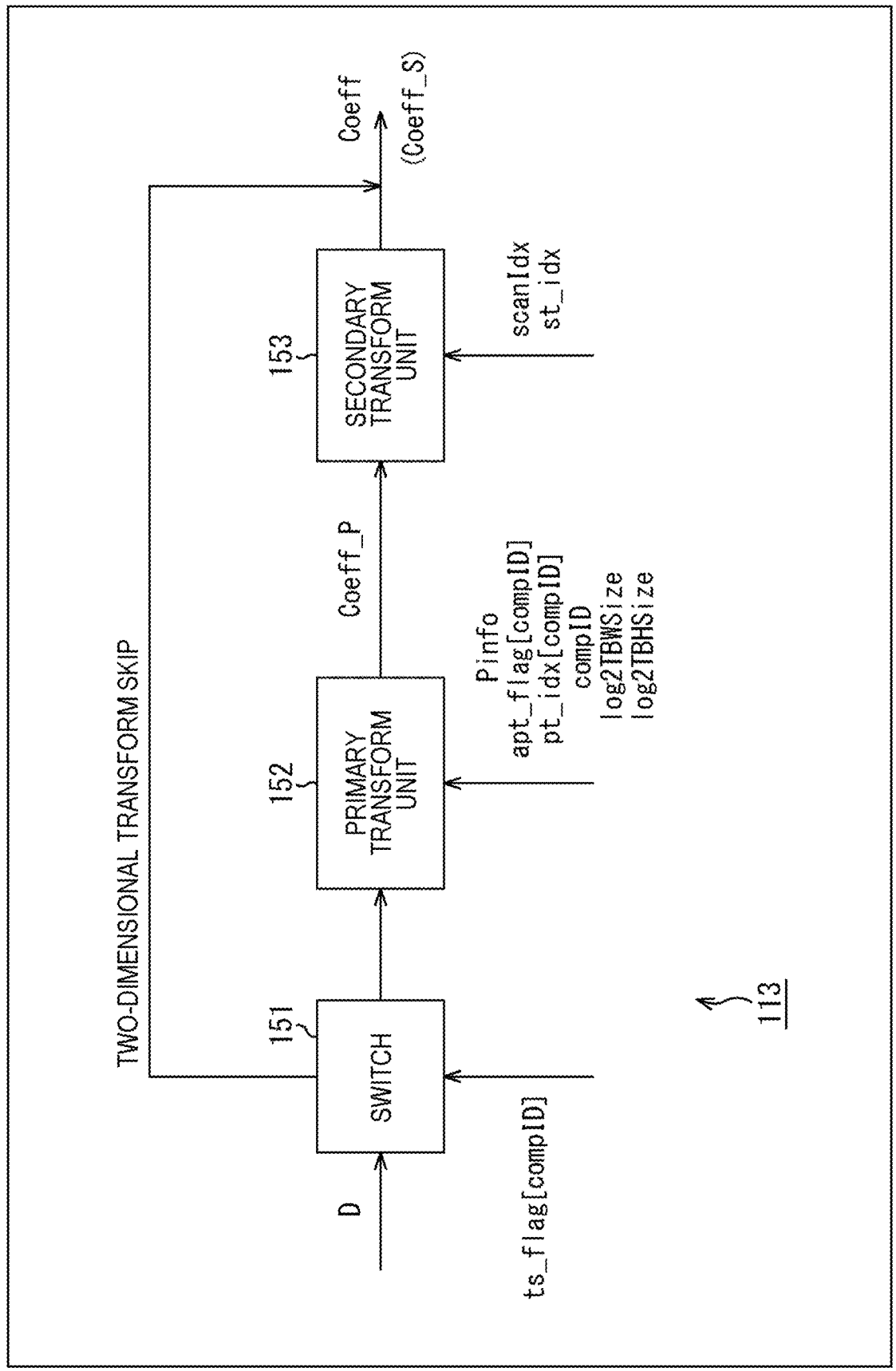
FIG. 12 is a block diagram illustrating a main configuration example of an orthogonal transform unit.

FIG. 12 is a block diagram illustrating a main configuration example of the orthogonal transform unit 113 in FIG. 11. As illustrated in FIG. 12, the orthogonal transform unit 113 includes a switch 151, a primary transform unit 152, and a secondary transform unit 153.

The switch 151 uses the prediction residual D and a transform skip flag ts_flag [compID] corresponding to a component identifier compID as inputs, and supplies the prediction residual D to the primary transform unit 152 in a case where a value of the transform skip flag ts_flag [compID] is NO_TS(=0) (in a case where a transform skip is not applied). Furthermore, the switch 151 skips the primary transform unit 152 and the secondary transform unit 153, and outputs the prediction residual D to the outside of the orthogonal transform unit 113 (supplies the same to the quantization unit 114) as a transform coefficient Coeff, in a case where the value of the transform skip flag ts_flag [compID] is 2D_TS (=1) (in a case where the value indicates application of a two-dimensional transform skip).

The primary transform unit 152 performs processing regarding primary transform that is predetermined transform processing such as orthogonal transform. For example, the primary transform unit 152 uses, as inputs, the component identifier compID, an adaptive primary transform flag apt_flag[compID] of the component identifier compID, a primary transform identifier pt_idx[compID] of the component identifier compID, the prediction mode information Pinfo, the size of the transformation block (a logarithmic value of a width log 2TBWSize and a logarithmic value of a height log 2TBHSize), and the prediction residual D. Note that the width TBWSize of the transformation block is also referred to as TBWidth, and the logarithmic value thereof is also referred to as log 2TBWidth. Similarly, the height TBHSize of the transformation block is also referred to as TBHeight, and the logarithmic value thereof is also referred to as log 2TBHeight.

The primary transform unit 152 selects a transform type TrTypeH of primary horizontal transform (and a primary horizontal transform type identifier TrTypeIdxH indicating the transform type) and a transform type TrTypeV of primary vertical transform (and a primary vertical transform type identifier TrTypeIdxV indicating the transform type) corresponding to the component identifier compID by reference to the prediction mode information PInfo, the component identifier compID, the adaptive primary transform flag apt_flag[compID] of the component identifier compID, and the primary transform identifier pt_idx[compID] of the component identifier compID.

Furthermore, the primary transform unit 152 performs, for the prediction residual D, primary horizontal transform determined by the primary horizontal transform type identifier TrTypeIdxH (or the primary horizontal transform type TrTypeH) and the width log 2TBWSize of the transformation block, and primary vertical transform determined by the primary vertical transform type identifier TrTypeIdxV (or the primary vertical transform type TrTypeV) and the height log 2TBHSize of the transformation block, to derive a transform coefficient Coeff_P. The primary horizontal transform is horizontal one-dimensional orthogonal transform, and the primary vertical transform is vertical one-dimensional orthogonal transform.

The primary transform unit 152 supplies the derived transform coefficient Coeff_P to the secondary transform unit 153.

The secondary transform unit 153 performs processing regarding secondary transform that is predetermined transform processing such as orthogonal transform. For example, the secondary transform unit 153 uses a secondary transform identifier st_idx, a scan identifier scanIdx indicating a method of scanning a transform coefficient, and the transform coefficient Coeff_P as inputs. The secondary transform unit 153 performs secondary transform for the transform coefficient Coeff_P on the basis of the secondary transform identifier st_idx and the scan identifier scanIdx to derive a transform coefficient Coeff_S after secondary transform.

More specifically, in a case where the secondary transform identifier st_idx indicates application of secondary transform (st_idx>0), the secondary transform unit 153 executes, for the transform coefficient Coeff_P, secondary transform processing corresponding to the secondary transform identifier st_idx to derive the transform coefficient Coeff_S after secondary transform.

The secondary transform unit 153 outputs the secondary transform coefficient Coeff_S to the outside of the orthogonal transform unit 113 (supplies the same to the quantization unit 114) as the transform coefficient Coeff.

Furthermore, in a case where the secondary transform identifier st_idx indicates non-application of secondary transform (st_idx==0), the secondary transform unit 153 skips the secondary transform and outputs the transform coefficient Coeff_P after primary transform to the outside of the orthogonal transform unit 113 (supplies the same to the quantization unit 114) as the transform coefficient Coeff (the transform coefficient Coeff_S after secondary transform).

In the orthogonal transform unit 113 having the above configuration, the primary transform unit 152 performs processing to which the above-described present technology is applied, as a derivation unit and an orthogonal transform unit. That is, the derivation unit derives the second transformation matrix, using the first transformation matrix, and the orthogonal transform unit performs the primary transform for the prediction residual, using the second transformation matrix derived by the derivation unit. Therefore, an increase in the memory capacity required for the primary transform can be suppressed.

Note that, as described above, the primary transform unit 152 performs the primary horizontal transform and the primary vertical transform as the primary transform. That is, the derivation unit derives the second transformation matrix for horizontal one-dimensional orthogonal transform and the second transformation matrix for vertical one-dimensional orthogonal transform, and the orthogonal transform unit performs, as the primary transform, the horizontal one-dimensional orthogonal transform, using the second transformation matrix for horizontal one-dimensional orthogonal transform derived by the derivation unit, and further, the vertical one-dimensional orthogonal transform, using the second transformation matrix for vertical one-dimensional orthogonal transform derived by the derivation unit. Therefore, an increase in the memory capacity required for the primary transform where the horizontal one-dimensional orthogonal transform and the vertical one-dimensional orthogonal transform are performed can be suppressed.

<Flow of Image Encoding Processing>

Next, a flow of each processing executed by the above image encoding device 100 will be described. First, an example of a flow of image encoding processing will be described with reference to the flowchart in FIG. 13.

When the image encoding processing is started, in step S101, the rearrangement buffer 111 is controlled by the control unit 101 and rearranges frames of input moving image data from the display order to the encoding order.

In step S102, the control unit 101 sets the unit of processing (performs block division) for an input image held by the rearrangement buffer 111.

In step S103, the control unit 101 determines (sets) an encoding parameter for the input image held by the rearrangement buffer 111.

In step S104, the prediction unit 122 performs the prediction processing and generates a predicted image or the like in the optimal prediction mode. For example, in the prediction processing, the prediction unit 122 performs the intra prediction to generate a predicted image in an optimal intra prediction mode, performs the inter prediction to generate a predicted image in an optimal inter prediction mode, and selects an optimal prediction mode from among the predicted images on the basis of a cost function value and the like.

In step S105, the calculation unit 112 calculates a difference between the input image and the predicted image in the optimal mode selected by the prediction processing in step S104. That is, the calculation unit 112 generates the prediction residual D between the input image and the predicted image. The prediction residual D obtained in this way is reduced in the data amount as compared with the original image data. Therefore, the data amount can be compressed as compared with a case of encoding the image as it is.

In step S106, the orthogonal transform unit 113 performs orthogonal transform processing for the prediction residual D generated by the processing in step S105 to derive the transform coefficient Coeff.

In step S107, the quantization unit 114 quantizes the transform coefficient Coeff obtained by the processing in step S106 by using a quantization parameter calculated by the control unit 101 or the like to derive the quantized transform coefficient level level.

In step S108, the inverse quantization unit 117 inversely quantizes the quantized transform coefficient level level generated by the processing in step S107 with characteristics corresponding to the characteristics of the quantization in step S107 to derive the transform coefficient Coeff_IQ.

In step S109, the inverse orthogonal transform unit 118 inversely orthogonally transforms the transform coefficient Coeff_IQ obtained by the processing in step S108 by a method corresponding to the orthogonal transform processing in step S106 to derive the prediction residual D'. Note that, since the inverse orthogonal transform processing is similar to inverse orthogonal transform processing (to be described below) performed on the decoding side, description (to be given below) for the decoding side can be applied to the inverse orthogonal transform processing in step S109.

In step S110, the calculation unit 119 adds the predicted image obtained by the prediction processing in step S104 to the prediction residual D' derived by the processing in step S109 to generate a locally decoded image.

In step S111, the in-loop filter unit 120 performs the in-loop filter processing for the locally decoded image derived by the processing in step S110.

In step S112, the frame memory 121 stores the locally decoded image derived by the processing in step S110 and the locally decoded image filtered in step S112.

In step S113, the encoding unit 115 encodes the quantized transform coefficient level level obtained by the processing in step S107. For example, the encoding unit 115 encodes the quantized transform coefficient level level that is information regarding the image by arithmetic coding or the like to generate the coded data. Furthermore, at this time, the encoding unit 115 encodes the various encoding parameters (header information Hinfo, prediction mode information Pinfo, and transform information Tinfo). Moreover, the encoding unit 115 derives the residual information RInfo from the quantized transform coefficient level level and encodes the residual information RInfo.

In step S114, the accumulation buffer 116 accumulates the coded data thus obtained, and outputs the coded data to the outside of the image encoding device 100, for example, as a bit stream. The bit stream is transmitted to the decoding side via a transmission path or a recording medium, for example. Furthermore, the rate control unit 123 performs rate control as necessary.

When the processing in step S114 ends, the image encoding processing ends.

In the image encoding processing of the above flow, processing to which the above-described present technology is applied is performed as processing of step S106. Furthermore, processing to which the above-described present technology is applied is performed as processing of step S109. Moreover, processing to which the above-described present technology is applied is performed as processing of step S113. Therefore, by executing the image encoding processing, an increase in the memory capacity required for the orthogonal transform/inverse orthogonal transform can be suppressed.

<Flow of Orthogonal Transform Processing>

Figure 13:
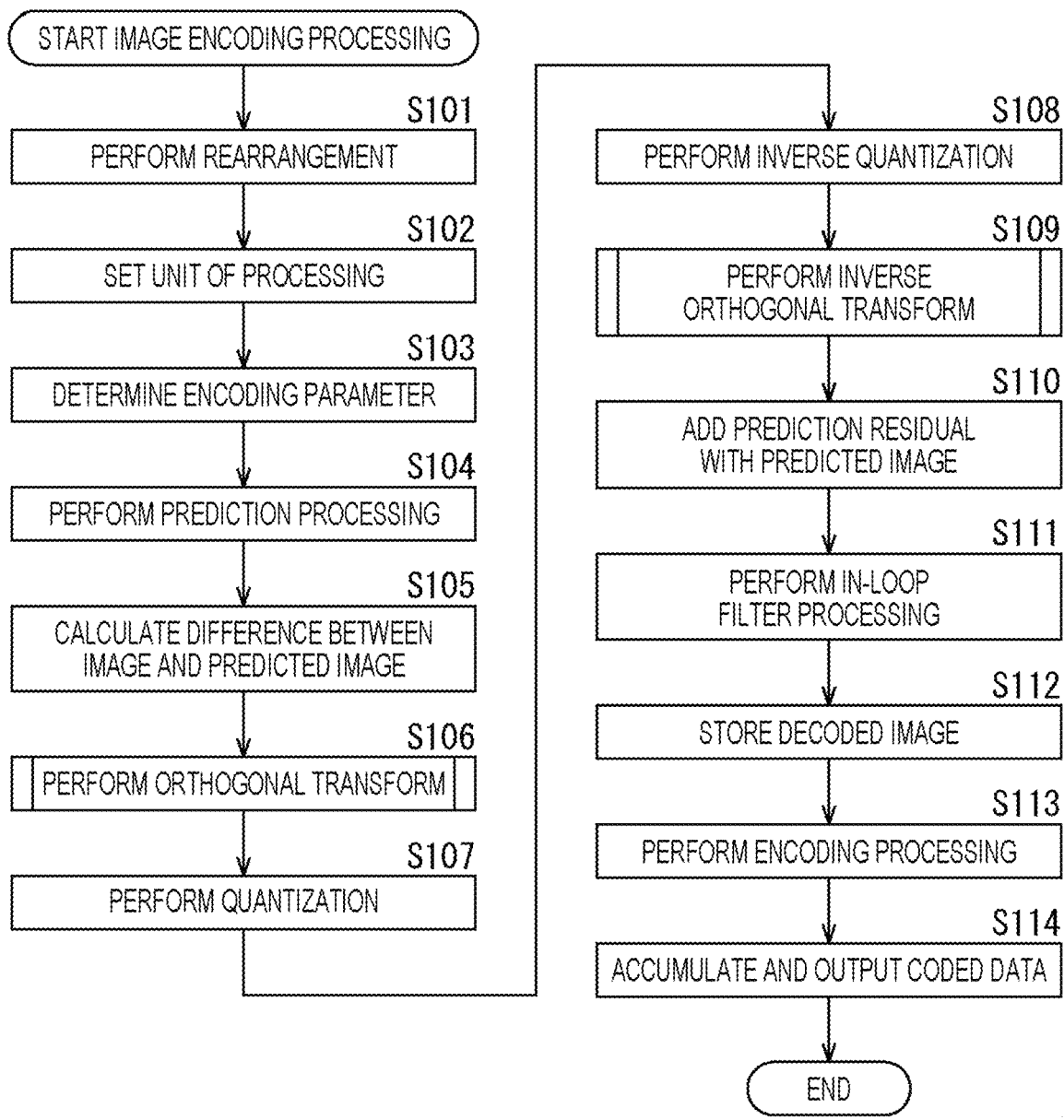
FIG. 13 is a flowchart for describing an example of a flow of image encoding processing.

Next, an example of a flow of the orthogonal transform processing executed in step S106 in FIG. 13 will be described with reference to the flowchart in FIG. 14.

When the orthogonal transform processing is started, in step S131, the switch 151 determines whether or not the transform skip flag ts_flag is 2D_TS (in a case of indicating a two-dimensional transform skip) (for example, (true)) or a transform quantization bypass flag transquant_bypass_flag is 1 (true). In a case where it is determined that the transform skip flag ts_flag is 2D_TS (for example, 1 (true)) or the transform quantization bypass flag is 1 (true), the orthogonal transform processing ends, and the processing returns to FIG. 13. In this case, the orthogonal transform processing (primary transform and secondary transform) is omitted, and the input prediction residual D is used as the transform coefficient Coeff.

Figure 14:
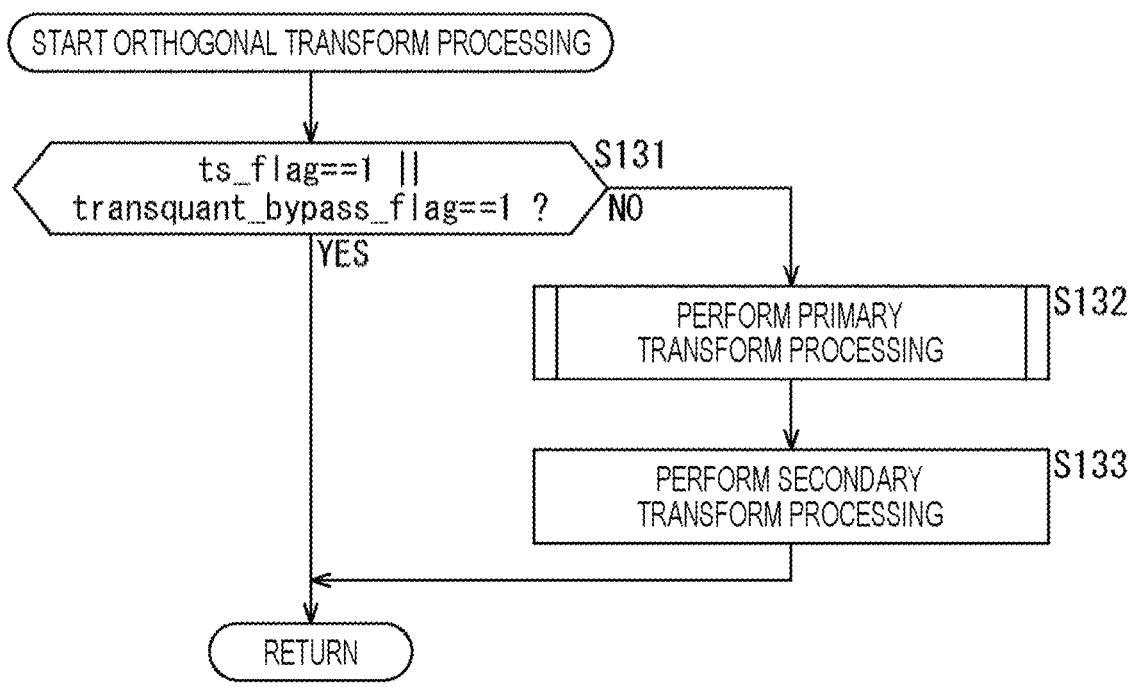
FIG. 14 is a flowchart for describing an example of a flow of orthogonal transform processing.

Furthermore, in step S131 in FIG. 14, in a case where it is determined that the transform skip flag ts_flag is not 2D_TS (not two-dimensional transform skip) (for example, 0 (false)) and the transform quantization bypass flag transquant_bypass_flag is 0 (false), the processing proceeds to step S132. In this case, the primary transform processing and the secondary transform processing are performed.

In step S132, the primary transform unit 152 performs the primary transform processing for the input prediction residual D on the basis of the adaptive primary transform information specified with the component identifier compID to derive the transform coefficient Coeff_P after primary transform.

In step S133, the secondary transform unit 153 performs the secondary transform processing for the transform coefficient Coeff_P to derive the transform coefficient Coeff_S (transform coefficient Coeff) after secondary transform.

When the processing in step S133 ends, the orthogonal transform processing ends.

In the above orthogonal transform processing, processing to which the above-described present technology is applied is performed as processing of step S132. Therefore, by executing the orthogonal transform processing, an increase in the memory capacity required for the primary transform can be suppressed.

<Image Decoding Device>

Figure 15:
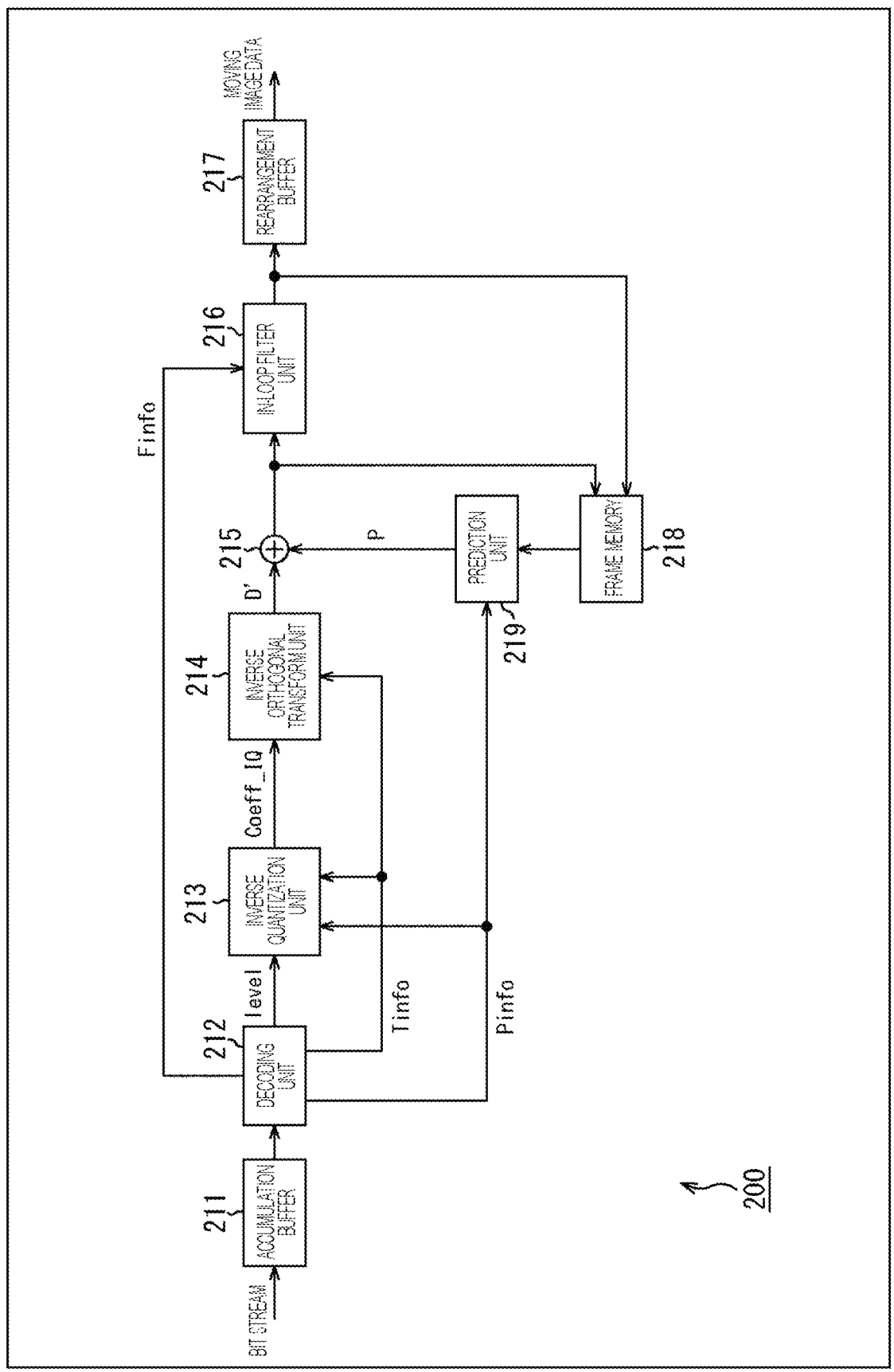
FIG. 15 is a block diagram illustrating a main configuration example of an image decoding device.

FIG. 15 is a block diagram illustrating an example of a configuration of an image decoding device as one mode of the image processing apparatus to which the present technology is applied. An image decoding device 200 illustrated in FIG. 15 is a device that decodes coded data that is a coded prediction residual between an image and a predicted image, such as AVC or HEVC. For example, the image decoding device 200 implements the technology described in Non-Patent Document 1, Non-Patent Document 3, or Non-Patent Document 4, and decodes coded data that is coded image data of a moving image by a method conforming to the standard described in any of the aforementioned documents. For example, the image decoding device 200 decodes the coded data (bit stream) generated by the above-described image encoding device 100.

Note that FIG. 15 illustrates main processing units, data flows, and the like, and those illustrated in FIG. 15 are not necessarily everything. That is, in the image decoding device 200, there may be a processing unit not illustrated as a block in FIG. 15, or processing or data flow not illustrated as an arrow or the like in FIG. 15.

This is similar in other drawings for describing a processing unit and the like in the image decoding device 200.

In FIG. 15, the image decoding device 200 includes an accumulation buffer 211, a decoding unit 212, an inverse quantization unit 213, an inverse orthogonal transform unit 214, a calculation unit 215, an in-loop filter unit 216, a rearrangement buffer 217, a frame memory 218, and a prediction unit 219. Note that the prediction unit 219 includes an intra prediction unit and an inter prediction unit (not illustrated). The image decoding device 200 is a device for generating moving image data by decoding coded data (bit stream).

<Accumulation Buffer>

The accumulation buffer 211 acquires the bit stream input to the image decoding device 200 and holds (stores) the bit stream. The accumulation buffer 211 supplies the accumulated bit stream to the decoding unit 212 at predetermined timing or in a case where a predetermined condition is satisfied, for example.

<Decoding Unit>

The decoding unit 212 performs processing regarding image decoding. For example, the decoding unit 212 uses the bit stream supplied from the accumulation buffer 211 as an input, and performs variable length decoding for a syntax value of each syntax element from the bit string according to a definition of a syntax table to derive a parameter.

The parameter derived from the syntax element and the syntax value of the syntax element includes, for example, the information such as the header information Hinfo, prediction mode information Pinfo, transform information Tinfo, residual information Rinfo, and filter information Finfo. That is, the decoding unit 212 parses (analyzes and acquires) such information from the bit stream. These pieces of information will be described below.

<Header information Hinfo>

The header information Hinfo includes, for example, header information such as a video parameter set (VPS)/a sequence parameter set (SPS)/a picture parameter set (PPS)/a slice header (SH). The header information Hinfo includes, for example, information defining image size (width PicWidth and height PicHeight), bit depth (luminance bitDepthY and chrominance bitDepthC), a chrominance array type ChromaArrayType, CU size maximum value MaxCUSize/minimum value MinCUSize, maximum depth MaxQTDepth/minimum depth MinQTDepth of quad-tree division, maximum depth MaxBTDepth/minimum depth MinBTDepth of binary-tree division, a maximum value MaxTSSize of a transform skip block (also called maximum transform skip block size), an on/off flag of each coding tool (also called valid flag), and the like.

For example, an example of the on/off flag of the coding tool included in the header information Hinfo includes an on/off flag related to transform and quantization processing below. Note that the on/off flag of the coding tool can also be interpreted as a flag indicating whether or not a syntax related to the coding tool exists in the coded data. Furthermore, in a case where a value of the on/off flag is 1 (true), the value indicates that the coding tool is available. In a case where the value of the on/off flag is 0 (false), the value indicates that the coding tool is not available. Note that the interpretation of the flag value may be reversed.

An inter-component prediction enabled flag (ccp_enabled_flag) ts_flag information indicating whether or not inter-component prediction (cross-component prediction (CCP)) is available. For example, in a case where the flag information is "1" (true), the flag information indicates that the inter-component prediction is available. In a case where the flag information is "0" (false), the flag information indicates that the inter-component prediction is not available.

Note that this CCP is also referred to as inter-component linear prediction (CCLM or CCLMP).

<Prediction Mode Information Pinfo>

The prediction mode information Pinfo includes, for example, information such as size information PBSize (prediction block size) of a prediction block (PB) to be processed, intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax, a luminance intra prediction mode IntraPredModeY derived from the syntax, and the like.

Furthermore, the intra prediction mode information IPinfo includes, for example, an inter-component prediction flag (ccp_flag (cclmp_flag)), a multi-class linear prediction mode flag (mclm_flag), a chrominance sample position type identifier (chroma_sample_loc_type_idx), a chrominance MPM identifier (chroma_mpm_idx), a luminance intra prediction mode (IntraPredModeC) derived from these syntaxes, and the like.

The inter-component prediction flag (ccp_flag (cclmp_flag)) ts_flag information indicating whether or not to apply inter-component linear prediction. For example, ccp_flag==1 indicates that inter-component prediction is applied, and ccp_flag==0 indicates that the inter-component prediction is not applied.

The multi-class linear prediction mode flag (mclm_flag) is information regarding a linear prediction mode (linear prediction mode information). More specifically, the multi-class linear prediction mode flag (mclm_flag) ts_flag information indicating whether or not to set a multi-class linear prediction mode. For example, "0" indicates one-class mode (single glass mode) (for example, CCLMP), and "1" indicates two-class mode (multiclass mode) (for example, MCLMP).

The chrominance sample position type identifier (chroma_sample_loc_type_idx) is an identifier for identifying a type of a pixel position of a chrominance component (also referred to as a chrominance sample position type). For example, in a case where the chrominance array type (ChromaArrayType), which is information regarding a color format, indicates 420 format, the chrominance sample position type identifier is assigned as in the following expression (7).

[Math. 5]

chroma_sample_loc_type_idx==0: Type2 chroma_sample_loc_type_idx==1: Type3 chroma_sample_loc_type_idx==2: Type0 chroma_sample_loc_type_idx==3: Type1                (7)

Note that the chrominance sample position type identifier (chroma_sample_loc_type_idx) is transmitted as (by being stored in) information (chroma_sample_loc_info( )) regarding the pixel position of the chrominance component.

The chrominance MPM identifier (chroma_mpm_idx) is an identifier indicating which prediction mode candidate in a chrominance intra prediction mode candidate list (intraPredModeCandListC) is to be specified as a chrominance intra prediction mode.

The motion prediction information MVinfo includes, for example, information such as merge_idx, merge_flag, inter_pred_idc, ref_idx_LX, mvp_lX_flag, X={0,1}, mvd, and the like (see, for example, JCTVC-W1005, 7.3.8.6 Prediction Unit Syntax).

Of course, the information included in the prediction mode information Pinfo is arbitrary, and information other than the above information may be included.

<Transform Information Tinfo>

The transform information Tinfo includes, for example, the following information. Of course, the information included in the transform information Tinfo is arbitrary, and information other than the above information may be included:

The width TBWSize and the height TBHSize of the transformation block to be processed (or may be logarithmic values log 2TBWSize and log 2TBHSize of TBWSize and TBHSize having a base of 2);

a transform skip flag (ts_flag): a flag indicating whether or not to skip (inverse) primary transform and (inverse) secondary transform;

a scan identifier (scanIdx);

a quantization parameter (qp); and a quantization matrix (scaling matrix (for example, JCTVC-W1005, 7.3.4 Scaling list data syntax)).

<Residual Information Rinfo>

The residual information Rinfo (for example, see 7.3.8.11 Residual Coding syntax of JCTVC-W1005) includes, for example, the following syntaxes:

cbf (coded_block_flag): a residual data presence/absence flag;

last_sig_coeff_x_pos: a last nonzero coefficient X coordinate;

last_sig_coeff_y_pos: a last nonzero coefficient Y coordinate;

coded_sub_block_flag: a subblock nonzero coefficient presence/absence flag;

sig_coeff_flag: a nonzero coefficient presence/absence flag;

gr1_flag: a flag indicating whether or not the level of the nonzero coefficient is greater than 1 (also called a GR1 flag);

gr2_flag: a flag indicating whether or not the level of the nonzero coefficient is greater than 2 (also called a GR2 flag);

sign_flag: a sign indicating positive/negative of the nonzero coefficient (also called a sign code);

coeff_abs_level_remaining: a residual level of the nonzero coefficient (also called a nonzero coefficient residual level);

and the like.

Of course, the information included in the residual information Rinfo is arbitrary, and information other than the above information may be included.

<Filter Information Finfo>

The filter information Finfo includes, for example, control information regarding the following filtering processing:

control information regarding a deblocking filter (DBF);

control information regarding a pixel adaptive offset (SAO);

control information regarding an adaptive loop filter (ALF); and control information regarding other linear and nonlinear filters.

More specifically, the filter information Finfo includes, for example, a picture to which each filter is applied, information for specifying an area in the picture, filter on/off control information for each CU, filter on/off control information for slice and tile boundaries, and the like. Of course, the information included in the filter information Finfo is arbitrary, and information other than the above information may be included.

Returning to the description of the decoding unit 212, the decoding unit 212 refers to the residual information Rinfo and derives the quantized transform coefficient level level at each coefficient position in each transformation block. The decoding unit 212 supplies the quantized transform coefficient level level to the inverse quantization unit 213.

Furthermore, the decoding unit 212 supplies the parsed header information Hinfo, prediction mode information Pinfo, quantized transform coefficient level level, transform information Tinfo, and filter information Finfo to each block. Specific description is given as follows.

The header information Hinfo is supplied to the inverse quantization unit 213, the inverse orthogonal transform unit 214, the prediction unit 219, and the in-loop filter unit 216.

The prediction mode information Pinfo is supplied to the inverse quantization unit 213 and the prediction unit 219.

The transform information Tinfo is supplied to the inverse quantization unit 213 and the inverse orthogonal transform unit 214.

The filter information Finfo is supplied to the in-loop filter unit 216.

Of course, the above example is an example, and the present embodiment is not limited to this example. For example, each encoding parameter may be supplied to an arbitrary processing unit. Furthermore, other information may be supplied to an arbitrary processing unit.

<Inverse Quantization Unit>

The inverse quantization unit 213 performs processing regarding inverse quantization. For example, the inverse quantization unit 213 uses the transform information Tinfo and the quantized transform coefficient level level supplied from the decoding unit 212 as inputs, and, on the basis of the transform information Tinfo, scales (inversely quantizes) the value of the quantized transform coefficient level level to derive a transform coefficient Coeff_IQ after inverse quantization.

Note that this inverse quantization is performed as inverse processing of the quantization by the quantization unit 114. Furthermore, the inverse quantization is processing similar to the inverse quantization performed by the inverse quantization unit 117. That is, the inverse quantization unit 117 performs processing (inverse quantization) similar to the inverse quantization unit 213.

The inverse quantization unit 213 supplies the derived transform coefficient Coeff_IQ to the inverse orthogonal transform unit 214

<Inverse Orthogonal Transform Unit>

The inverse orthogonal transform unit 214 performs processing regarding inverse orthogonal transform. For example, the inverse orthogonal transform unit 214 uses the transform coefficient Coeff_IQ supplied from the inverse quantization unit 213 and the transform information Tinfo supplied from the decoding unit 212 as inputs, and performs the inverse orthogonal transform processing for the transform coefficient Coeff_IQ on the basis of the transform information Tinfo to derive the prediction residual D'.

Note that this inverse orthogonal transform is performed as inverse processing of the orthogonal transform by the orthogonal transform unit 113.

Furthermore, the inverse orthogonal transform is processing similar to the inverse orthogonal transform performed by the inverse orthogonal transform unit 118. That is, the inverse orthogonal transform unit 118 performs processing (inverse orthogonal transform) similar to the inverse orthogonal transform unit 214.

The inverse orthogonal transform unit 214 supplies the derived prediction residual D' to the calculation unit 215.

<Calculation Unit>

The calculation unit 215 performs processing regarding addition of information regarding an image. For example, the calculation unit 215 uses the prediction residual D' supplied from the inverse orthogonal transform unit 214 and the predicted image P supplied from the prediction unit 219 as inputs. The calculation unit 215 adds the prediction residual D' and the predicted image P (prediction signal) corresponding to the prediction residual D' to derive the locally decoded image $R_{local}$, as illustrated in the following expression (8).

[Math. 6]

$$R_{local}=D'+P \qquad (8)$$

The calculation unit 215 supplies the derived locally decoded image $R_{local}$ to the in-loop filter unit 216 and the frame memory 218.

<In-Loop Filter Unit>

The in-loop filter unit 216 performs processing regarding in-loop filter processing. For example, the in-loop filter unit 216 uses the locally decoded image $R_{local}$ supplied from the calculation unit 215 and the filter information Finfo supplied from the decoding unit 212 as inputs. Note that the information input to the in-loop filter unit 216 may be information other than the aforementioned information.

The in-loop filter unit 216 appropriately performs filtering processing for the locally decoded image Rlocal on the basis of the filter information Finfo.

For example, the in-loop filter unit 216 applies four in-loop filters of a bilateral filter, a deblocking filter (DBF), an adaptive offset filter (sample adaptive offset (SAO)), and an adaptive loop filter (adaptive loop filter (ALF)) in this order, as described in Non-Patent Document 1. Note that which filter is applied and in which order the filters are applied are arbitrary and can be selected as appropriate.

The in-loop filter unit 216 performs filtering processing corresponding to the filtering processing performed on the encoding side (for example, by the in-loop filter unit 120 of the image encoding device 100). Of course, the filtering processing performed by the in-loop filter unit 216 is arbitrary, and is not limited to the above example. For example, the in-loop filter unit 216 may apply a Wiener filter or the like.

The in-loop filter unit 216 supplies the filtered locally decoded image $R_{local}$ to the rearrangement buffer 217 and the frame memory 218.

<Rearrangement Buffer>

The rearrangement buffer 217 uses the locally decoded image $R_{local}$ supplied from the in-loop filter unit 216 and holds (stores) the locally decoded image $R_{local}$. The rearrangement buffer 217 reconstructs the decoded image R for each unit of picture, using the locally decoded image $R_{local}$, and holds (stores) the decoded image R (in the buffer). The rearrangement buffer 217 rearranges the obtained decoded images R from the decoding order to the reproduction order. The rearrangement buffer 217 outputs a rearranged decoded image R group to the outside of the image decoding device 200 as moving image data.

<Frame Memory>

The frame memory 218 performs processing regarding storage of data relating to an image. For example, the frame memory 218 uses the locally decoded image $R_{local}$ supplied from the calculation unit 215 as an input, reconstructs the decoded image R for each unit of picture, and stores the decoded image R in the buffer in the frame memory 218.

Furthermore, the frame memory 218 uses the in-loop filtered locally decoded image $R_{local}$ supplied from the in-loop filter unit 216 as an input, reconstructs the decoded image R for each unit of picture, and stores the decoded image R in the buffer in the frame memory 218. The frame memory 218 appropriately supplies the stored decoded image R (or a part thereof) to the prediction unit 219 as a reference image.

Note that the frame memory 218 may store the header information Hinfo, the prediction mode information Pinfo, the transform information Tinfo, the filter information Finfo, and the like related to generation of the decoded image.

<Prediction Unit>

The prediction unit 219 performs processing regarding generation of a predicted image. For example, the prediction unit 219 uses the prediction mode information Pinfo supplied from the decoding unit 212 as an input, and performs prediction by a prediction method specified by the prediction mode information Pinfo to derive the predicted image P. At the time of derivation, the prediction unit 219 uses the decoded image R (or a part thereof) before filtering or after filtering stored in the frame memory 218, the decoded image R being specified by the prediction mode information Pinfo, as the reference image. The prediction unit 219 supplies the derived predicted image P to the calculation unit 215.

In the image decoding device 200 having the above configuration, the inverse orthogonal transform unit 214 performs processing to which the above-described present technology is applied, as a derivation unit and an inverse orthogonal transform unit. Furthermore, the decoding unit 212 performs processing to which the above-described present technology is applied, as a decoding unit. Therefore, the image decoding device 200 can suppress an increase in the memory capacity required for the inverse orthogonal transform.

<Details of Inverse Orthogonal Transform Unit>

Figure 16:
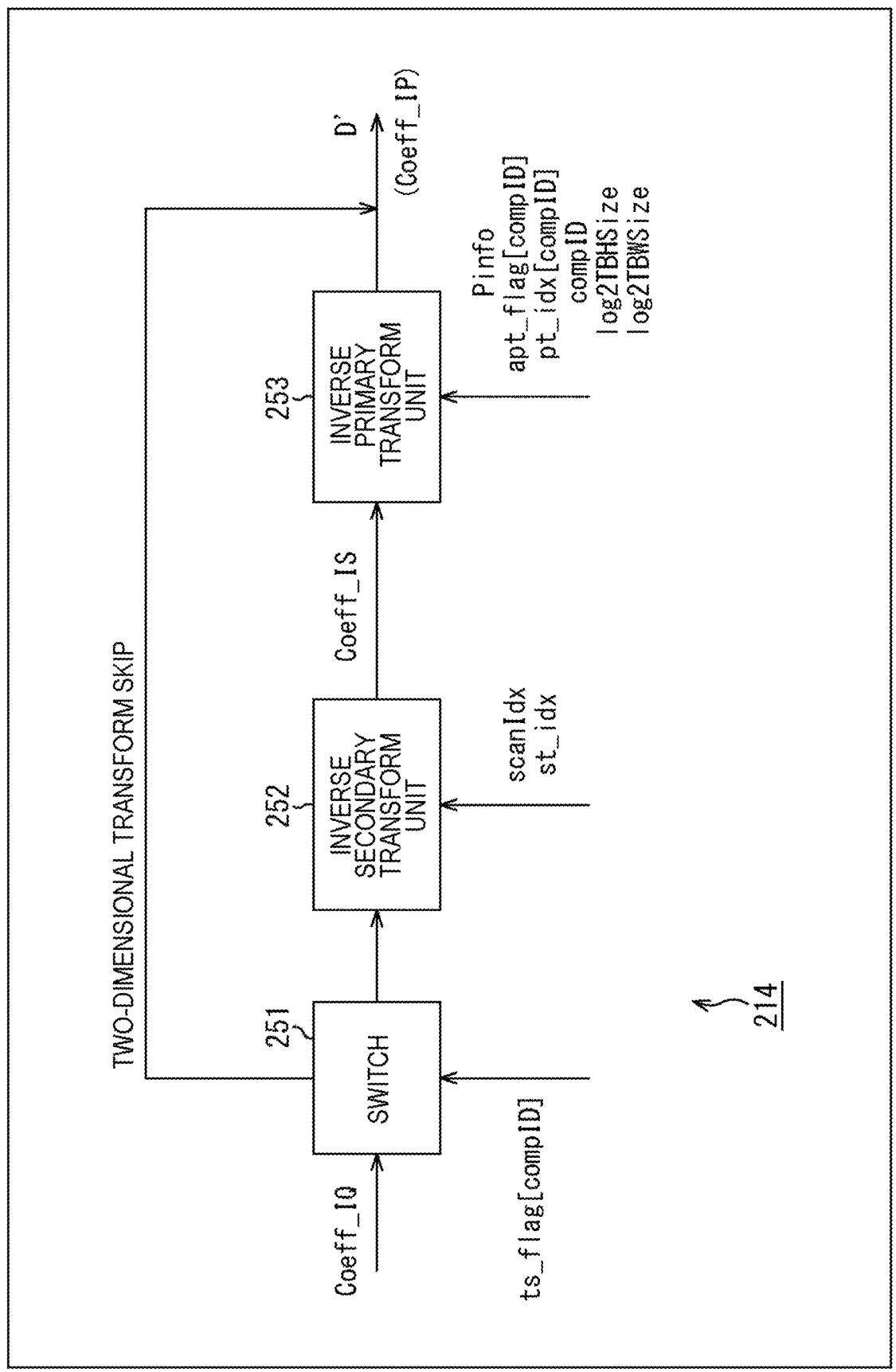
FIG. 16 is a block diagram illustrating a main configuration example of an inverse orthogonal transform unit.

FIG. 16 is a block diagram illustrating a main configuration example of the inverse orthogonal transform unit 214 in FIG. 15. As illustrated in FIG. 16, the inverse orthogonal transform unit 214 includes a switch 251, an inverse secondary transform unit 252, and an inverse primary transform unit 253.

The switch 251 uses the transform coefficient Coeff_IQ and the transform skip flag ts_flag [compID] as inputs. In a case where the value of the transform skip flag ts_flag [compID] is NO_TS(=0), that is, in a case where a transform skip is not applied, the switch 251 supplies the transform coefficient Coeff_IQ to the inverse secondary transform unit 252. Furthermore, in a case where the value of the transform skip flag ts_flag [compID] is 2D_TS(=1), that is, in a case where a two-dimensional transform skip is applied, the switch 251 skips the inverse secondary transform unit 252 and the inverse primary transform unit 253, and outputs the transform coefficient Coeff_IQ to the outside of the inverse orthogonal transform unit 214 (supplies the same to the calculation unit 215) as the prediction residual D'.

The inverse secondary transform unit 252 performs processing regarding inverse secondary transform that is inverse processing of the secondary transform performed on the encoding side (for example, by the secondary transform unit 153 of the image encoding device 100). For example, the inverse secondary transform unit 252 uses the secondary transform identifier st_idx, the scan identifier scanIdx indicating a method of scanning the transform coefficient, and the transform coefficient Coeff_IQ supplied from the switch 251 as inputs.

The inverse secondary transform unit 252 performs inverse secondary transform for the transform coefficient Coeff_IQ on the basis of the secondary transform identifier st_idx and the scan identifier scanIdx to derive a transform coefficient Coeff_IS after inverse secondary transform.

More specifically, in a case where the secondary transform identifier st_idx indicates application of inverse secondary transform (st_idx>0), the inverse secondary transform unit 252 executes, for the transform coefficient Coeff_IQ, inverse secondary transform processing corresponding to the secondary transform identifier st_idx to derive the transform coefficient Coeff_IS after secondary transform. The inverse secondary transform unit 252 supplies the transform coefficient Coeff_IS after inverse secondary transform to the inverse primary transform unit 253.

Note that in a case where the secondary transform identifier st_idx indicates that the inverse secondary transform is not applied (st_idx==0), the inverse secondary transform unit 252 skips the inverse secondary transform, and supplies the transform coefficient Coeff_IQ to the inverse primary transform unit 253 as the transform coefficient Coeff_IS after inverse secondary transform.

The inverse primary transform unit 253 performs processing related to inverse primary transform that is inverse processing of the primary transform performed on the encoding side (for example, by the primary transform unit 152 of the image encoding device 100). For example, the inverse primary transform unit 253 uses, as inputs, the component identifier compID, an adaptive primary transform flag apt_flag[compID] of the component identifier compID, a primary transform identifier pt_idx[compID] of the component identifier compID, the prediction mode information PInfo, the size of the transformation block (the logarithmic value of a width log 2TBWSize and the logarithmic value of a height log 2TBHSize), and the transform coefficient Coeff_IS after inverse secondary transform.

The inverse primary transform unit 253 selects a transform type TrTypeH of inverse primary horizontal transform (and an inverse primary horizontal transform type identifier TrTypeIdxH indicating the transform type) and a transform type TrTypeV of inverse primary vertical transform (and an inverse primary vertical transform type identifier TrTypeIdxV indicating the transform type) corresponding to the component identifier compID by reference to the prediction mode information PInfo, the component identifier compID, the adaptive primary transform flag apt_flag[compID] of the component identifier compID, and the primary transform identifier pt_idx[compID] of the component identifier compID.

Furthermore, the inverse primary transform unit 253 performs, for the transform coefficient Coeff_IS after inverse secondary transform, inverse primary vertical transform defined by the inverse primary vertical transform type identifier TrTypeIdxV (or the inverse primary vertical transform type TrTypeV) and the height log 2TBHSize of the transformation block, and inverse primary horizontal transform defined by the inverse primary horizontal transform type identifier TrTypeIdxH (or the inverse primary horizontal transform type Transform type TrTypeH) and the width log 2TBWSize of the transformation block, to derive a transform coefficient Coeff_IP after inverse primary vertical transform. The inverse primary vertical transform is vertical inverse one-dimensional orthogonal transform and the inverse primary horizontal transform is horizontal inverse one-dimensional orthogonal transform.

The inverse primary transform unit 253 outputs the transform coefficient Coeff_IP after inverse primary transform to the outside of the inverse orthogonal transform unit 214 (supplies the same to the calculation unit 215) as the prediction residual D'.

In the inverse orthogonal transform unit 214 having the above configuration, the inverse primary transform unit 253 performs processing to which the above-described present technology is applied, as a derivation unit and an inverse orthogonal transform unit. That is, the derivation unit derives the second transformation matrix, using the first transformation matrix, and the inverse orthogonal transform unit performs the inverse primary transform for the inverse secondary transform result, using the second transformation matrix derived by the derivation unit. Therefore, an increase in the memory capacity required for the inverse primary transform can be suppressed.

Note that the above-described inverse primary transform unit 253 performs the inverse primary vertical transform and the inverse primary horizontal transform as the inverse primary transform. That is, the derivation unit derives the second transformation matrix for vertical inverse one-dimensional orthogonal transform and the second transformation matrix for horizontal inverse one-dimensional orthogonal transform, and the inverse orthogonal transform unit performs, as the inverse primary transform, the vertical inverse one-dimensional orthogonal transform, using the second transformation matrix for vertical inverse one-dimensional orthogonal transform derived by the derivation unit, and further, the horizontal inverse one-dimensional orthogonal transform, using the second transformation matrix for horizontal inverse one-dimensional orthogonal transform inverse one-dimensional orthogonal transform derived by the derivation unit. Therefore, an increase in the memory capacity required for the primary transform in which the vertical inverse one-dimensional orthogonal transform and the horizontal inverse one-dimensional orthogonal transform are performed can be suppressed.

<Flow of Image Decoding Processing>

Next, a flow of each processing executed by the above image decoding device 200 will be described. First, an example of a flow of image decoding processing will be described with reference to the flowchart in FIG. 17.

When the image decoding processing is started, in step S201, the accumulation buffer 211 acquires and holds (accumulates) the coded data (bit stream) supplied from the outside of the image decoding device 200.

In step S202, the decoding unit 212 decodes the coded data (bit stream) to obtain a quantized transform coefficient level level. Furthermore, the decoding unit 212 parses (analyzes and acquires) various encoding parameters from the coded data (bit stream) by this decoding.

In step S203, the inverse quantization unit 213 performs inverse quantization that is inverse processing of the quantization performed on the encoding side for the quantized transform coefficient level level obtained by the processing in step S202 to obtain the transform coefficient Coeff_IQ.

In step S204, the inverse orthogonal transform unit 214 performs inverse orthogonal transform processing that is inverse processing of the orthogonal transform processing performed on the encoding side for the transform coefficient Coeff_IQ obtained by the processing in step S203 to obtain the prediction residual D'.

In step S205, the prediction unit 219 executes prediction processing by a prediction method specified on the encoding side on the basis of the information parsed in step S202, and generates a predicted image P, for example, by reference to the reference image stored in the frame memory 218.

In step S206, the calculation unit 215 adds the prediction residual D' obtained by the processing in step S204 and the predicted image P obtained by the processing in step S205 to derive a locally decoded image $R_{local}$.

In step S207, the in-loop filter unit 216 performs the in-loop filter processing for the locally decoded image $R_{local}$ obtained by the processing in step S206.

In step S208, the rearrangement buffer 217 derives a decoded image R, using the filtered locally decoded image $R_{local}$ obtained by the processing in step S207, and rearranges a decoded image R group from the decoding order to the reproduction order. The decoded image R group rearranged in the reproduction order is output to the outside of the image decoding device 200 as a moving image.

Furthermore, in step S209, the frame memory 218 stores at least one of the locally decoded image $R_{local}$ obtained by the processing in step S206, and the locally decoded image $R_{local}$ after filtering processing obtained by the processing in step S207.

When the processing in step S209 ends, the image decoding processing ends.

In the image decoding processing of the above flow, processing to which the above-described present technology is applied is performed as processing of step S202. Furthermore, processing to which the above-described present technology is applied is performed as processing of step S204. Therefore, by executing the image decoding processing, an increase in the memory capacity required for the inverse orthogonal transform can be suppressed.

<Flow of Inverse Orthogonal Transform Processing>

Figure 17:
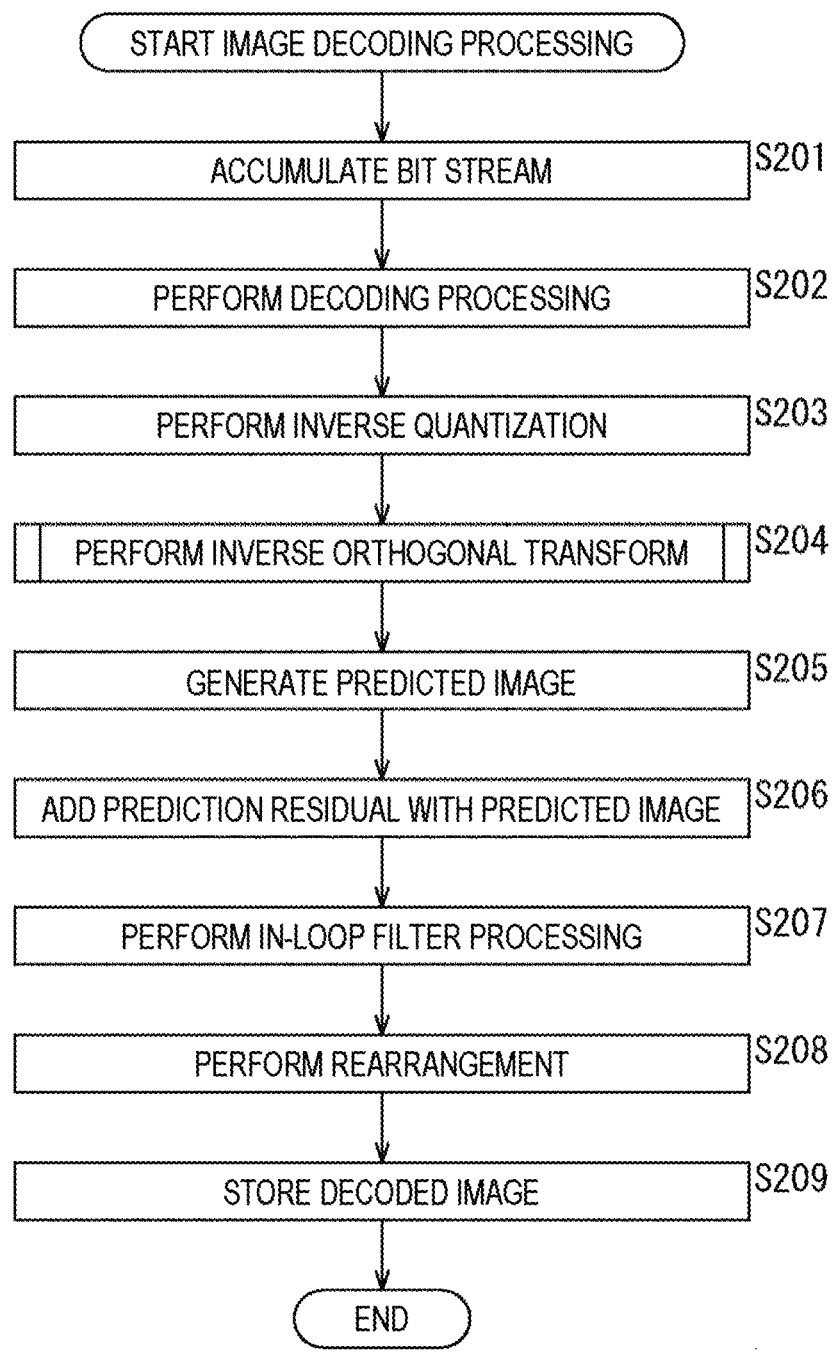
FIG. 17 is a flowchart for describing an example of a flow of image decoding processing.

Next, an example of a flow of the inverse orthogonal transform processing executed in step S204 in FIG. 17 will be described with reference to the flowchart in FIG. 18. When the inverse orthogonal transform processing is started, in step S231, the switch 251 determines whether or not the transform skip flag ts_flag is 2D_TS (in a mode of a two-dimensional transform skip) (for example, 1 (true)) or the transform quantization bypass flag transquant_bypass_flag is 1 (true). In a case where it is determined that the transform skip identifier ts_idx is 2D_TS or the transform quantization bypass flag is 1 (true), the inverse orthogonal transform processing ends, and the processing returns to FIG. 17. In this case, the inverse orthogonal transform processing (the inverse primary transform and the inverse secondary transform) is omitted, and the transform coefficient Coeff_IQ is adopted as the prediction residual D'.

Furthermore, in step S231, in a case where it is determined that the transfer skip identifier ts_idx is not 2D_TS (a mode other than the two-dimensional transform skip) (for example, 0 (false)), and the transform quantization bypass flag is 0 (false), the processing proceeds to step S232. In this case, the inverse secondary transform processing and the inverse primary transform processing are performed.

In step S232, the inverse secondary transform unit 252 performs the inverse secondary transform processing for the transform coefficient Coeff_IQ on the basis of the secondary transform identifier st_idx to derive a transform coefficient Coeff_IS, and outputs the transform coefficient Coeff_IS.

In step S233, the inverse primary transform unit 253 performs the inverse primary transform processing for the transform coefficient Coeff_IS to derive a transform coefficient Coeff_IP (prediction residual D') after inverse primary transform.

When the processing in step S233 ends, the inverse orthogonal transform processing ends.

In the above inverse orthogonal transform processing, processing to which the above-described present technology is applied is performed as processing of step S233. Therefore, by executing the inverse orthogonal transform processing, an increase in the memory capacity required for the inverse primary transform processing can be suppressed.

2-2. Example 1-1

<Concept>

Next, each derivation example described with reference to FIG. 10 will be described in more detail. First, the first row example and the second row example from the top except the uppermost row of item names in the table illustrated in FIG. 10 will be described.

As described above, the derivation of the first row example from the top focuses on the similarity between the waveform of the lowest-order row vector of the first transform type and the waveform of the lowest-order row vector of the transform type of a transformation matrix to be substituted. In this case, the derivation unit flips the first transformation matrix to derive the second transformation matrix. That is, the derivation unit uses the transformation matrix of DST7 as the base transformation matrix $T_{base}$, and flips the transformation matrix in the row direction to derive the transformation matrix of FlipDST7, as illustrated in FIG. 19. The (decreasing-type) transformation matrix of DCT8 having a similar waveform of the 0-order row vector can be substituted by the transformation matrix of FlipDST7.

A specific example of this derivation is illustrated in the upper part in FIG. 20. As illustrated in the upper part in FIG. 20, this derivation can be expressed by a matrix product of the base transformation matrix $T_{base}$ (DST7) and a flip matrix J. Here, the flip matrix J (also referred to as cross-identity matrix) is obtained by right-left inverting an N×N unit matrix I.

Furthermore, the derivation of the second row example from the top focuses on the similarity between the waveform of the lowest-order column vector of the first transform type and the waveform of the lowest-order row vector of the transform type of a transformation matrix to be substituted. In this case, the derivation unit transposes the first transformation matrix to derive the second transformation matrix. That is, the derivation unit uses the transformation matrix of DST7 as the base transformation matrix $T_{base}$, and transposes the transformation matrix to derive the transformation matrix of TrDST7, as illustrated in FIG. 19. The (chevron-type) transformation matrix of DST1 having a similar waveform of the 0-order row vector can be substituted by the transformation matrix of TrDST7.

A specific example of this derivation is illustrated in the lower part in FIG. 20. As illustrated in the lower part in FIG. 20, this derivation can be expressed by transposition of the base transformation matrix $T_{base}$ (DST7).

That is, in both of the above two derivation examples, the second transformation matrix can be derived by one-time operation (flip or transposition). Furthermore, the operation is easy. That is, the second transformation matrix can be easily derived.

Furthermore, by applying the above two derivation examples, it becomes unnecessary to prepare the transformation matrix of DCT8 and the transformation matrix of DST1 as candidates for transformation matrices to be used for orthogonal transform/inverse orthogonal transform. That is, the number of unique transform types can be reduced.

In this case, as illustrated in the table in FIG. 21, the five types of transformation matrices required in the case of the technology described in Non-Patent Document 1 (see the table A in FIG. 6) can be reduced to three types. Therefore, the total LUT size can be about 40 KB. That is, the size of the LUT can be reduced (by about 53 KB (the table A in FIG. 6)) as compared with the case of the technology described in Non-Patent Document 1.

That is, an increase in the size of the LUT can be suppressed.

Note that, as described above, even in this case, by performing the orthogonal transform/inverse orthogonal transform using the transformation matrix of the derived second transform type (TrDST7 or FlipDST7), similar coding efficiency to the case of using the transformation matrix of DST1 or the transformation matrix of DCT8 for the orthogonal transform/inverse orthogonal transform can be obtained.

<Primary Transform Unit>

Figure 22:
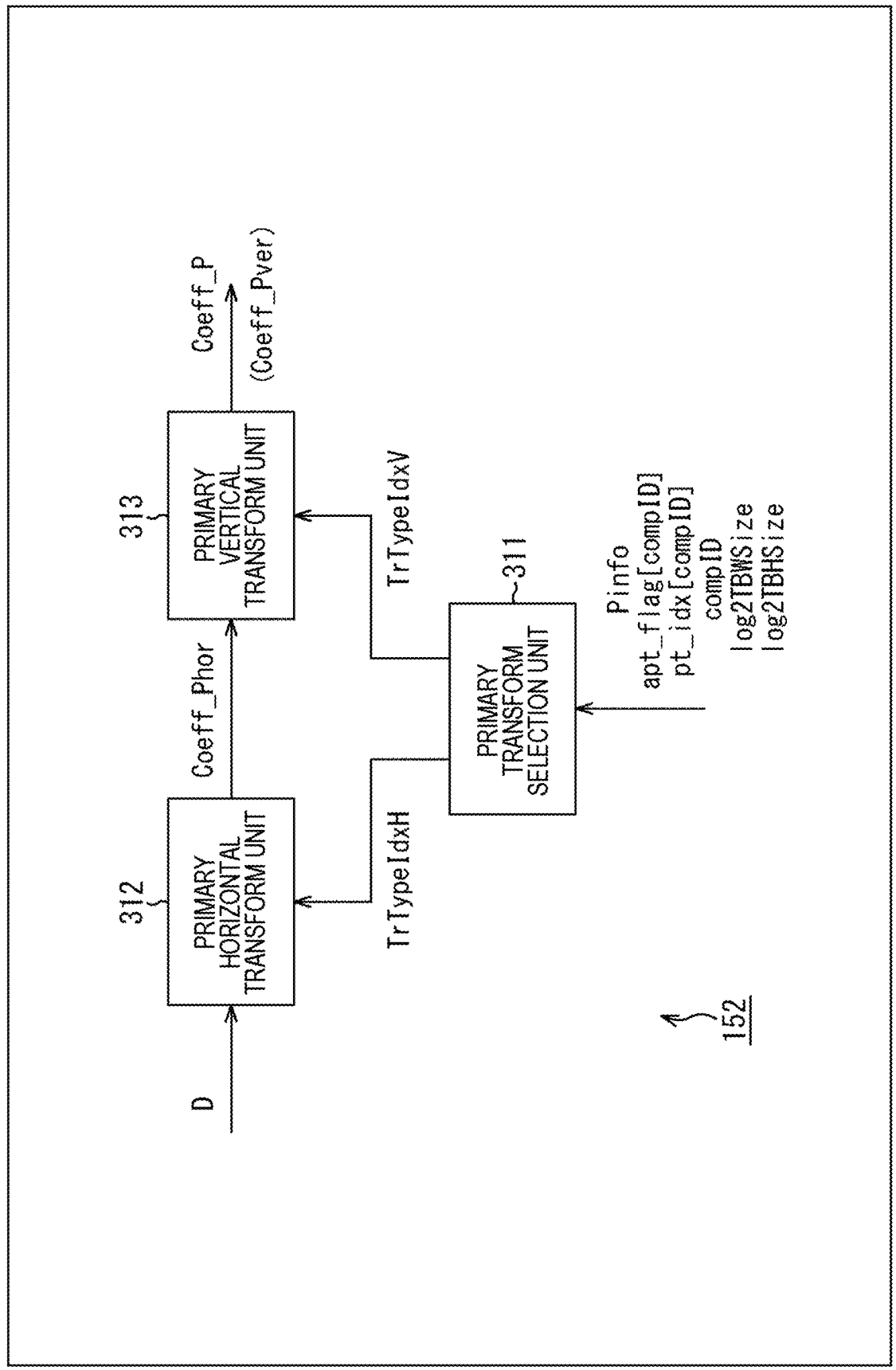
FIG. 22 is a block diagram illustrating a main configuration example of a primary transform unit.

Next, configurations, processing, and the like for performing such derivation will be described. FIG. 22 is a block diagram illustrating a main configuration example of the primary transform unit 152 in this case. As illustrated in FIG. 22, the primary transform unit 152 includes a primary transform selection unit 311, a primary horizontal transform unit 312, and a primary vertical transform unit 313.

The primary transform selection unit 311 uses the prediction mode information PInfo, the component identifier compID, the adaptive primary transform flag apt_flag[compID], and the primary transform identifier pt_idx[compID] as inputs. The primary transform selection unit 311 derives the transform type identifier TrTypeIdxH of primary horizontal transform and the transform type identifier TrTypeIdxV of primary vertical transform by reference to the above information. The primary transform selection unit 311 supplies the derived transform type identifier TrTypeIdxH of primary horizontal transform to the primary horizontal transform unit 312. Furthermore, the primary transform selection unit 311 supplies the derived transform type identifier TrTypeIdxV of primary vertical transform to the primary vertical transform unit 313.

The primary horizontal transform unit 312 uses the prediction residual D, the transform type identifier TrTypeIdxH of primary horizontal transform, and information regarding the size of the transformation block (not illustrated) as inputs. The information regarding the size of the transformation block may be a natural number N indicating the size of the transformation block in the horizontal direction or the vertical direction (the number of coefficients), or may be log 2TBWSize (the logarithmic value of the width) indicating the width of the transformation block (N=1<<log 2TBW-Size). The primary horizontal transform unit 312 executes, for the prediction residual D, primary horizontal transform Phor determined by the transform type identifier TrTypeIdxH and the size of the transformation block to derive a transform coefficient Coeff_Phor after primary horizontal transform. The primary horizontal transform unit 312 supplies the transform coefficient Coeff_Phor after primary horizontal transform to the primary vertical transform unit 313.

The primary vertical transform unit 313 uses the transform coefficient Coeff_Phor after primary horizontal transform, the transform type identifier TrTypeIdxV of primary vertical transform, and information regarding the size of the transformation block (not illustrated) as inputs. The information regarding the size of the transformation block may be a natural number N indicating the size of the transformation block in the horizontal direction or the vertical direction (the number of coefficients), or may be log 2TBH-Size (the logarithmic value of the height) indicating the height of the transformation block (N=1<<log 2TBHSize). The primary vertical transform unit 313 executes, for the transform coefficient Coeff_Phor after primary horizontal transform, primary vertical transform Pver determined by the transform type identifier TrTypeIdxV and the size of the transformation block to derive a transform coefficient Coeff_Pver after primary vertical transform. The primary vertical transform unit 313 outputs the transform coefficient Coeff_Pver after primary vertical transform to the outside of the primary transform unit 152 (supplies the same to the secondary transform unit 153) as the transform coefficient Coeff_P after primary transform.

In the primary transform unit 152 having the above configuration, the primary horizontal transform unit 312 and the primary vertical transform unit 313 perform processing to which the above-described present technology is applied, as a derivation unit and an orthogonal transform unit, respectively.

That is, the primary horizontal transform unit 312 derives, as a derivation unit, the second transformation matrix for horizontal one-dimensional orthogonal transform, and further performs, as an orthogonal transform unit, horizontal one-dimensional orthogonal transform, using the second transformation matrix for horizontal one-dimensional orthogonal transform derived by the derivation unit. Therefore, the primary horizontal transform unit 312 can suppress an increase in the memory capacity required for the horizontal one-dimensional orthogonal transform.

Furthermore, the primary vertical transform unit 313 derives, as a derivation unit, the second transformation matrix for vertical one-dimensional orthogonal transform, and further performs, as an orthogonal transform unit, the vertical one-dimensional orthogonal transform, using the second transformation matrix for vertical one-dimensional orthogonal transform derived by the derivation unit. Therefore, the primary vertical transform unit 313 can suppress an increase in the memory capacity required for the vertical one-dimensional orthogonal transform.

<Primary Horizontal Transform Unit>

Figure 23:
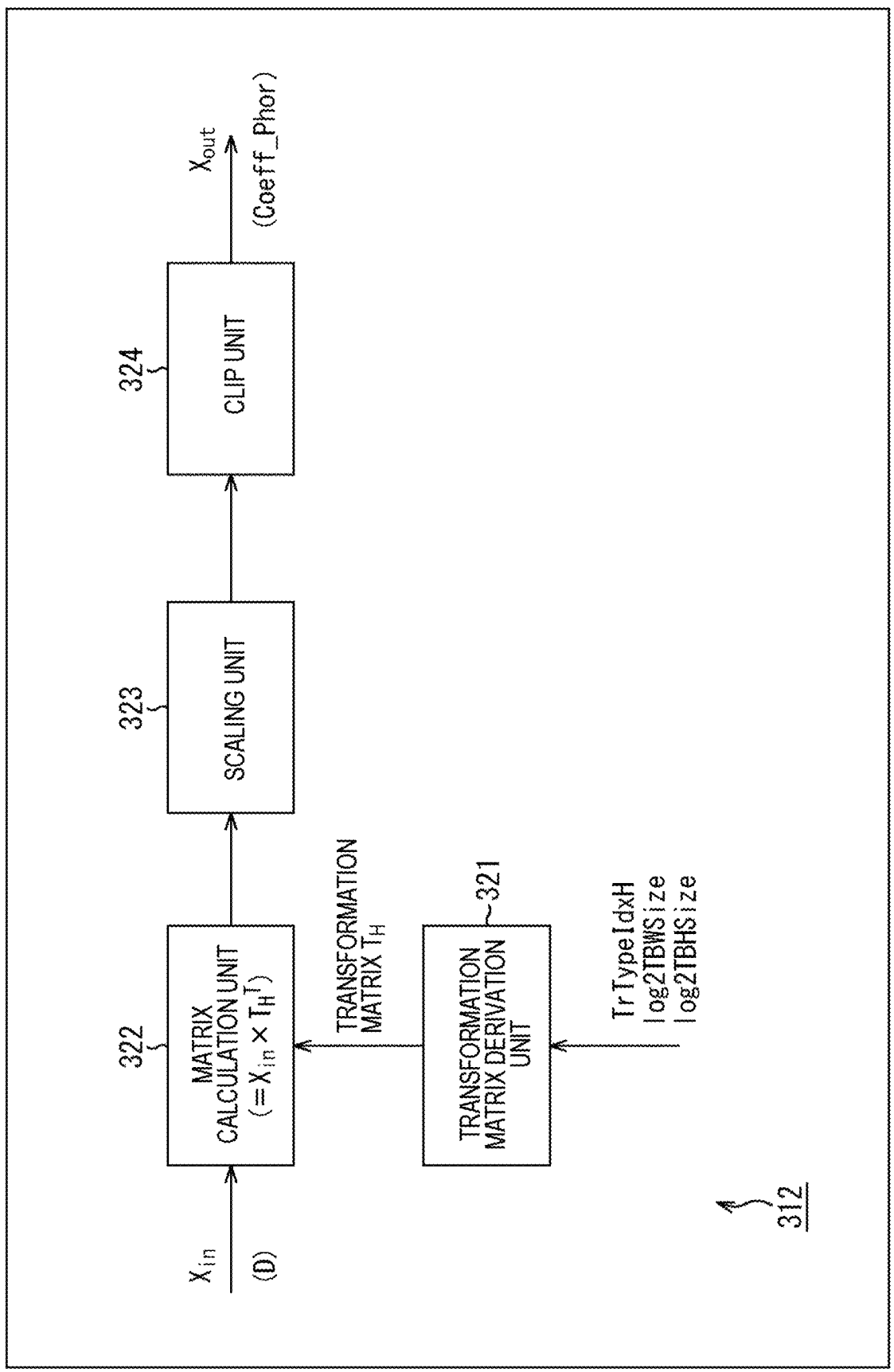
FIG. 23 is a block diagram illustrating a main configuration example of a primary horizontal transform unit.

FIG. 23 is a block diagram illustrating a main configuration example of the primary horizontal transform unit 312 in FIG. 22. As illustrated in FIG. 23, the primary horizontal transform unit 312 includes a transformation matrix derivation unit 321, a matrix calculation unit 322, a scaling unit 323, and a clip unit 324.

The transformation matrix derivation unit 321 uses the transform type identifier TrTypeIdxH of primary horizontal transform and the information regarding the size of the transformation block as inputs, and derives a transformation matrix $T_H$ for primary horizontal transform (a transformation matrix $T_H$ for horizontal one-dimensional orthogonal transform) having the same size as the transformation block, the transformation matrix $T_H$ corresponding to the transform type identifier TrTypeIdxH of primary horizontal transform. The transformation matrix derivation unit 321 supplies the transformation matrix $T_H$ to the matrix calculation unit 322.

The matrix calculation unit 322 performs the horizontal one-dimensional orthogonal transform for input data $X_{in}$ (that is, the transformation block of the prediction residual D), using the transformation matrix $T_H$ supplied from the transformation matrix derivation unit 321, to obtain intermediate data Y1. This calculation can be expressed by a determinant as in the following expression (9).

[Math. 7]

$$Y1 = X_{in} \times T_H^T \qquad (9)$$

The matrix calculation unit 322 supplies the intermediate data Y1 to the scaling unit 323.

The scaling unit 323 scales a coefficient Y1 [i, j] of each i-row j-column component of the intermediate data Y1 with a predetermined shift amount $S_H$ to obtain intermediate data Y2. This scaling can be expressed as the following expression (10). Hereinafter, the i-row j-column component ((i, j) component) of a certain two-dimensional matrix (two-dimensional array) X is written as X [i, j].

[Math. 8]

$$Y2[i,j] = Y1[i,j] >> S_H \qquad (10)$$

The scaling unit 323 supplies the intermediate data Y2 to the clip unit 324.

The clip unit 324 clips a value of a coefficient Y2 [i, j] of each i-row j-column component of the intermediate data Y2, and derives output data $X_{out}$ (that is, the transform coefficient Coeff_Phor after primary horizontal transform). This processing can be expressed as the following expression (11).

[Math. 9]

$$X_{out}[i,j] = \text{Clip3}(\text{minCoefVal}, \text{maxCoefVal}, Y2[i,j]) \qquad (11)$$

The clip unit 324 outputs the output data $X_{out}$ (the transform coefficient Coeff_Phor after primary horizontal transform) to the outside of the primary horizontal transform unit 312 (supplies the same to the primary vertical transform unit 313).

In the primary horizontal transform unit 312 having the above configuration, the transformation matrix derivation unit 321 performs processing to which the above-described present technology is applied, as a derivation unit. Furthermore, the matrix calculation unit 322 performs processing to which the above-described present technology is applied, as an orthogonal transform unit. Therefore, the primary horizontal transform unit 312 can suppress an increase in the memory capacity required for the horizontal one-dimensional orthogonal transform.

<Transformation Matrix Derivation Unit>

Figure 24:
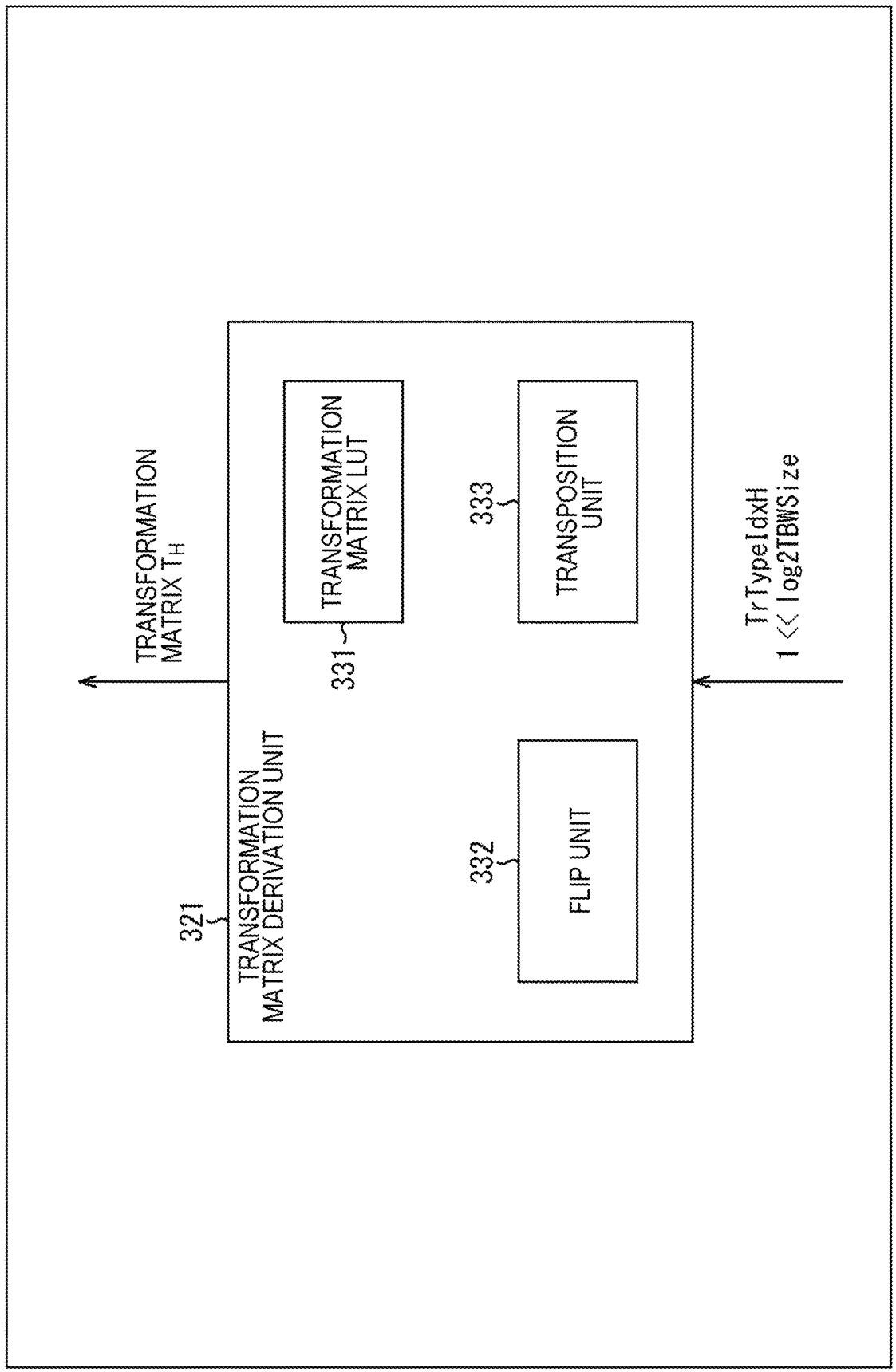
FIG. 24 is a block diagram illustrating a main configuration example of a transformation matrix derivation unit.

FIG. 24 is a block diagram illustrating a main configuration example of the transformation matrix derivation unit 321 in FIG. 23. As illustrated in FIG. 24, the transformation matrix derivation unit 321 includes a transformation matrix LUT 331, a flip unit 332, and a transposition unit 333. Note that, in FIG. 24, arrows representing data transfer are omitted, but in the transformation matrix derivation unit 321, arbitrary data can be transferred between arbitrary processing units (processing blocks).

The transformation matrix LUT 331 is a lookup table for holding (storing) a transformation matrix corresponding to the transform type identifier TrTypeIdxH of primary horizontal transform and a size N of the transformation block. When the transform type identifier TrTypeIdxH of primary horizontal transform and the size N of the transformation block are specified, the transformation matrix LUT 331 selects and outputs a transformation matrix corresponding thereto. In the case of this derivation example, the transformation matrix LUT 331 supplies the transformation matrix to both or one of the flip unit 332 and the transposition unit 333 as the base transformation matrix $T_{base}$.

The flip unit 332 flips an input transformation matrix T of N rows and N columns, and outputs a flipped transformation matrix $T_{flip}$. In the case of this derivation example, the flip unit 332 uses the base transformation matrix $T_{base}$ of N rows and N columns supplied from the transformation matrix LUT 331 as an input, flips the base transformation matrix $T_{base}$ in the row direction (horizontal direction), and outputs the flipped transformation matrix $T_{flip}$ to the outside of the transformation matrix derivation unit 321 (supplies the same to the matrix calculation unit 322) as the transformation matrix $T_H$.

The transposition unit 333 transposes the input transformation matrix T of N rows and N columns, and outputs a transposed transformation matrix $T_{transpose}$. In the case of this derivation example, the transposition unit 333 uses the base transformation matrix $T_{base}$ of N rows and N columns supplied from the transformation matrix LUT 331 as an input, transposes the base transformation matrix $T_{base}$, and outputs the transposed transformation matrix $T_{transpose}$ to the outside of the transformation matrix derivation unit 321 (supplies the same to the matrix calculation unit 322) as the transformation matrix $T_H$.

As described above, the transformation matrix derivation unit 321 includes the flip unit 332 and the transposition unit 333. Therefore, the transformation matrix derivation unit 321 can implement the derivation example of the first row example from the top of the table illustrated in FIG. 10, using the flip unit 332, for example. Furthermore, the transformation matrix derivation unit 321 can implement the derivation example of the second row example from the top of the table illustrated in FIG. 10, using the transposition unit 333, for example.

<Primary Vertical Transform Unit>

Figure 25:
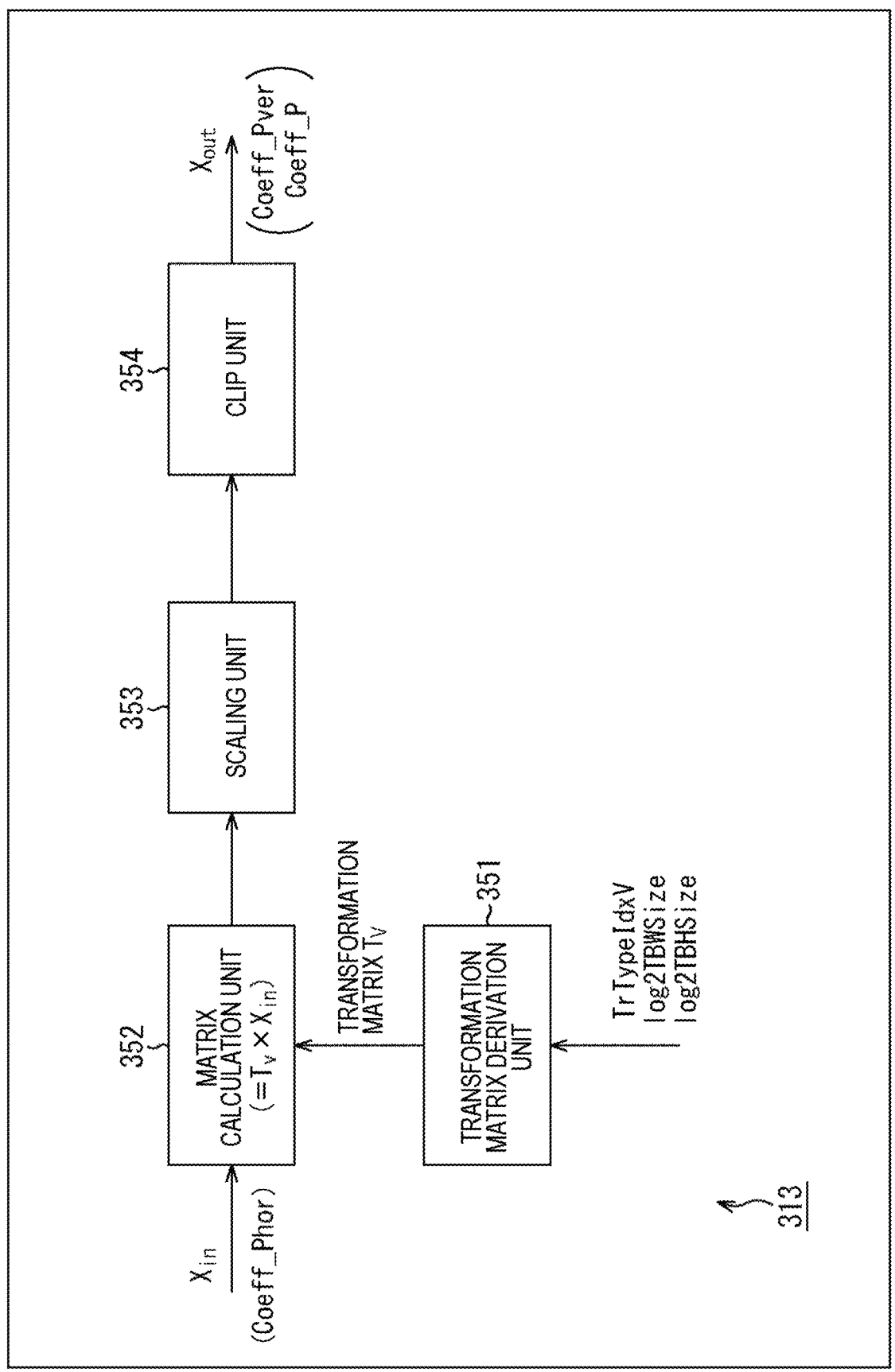
FIG. 25 is a block diagram illustrating a main configuration example of a primary vertical transform unit.

FIG. 25 is a block diagram illustrating a main configuration example of the primary vertical transform unit 313 in FIG. 22. As illustrated in FIG. 25, the primary vertical transform unit 313 includes a transformation matrix derivation unit 351, a matrix calculation unit 352, a scaling unit 353, and a clip unit 354.

The transformation matrix derivation unit 351 uses the transform type identifier TrTypeIdxV of primary vertical transform and the information regarding the size of the transformation block as inputs, and derives a transformation matrix $T_V$ for primary vertical transform (a transformation matrix $T_V$ for vertical one-dimensional orthogonal transform) having the same size as the transformation block, the transformation matrix $T_V$ corresponding to the transform type identifier TrTypeIdxV of primary vertical transform. The transformation matrix derivation unit 351 supplies the transformation matrix $T_V$ to the matrix calculation unit 352.

The matrix calculation unit 352 performs the vertical one-dimensional orthogonal transform for the input data $X_{in}$ (that is, the transformation block of the transform coefficient Coeff_Phor after primary horizontal transform), using the transformation matrix $T_V$ supplied from the transformation matrix derivation unit 351, to obtain intermediate data Y1. This calculation can be expressed by a determinant as in the following expression (12).

[Math. 10]

$$Y1 = T_V \times X_{in} \tag{12}$$

The matrix calculation unit 352 supplies the intermediate data Y1 to the scaling unit 353.

The scaling unit 353 scales a coefficient Y1 [i, j] of each i-row j-column component of the intermediate data Y1 with a predetermined shift amount $S_V$ to obtain intermediate data Y2. This scaling can be expressed as the following expression (13).

[Math. 11]

$$Y2[i,j] = Y1[i,j] >> S_V \tag{13}$$

The scaling unit 353 supplies the intermediate data Y2 to the clip unit 354.

The clip unit 354 clips a value of a coefficient Y2 [i, j] of each i-row j-column component of the intermediate data Y2, and derives output data $X_{out}$ (that is, the transform coefficient Coeff_Pver after primary vertical transform). This processing can be expressed as the following expression (14).

[Math. 12]

$$X_{out}[i,j] = \text{Clip3}(\text{minCoefVal}, \text{maxCoefVal}, Y2[i,j]) \tag{14}$$

The clip unit 324 outputs the output data $X_{out}$ (transform coefficient Coeff_Pver after primary vertical transform) to the outside of the primary vertical transform unit 313 (supplies the same to the secondary transform unit 153) as the transform coefficient Coeff_P after primary transform.

In the primary vertical transform unit 313 having the above configuration, the transformation matrix derivation unit 351 performs processing to which the above-described present technology is applied, as a derivation unit. Furthermore, the matrix calculation unit 352 performs processing to which the above-described present technology is applied, as an orthogonal transform unit. Therefore, the primary vertical transform unit 313 can suppress an increase in the memory capacity required for the vertical one-dimensional orthogonal transform.

<Transformation Matrix Derivation Unit>

Figure 26:
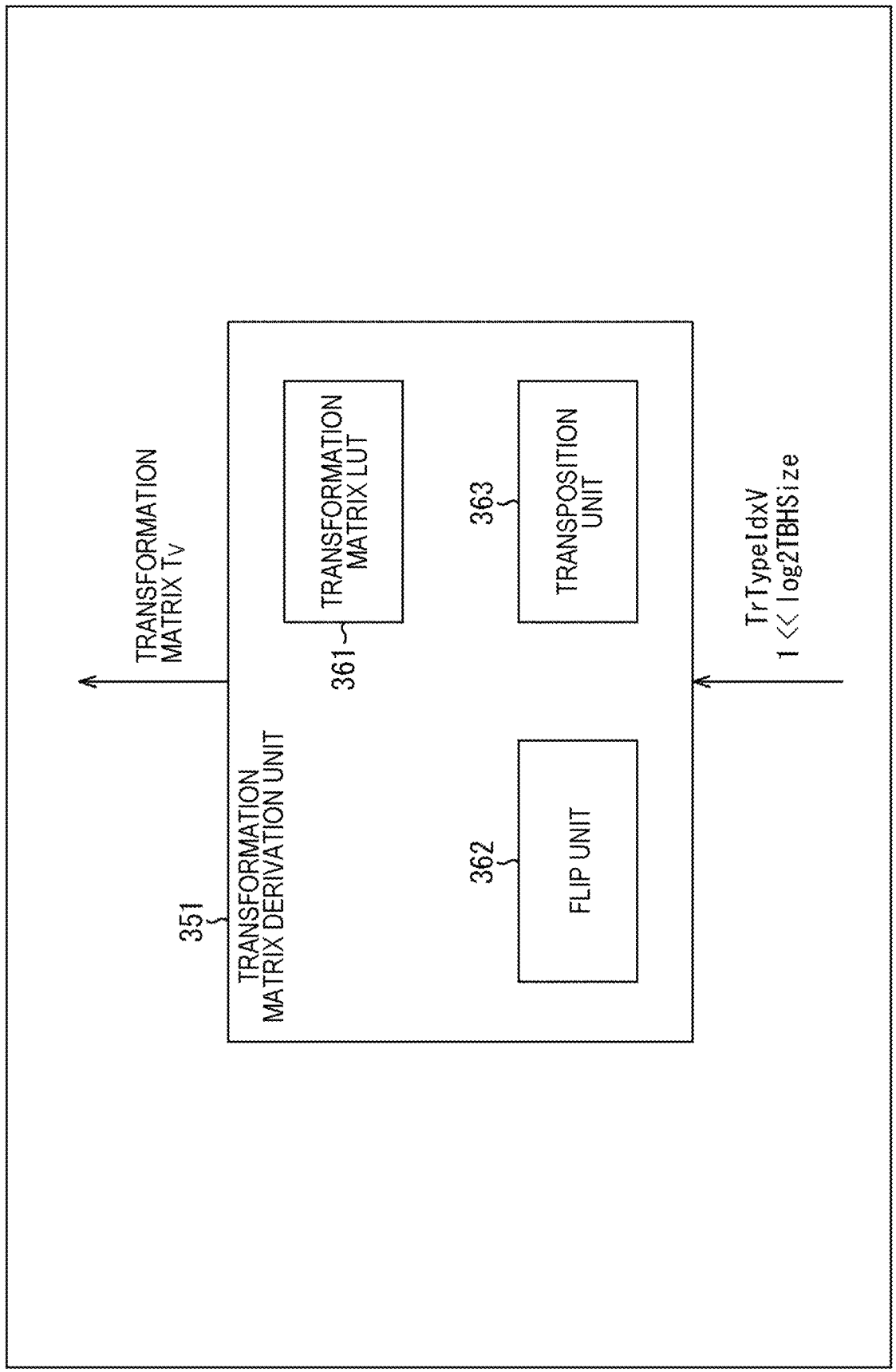
FIG. 26 is a block diagram illustrating a main configuration example of a transformation matrix derivation unit.

FIG. 26 is a block diagram illustrating a main configuration example of the transformation matrix derivation unit 351 in FIG. 25. As illustrated in FIG. 26, the transformation matrix derivation unit 351 includes a transformation matrix LUT 361, a flip unit 362, and a transposition unit 363. Note that, in FIG. 26, arrows representing data transfer are omitted, but in the transformation matrix derivation unit 351, arbitrary data can be transferred between arbitrary processing units (processing blocks).

The transformation matrix LUT 361 is a lookup table for holding (storing) a transformation matrix corresponding to the transform type identifier TrTypeIdxV of primary vertical transform and the size N of the transformation block. When the transform type identifier TrTypeIdxV of primary vertical transform and the size N of the transformation block are specified, the transformation matrix LUT 361 selects and outputs a transformation matrix corresponding thereto. In the case of this derivation example, the transformation matrix LUT 361 supplies the transformation matrix to both or one of the flip unit 362 and the transposition unit 363 as the base transformation matrix $T_{base}$.

The flip unit 362 flips an input transformation matrix T of N rows and N columns, and outputs a flipped transformation matrix $T_{flip}$. In the case of this derivation example, the flip unit 362 uses the base transformation matrix $T_{base}$ of N rows and N columns supplied from the transformation matrix LUT 361 as an input, flips the base transformation matrix $T_{base}$ in the row direction (horizontal direction), and outputs the flipped transformation matrix $T_{flip}$ to the outside of the transformation matrix derivation unit 351 (supplies the same to the matrix calculation unit 352) as the transformation matrix $T_V$.

The transposition unit 363 transposes the input transformation matrix T of N rows and N columns, and outputs a transposed transformation matrix $T_{transpose}$. In the case of this derivation example, the transposition unit 363 uses the base transformation matrix $T_{base}$ of N rows and N columns supplied from the transformation matrix LUT 361 as an input, transposes the base transformation matrix $T_{base}$, and outputs the transposed transformation matrix $T_{transpose}$ to the outside of the transformation matrix derivation unit 351 (supplies the same to the matrix calculation unit 352) as the transformation matrix $T_V$.

As described above, the transformation matrix derivation unit 351 includes the flip unit 362 and the transposition unit 363. Therefore, the transformation matrix derivation unit 351 can implement the derivation example of the first row example from the top of the table illustrated in FIG. 10, using the flip unit 362, for example. Furthermore, the transformation matrix derivation unit 351 can implement the derivation example of the second row example from the top of the table illustrated in FIG. 10, using the transposition unit 363, for example.

<Flow of Primary Transform Processing>

Next, an example of a flow of processing performed by the above-described configuration will be described. An example of a flow of the primary transform processing executed in step S132 in FIG. 14 in this case will be described with reference to the flowchart in FIG. 27.

When the primary transform processing is started, in step S301, the primary transform selection unit 311 (FIG. 22) of the primary transform unit 152 selects the transform type identifier TrTypeIdxH of primary horizontal transform (and the transform type TrTypeH specified with the identifier), and the transform type identifier TrTypeIdxV of primary vertical transform (the transform type TrTypeV specified with the identifier), as described above.

In step S302, the primary horizontal transform unit 312 performs, for the prediction residual D, the primary horizontal transform processing corresponding to the transform type identifier TrTypeIdxH of primary horizontal transform obtained in step S301 to derive the transform coefficient Coeff_Phor after primary horizontal transform.

In step S303, the primary vertical transform unit 313 performs, for a primary horizontal transform result (the transform coefficient Coeff_Phor after primary horizontal transform), the primary vertical transform processing corresponding to the transform type identifier TrTypeIdxV of primary vertical transform obtained in step S301 to derive the transform coefficient Coeff_Pver after primary vertical transform (the transform coefficient Coeff_P after primary transform).

When the processing in step S303 ends, the primary transform processing ends and the processing returns to FIG. 14.

In the above primary transform processing, processing to which the above-described present technology is applied is performed as processing of step S302 or S303. Therefore, by executing the primary transform processing, an increase in the memory capacity required for the primary horizontal transform processing and the primary vertical transform processing can be suppressed.

<Flow of Primary Horizontal Transform Processing>

A flow of the primary horizontal transform processing executed in step S302 in FIG. 27 will be described with reference to the flowchart in FIG. 28.

When the primary horizontal transform processing is started, in step S321, the transformation matrix derivation unit 321 (FIG. 23) of the primary horizontal transform unit 312 derives the transformation matrix $T_H$ corresponding to the transform type identifier TrTypeIdxH (or the transform type TrTypeH) of primary horizontal transform.

In step S322, the matrix calculation unit 322 performs the horizontal one-dimensional orthogonal transform for the input data $X_{in}$ (prediction residual D), using the derived transformation matrix $T_H$, to obtain the intermediate data Y1. When this processing is expressed as a determinant, the processing can be expressed as the above-described expression (9). Furthermore, when this processing is expressed as an operation for each element, the processing can be expressed as the following expression (15).

[Math. 13]

$$Y1[i, j] = X_{in}[i, :] \times T_H^T[:, j] = \sum_{k=0}^{N-1} X_{in}[i, k] T_H[j, k] \tag{15}$$

Figure 29:
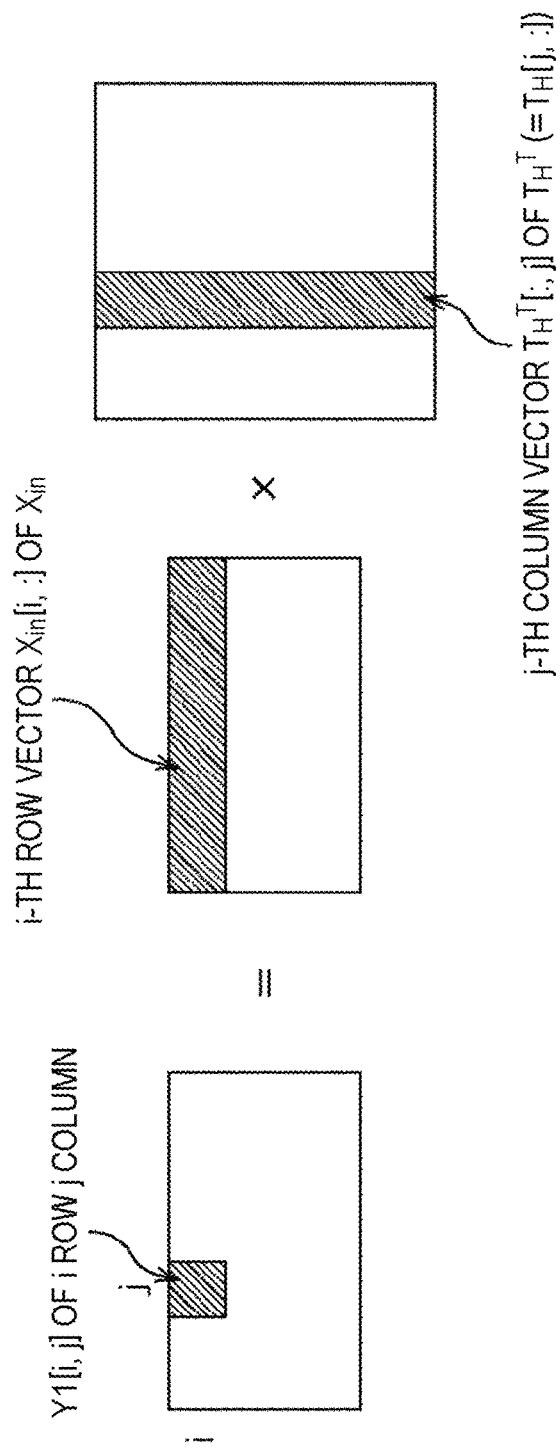
FIG. 29 is a diagram illustrating an example of an operation expression for each element.

That is, as illustrated in FIG. 29, an inner product of an i-th row vector $X_{in}[i, :]$ of the input data $X_{in}$ and a transformation matrix $T_H^T[:, j]$ of a j-th row vector $T_H[j, :]$ of the transformation matrix $T_H$ is set as a coefficient Y1 [i, j] of the i-row j-column component of the intermediate data Y1 (j=0, . . . , M-1, and i=0, . . . , N-1). Here, M represents the size of the input data $X_{in}$ in the x direction, and N represents the size of the input data $X_{in}$ in the y direction. M and N can be expressed as the following expressions (16).

[Math. 14]

$M=1<<\log 2TBSize$ $N=1<<\log 2TBSize \tag{16}$

Returning to FIG. 28, in step S323, the scaling unit 323 scales, with the shift amount $S_H$, a coefficient Y1 [i, j] of each i-row j-column component of the intermediate data Y1 derived by the processing in step S322 to derive intermediate data Y2. This scaling can be expressed as the above-described expression (10).

In step S324, the clip unit 324 clips the value of the coefficient Y2 [i, j] of each i-row j-column component of the intermediate data Y2 derived by the processing in step S323, and obtains output data $X_{out}$ (that is, the transform coefficient Coeff_Phor after primary horizontal transform). This processing can be expressed as the above-described expression (11).

Figure 27:
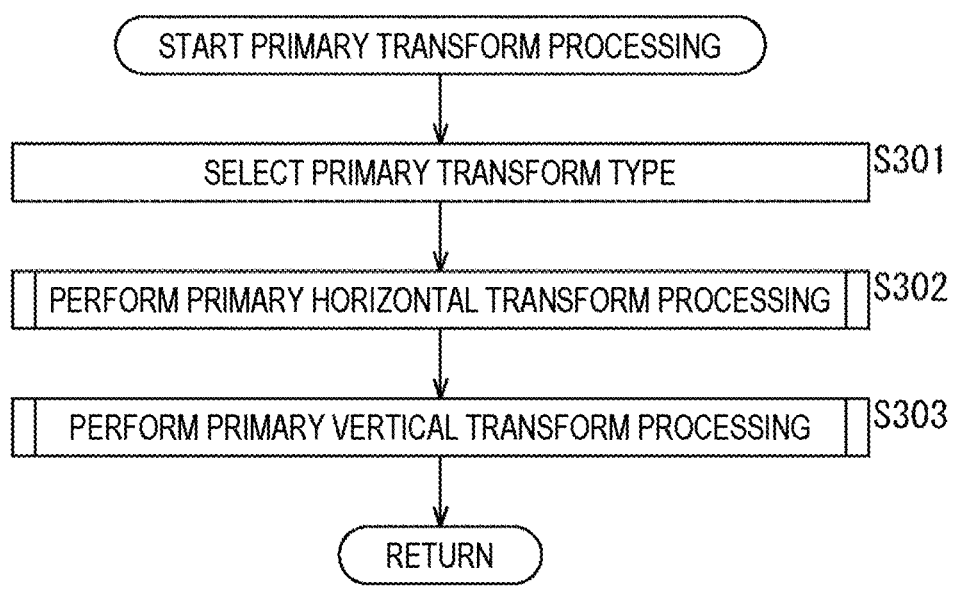
FIG. 27 is a flowchart for describing an example of a flow of primary transform processing.

When the processing in step S324 ends, the primary horizontal transform processing ends and the processing returns to FIG. 27.

In the above primary horizontal transform processing, processing to which the above-described present technology is applied is performed as processing of step S321 or S322. Therefore, by executing the primary horizontal transform processing, an increase in the memory capacity required for the horizontal one-dimensional orthogonal transform can be suppressed.

<Flow of Transformation Matrix Derivation Processing>

Next, an example of a flow of the transformation matrix derivation processing executed in step S321 in FIG. 28 will be described with reference to the flowchart in FIG. 30.

When the transformation matrix derivation processing is started, in step S341, the transformation matrix derivation unit 321 obtains a base transform type BaseTrType corresponding to the transform type identifier TrTypeIdxH by reference to the correspondence table illustrated in FIG. 31, for example. Note that, when this processing is expressed as a mathematical expression, the processing can be expressed as the expression (17), for example. Moreover, the transformation matrix of N rows and N columns of the obtained base transform type is read from the transformation matrix LUT, and is set as the base transformation matrix $T_{base}$, as in the following expression (18).

[Math. 15]

$$BaseTrType=LUT\_TrTypeIdxToBaseTrType[TrTypeIdxH] \quad (17)$$

$$Tbase=T[BaseTrType][\log 2N-] \quad (18)$$

Furthermore, the transformation matrix derivation unit 321 sets a value corresponding to the transform type identifier TrTypeIdxH as a flip flag FlipFlag, as in the following expression (19). Furthermore, the transformation matrix derivation unit 321 sets a value corresponding to the transform type identifier TrTypeIdxH as a transposition flag TransposeFlag, as in the following expression (20).

[Math. 16]

$$FlipFlag=LUT\_TrTypeIdxToFlipFlag[TrTypeIdxH] \quad (19)$$

$$TransposeFlag=LUT\_TrTypeIdxToTransposeFlag[TrTypeIdxH] \quad (20)$$

In step S342, the transformation matrix derivation unit 321 determines whether or not the flip flag FlipFlag and the transposition flag TransposeFlag satisfy a condition (ConditionA1) expressed by the following expression (21).

[Math. 17]

$$ConditionA1:FlipFlag==F\&\&TransposeFlag==F \quad (21)$$

In a case where it is determined that the above-described condition (ConditionA1) is satisfied (in a case where both the flip flag FlipFlag and the transposition flag TransposeFlag are false (0)), the processing proceeds to step S343.

In step S343, the transformation matrix derivation unit 321 sets the base transformation matrix $T_{base}$ as the transformation matrix $T_H$ as in the following expression (22).

[Math. 18]

$$T_H T_{base} \quad (22)$$

Figure 28:
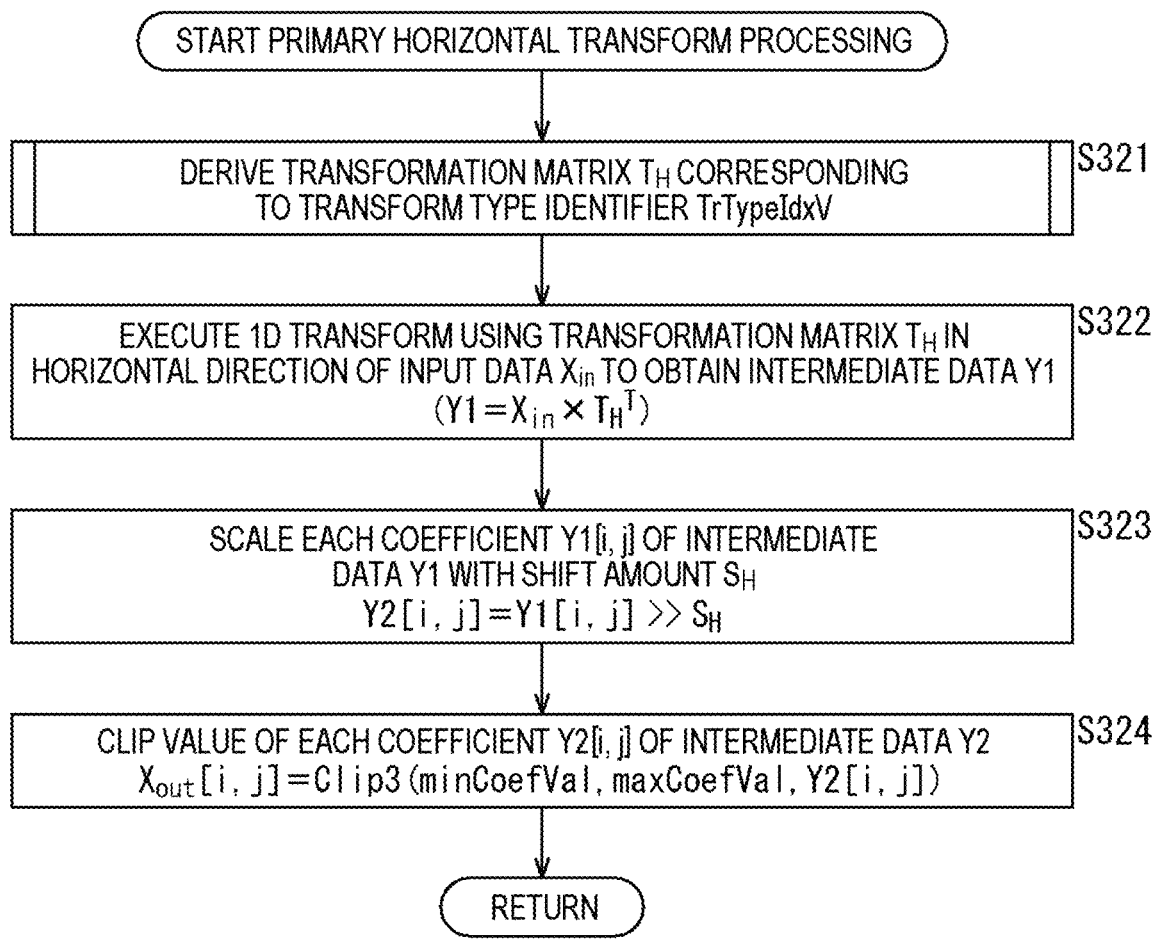
FIG. 28 is a flowchart for describing an example of a flow of primary horizontal transform processing.

When the processing in step S343 ends, the transformation matrix derivation processing ends and the processing returns to FIG. 28. Furthermore, in step S342, in a case where it is determined that the above-described condition (ConditionA1) is not satisfied (the flip flag FlipFlag or the transposition flag TransposeFlag is true (1)), the processing proceeds to step S344.

In step S344, the transformation matrix derivation unit 321 determines whether or not the flip flag FlipFlag and the transposition flag TransposeFlag satisfy a condition (ConditionA2) expressed by the following expression (23).

[Math. 19]

$$ConditionA2:FlipFlag==F\&\&TransposeFlag==T \quad (23)$$

In a case where it is determined that the above-described condition (ConditionA2) is satisfied (in a case where the flip flag FlipFlag is false (0) and the transposition flag TransposeFlag is true (1)), the processing proceeds to step S345.

In step S345, the transformation matrix derivation unit 321 transposes the base transformation matrix $T_{base}$ via the transposition unit 333 to obtain the transformation matrix $T_H$. This processing can be expressed as a determinant as in the following expression (24).

[Math. 20]

$$T_H=Tr(T_{base})=T_{base}^T \quad (24)$$

Furthermore, in a case of expressing the processing as an operation for each element, the transformation matrix derivation unit 321 sets the i-row j-column component ((i, j) component) of the base transformation matrix $T_{base}$ as an (j, i) component of the transformation matrix $T_H$, as in the following expression (25).

[Math. 21]

$$T_H[j,i]=T_{base}[i,j]$$

$$\text{for } i,j=0,\ldots,N-1 \quad (25)$$

Here, the i-row j-column component ((i, j) component) of the transformation matrix $T_H$ of N rows and N columns is written as $T_H[i, j]$. Furthermore, "for i, j=0, . . . , N−1" on the second row indicates that i and j have values of 0 to N−1. That is, it means that $T_H[j, i]$ indicates all of elements of the transformation matrix $T_H$ of N rows and N columns.

By expressing the processing in step S345 as an operation for each element in this way, the transposition operation can be implemented by accessing a simple two-dimensional array. When the processing in step S345 ends, the transformation matrix derivation processing ends and the processing returns to FIG. 28.

Furthermore, in step S344, in a case where it is determined that the above-described condition (ConditionA2) is not satisfied (the flip flag FlipFlag is true (1) or the transposition flag TransposeFlag is false (0)), the processing proceeds to step S346.

In step S346, the transformation matrix derivation unit 321 flips the base transformation matrix $T_{base}$ via the flip unit 332 to obtain the transformation matrix $T_H$. This processing can be expressed as a determinant as in the following expression (26).

[Math. 22]

$$T_H=T_{base}\times J \quad (26)$$

Here, x is an operator representing a matrix product. Furthermore, the flip matrix J (cross-identity matrix) is obtained by right-left inverting the N×N unit matrix I.

Furthermore, in a case of expressing the processing as an operation for each element, the transformation matrix derivation unit 321 sets a (i, N−1−j) component of the base transformation matrix Tbase as the i-row j-column component ((i, j) component) of the transformation matrix $T_H$, as in the following expression (27).

[Math. 23]

$$T_H[i,j]=T_{base}[i,N-1-j]$$

$$\text{for } i,j=0,\ldots,N-1 \quad (27)$$

Here, the i-row j-column component ((i, j) component) of the transformation matrix $T_H$ of N rows and N columns is written as $T_H[i, j]$. Furthermore, "for i, j=0, . . . , N−1" on the second row indicates that i and j have values of 0 to N−1. That is, it means that $T_H[i, j]$ indicates all of elements of the transformation matrix $T_H$ of N rows and N columns.

By expressing the processing in step S346 as an operation for each element in this way, the transposition operation can be implemented by accessing a simple two-dimensional array without a matrix calculation of the base transformation matrix $T_{base}$ and the flip matrix J. Furthermore, the flip matrix J becomes unnecessary. When the processing in step S346 ends, the transformation matrix derivation processing ends and the processing returns to FIG. 28.

In the above transformation matrix derivation processing, processing to which the above-described present technology is applied is performed as processing of step S345 or S346. Therefore, by executing the transformation matrix derivation processing, the derivation example of the first and second row examples from the top of the table in FIG. 10 can be implemented in the horizontal one-dimensional orthogonal transform. Therefore, an increase in the required memory capacity can be suppressed.

Note that a branch described below may be inserted between the processing in step S344 and the processing in step S346. That is, in the step, the transformation matrix derivation unit 321 determines whether or not the flip flag FlipFlag and the transposition flag TransposeFlag satisfy a condition (ConditionA3) expressed by the following expression (28).

[Math. 24]

ConditionA3:FlipFlag==T&&TransposeFlag==F (28)

In a case where the transformation matrix derivation unit 321 determines that the above-described condition (ConditionA3) is satisfied (in a case where the flip flag FlipFlag is true (1) and the transposition flag TransposeFlag is false (0)), the processing proceeds to step S346.

Furthermore, in a case where it is determined that the above-described condition (ConditionA3) is not satisfied (the flip flag FlipFlag is false (0) or the transposition flag TransposeFlag is true (1)), the transformation matrix derivation processing ends and the processing returns to FIG. 28.

<Flow of Primary Vertical Transform Processing>

Next, a flow of the primary vertical transform processing executed in step S303 in FIG. 27 will be described with reference to the flowchart in FIG. 32.

When the primary vertical transform processing is started, in step S361, the transformation matrix derivation unit 351 (FIG. 25) of the primary vertical transform unit 313 executes the transformation matrix derivation processing to derive the transformation matrix $T_V$ corresponding to the transform type identifier TrTypeIdxV (or the transform type TrTypeV) of primary vertical transform.

Since the flow of the transformation matrix derivation processing is similar to the case of primary horizontal transform described with reference to the flowchart in FIG. 30, and description thereof is omitted. For example, the description regarding the horizontal direction, of the description made by reference to FIG. 30, is simply applied to the vertical direction, such as by replacing the transform type identifier TrTypeIdxH of primary horizontal transform with the transform type identifier TrTypeIdxV of primary vertical transform, and replacing the transformation matrix $T_H$ for primary horizontal transform with the transformation matrix $T_V$ for primary vertical transform.

In step S362, the matrix calculation unit 352 performs the vertical one-dimensional orthogonal transform for the input data $X_{in}$ (the transform coefficient Coeff_Phor after primary horizontal transform), using the derived transformation matrix $T_V$, to obtain the intermediate data Y1. When this processing is expressed as a determinant, the processing can be expressed as the above-described expression (12). Furthermore, when this processing is expressed as an operation for each element, the processing can be expressed as the following expression (29).

[Math. 25]

$$Y1[i, j] = T_V[i, :] \times X_{in}[:, j] = \sum_{k=0}^{N-1} T_V[i, k] X_{in}[k, j] \qquad (29)$$

Figure 33:
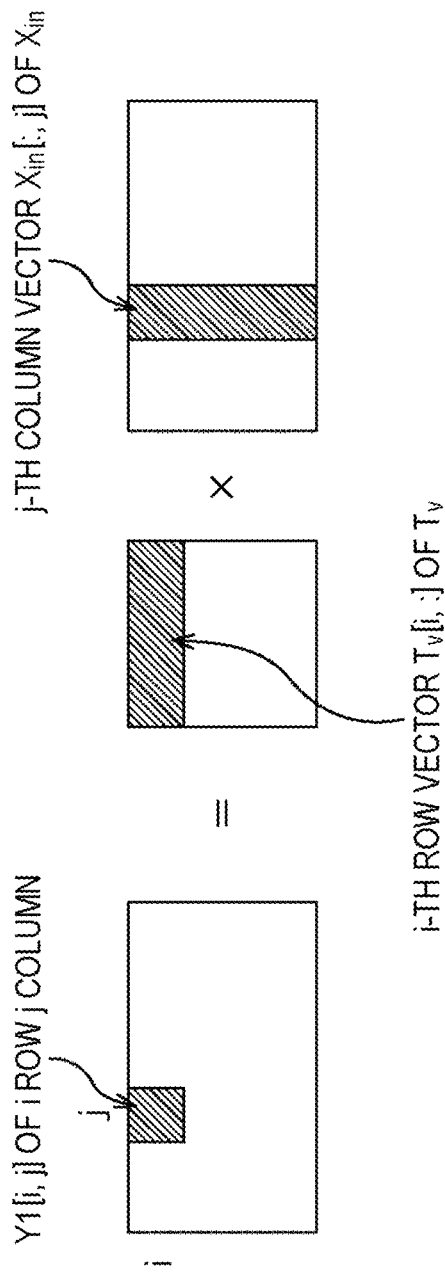
FIG. 33 is a diagram illustrating an example of an operation expression for each element.

That is, in this case, as illustrated in FIG. 33, an inner product of an i-th row vector $T_V[i, :]$ of the transformation matrix $T_V$ and a j-th column vector $X_{in}[:, j]$ of the input data $X_{in}$ as the coefficient Y1 [i, j] of the i-row j-column component of the intermediate data Y1 (j=0, . . . , M−1, and i=0, . . . , N−1).

In step S363, the scaling unit 353 scales, with the shift amount $S_y$, the coefficient Y1 [i, j] of each i-row j-column component of the intermediate data Y1 derived by the processing in step S322 to derive the intermediate data Y2. This scaling can be expressed as the above-described expression (13).

In step S364, the clip unit 354 clips the value of the coefficient Y2 [i, j] of each i-row j-column component of the intermediate data Y2 derived by the processing in step S363, and obtains output data $X_{out}$ (that is, the transform coefficient Coeff_Pver after primary vertical transform). This processing can be expressed as the above-described expression (14).

When the processing in step S364 ends, the primary horizontal transform processing ends, and the processing returns to FIG. 27.

In the above primary vertical transform processing, processing to which the above-described present technology is applied is performed as processing of step S361 or S362. Therefore, by executing the primary vertical transform processing, an increase in the memory capacity required for the vertical one-dimensional orthogonal transform can be suppressed.

<Inverse Primary Transform Unit>

Figure 34:
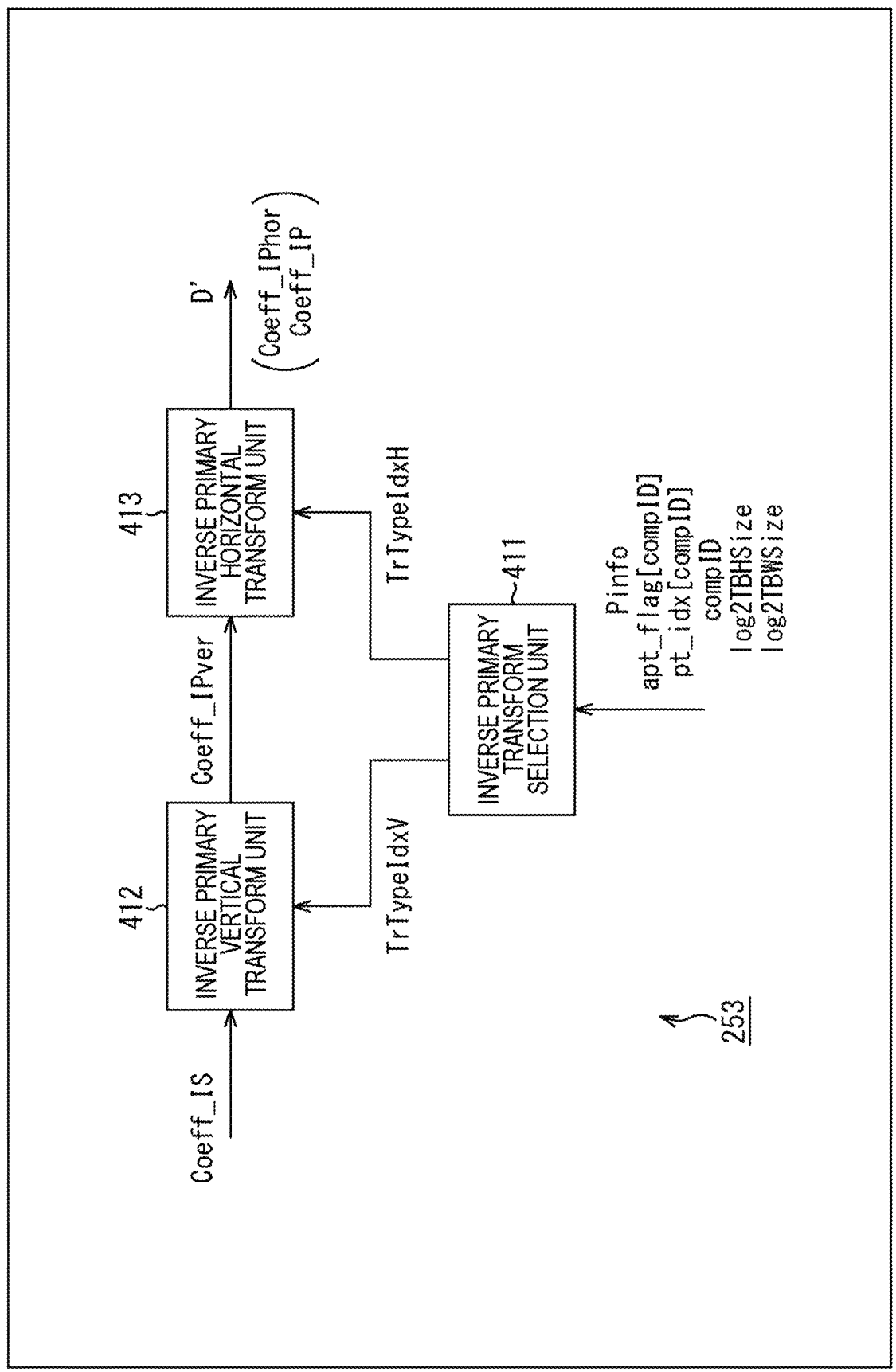
FIG. 34 is a block diagram illustrating a main configuration example of an inverse primary transform unit.

Next, a configuration of the image decoding device 200 in the case of the present embodiment will be described. FIG. 34 is a block diagram illustrating a main configuration example of the inverse primary transform unit 253 (FIG. 16) in this case. As illustrated in FIG. 34, the inverse primary transform unit 253 includes an inverse primary transform selection unit 411, an inverse primary vertical transform unit 412, and an inverse primary horizontal transform unit 413.

The inverse primary transform selection unit 411 uses the prediction mode information PInfo, the component identifier compID, the adaptive primary transform flag apt_flag[compID], and the primary transform identifier pt_idx[compID] as inputs. The inverse primary transform selection unit 411 derives the transform type identifier TrTypeIdxV of inverse primary vertical transform and the transform type identifier TrTypeIdxH of inverse primary vertical transform by reference to the above information. The inverse primary transform selection unit 411 supplies the derived transform type identifier TrTypeIdxV of inverse primary transform to the inverse primary vertical transform unit 412. Furthermore, the inverse primary transform selection unit 411 supplies the derived transform type identifier TrTypeIdxH of inverse primary horizontal transform to the inverse primary horizontal transform unit 413.

The inverse primary vertical transform unit 412 uses the transform coefficient Coeff_IS after inverse secondary transform, the transform type identifier TrTypeIdxV after inverse primary vertical transform, and information regarding the size of the transformation block as inputs. The information regarding the size of the transformation block may be a natural number N indicating the size of the transformation block in the horizontal direction or the vertical direction (the number of coefficients), or may be log 2TBHSize (the logarithmic value of the height) indicating the height of the transformation block (N=1<<log 2TBHSize). The inverse primary vertical transform unit 412 executes, for the transform coefficient Coeff_IS after inverse secondary transform, inverse primary vertical transform IPver determined by the transform type identifier TrTypeIdxV and the size of the transformation block to derive a transform coefficient Coeff_IPver after inverse primary vertical transform. The inverse primary vertical transform unit 412 supplies the transform coefficient Coeff_IPver after inverse primary vertical transform to the inverse primary horizontal transform unit 413.

The inverse primary horizontal transform unit 413 uses the transform coefficient Coeff_IPver after inverse primary vertical transform, the transform type identifier TrTypeIdxH of inverse primary horizontal transform, and information regarding the size of the transformation block as inputs. The information regarding the size of the transformation block may be a natural number N indicating the size of the transformation block in the horizontal direction or the vertical direction (the number of coefficients), or may be log 2TBWSize (the logarithmic value of the width) indicating the width of the transformation block (N=1<<log 2TBWSize). The inverse primary horizontal transform unit 413 executes, for the transform coefficient Coeff_IPver after inverse primary vertical transform supplied from the inverse primary vertical transform unit 412, inverse primary horizontal transform IPhor determined by the transform type identifier TrTypeIdxH and the size of the transformation block to derive the transform coefficient Coeff_IPhor after inverse primary horizontal transform (that is, the transform coefficient Coeff_IP after inverse primary transform). The inverse primary horizontal transform unit 413 outputs the transform coefficient Coeff_IPhor after inverse primary horizontal transform to the outside of the inverse primary transform unit 253 (supplies the same to the calculation unit 215) as the prediction residual D'.

In the inverse primary transform unit 253 having the above configuration, the inverse primary vertical transform unit 412 and the inverse primary horizontal transform unit 413 perform processing to which the above-described present technology is applied, as a derivation unit and an orthogonal transform unit, respectively.

That is, the inverse primary vertical transform unit 412 derives, as a derivation unit, the second transformation matrix for vertical inverse one-dimensional orthogonal transform, and further performs, as an inverse orthogonal transform unit, the vertical inverse one-dimensional orthogonal transform, using the second transformation matrix for vertical inverse one-dimensional orthogonal transform derived by the derivation unit. Therefore, the inverse primary vertical transform unit 412 can suppress an increase in the memory capacity required for the vertical inverse one-dimensional orthogonal transform.

Furthermore, the inverse primary horizontal transform unit 413 derives, as a derivation unit, the second transformation matrix for horizontal inverse one-dimensional orthogonal transform, and further performs, as an orthogonal transform unit, horizontal inverse one-dimensional orthogonal transform, using the second transformation matrix for horizontal inverse one-dimensional orthogonal transform derived by the derivation unit. Therefore, the inverse primary horizontal transform unit 413 can suppress an increase in the memory capacity required for the horizontal inverse one-dimensional orthogonal transform.

<<Inverse Primary Vertical Transform Unit>>

Figure 35:
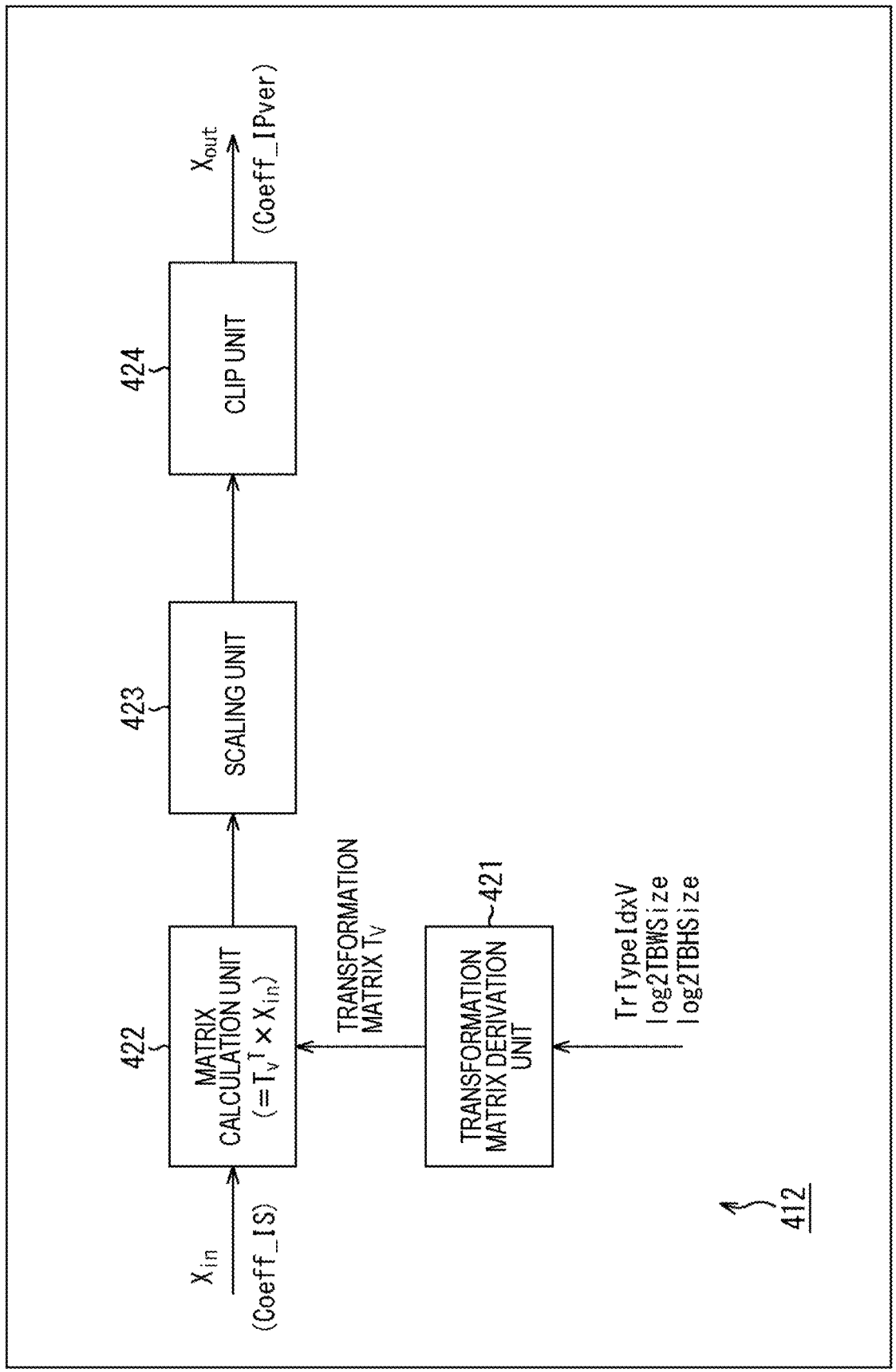
FIG. 35 is a block diagram illustrating a main configuration example of an inverse primary vertical transform unit.

FIG. 35 is a block diagram illustrating a main configuration example of the inverse primary vertical transform unit 412 in FIG. 34. As illustrated in FIG. 35, the inverse primary vertical transform unit 412 includes a transformation matrix derivation unit 421, a matrix calculation unit 422, a scaling unit 423, and a clip unit 424.

The transformation matrix derivation unit 421 uses the transform type identifier TrTypeIdxV of inverse primary vertical transform and the information regarding the size of the transformation block as inputs, and derives a transformation matrix $T_V$ for inverse primary vertical transform (a transformation matrix $T_V$ for vertical inverse one-dimensional orthogonal transform) having the same size as the transformation block, the transformation matrix $T_V$ corresponding to the transform type identifier TrTypeIdxV of inverse primary vertical transform. The transformation matrix derivation unit 421 supplies the transformation matrix $T_V$ to the matrix calculation unit 422.

The matrix calculation unit 422 performs the vertical inverse one-dimensional orthogonal transform for the input data $X_{in}$ (that is, the transformation block of the transform coefficient Coeff_IS after inverse secondary transform), using the transformation matrix $T_V$ supplied from the transformation matrix derivation unit 421, to obtain intermediate data Y1. This calculation can be expressed by a determinant as in the following expression (30).

[Math. 26]

$$Y1 = T_V^T \times X_{in} \qquad (30)$$

The matrix calculation unit 422 supplies the intermediate data Y1 to the scaling unit 423.

The scaling unit 423 scales a coefficient Y1 [i, j] of each i-row j-column component of the intermediate data Y1 with a predetermined shift amount $S_{I_V}$ to obtain intermediate data Y2. This scaling can be expressed as the following expression (31).

[Math. 27]

$$Y2[i,j] = Y1[i,j] >> S_{IV} \qquad (31)$$

The scaling unit 423 supplies the intermediate data Y2 to the clip unit 424.

The clip unit 424 clips a value of a coefficient Y2 [i, j] of each i-row j-column component of the intermediate data Y2, and derives output data $X_{out}$ (that is, the transform coefficient Coeff_IPver after inverse primary vertical transform). This processing can be expressed as the above-described expression (11).

The clip unit 424 outputs the output data $X_{out}$ (the transform coefficient Coeff_IPver after inverse primary vertical transform) to the outside of the inverse primary vertical transform unit 412 (supplies the same to the inverse primary horizontal transform unit 413).

In the inverse primary vertical transform unit 412 having the above configuration, the transformation matrix derivation unit 421 performs processing to which the above-described present technology is applied, as a derivation unit. Furthermore, the matrix calculation unit 422 performs processing to which the above-described present technology is applied, as an orthogonal transform unit. Therefore, the inverse primary vertical transform unit 412 can suppress an increase in the memory capacity required for the vertical inverse one-dimensional orthogonal transform.

<Transformation Matrix Derivation Unit>

Figure 36:
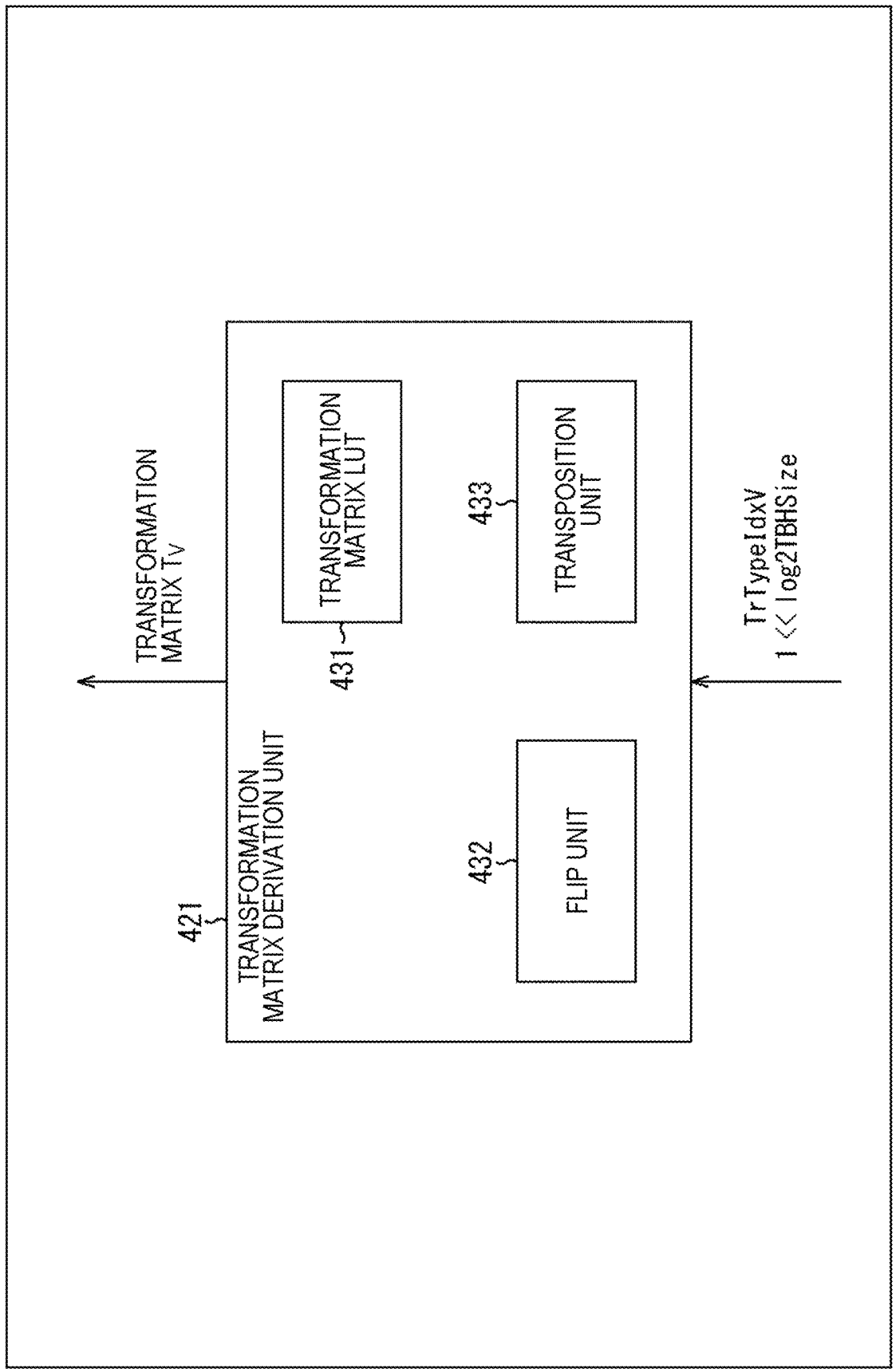
FIG. 36 is a block diagram illustrating a main configuration example of a transformation matrix derivation unit.

FIG. 36 is a block diagram illustrating a main configuration example of the transformation matrix derivation unit 421 in FIG. 35. As illustrated in FIG. 36, the transformation matrix derivation unit 421 includes a transformation matrix LUT 431, a flip unit 432, and a transposition unit 433. Note that, in FIG. 36, arrows representing data transfer are omitted, but in the transformation matrix derivation unit 421, arbitrary data can be transferred between arbitrary processing units (processing blocks).

The transformation matrix LUT 431 is a lookup table for holding (storing) a transformation matrix corresponding to the transform type identifier TrTypeIdxV of inverse primary vertical transform and the size N of the transformation block. When the transform type identifier TrTypeIdxV of inverse primary vertical transform and the size N of the transformation block are specified, the transformation matrix LUT 431 selects and outputs a transformation matrix corresponding thereto. In the case of this derivation example, the transformation matrix LUT 431 supplies the transformation matrix to both or one of the flip unit 432 and the transposition unit 433 as the base transformation matrix $T_{base}$.

The flip unit 432 flips an input transformation matrix T of N rows and N columns, and outputs a flipped transformation matrix $T_{flip}$. In the case of this derivation example, the flip unit 432 uses the base transformation matrix $T_{base}$ of N rows and N columns supplied from the transformation matrix LUT 431 as an input, flips the base transformation matrix $T_{base}$ in the row direction (horizontal direction), and outputs the flipped transformation matrix $T_{flip}$ to the outside of the transformation matrix derivation unit 321 (supplies the same to the matrix calculation unit 422) as the transformation matrix $T_V$.

The transposition unit 433 transposes the input transformation matrix T of N rows and N columns, and outputs a transposed transformation matrix $T_{transpose}$. In the case of this derivation example, the transposition unit 433 uses the base transformation matrix $T_{base}$ of N rows and N columns supplied from the transformation matrix LUT 431 as an input, transposes the base transformation matrix $T_{base}$, and outputs the transposed transformation matrix $T_{transpose}$ to the outside of the transformation matrix derivation unit 421 (supplies the same to the matrix calculation unit 422) as the transformation matrix $T_V$.

As described above, the transformation matrix derivation unit 421 includes the flip unit 432 and the transposition unit 433. Therefore, the transformation matrix derivation unit 421 can implement the derivation example of the first row example from the top of the table illustrated in FIG. 10, using the flip unit 432, for example. Furthermore, the transformation matrix derivation unit 421 can implement the derivation example of the second row example from the top of the table illustrated in FIG. 10, using the transposition unit 433, for example.

<Inverse Primary Horizontal Transform Unit>

Figure 37:
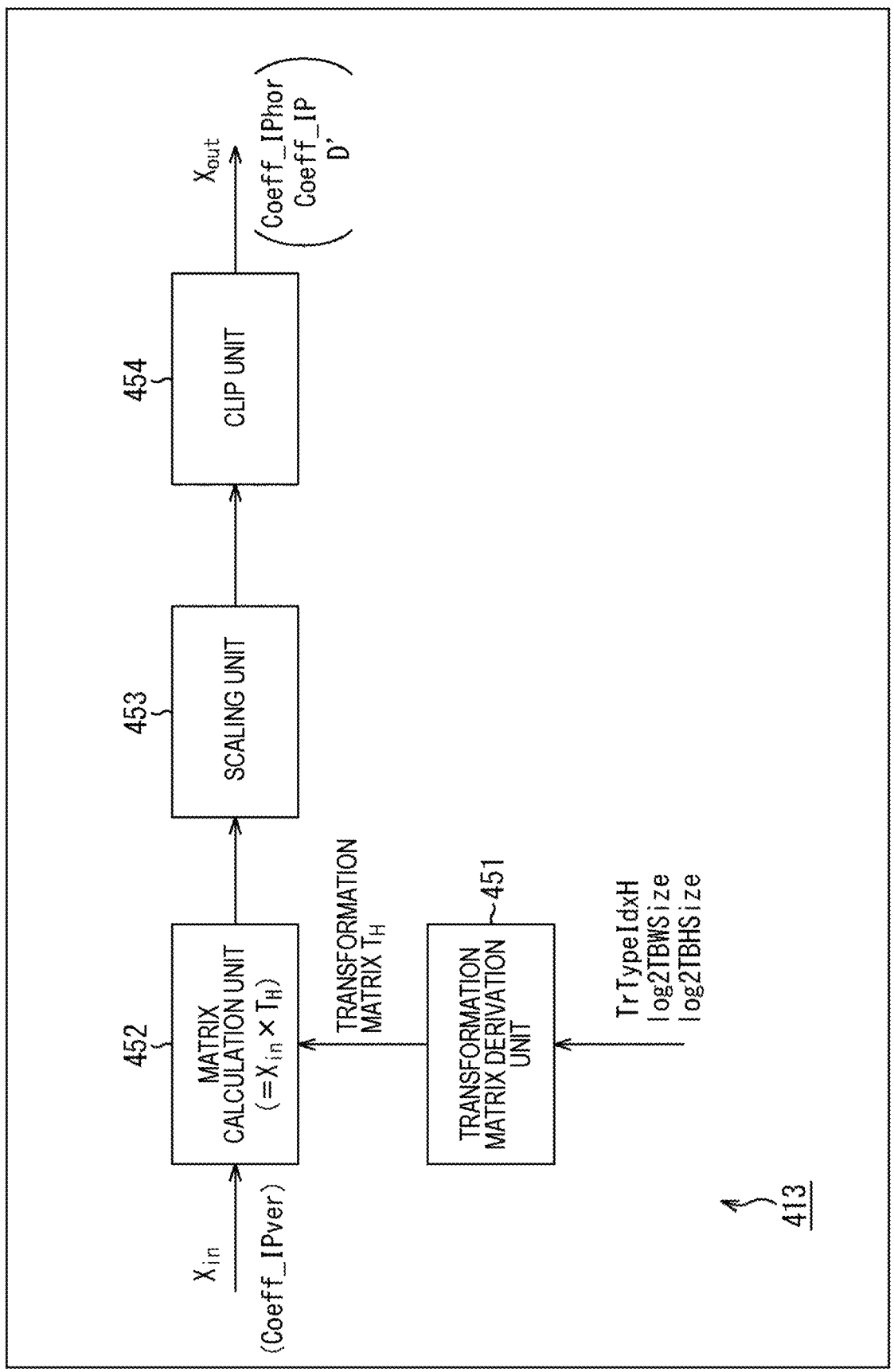
FIG. 37 is a block diagram illustrating a main configuration example of an inverse primary horizontal transform unit.

FIG. 37 is a block diagram illustrating a main configuration example of the inverse primary horizontal transform unit 413 in FIG. 34. As illustrated in FIG. 37, the inverse primary horizontal transform unit 413 includes a transformation matrix derivation unit 451, a matrix calculation unit 452, a scaling unit 453, and a clip unit 454.

The transformation matrix derivation unit 451 uses the transform type identifier TrTypeIdxH of inverse primary horizontal transform and the information regarding the size of the transformation block as inputs, and derives a transformation matrix $T_H$ for inverse primary horizontal transform (a transformation matrix $T_H$ for horizontal inverse one-dimensional orthogonal transform) having the same size as the transformation block, the transformation matrix $T_H$ corresponding to the transform type identifier TrTypeIdxH of inverse primary horizontal transform. The transformation matrix derivation unit 451 supplies the transformation matrix $T_H$ to the matrix calculation unit 452.

The matrix calculation unit 452 performs the horizontal inverse one-dimensional orthogonal transform for the input data $X_{in}$ (that is, the transformation block of the transform coefficient Coeff_IPver after inverse primary vertical transform), using the transformation matrix $T_H$ supplied from the transformation matrix derivation unit 451, to obtain intermediate data Y1. This calculation can be expressed by a determinant as in the following expression (32).

[Math. 28]

$$Y1 = X_{in} \times T_H \qquad (32)$$

The matrix calculation unit 452 supplies the intermediate data Y1 to the scaling unit 453.

The scaling unit 453 scales a coefficient Y1 [i, j] of each i-row j-column component of the intermediate data Y1 with a predetermined shift amount $S_{IH}$ to obtain intermediate data Y2. This scaling can be expressed as the following expression (33).

[Math. 29]

$$Y2[i,j] = Y1[i,j] >> S_{IH} \qquad (33)$$

The scaling unit 453 supplies the intermediate data Y2 to the clip unit 454.

The clip unit 454 clips a value of a coefficient Y2 [i, j] of each i-row j-column component of the intermediate data Y2, and derives output data $X_{out}$ (that is, the transform coefficient Coeff_IPhor after inverse primary horizontal transform). This processing can be expressed as the above-described expression (11).

The clip unit 454 outputs the output data $X_{out}$ (the transform coefficient Coeff_IPhor after inverse primary horizontal transform (transform coefficient Coeff_IP after inverse primary transform)) to the outside of the inverse primary horizontal transform unit 413 (supplies the same to the calculation unit 215) as a prediction residual D'.

In the inverse primary horizontal transform unit 413 having the above configuration, the transformation matrix derivation unit 451 performs processing to which the above-described present technology is applied, as a derivation unit. Furthermore, the matrix calculation unit 452 performs processing to which the above-described present technology is applied, as an inverse orthogonal transform unit. Therefore, the inverse primary horizontal transform unit 413 can suppress an increase in the memory capacity required for the horizontal inverse one-dimensional orthogonal transform.

<Transformation Matrix Derivation Unit>

Figure 38:
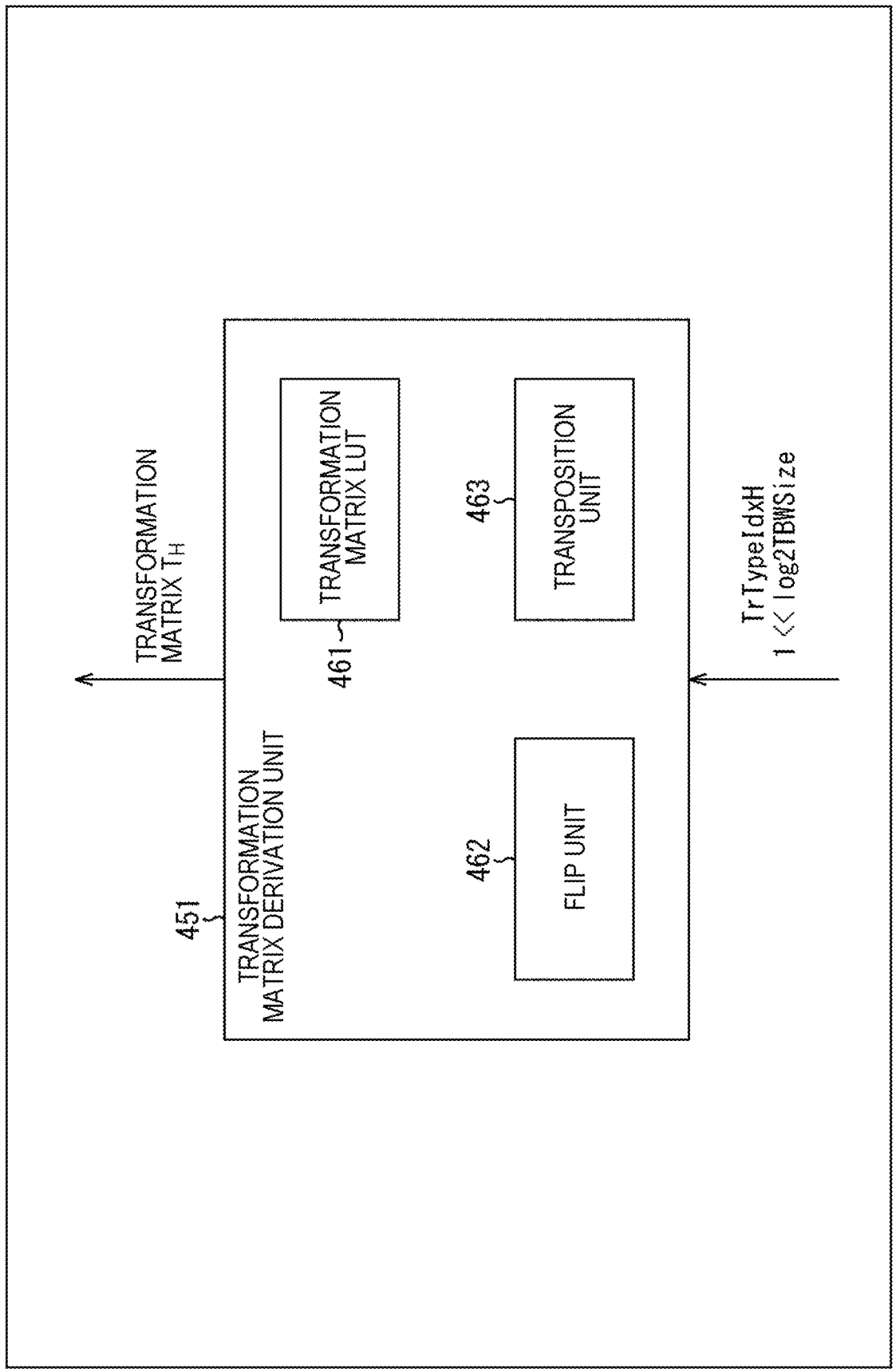
FIG. 38 is a block diagram illustrating a main configuration example of a transformation matrix derivation unit.

FIG. 38 is a block diagram illustrating a main configuration example of the transformation matrix derivation unit 451 in FIG. 37. As illustrated in FIG. 38, the transformation matrix derivation unit 451 includes a transformation matrix LUT 461, a flip unit 462, and a transposition unit 463. Note that, in FIG. 38, arrows representing data transfer are omitted, but in the transformation matrix derivation unit 451, arbitrary data can be transferred between arbitrary processing units (processing blocks).

The transformation matrix LUT 461 is a lookup table for holding (storing) a transformation matrix corresponding to the transform type identifier TrTypeIdxH of inverse primary horizontal transform and the size N of the transformation block. When the transform type identifier TrTypeIdxH of inverse primary horizontal transform and the size N of the transformation block are specified, the transformation matrix LUT 461 selects and outputs a transformation matrix corresponding thereto. In the case of this derivation example, the transformation matrix LUT 461 supplies the transformation matrix to both or one of the flip unit 462 and the transposition unit 463 as the base transformation matrix $T_{base}$.

The flip unit 462 flips an input transformation matrix T of N rows and N columns, and outputs a flipped transformation matrix $T_{flip}$. In the case of this derivation example, the flip unit 462 uses the base transformation matrix $T_{base}$ of N rows and N columns supplied from the transformation matrix LUT 461 as an input, flips the base transformation matrix $T_{base}$ in the row direction (horizontal direction), and outputs the flipped transformation matrix $T_{flip}$ to the outside of the transformation matrix derivation unit 451 (supplies the same to the matrix calculation unit 452) as the transformation matrix $T_H$.

The transposition unit 463 transposes the input transformation matrix T of N rows and N columns, and outputs a transposed transformation matrix $T_{transpose}$. In the case of this derivation example, the transposition unit 463 uses the base transformation matrix $T_{base}$ of N rows and N columns supplied from the transformation matrix LUT 461 as an input, transposes the base transformation matrix $T_{base}$, and outputs the transposed transformation matrix $T_{transpose}$ to the outside of the transformation matrix derivation unit 451 (supplies the same to the matrix calculation unit 452) as the transformation matrix $T_H$.

As described above, the transformation matrix derivation unit 451 includes the flip unit 462 and the transposition unit 463. Therefore, the transformation matrix derivation unit 451 can implement the derivation example of the first row example from the top of the table illustrated in FIG. 10, using the flip unit 462, for example. Furthermore, the transformation matrix derivation unit 451 can implement the derivation example of the second row example from the top of the table illustrated in FIG. 10, using the transposition unit 463, for example.

<Flow of Inverse Primary Transform Processing>

Next, an example of a flow of processing performed by the above-described configuration of the image decoding device 200 will be described. Next, an example of a flow of inverse primary transform processing executed in step S233 in FIG. 18 in this case will be described with reference to the flowchart in FIG. 39.

When the inverse primary transform processing is started, in step S401, the inverse primary transform selection unit 411 (FIG. 34) of the inverse primary transform unit 253 performs the inverse primary transform selection processing to select the transform type identifier TrTypeIdxV (or the transform type TrTypeV) of inverse primary vertical transform and the transform type identifier TrTypeIdxH (or the transform type TrTypeH) of inverse primary horizontal transform.

In step S402, the inverse primary vertical transform unit 412 performs, for the transform coefficient Coeff_IS after inverse secondary transform, the inverse primary vertical transform processing corresponding to the transform type identifier TrTypeIdxV of inverse primary vertical transform obtained in step S401 to derive the transform coefficient Coeff_IPver after inverse primary vertical transform.

In step S403, the inverse primary horizontal transform unit 413 performs, for the transform coefficient Coeff_IPver after inverse primary vertical transform, the inverse primary horizontal transform processing corresponding to the transform type identifier TrTypeIdxH of inverse primary horizontal transform obtained in step S401 to derive the transform coefficient Coeff_IPhor after inverse primary horizontal transform (that is, transform coefficient Coeff_IP after inverse primary transform (prediction residual D')).

Figure 18:
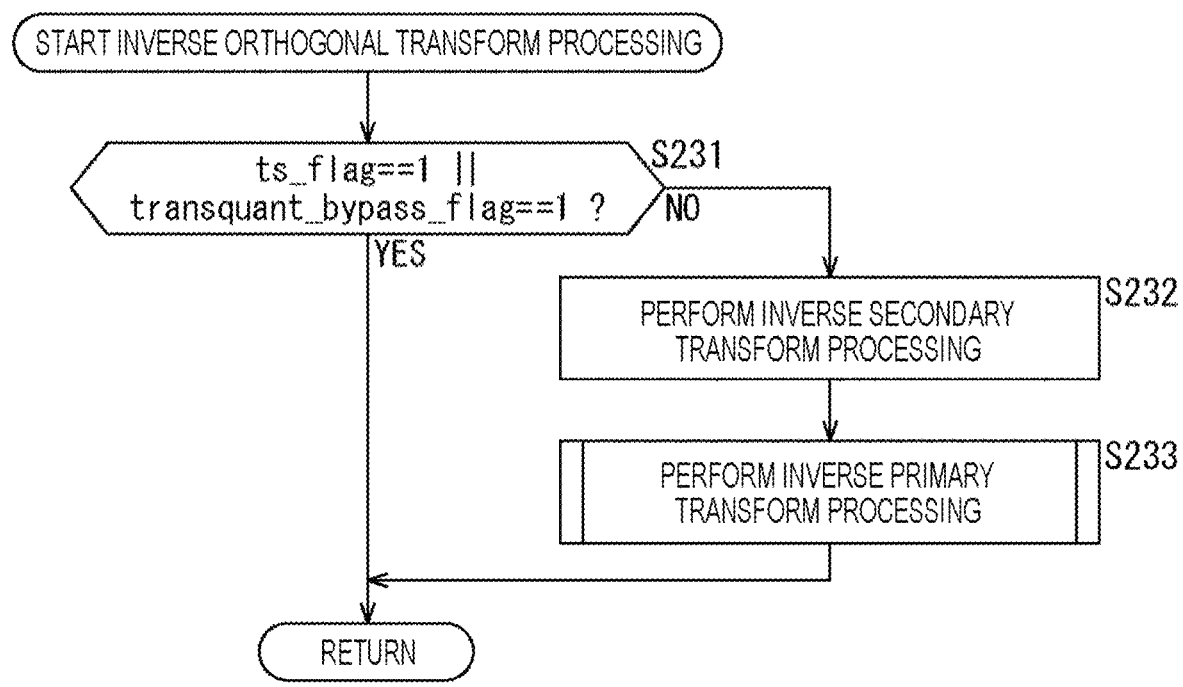
FIG. 18 is a flowchart for describing an example of a flow of inverse orthogonal transform processing.

When the processing in step S403 ends, the inverse primary transform processing ends and the processing returns to FIG. 18.

In the above inverse primary transform processing, processing to which the above-described present technology is applied is performed as processing of step S402 or S403. Therefore, by executing the inverse primary transform processing, an increase in the memory capacity required for the inverse primary vertical transform processing or the inverse primary horizontal transform processing can be suppressed.

<Flow of Inverse Primary Transform Selection Processing>

Next, an example of a flow of the inverse primary transform selection processing executed in step S401 in FIG. 39 will be described with reference to the flowchart in FIG. 40.

When the inverse primary transform selection processing is started, in step S421, the inverse primary transform selection unit 411 determines whether or not the adaptive primary transform flag apt_flag[compID] of the component identifier compID is true (1). In a case where the adaptive primary transform flag apt_flag[compID] of the component identifier compID is determined to be true (1), the processing proceeds to step S422.

In step S422, the inverse primary transform selection unit 411 selects transform a set TrSetH or TrSetV in each direction from a transform set group on the basis of the prediction mode information Pinfo.

In step S423, the inverse primary transform selection unit 411 derives the transform type identifier TrTypeIdxH of inverse primary horizontal transform on the basis of the transform set TrSetH and the primary transform identifier pt_idx[compID] This processing can be expressed as, for example, the following expression (34).

[Math. 30]

$$\text{TrTypeIdx}H = \text{TrSetToTrTypeIdx}[\text{TrSet}H][pt\_idx] \tag{34}$$

In step S424, the inverse primary transform selection unit 411 derives the transform type identifier TrTypeIdxV of inverse primary vertical transform on the basis of the transform set TrSetV and the inverse primary transform identifier pt_idx[compID]. This processing can be expressed as, for example, the following expression (35).

[Math. 31]

$$\text{TrTypeIdx}V = \text{TrSetToTrTypeIdx}[\text{TrSet}V][pt\_idx] \tag{35}$$

Figure 39:
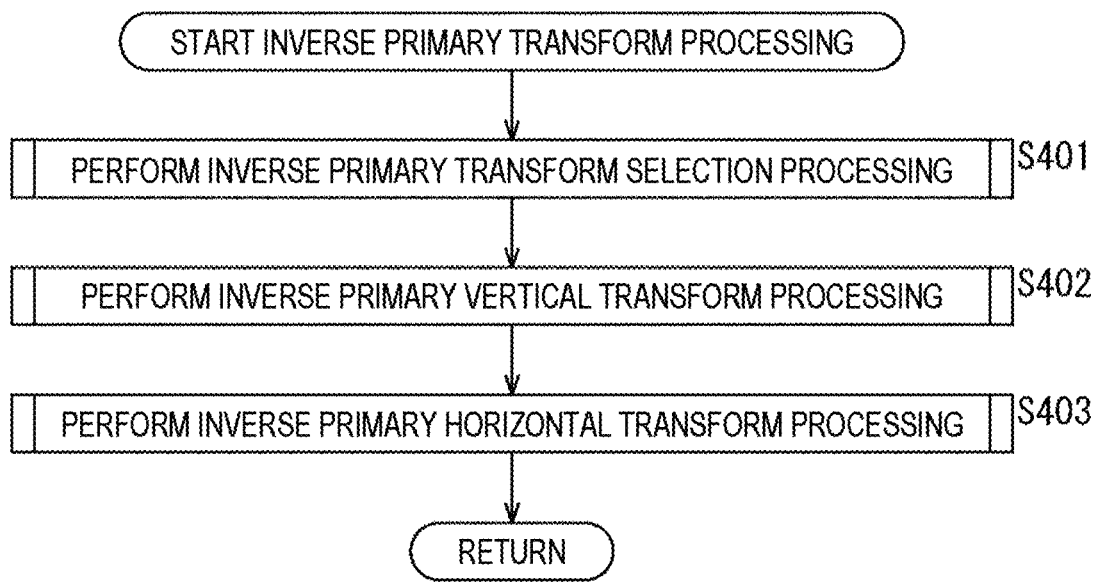
FIG. 39 is a flowchart for describing an example of a flow of inverse primary transform processing.
Figure 40:
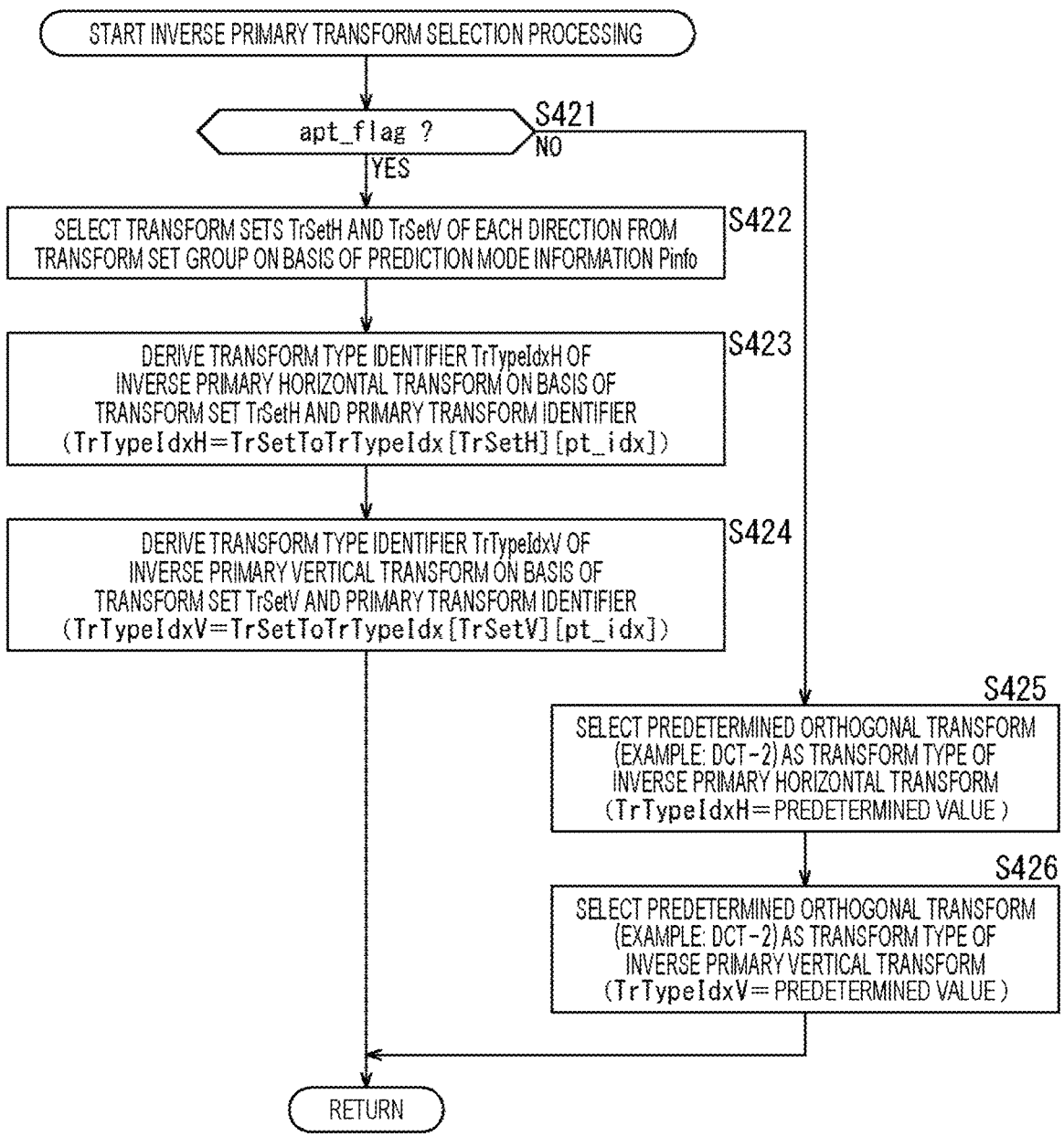
FIG. 40 is a flowchart for describing an example of a flow of inverse primary transform selection processing.

When the processing in step S424 ends, the inverse primary transform selection processing ends and the processing returns to FIG. 39.

Furthermore, in step S421, in a case where the adaptive primary transform flag apt_flag[compID] of the component identifier compID is determined to be false (0), the processing proceeds to step S425.

In step S425, the inverse primary transform selection unit 411 sets (selects) predetermined orthogonal transform (for example, DCT2) for the transform type identifier TrTypeIdxH of inverse primary horizontal transform. This processing can be expressed as, for example, the following expression (36).

[Math. 32]

$$\text{TrTypeIdx}H = \text{Predetermined value} \qquad (36)$$

In step S426, the inverse primary transform selection unit 411 sets (selects) predetermined orthogonal transform (for example, DCT2) for the transform type identifier TrTypeIdxV of inverse primary vertical transform. This processing can be expressed as, for example, the following expression (37).

[Math. 33]

$$\text{TrTypeIdx}V = \text{Predetermined value} \qquad (37)$$

When the processing in step S426 ends, the inverse primary transform selection processing ends and the processing returns to FIG. 39.

<Flow of Inverse Primary Vertical Transform Processing>

Next, a flow of the inverse primary vertical transform processing executed in step S402 in FIG. 39 will be described with reference to the flowchart in FIG. 41.

When the inverse primary vertical transform processing is started, in step S441, the transformation matrix derivation unit 421 (FIG. 35) of inverse primary vertical transform unit 412 executes the transformation matrix derivation processing to derive the transformation matrix $T_V$ corresponding to the transform type identifier TrTypeIdxV of inverse primary vertical transform.

The transformation matrix derivation processing in this case is performed by a flow similar to the case of the primary horizontal transform described with reference to the flowchart in FIG. 30. Therefore, the description is omitted. For example, the description made with reference to FIG. 30 can be applied as description of the transformation matrix derivation processing of this case, by replacing the transform type identifier TrTypeIdxH of primary horizontal transform with the transform type identifier TrTypeIdxV of inverse primary vertical transform, and replacing the transformation matrix $T_H$ for primary horizontal transform to be derived with the transformation matrix $T_V$ for inverse primary vertical transform.

In step S442, the matrix calculation unit 422 performs the vertical inverse one-dimensional orthogonal transform for the input data $X_{in}$ (that is, the transform coefficient Coeff_IS after inverse secondary transform), using the derived transformation matrix $T_V$, to obtain the intermediate data Y1. When this processing is expressed as a determinant, the processing can be expressed as the above-described expression (30).

In step S443, the scaling unit 423 scales, with the shift amount $S_{IV}$, the coefficient Y1 [i, j] of each i-row j-column component of the intermediate data Y1 derived by the processing in step S442 to derive the intermediate data Y2. This scaling can be expressed as the above-described expression (31).

In step S444, the clip unit 424 clips the value of the coefficient Y2 [i, j] of each i-row j-column component of the intermediate data Y2 derived by the processing in step S443, and obtains output data $X_{out}$ (that is, the transform coefficient Coeff_IPver after inverse primary vertical transform). This processing can be expressed as the above-described expression (11).

When the processing in step S444 ends, the inverse primary vertical transform processing ends and the processing returns to FIG. 39.

In the above inverse primary vertical transform processing, processing to which the above-described present technology is applied is performed as processing of step S441 or S442. Therefore, by executing the inverse primary vertical transform processing, an increase in the memory capacity required for the vertical inverse one-dimensional orthogonal transform can be suppressed.

<Flow of Inverse Primary Horizontal Transform Processing>

Next, a flow of the inverse primary horizontal transform processing executed in step S403 in FIG. 39 will be described with reference to the flowchart in FIG. 42.

When the inverse primary horizontal transform processing is started, in step S461, the transformation matrix derivation unit 451 (FIG. 37) of inverse primary horizontal transform unit 413 executes the transformation matrix derivation processing to derive the transformation matrix $T_H$ corresponding to the transform type identifier TrTypeIdxH of inverse primary horizontal transform.

The transformation matrix derivation processing in this case is performed by a flow similar to the case of the primary horizontal transform described with reference to the flowchart in FIG. 30. Therefore, the description is omitted. For example, the description made by reference to FIG. 30 can be applied as description of the transformation matrix derivation processing of this case, by replacing the primary horizontal transform with the inverse primary horizontal transform, or the like.

In step S462, the matrix calculation unit 452 performs the horizontal inverse one-dimensional orthogonal transform for the input data $X_{in}$ (that is, the transform coefficient Coeff_IPver after inverse primary vertical transform), using the derived transformation matrix $T_H$, to obtain the intermediate data Y1. When this processing is expressed as a determinant, the processing can be expressed as the above-described expression (32).

In step S463, the scaling unit 453 scales, with the shift amount $S_{IH}$, the coefficient Y1 [i, j] of each i-row j-column component of the intermediate data Y1 derived by the processing in step S462 to derive the intermediate data Y2. This scaling can be expressed as the above-described expression (33).

In step S464, the clip unit 454 clips the value of the coefficient Y2 [i, j] of each i-row j-column component of the intermediate data Y2 derived by the processing in step S463, and outputs output data $X_{out}$ (that is, the transform coefficient Coeff_IPhor after inverse primary horizontal transform). This processing can be expressed as the above-described expression (14).

When the processing in step S464 ends, the inverse primary horizontal transform processing ends and the processing returns to FIG. 39.

In the above inverse primary horizontal transform processing, processing to which the above-described present technology is applied is performed as processing of step S461 or S462. Therefore, by executing the inverse primary horizontal transform processing, an increase in the memory capacity required for the horizontal inverse one-dimensional orthogonal transform can be suppressed.

2-3. Example 1-2

<Concept>

Next, the third row example from the top except the uppermost row of item names in the table illustrated in FIG. 10 will be described.

Figure 43:
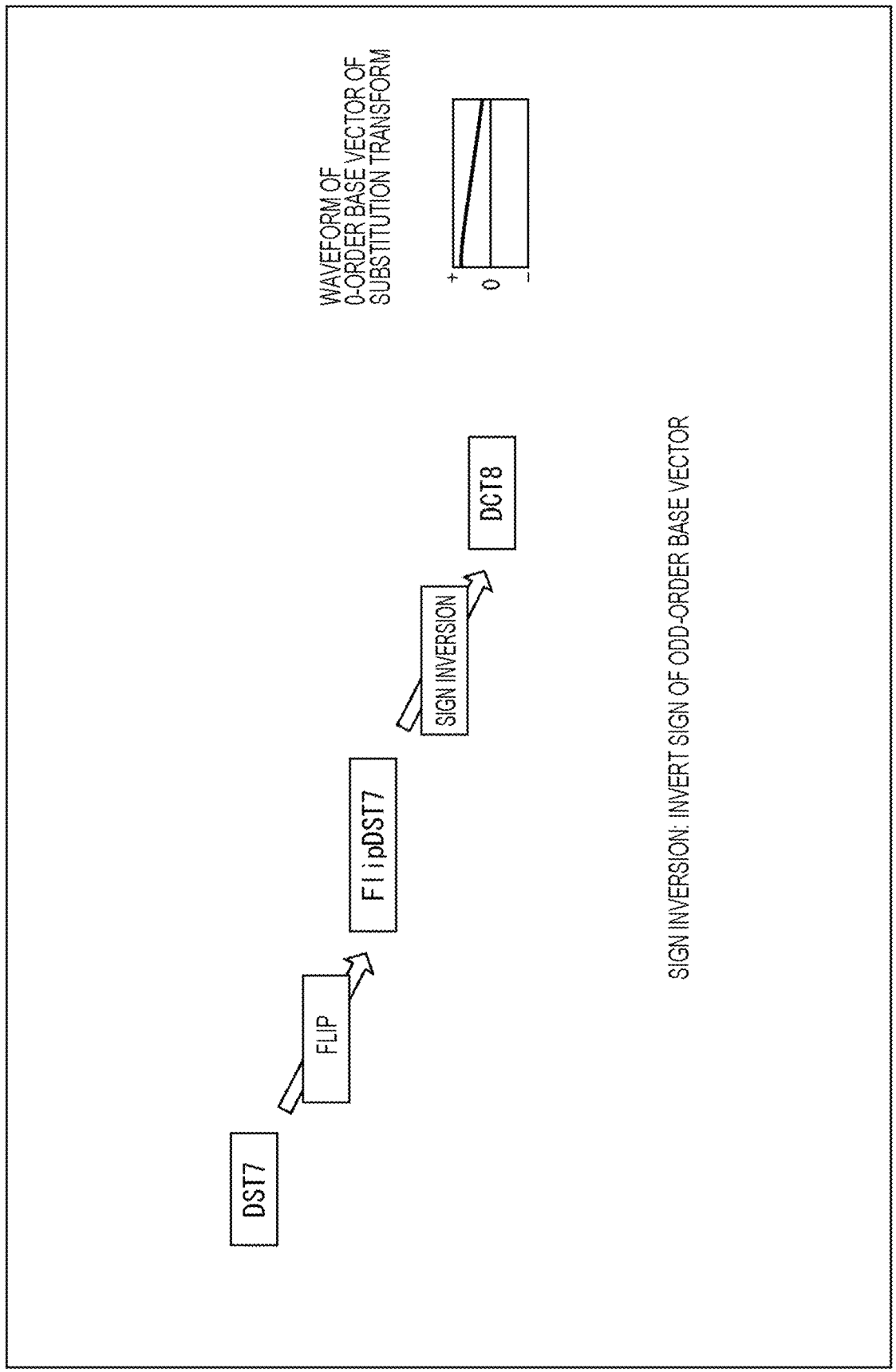
FIG. 43 is a diagram illustrating an example of transform type derivation.

As described above, the derivation of the third row example from the top focuses on the characteristics between paired DCT and DST. More specifically, between DCT/DST to be paired (for example, DST7 and DCT8), attention is paid to the point that even-numbered row vectors are axially symmetric and odd-numbered row vectors are point-symmetric. In this case, the derivation unit flips the first transformation matrix and inverts the sign of the odd-numbered row vector of the flipped first transformation matrix to derive the second transformation matrix. That is, the derivation unit flips the transformation matrix of DST7 in the row direction and further inverts the sign of an odd-order row vector to losslessly derive the transformation matrix of DCT8, as illustrated in FIG. 43. Therefore, naturally, the (decreasing-type) transformation matrix of DCT8 having the same waveform of the 0-order row vector can be substituted by the derived DCT8.

A specific example of this derivation is illustrated in FIG. 44. As illustrated in FIG. 44, this derivation can be expressed by a matrix product of a unit matrix D having a negative element in an odd-order row, the base transformation matrix $T_{base}$ (DST7), and the flip matrix J.

That is, in this derivation example, the second transformation matrix can be derived by two-time operation (flip and sign inversion). Furthermore, each operation is easy. That is, the second transformation matrix can be easily derived.

Furthermore, by applying this derivation example, it becomes unnecessary to prepare the transformation matrix of DCT8 as a candidate for a transformation matrix to be used for orthogonal transform/inverse orthogonal transform. That is, the number of unique transform types can be reduced.

In this case, as illustrated in the table in FIG. 45, the five types of transformation matrices required in the case of the technology described in Non-Patent Document 1 (see the table A in FIG. 6) can be reduced to four types. Therefore, the total LUT size can be about 47 KB. That is, the size of the LUT can be reduced (by about 53 KB (the table A in FIG. 6)) as compared with the case of the technology described in Non-Patent Document 1. That is, an increase in the size of the LUT can be suppressed.

Note that, as described above, in this case, the transformation matrix of the transform type DCT8 can be obtained as the second transform type. Therefore, by performing the orthogonal transform/inverse orthogonal transform using the transformation matrix of the second transform type, the same coding efficiency as the case of using the transformation matrix of DCT8 for the orthogonal transform/inverse orthogonal transform can be obtained.

<Transformation Matrix Derivation Unit>

Next, configurations, processing, and the like for performing such derivation will be described. First, a technical configuration of the present embodiment of the image encoding device 100 will be described. Since configurations of the primary transform unit 152, the primary horizontal transform unit 312, the primary vertical transform unit 313, and the like in this case are similar to the case of <2-2. Example 1-1> described with reference to FIG. 22, description thereof is omitted.

Figure 46:
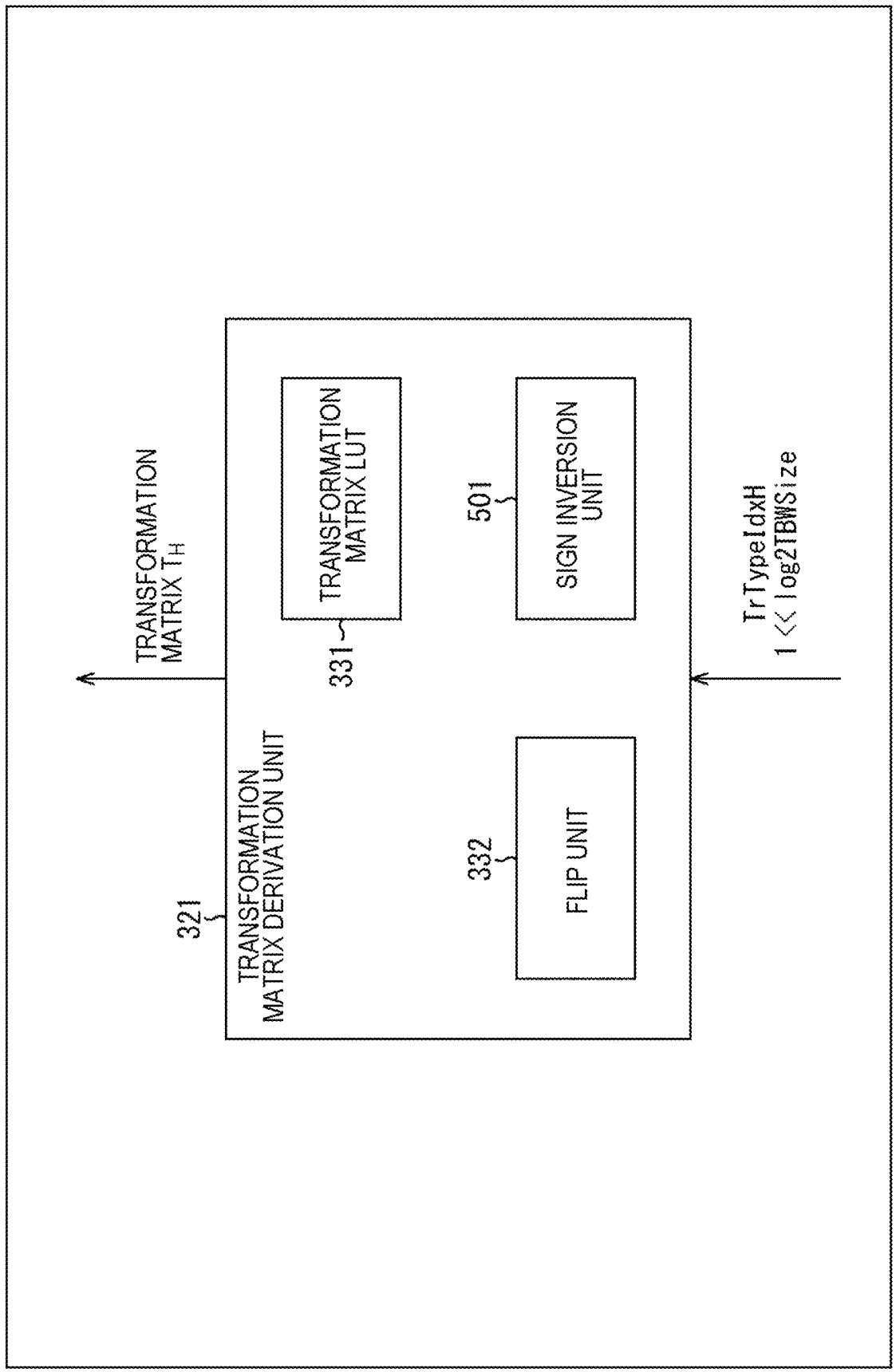
FIG. 46 is a block diagram illustrating a main configuration example of a transformation matrix derivation unit.

FIG. 46 is a block diagram illustrating a main configuration example of the transformation matrix derivation unit 321 (the transformation matrix derivation unit 321 (FIG. 23) in the primary horizontal transform unit 312) in this case. As illustrated in FIG. 46, the transformation matrix derivation unit 321 in this case includes a transformation matrix LUT 331, a flip unit 332, and a sign inversion unit 501. Note that, in FIG. 46, arrows representing data transfer are omitted, but in the transformation matrix derivation unit 321, arbitrary data can be transferred between arbitrary processing units (processing blocks).

The transformation matrix LUT 331 and the flip unit 332 are similar to the case in FIG. 24.

The sign inversion unit 501 uses the transformation matrix T of N rows and N columns as an input, inverts the sign of a predetermined portion of the transformation matrix T, and outputs a transformation matrix $T_{InvSign}$ after sign inversion. In the case of this derivation example (Example 1-2), the transformation matrix derivation unit 321 horizontally flips the base transformation matrix $T_{base}$ of N rows and N columns selected in the transformation matrix LUT 331 via the flip unit 332, further inverts the sign of an odd-order row vector via the sign inversion unit 501, and outputs the transformation matrix $T_{InvSign}$ to the outside of the transformation matrix derivation unit 321 (supplies the same to the matrix calculation unit 322) as the transformation matrix $T_H$.

As described above, the transformation matrix derivation unit 321 can implement the derivation example of the third row example from the top of the table illustrated in FIG. 10, using the flip unit 332 and the sign inversion unit 501.

<Transformation Matrix Derivation Unit>

Figure 47:
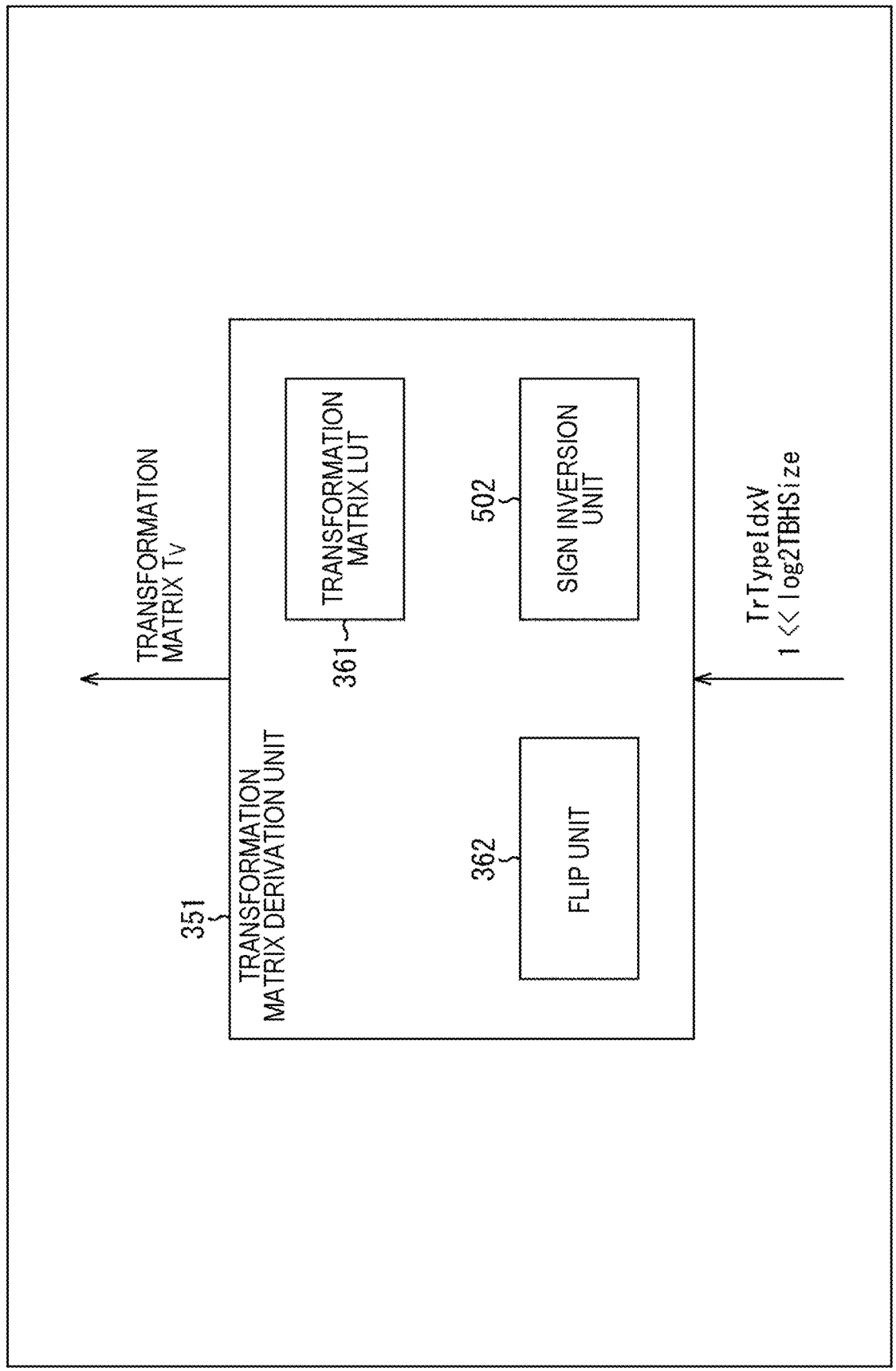
FIG. 47 is a block diagram illustrating a main configuration example of a transformation matrix derivation unit.

FIG. 47 is a block diagram illustrating a main configuration example of the transformation matrix derivation unit 351 included in the primary vertical transform unit 313 in this case. As illustrated in FIG. 47, the transformation matrix derivation unit 351 in this case includes the transformation matrix LUT 361, the flip unit 362, and a sign inversion unit 502, similarly to the transformation matrix derivation unit 321. Note that, in FIG. 47, arrows representing data transfer are omitted, but in the transformation matrix derivation unit 351, arbitrary data can be transferred between arbitrary processing units (processing blocks).

The transformation matrix LUT 361 and the flip unit 362 are similar to the case in FIG. 26.

The sign inversion unit 502 uses a transformation matrix T of N rows and N columns as an input, inverts the sign of a predetermined portion of the transformation matrix T, and performs sign inversion, and outputs a transformation matrix $T_{InvSign}$ after the sign inversion, similarly to the sign inversion unit 501. In the case of this derivation example, the transformation matrix derivation unit 351 horizontally flips the base transformation matrix $T_{base}$ of N rows and N columns selected in the transformation matrix LUT 361 via the flip unit 362, further inverts the sign of an odd-order row vector via the sign inversion unit 502, and outputs the transformation matrix $T_{InvSign}$ to the outside of the transformation matrix derivation unit 351 (supplies the same to the matrix calculation unit 352) as the transformation matrix $T_V$.

As described above, the transformation matrix derivation unit 351 can implement the derivation example of the third row example from the top of the table illustrated in FIG. 10, using the flip unit 362 and the sign inversion unit 502.

<Flow of Transformation Matrix Derivation Processing>

Since the primary transform processing, the primary horizontal transform processing, and the primary vertical transform processing in this case are performed by flows similar to the case of <2-2. Example 1-1>, description of the processing is omitted.

Figure 48:
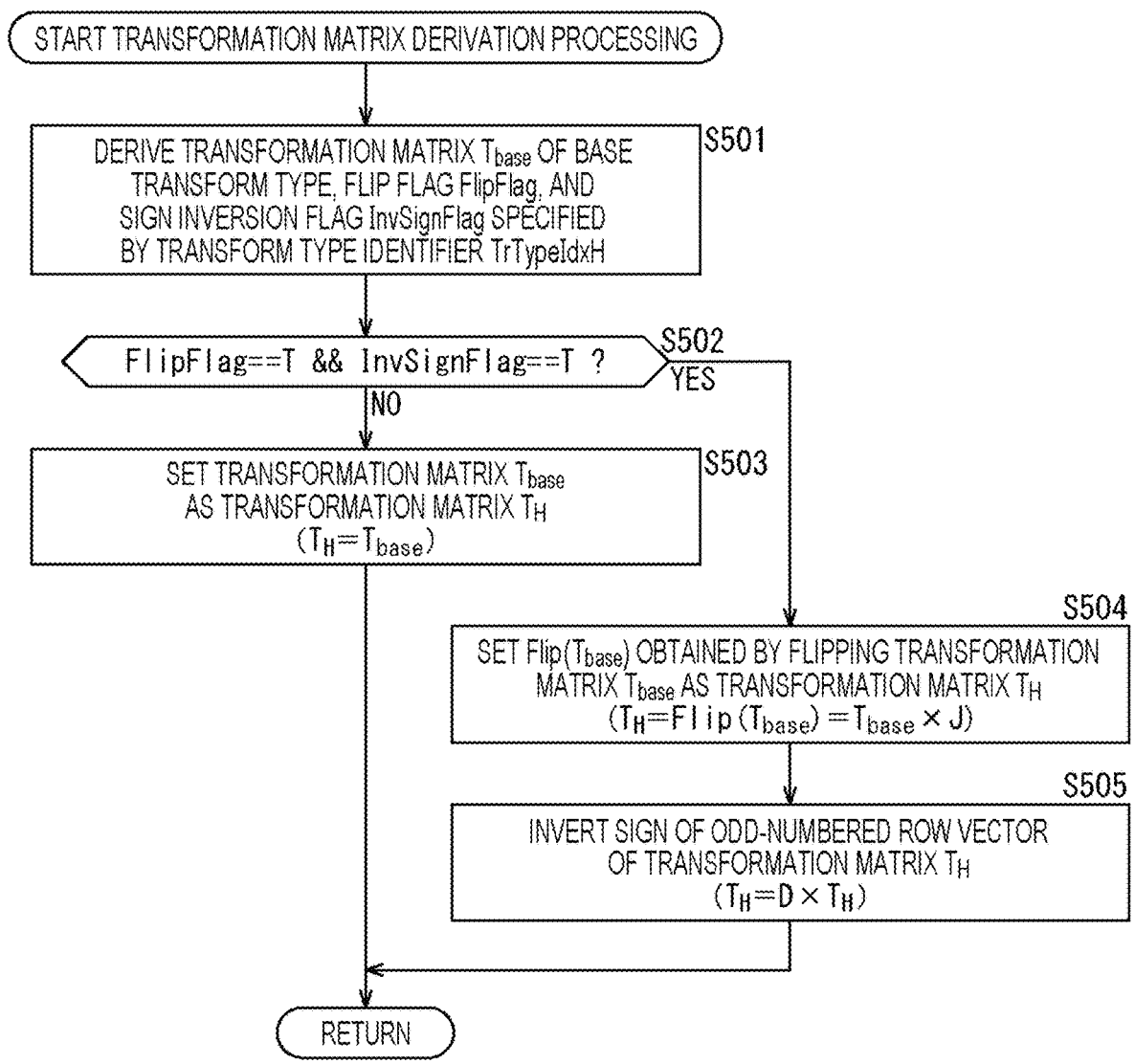
FIG. 48 is a block diagram illustrating a main configuration example of a transformation matrix derivation unit.

Next, an example of a flow of the transformation matrix derivation processing in this case, which is executed by the transformation matrix derivation unit 321 in the primary horizontal transform unit 312 in step S321 in FIG. 28, will be described with reference to the flowchart in FIG. 48.

When the transformation matrix derivation processing is started, in step S501, the transformation matrix derivation unit 321 obtains a base transform type BaseTrType corresponding to the transform type identifier TrTypeIdxH by reference to the correspondence table illustrated in FIG. 49, for example. Note that, when this processing is expressed as a mathematical expression, the processing can be expressed as the expression (17), for example. Moreover, the transformation matrix derivation unit 321 reads the transformation matrix of N rows and N columns of the obtained base transform type from the transformation matrix LUT, and sets the transformation matrix as the base transformation matrix $T_{base}$, as in the following expression (18).

Furthermore, the transformation matrix derivation unit 321 sets a value corresponding to the transform type identifier TrTypeIdxH as the flip flag FlipFlag, as in the above-described expression (19). Furthermore, the transformation matrix derivation unit 321 sets a value corresponding to the transform type identifier TrTypeIdxH as a sign inversion flag InvSignFlag, as in the above-described expression (38).

[Math. 34]

$$\text{InvSignFlag}=\text{LUT\_TrTypeIdxToInvSignFlag}[\text{TrTypeIdx}H] \qquad (38)$$

In step S502, the transformation matrix derivation unit 321 determines whether or not the flip flag FlipFlag and the transposition flag TransposeFlag satisfy a condition (ConditionB1) expressed by the following expression (39).

[Math. 35]

$$\text{ConditionB1}:\text{FlipFlag}==T\&\&\text{InvSignFlag}==T \qquad (39)$$

In a case where it is determined that the condition illustrated in the above expression (39) is not satisfied (that is, in a case where the flip flag FlipFlag is determined to be false (0) or the sign inversion flag InvSignFlag is determined to be false (0)), the processing proceeds to step S503.

In step S503, the transformation matrix derivation unit 321 sets the base transformation matrix $T_{base}$ as the transformation matrix $T_H$. When the processing in step S503 ends, the transformation matrix derivation processing ends and the processing returns to FIG. 28.

Further, in step S502, in a case where it is determined that the condition illustrated in the above expression (39) is satisfied (that is, in a case where the flip flag FlipFlag is determined to be true (1) or the sign inversion flag InvSignFlag is determined to be true (1)), the processing proceeds to step S504.

In step S504, the transformation matrix derivation unit 321 flips the base transformation matrix $T_{base}$ via the flip unit 332, and sets the flipped base transformation matrix $T_{base}$ as the transformation matrix $T_H$. That is, the transformation matrix derivation unit 321 derives the transformation matrix $T_H$ of Flip ($T_{base}$).

In step S505, the transformation matrix derivation unit 321 inverts the sign of the odd-numbered row vector of the transformation matrix $T_H$, using the sign inversion unit 501, and resets the transformation matrix $T_H$. This processing can be expressed as a determinant as in the following expression (40).

[Math. 36]

$$T_H = D \times T_H \qquad (40)$$

Here, x is an operator representing a matrix product, and a sign inversion matrix D is a diagonal matrix including Diag $(1, -1, \ldots, (-1)^{N-1})$ Furthermore, the processing can also be expressed as an operation for each element, as in the following expression (41). With the expression, the processing can be implemented without the sign inversion matrix D. In that case, the transformation matrix derivation unit 321 inverts positive/negative signs of the component of an odd-numbered row (i %2==1) of the i-row j-column component ((i, j) component) of the transformation matrix $T_H$.

$$T_H[j,i]=(-1)*T_H[i,j]$$

$$\text{for } i,j=0,\ldots,N-1 \text{ and } i\%2==1 \qquad (41)$$

Here, the i-row j-column component ((i, j) component) of the transformation matrix $T_H$ of N rows and N columns is written as $T_H$ [i, j]. Furthermore, "for i, j=0, . . . , N−1 and i % 2==1" on the second row indicates that j has a value of 0 to N−1, and i has an odd value of in the range of 0 to N−1. That is, it means that $T_H$[i, j] indicates (each element of) an odd row vector of the transformation matrix $T_H$ of N rows and N columns.

When the processing in step S505 ends, the transformation matrix derivation processing ends and the processing returns to FIG. 28.

<Flow of Transformation Matrix Derivation Processing>

Note that, since the flow of the transformation matrix derivation processing executed in step S361 (FIG. 32) of the primary vertical transform processing is similar to the case of the transformation matrix derivation processing executed in the primary horizontal transform described with reference to the flowchart in FIG. 48, description thereof is omitted.

<Transformation Matrix Derivation Unit>

Next, a configuration of the image decoding device 200 in the case will be described. Since configurations of the inverse primary transform unit 253, the inverse primary vertical transform unit 412, the inverse primary horizontal transform unit 413, and the like included in the image decoding device 200 in this case are similar to the case of <2-2. Example 1-1>, description thereof is omitted.

Figure 50:
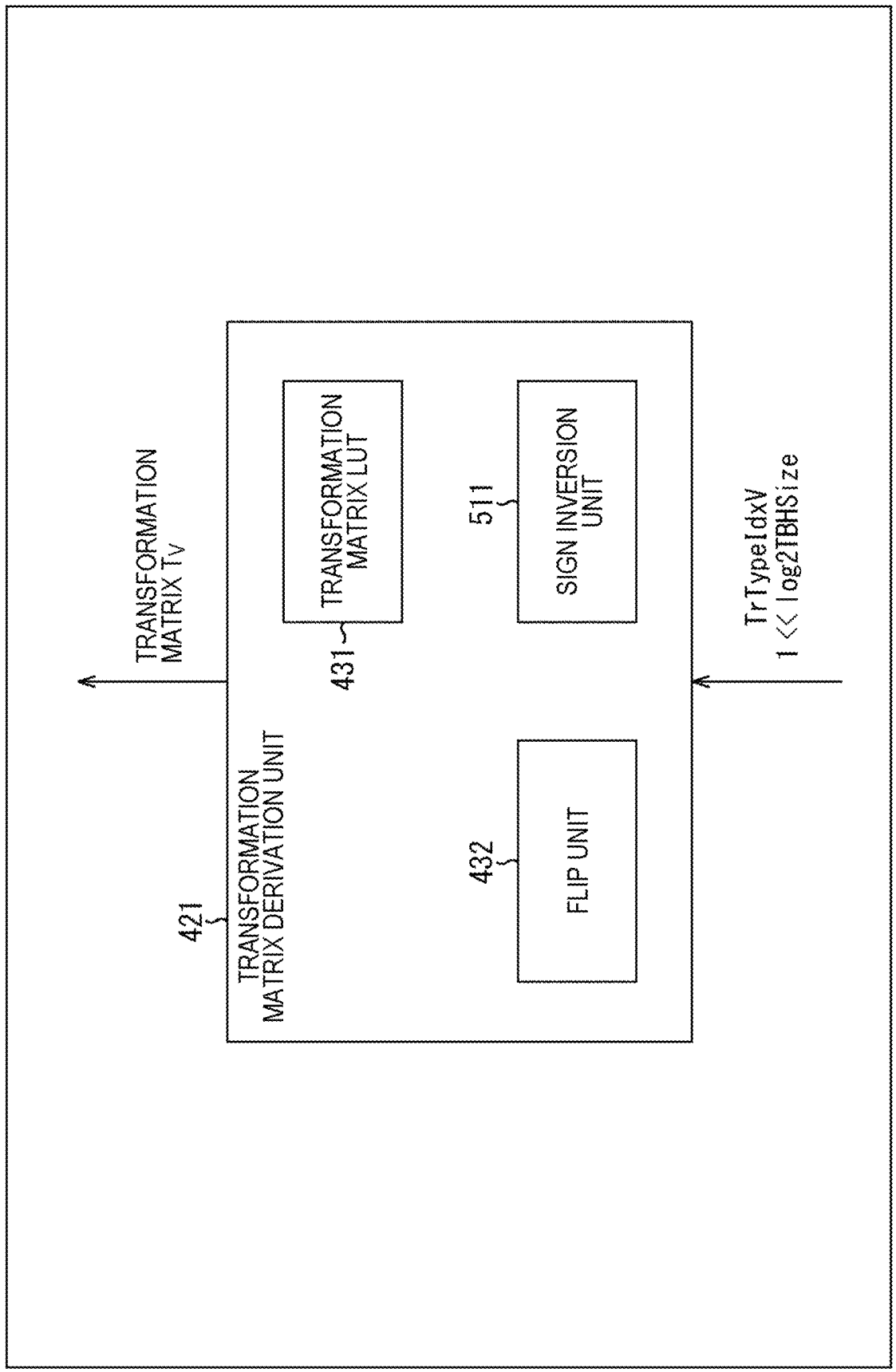
FIG. 50 is a block diagram illustrating a main configuration example of a transformation matrix derivation unit.

FIG. 50 is a block diagram illustrating a main configuration example of the transformation matrix derivation unit 421 (the transformation matrix derivation unit 421 in the inverse primary vertical transform unit 412) in this case. As illustrated in FIG. 50, the transformation matrix derivation unit 421 in this case includes the transformation matrix LUT 431, the flip unit 432, and a sign inversion unit 511, similarly to the transformation matrix derivation unit 321. Note that, in FIG. 50, arrows representing data transfer are omitted, but in the transformation matrix derivation unit 421, arbitrary data can be transferred between arbitrary processing units (processing blocks).

The transformation matrix LUT 431 and the flip unit 432 are similar to the case in FIG. 36. The sign inversion unit 511 uses a transformation matrix T of N rows and N columns as an input, inverts the sign of a predetermined portion of the transformation matrix T, and performs sign inversion, and outputs a transformation matrix $T_{InvSign}$ after the sign inversion, similarly to the sign inversion unit 501. In the case of this derivation example, the transformation matrix derivation unit 421 horizontally flips the base transformation matrix $T_{base}$ of N rows and N columns selected in the transformation matrix LUT 431 via the flip unit 432, further inverts the sign of an odd-order row vector via the sign inversion unit 511, and outputs the transformation matrix $T_{InvSign}$ to the outside of the transformation matrix derivation unit 421 (supplies the same to the matrix calculation unit 422) as the transformation matrix $T_V$.

As described above, the transformation matrix derivation unit 421 can implement the derivation example of the third row example from the top of the table illustrated in FIG. 10, using the flip unit 432 and the sign inversion unit 511.

<Transformation Matrix Derivation Unit>

Figure 51:
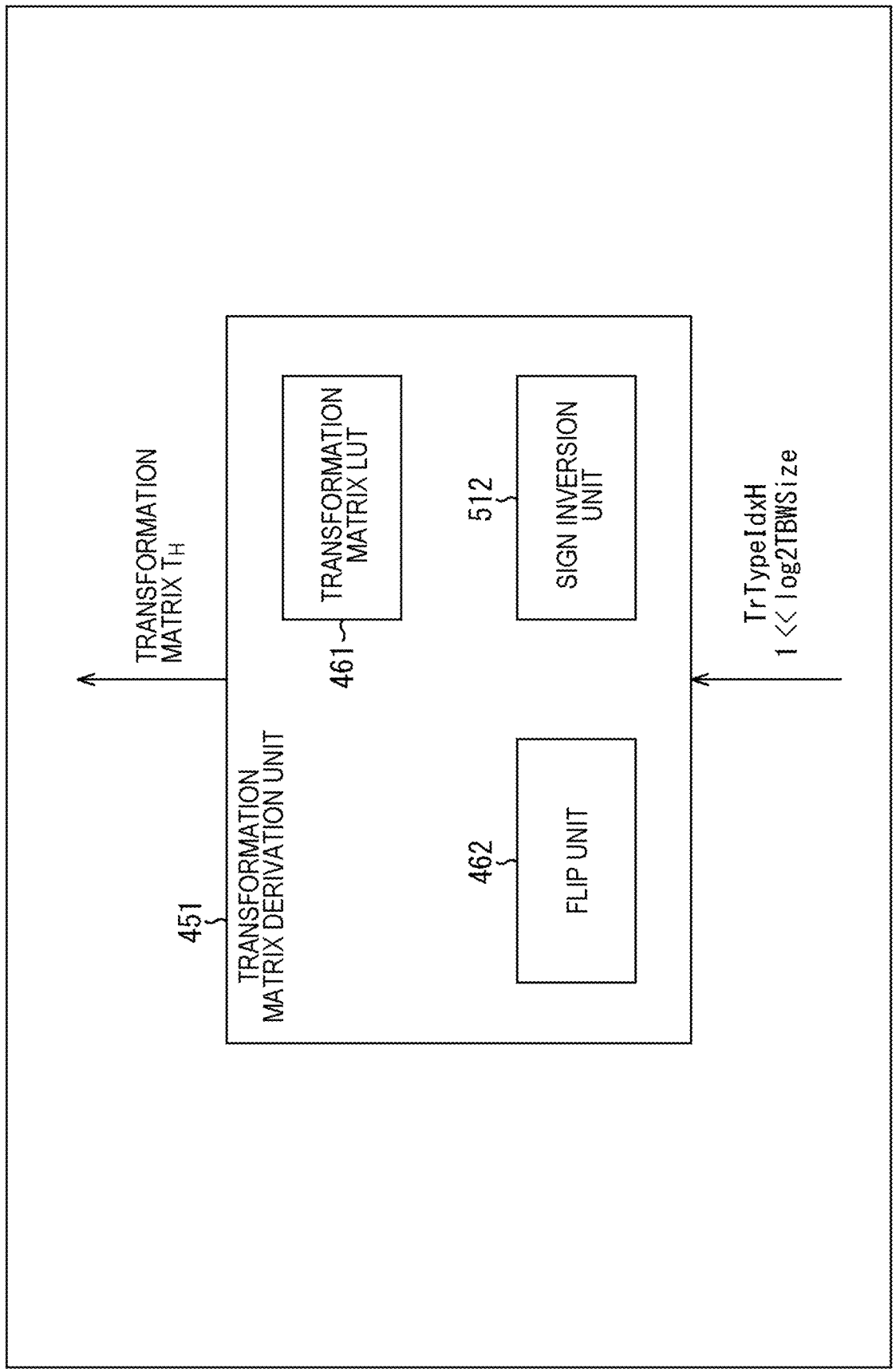
FIG. 51 is a block diagram illustrating a main configuration example of a transformation matrix derivation unit.

FIG. 51 is a block diagram illustrating a main configuration example of the transformation matrix derivation unit 451 included in the inverse primary horizontal transform unit 413 in this case. As illustrated in FIG. 51, the transformation matrix derivation unit 451 in this case includes a transformation matrix LUT 461, a flip unit 462, and a sign inversion unit 512, similarly to the transformation matrix derivation unit 421. Note that, in FIG. 51, arrows representing data transfer are omitted, but in the transformation matrix derivation unit 451, arbitrary data can be transferred between arbitrary processing units (processing blocks).

The transformation matrix LUT 461 and the flip unit 462 are similar to the case in FIG. 50. The sign inversion unit 512 uses a transformation matrix T of N rows and N columns as an input, inverts the sign of a predetermined portion of the transformation matrix T, and performs sign inversion, and outputs a transformation matrix $T_{InvSign}$ after the sign inversion, similarly to the sign inversion unit 501. In the case of this derivation example, the transformation matrix derivation unit 451 horizontally flips the base transformation matrix $T_{base}$ of N rows and N columns selected in the transformation matrix LUT 461 via the flip unit 462, further inverts the sign of an odd-order row vector via the sign inversion unit 512, and outputs the transformation matrix $T_{InvSign}$ to the outside of the transformation matrix derivation unit 451 (supplies the same to the matrix calculation unit 452) as the transformation matrix $T_V$.

As described above, the transformation matrix derivation unit 451 can implement the derivation example of the third row example from the top of the table illustrated in FIG. 10, using the flip unit 462 and the sign inversion unit 512.

<Flow of Transformation Matrix Derivation Processing>

Note that the transformation matrix derivation unit 421 and the transformation matrix derivation unit 451 perform the transformation matrix derivation processing by a flow similar to the case described with reference to the flowchart in FIG. 48, and thus description of the processing is omitted.

2-4. Example 1-3

<Concept>

Next, the fourth row example and the fifth row example from the top except the uppermost row of item names in the table illustrated in FIG. 10 will be described.

Figure 52:
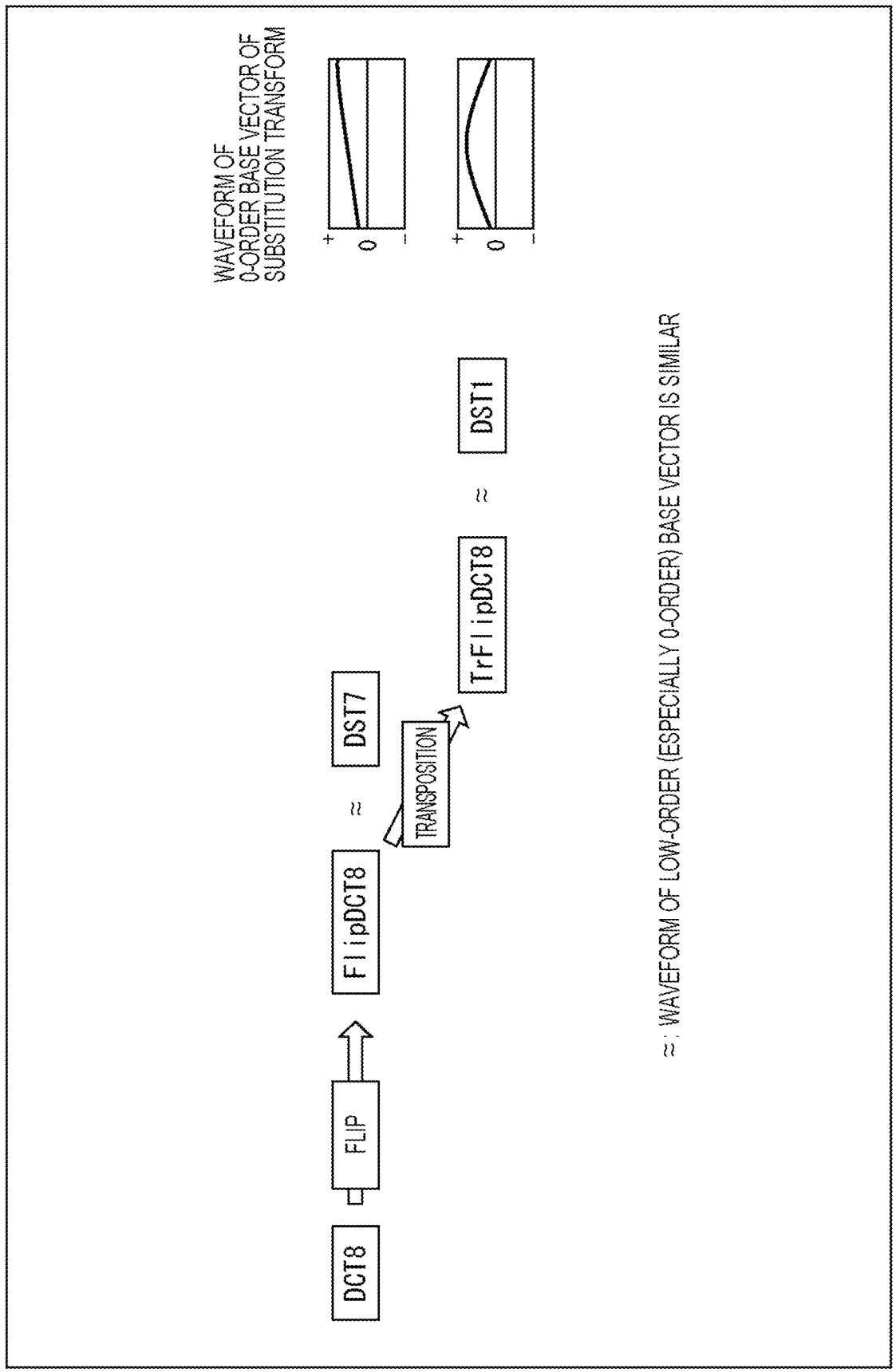
FIG. 52 is a diagram illustrating an example of transform type derivation.

As described above, the derivation of the fourth row example from the top focuses on the similarity between the waveform of the lowest-order row vector of the first transform type and the waveform of the lowest-order row vector of the transform type of a transformation matrix to be substituted, similarly to the case of the first row example from the top. In this case, the derivation unit flips the first transformation matrix to derive the second transformation matrix. That is, the derivation unit uses the transformation matrix of DCT8 as the base transformation matrix $T_{base}$, and flips the transformation matrix in the row direction to derive the transformation matrix of FlipDCT8, as illustrated in FIG. 52. The (increasing-type) transformation matrix of DST7 having a similar waveform of the 0-order row vector can be substituted by the transformation matrix of FlipDCT8.

Furthermore, the derivation of the fifth row example from the top focuses on the similarity between the waveform of the highest-order column vector of the first transform type and the waveform of the lowest-order row vector of the transform type of a transformation matrix to be substituted. In this case, the derivation unit flips the first transformation matrix and transposes the flipped first transformation matrix to derive the second transformation matrix. That is, the derivation unit uses the transformation matrix of DCT8 as the base transformation matrix $T_{base}$, and flips the transformation matrix in the row direction and further transposes the transformation matrix to derive the transformation matrix of TrFlipDCT8, as illustrated in FIG. 52. The (chevron-type) transformation matrix of DST1 having a similar waveform of the 0-order row vector can be substituted by the transformation matrix of TrFlipDCT8.

That is, in both of the above two derivation examples, the second transformation matrix can be derived by one-time or two-time operation (flip, or flip and transposition). Furthermore, the operation is easy. That is, the second transformation matrix can be easily derived.

Furthermore, by applying the above two derivation examples, it becomes unnecessary to prepare the transformation matrix of DST7 and the transformation matrix of DST1 as candidates for transformation matrices to be used for orthogonal transform/inverse orthogonal transform. That is, the number of unique transform types can be reduced.

In this case, as illustrated in the table in FIG. 53, the five types of transformation matrices required in the case of the technology described in Non-Patent Document 1 (see the table A in FIG. 6) can be reduced to three types. Therefore, the total LUT size can be about 40 KB. That is, the size of the LUT can be reduced (by about 53 KB (the table A in FIG. 6)) as compared with the case of the technology described in Non-Patent Document 1. That is, an increase in the size of the LUT can be suppressed.

Note that, as described above, even in this case, by performing the orthogonal transform/inverse orthogonal transform using the transformation matrix of the derived second transform type (FlipDCT8 or TrFlipDCT8), similar coding efficiency to the case of using the transformation matrix of DST7 or the transformation matrix of DST1 for the orthogonal transform/inverse orthogonal transform can be obtained.

<Configuration>

Since configurations of the image encoding device 100 and the image decoding device 200 in this case are similar to those described in <2-2. Example 1-1>, description thereof is omitted.

<Flow of Transformation Matrix Derivation Processing>

Next, a flow of the processing flow will be described. Since processing other than the transformation matrix derivation processing is performed by a flow similar to the example described in <2-2. Example 1-1> and the like, description of the processing is omitted.

An example of a flow of the transformation matrix derivation processing in this case, which is executed by the transformation matrix derivation unit 321 included in the primary horizontal transform unit 312 in step S321 in FIG. 28, will be described with reference to the flowchart in FIG. 54.

When the transformation matrix derivation processing is started, in step S521, the transformation matrix derivation unit 321 obtains a base transform type BaseTrType corresponding to the transform type identifier TrTypeIdxH by reference to the correspondence table illustrated in FIG. 55, for example.

Figure 30:
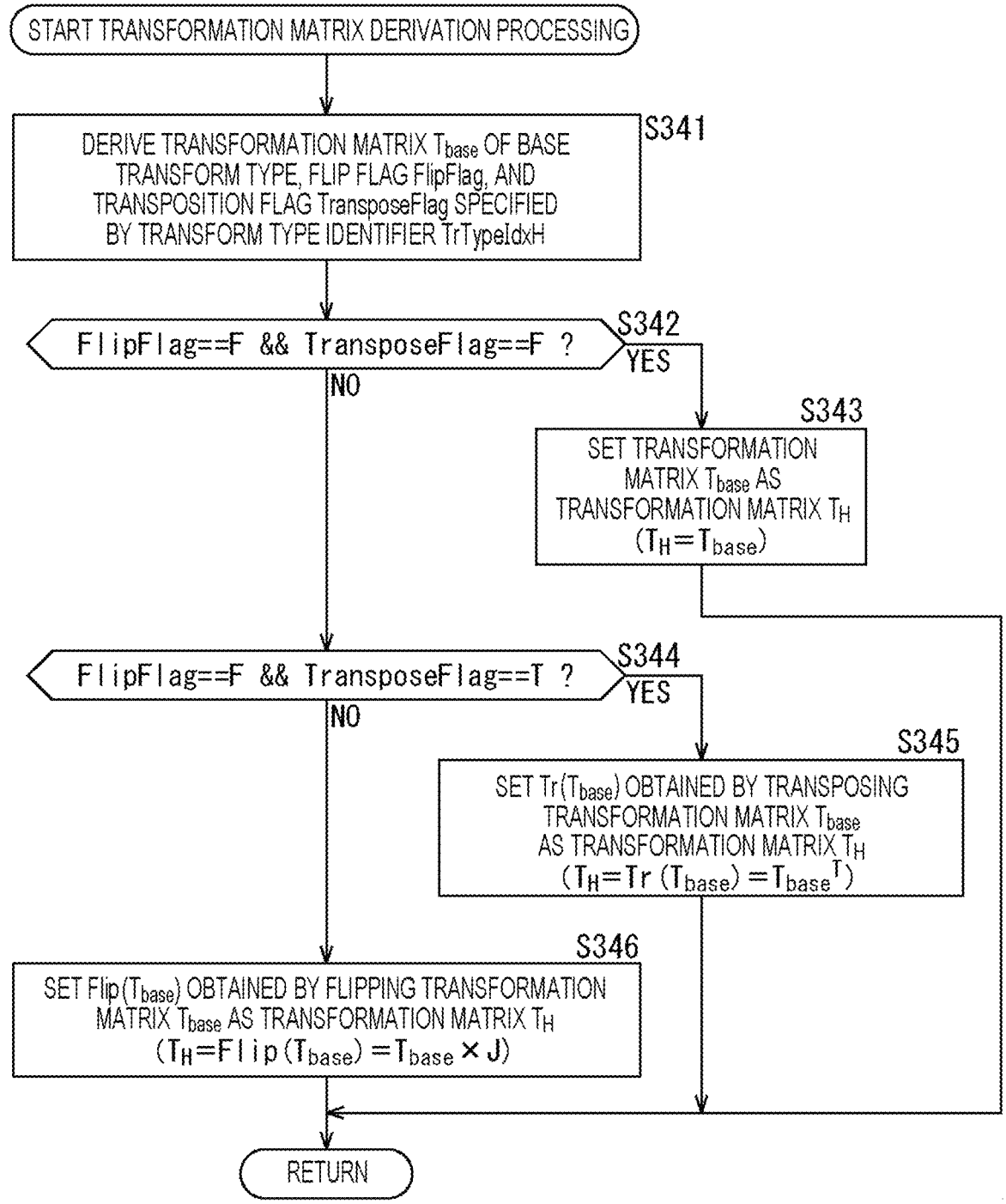
FIG. 30 is a flowchart for describing an example of a flow of transformation matrix derivation processing.

Furthermore, the transformation matrix derivation unit 321 sets the value of the flip flag FlipFlag corresponding to the transform type identifier TrTypeIdxH and the value of the transposition flag TransposeFlag corresponding to the transform type identifier TrTypeIdxH, similarly to the case of step S341 of the flowchart in FIG. 30.

In step S522, the transformation matrix derivation unit 321 determines whether or not the flip flag FlipFlag satisfies a condition (ConditionC1) expressed by the following expression (42).

[Math. 38]

$$ConditionC1: FlipFlag == T \quad (42)$$

In a case where it is determined that the above-described condition (ConditionC1) is not satisfied (in a case where the flip flag FlipFlag is false (0)), the processing proceeds to step S523.

In step S523, the transformation matrix derivation unit 321 sets the base transformation matrix $T_{base}$ as the transformation matrix $T_H$, similarly to the case of step S343 in FIG. 30. When the processing in step S523 ends, the transformation matrix derivation processing ends and the processing returns to FIG. 28.

Furthermore, in step S522, in a case where it is determined that the above-described condition (ConditionC1) is satisfied (in a case where the flip flag FlipFlag is true (1)), the processing proceeds to step S524.

In step S524, the transformation matrix derivation unit 321 horizontally flips the base transformation matrix $T_{base}$ and sets the flipped transformation matrix Flip ($T_{base}$) as a transformation matrix $T_{tmp}$. This processing can be expressed as the following expression (43).

[Math. 39]

$$T_{tmp} = Flip(T_{base}) = T_{base} \times J \quad (43)$$

In step S525, the transformation matrix derivation unit 321 determines whether or not the transposition flag TransposeFlag satisfies a condition (ConditionC2) expressed by the following expression (44).

[Math. 40]

$$ConditionC2: TransposeFlag == T \quad (44)$$

In a case where it is determined that the above-described condition (ConditionC2) is not satisfied (in a case where the transposition flag TransposeFlag is false (0)), the processing proceeds to step S526.

In step S526, the transformation matrix derivation unit 321 sets the transformation matrix $T_{tmp}$ as the transformation matrix $T_H$. This processing can be expressed as the following expression (45).

[Math. 41]

$$T_H = T_{tmp} \quad (45)$$

When the processing in step S526 ends, the transformation matrix derivation processing ends and the processing returns to FIG. 28. Furthermore, in step S525, in a case where it is determined that the above-described condition (ConditionC2) is satisfied (in a case where the transposition flag TransposeFlag is true (1)), the processing proceeds to step S527.

In step S527, the transformation matrix derivation unit 321 sets Tr ($T_{tmp}$) obtained by transposing the transformation matrix $T_{tmp}$ as the transformation matrix $T_H$. This processing can be expressed as, for example, the following expression (46).

[Math. 42]

$$T_H = Tr(T_{tmp}) = T_{tmp}^T \quad (46)$$

When the processing in step S527 ends, the transformation matrix derivation processing ends and the processing returns to FIG. 28.

By executing the transformation matrix derivation processing as described above, the derivation example of the fourth and fifth row examples from the top of the table in FIG. 10 can be implemented in the horizontal one-dimensional orthogonal transform. Therefore, an increase in the required memory capacity can be suppressed.

Note that the above description has been given such that the flip and the transposition are performed in order. However, the flip and the transposition may be collectively performed (by one-time operation). For example, the determinations in steps S522 and S525 in FIG. 54 are collectively performed, and in a case where both of the determinations are true (1), flip and transposition may be collectively performed.

For example, when the flip and transposition operations are expressed as an operation for each element, an (i, . . . , N−1−j) component of the base transformation matrix $T_{base}$ is set as a j-row i-column component ((j, i) component) of the transformation matrix $T_H$. That is, the operations can be expressed as the following expression (47).

[Math. 43]

$$T_H[j,i] = T_{base}[i, N-1-j]$$

$$\text{for } i,j = 0, \ldots, N-1 \quad (47)$$

Here, the i-row j-column component ((i, j) component) of the transformation matrix $T_H$ of N rows and N columns is written as $T_H$ [i, j]. Furthermore, "for i, j=0, . . . , N−1" on the second row indicates that i and j have values of 0 to N−1. That is, it means that $T_H$ [i, j] indicates all of elements of the transformation matrix $T_H$ of N rows and N columns.

In this way, the flip and transposition can be implemented by one-time operation, which is by accessing a simple two-dimensional array. Furthermore, since the flip matrix J is unnecessary, an increase in the memory capacity can be suppressed by the capacity of the flip matrix J Note that, in the case of the present example, in step S361 in FIG. 32, the transformation matrix derivation processing executed by the transformation matrix derivation unit 351 included in the primary vertical transform unit 313 is also performed by a flow similar to the flowchart in FIG. 54.

Figure 41:
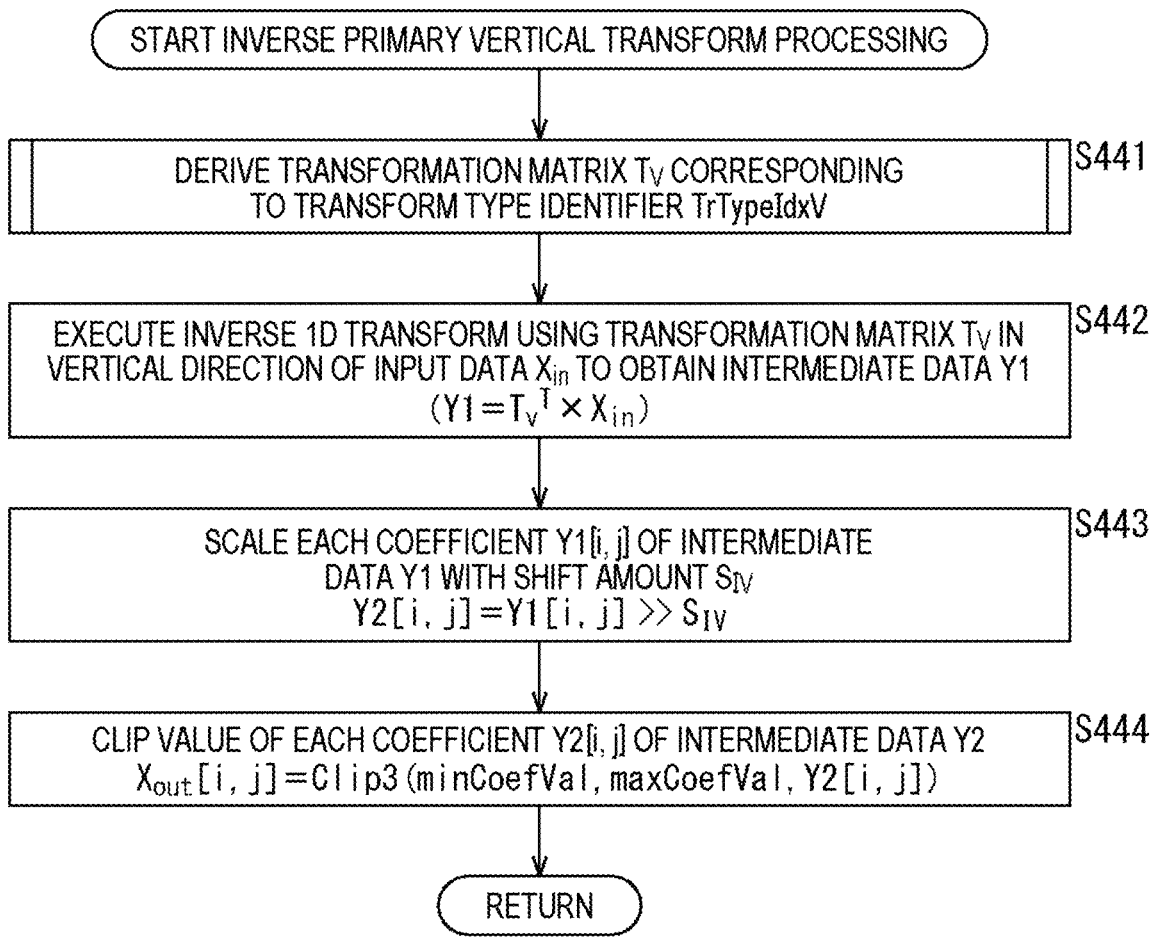
FIG. 41 is a flowchart for describing an example of a flow of inverse primary vertical transform processing.
Figure 54:
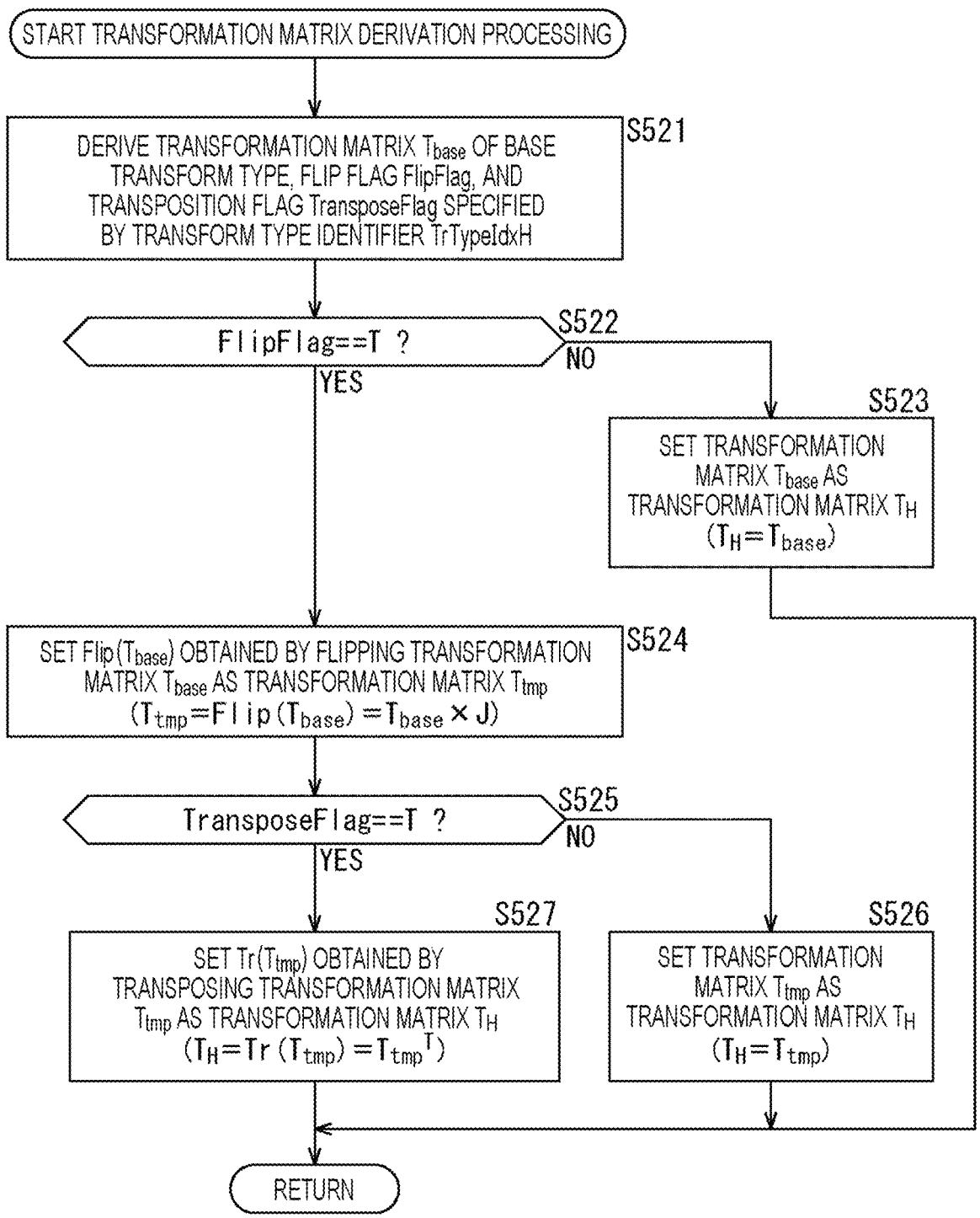
FIG. 54 is a flowchart for describing an example of a flow of transformation matrix derivation processing.

Furthermore, in the case of the present example, in step S441 in FIG. 41, the transformation matrix derivation processing executed by the transformation matrix derivation unit 421 included in the inverse primary vertical transform unit 412 is also performed by a flow similar to the flowchart in FIG. 54.

Figure 42:
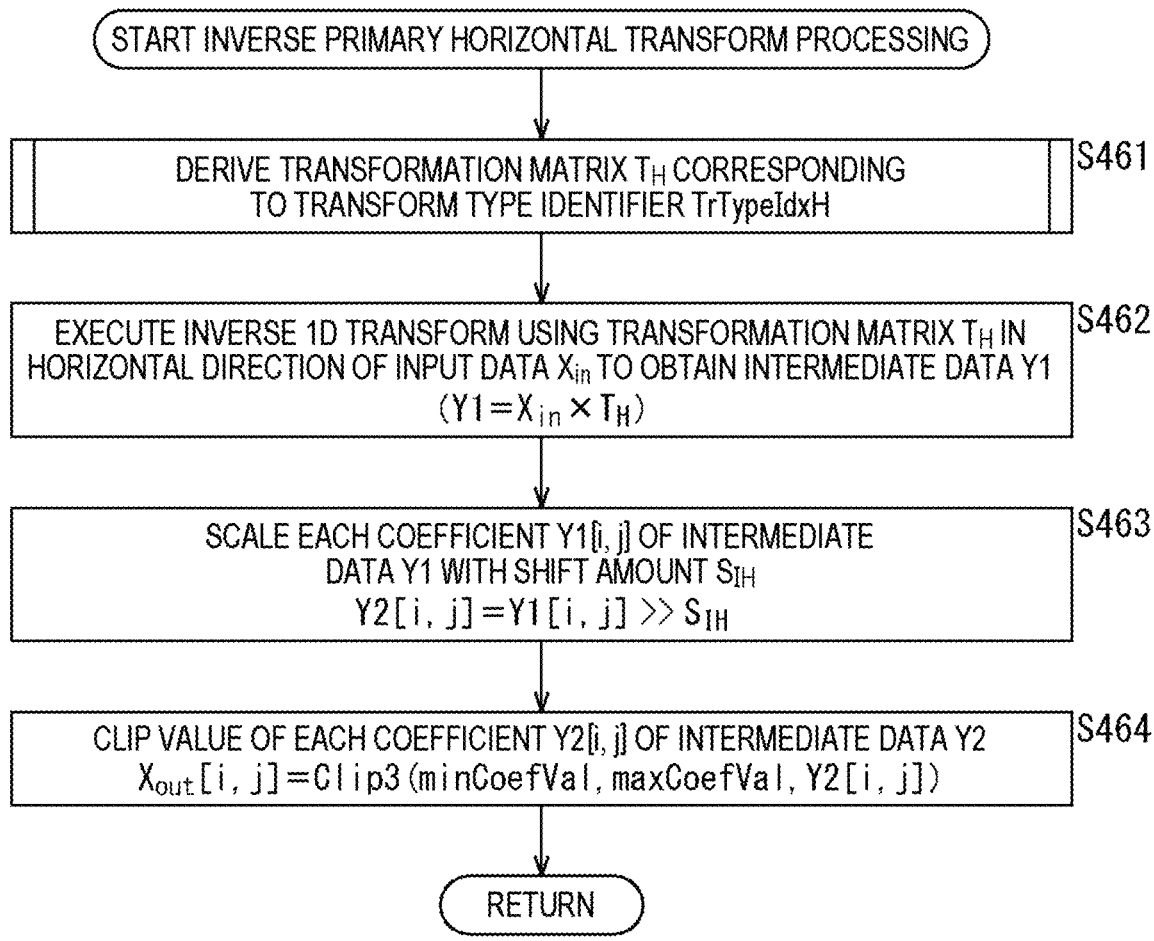
FIG. 42 is a flowchart for describing an example of a flow of inverse primary horizontal transform processing.

Moreover, in the case of the present example, in step S461 in FIG. 42, the transformation matrix derivation processing executed by the transformation matrix derivation unit 451 included in the inverse primary horizontal transform unit 413 is also performed by a flow similar to the flowchart in FIG. 54.

Therefore, description of the processing is omitted.

2-5. Example 1-4

<Concept>

Next, the sixth row example from the top except the uppermost row of item names in the table illustrated in FIG. 10 will be described.

Figure 56:
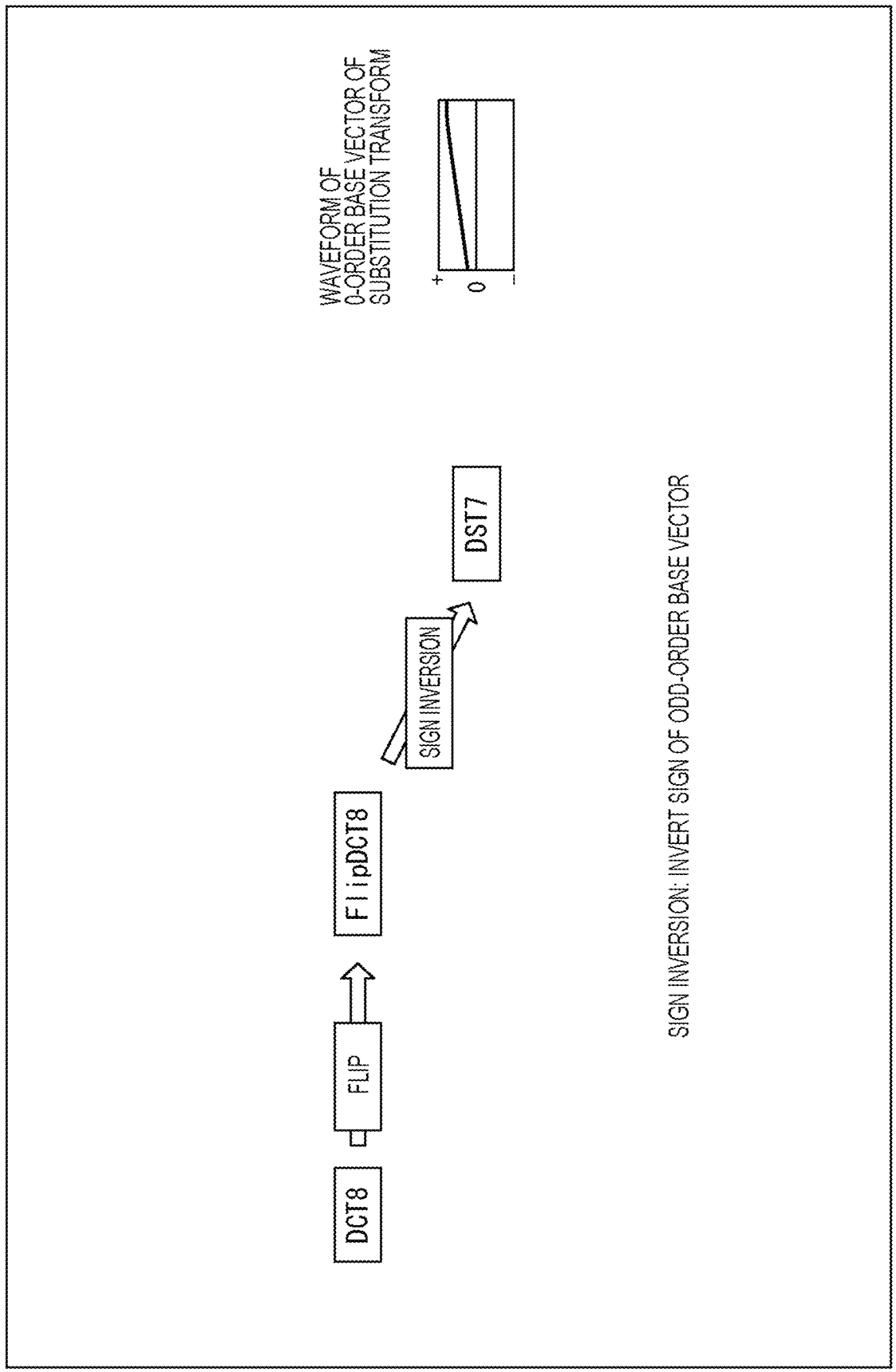
FIG. 56 is a diagram illustrating an example of transform type derivation.

As described above, the derivation of the sixth row example from the top focuses on the characteristics between paired DCT and DST, similarly to the case of the third row example from the top (Example 1-2). More specifically, between DCT/DST to be paired (for example, DCT8 and DST7), attention is paid to the point that even-numbered row vectors are axially symmetric and odd-numbered row vectors are point-symmetric. In this case, the derivation unit flips the first transformation matrix and inverts the sign of the odd-numbered row vector of the flipped first transformation matrix to derive the second transformation matrix. That is, the derivation unit uses the transformation matrix of DCT8 as the base transformation matrix $T_{base}$, and flips the transformation matrix in the row direction and further inverts the sign of an odd-order row vector to losslessly derive the transformation matrix of DST7, as illustrated in FIG. 56. Therefore, naturally, the (increasing-type) transformation matrix of DST7 having the same waveform of the 0-order row vector can be substituted by the derived transformation matrix of DST7.

That is, in this derivation example, the second transformation matrix can be derived by two-time operation (flip and sign inversion). Furthermore, the operation is easy. That is, the second transformation matrix can be easily derived.

Furthermore, by applying this derivation example, it becomes unnecessary to prepare the transformation matrix of DST7 as a candidate for a transformation matrix to be used for orthogonal transform/inverse orthogonal transform. That is, the number of unique transform types can be reduced.

In this case, as illustrated in the table in FIG. 57, the five types of transformation matrices required in the case of the technology described in Non-Patent Document 1 (see the table A in FIG. 6) can be reduced to four types. Therefore, the total LUT size can be about 47 KB. That is, the size of the LUT can be reduced (by about 53 KB (the table A in FIG. 6)) as compared with the case of the technology described in Non-Patent Document 1. That is, an increase in the size of the LUT can be suppressed.

Furthermore, in this derivation example, the transformation matrix of DST7 can be derived as the second transformation matrix. Therefore, by performing the orthogonal transform/inverse orthogonal transform using the second transformation matrix, the same coding efficiency as the case of using the transformation matrix of DST7 for the orthogonal transform/inverse orthogonal transform can be obtained.

<Flow of Configuration and Processing>

Since configurations of the image encoding device 100 and the image decoding device 200 in this case are similar to those described in <2-3. Example 1-2>, description thereof is omitted. Furthermore, since processing performed by the image encoding device 100 and the image decoding device 200 is similar to the processing described in <2-3. Example 1-2>, description thereof is omitted.

Note that, in the case of the present example, in obtaining a base transform type corresponding to the transform type identifier TrTypeIdxH in the transformation matrix derivation processing, the base transform type is obtained by reference to the correspondence table illustrated in FIG. 58, for example. Other than the above, the processing is simply performed according to a flow similar to the case described with reference to the flowchart in FIG. 48.

2-6. Example 1-5

<Concept>

Next, the seventh row example and the eighth row example from the top except the uppermost row of item names in the table illustrated in FIG. 10 will be described.

Figure 59:
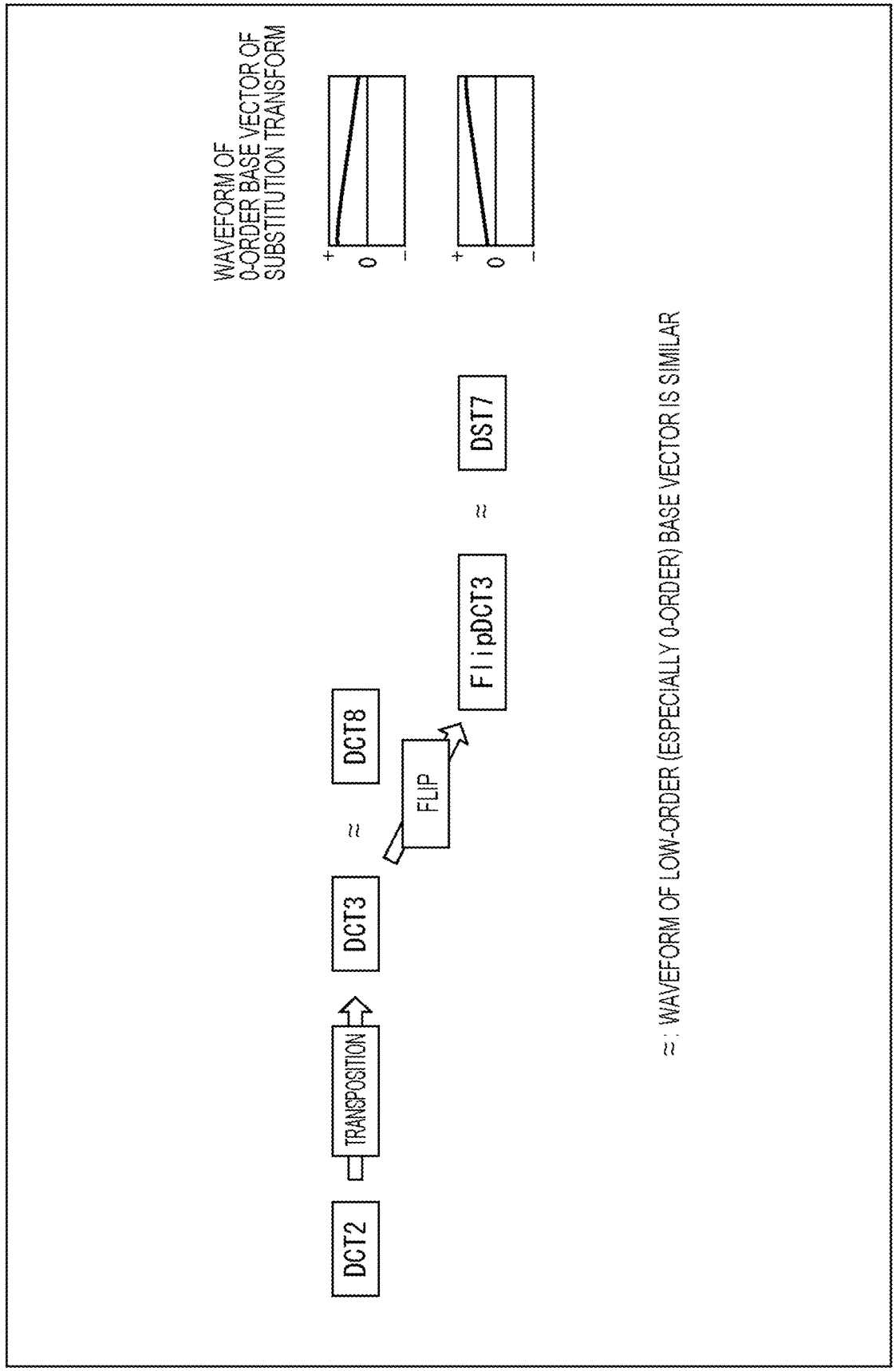
FIG. 59 is a diagram illustrating an example of transform type derivation.

As described above, the derivation of the seventh row example from the top focuses on the similarity between the waveform of the lowest-order row vector of the first transform type and the waveform of the lowest-order row vector of the transform type of a transformation matrix to be substituted, similarly to the case of the first row example from the top. Note that, in this case, the derivation unit transposes the first transformation matrix to derive the second transformation matrix. That is, the derivation unit uses the transformation matrix of DCT2 as the base transformation matrix $T_{base}$, and transposes the transformation matrix to derive the transformation matrix of DCT3, as illustrated in FIG. 59. The (decreasing-type) transformation matrix of DCT8 having a similar waveform of the 0-order row vector can be substituted by the transformation matrix of DCT3.

Furthermore, the derivation of the eighth row example from the top focuses on the similarity between the waveform of the highest-order column vector of the first transform type and the waveform of the lowest-order row vector of the transform type of a transformation matrix to be substituted, similarly to the case of the fifth row example from the top. In this case, the derivation unit transposes the first transformation matrix and flips the transposed first transformation matrix to derive the second transformation matrix. That is, the derivation unit uses the transformation matrix of DCT2 as the base transformation matrix $T_{base}$, and transposes the transformation matrix and further flips the transformation matrix in the row direction to derive the transformation matrix of FlipDCT3, as illustrated in FIG. 59. The (increasing-type) transformation matrix of DST7 having a similar waveform of the 0-order row vector can be substituted by the transformation matrix of FlipDCT3.

That is, in both of the above two derivation examples, the second transformation matrix can be derived by one-time or two-time operation (transposition, or transposition and flip). Furthermore, the operation is easy. That is, the second transformation matrix can be easily derived.

Furthermore, by applying the above two derivation examples, it becomes unnecessary to prepare the transformation matrix of DCT8 and the transformation matrix of DST7 as candidates for transformation matrices to be used for orthogonal transform/inverse orthogonal transform. That is, the number of unique transform types can be reduced.

In this case, as illustrated in the table in FIG. 60, the five types of transformation matrices required in the case of the technology described in Non-Patent Document 1 (see the table A in FIG. 6) can be reduced to three types. Therefore, the total LUT size can be about 40 KB. That is, the size of the LUT can be reduced (by about 53 KB (the table A in FIG. 6)) as compared with the case of the technology described in Non-Patent Document 1. That is, an increase in the size of the LUT can be suppressed.

Note that, as described above, even in this case, by performing the orthogonal transform/inverse orthogonal transform using the transformation matrix of the derived second transform type (DCT3 or FlipDCT3), similar coding efficiency to the case of using the transformation matrix of DCT8 or the transformation matrix of DST7 for the orthogonal transform/inverse orthogonal transform can be obtained.

<Configuration>

Since configurations of the image encoding device 100 and the image decoding device 200 in this case are similar to those described in <2-2. Example 1-1>, description thereof is omitted.

<Flow of Transformation Matrix Derivation Processing>

Next, a flow of the processing flow will be described. Since processing other than the transformation matrix derivation processing is performed by a flow similar to the example described in <2-2. Example 1-1> and the like, description of the processing is omitted.

An example of a flow of the transformation matrix derivation processing in this case, which is executed by the transformation matrix derivation unit 321 included in the primary horizontal transform unit 312 in step S321 in FIG. 28, will be described with reference to the flowchart in FIG. 61.

When the transformation matrix derivation processing is started, in step S541, the transformation matrix derivation unit 321 obtains a base transform type BaseTrType corresponding to the transform type identifier TrTypeIdxH by reference to the correspondence table illustrated in FIG. 62, for example.

Furthermore, the transformation matrix derivation unit 321 sets the value of the flip flag FlipFlag corresponding to the transform type identifier TrTypeIdxH and the value of the transposition flag TransposeFlag corresponding to the transform type identifier TrTypeIdxH, similarly to the case of step S341 of the flowchart in FIG. 30.

In step S542, the transformation matrix derivation unit 321 determines whether or not the transposition flag TransposeFlag satisfies a condition (ConditionD1) expressed by the following expression (48).

[Math. 44]

$$ConditionD1: TransposeFlag == T \quad (48)$$

In a case where it is determined that the above-described condition (ConditionD1) is not satisfied (in a case where the transposition flag TransposeFlag is false (0)), the processing proceeds to step S543.

In step S543, the transformation matrix derivation unit 321 sets the base transformation matrix $T_{base}$ as the transformation matrix $T_H$, similarly to the case of step S343 in FIG. 30. When the processing in step S543 ends, the transformation matrix derivation processing ends and the processing returns to FIG. 28.

Furthermore, in step S542, in a case where it is determined that the above-described condition (ConditionD1) is satisfied (in a case where the transposition flag TransposeFlag is true (1)), the processing proceeds to step S544.

In step S544, the transformation matrix derivation unit 321 transposes the base transformation matrix $T_{base}$ in the horizontal direction, and sets the transposed transformation matrix Tr ($T_{base}$) as the transformation matrix $T_{tmp}$. This processing can be expressed as the following expression (49).

[Math. 45]

$$T_{tmp} = Tr(T_{base}) = T_{base}^T \quad (49)$$

In step S545, the transformation matrix derivation unit 321 determines whether or not the flip flag FlipFlag satisfies a condition (ConditionD2) expressed by the following expression (50).

[Math. 46]

$$ConditionD2: FlipFlag == T \quad (50)$$

In a case where it is determined that the above-described condition (ConditionD2) is not satisfied (in a case where the flip flag FlipFlag is false (0)), the processing proceeds to step S546.

In step S546, the transformation matrix derivation unit 321 sets the transformation matrix $T_{tmp}$ as the transformation matrix $T_H$, as in the above-described expression (45).

When the processing in step S546 ends, the transformation matrix derivation processing ends and the processing returns to FIG. 28. Furthermore, in step S545, in a case where it is determined that the above-described condition (ConditionD2) is satisfied (in a case where the flip flag FlipFlag is true (1)), the processing proceeds to step S547.

In step S547, the transformation matrix derivation unit 321 sets Flip ($T_{tmp}$) obtained by flipping the transformation matrix $T_{tmp}$ as the transformation matrix $T_H$. This processing can be expressed as, for example, the following expression (51).

[Math. 47]

$$T_H = Flip(T_{tmp}) = T_{tmp} \times J \quad (51)$$

When the processing in step S547 ends, the transformation matrix derivation processing ends and the processing returns to FIG. 28.

By executing the transformation matrix derivation processing as described above, the derivation example of the seventh and eighth row examples from the top of the table in FIG. 10 can be implemented in the horizontal one-dimensional orthogonal transform. Therefore, an increase in the required memory capacity can be suppressed.

Note that the above description has been given such that the transposition and the flip are performed in order. However, the transposition and the flip may be collectively performed (by one-time operation). For example, the determinations in steps S542 and S545 in FIG. 61 are collectively performed, and in a case where both of the determinations are true (1), transposition and flip may be collectively performed.

For example, when the transposition and flip operations are expressed as an operation for each element, a (j, i) component of the base transformation matrix $T_{base}$ is set as an i-row (N−1−j)-column component ((i, (N−1−j)) component) of the transformation matrix $T_H$. That is, this processing can be expressed as the following expression (52).

[Math. 48]

$$T_H[i, N-1-j] = T_{base}[j, i]$$

$$\text{for } i, j = 0, \ldots, N-1 \quad (52)$$

Here, the i-row j-column component ((i, j) component) of the transformation matrix $T_H$ of N rows and N columns is written as $T_H[i, j]$. Furthermore, "for i, j=0, . . . , N−1" on the second row indicates that i and j have values of 0 to N−1. That is, it means that $T_H[i, j]$ indicates all of elements of the transformation matrix $T_H$ of N rows and N columns.

In this way, the transposition and flip can be implemented by one-time operation, which is by accessing a simple two-dimensional array. Furthermore, since the flip matrix J is unnecessary, an increase in the memory capacity can be suppressed by the capacity of the flip matrix J.

Figure 32:
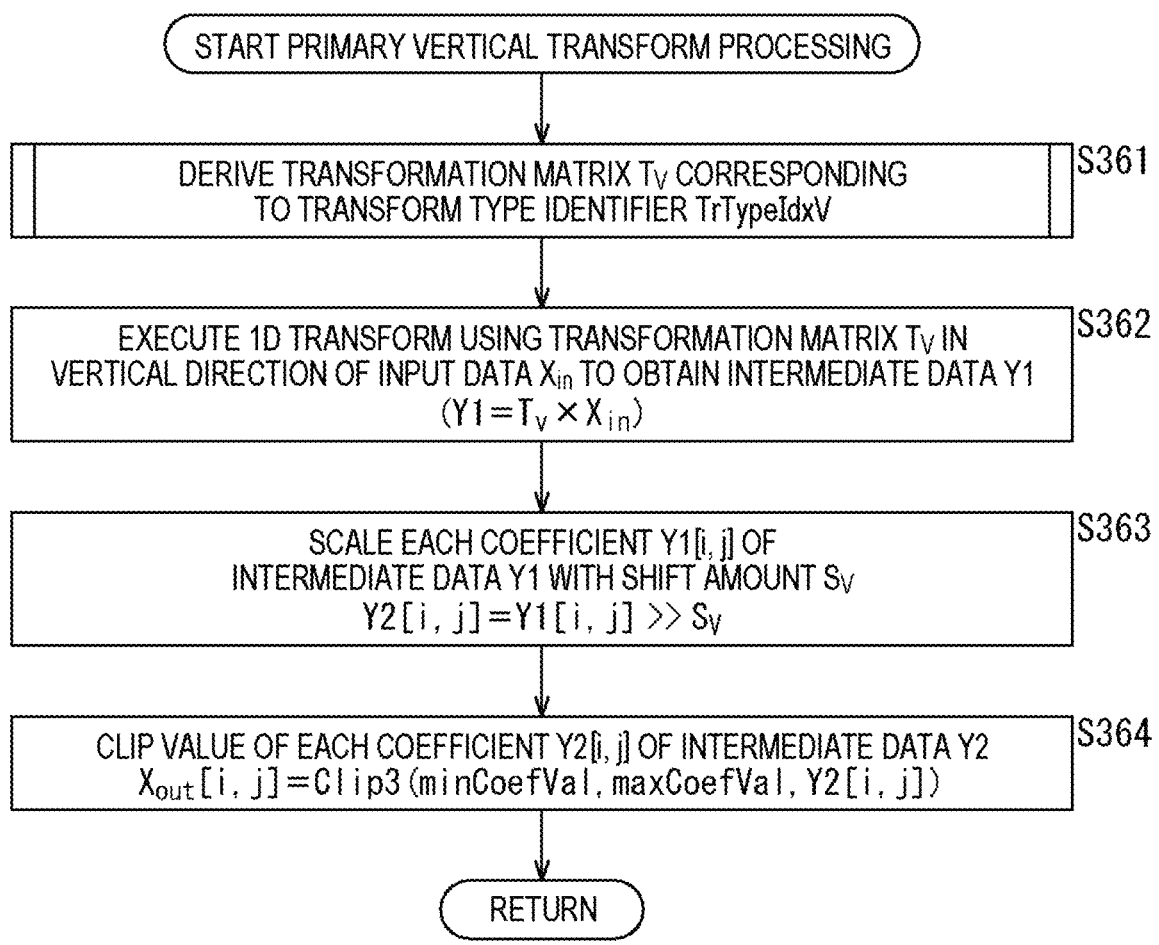
FIG. 32 is a flowchart for describing an example of a flow of primary vertical transform processing.
Figure 61:
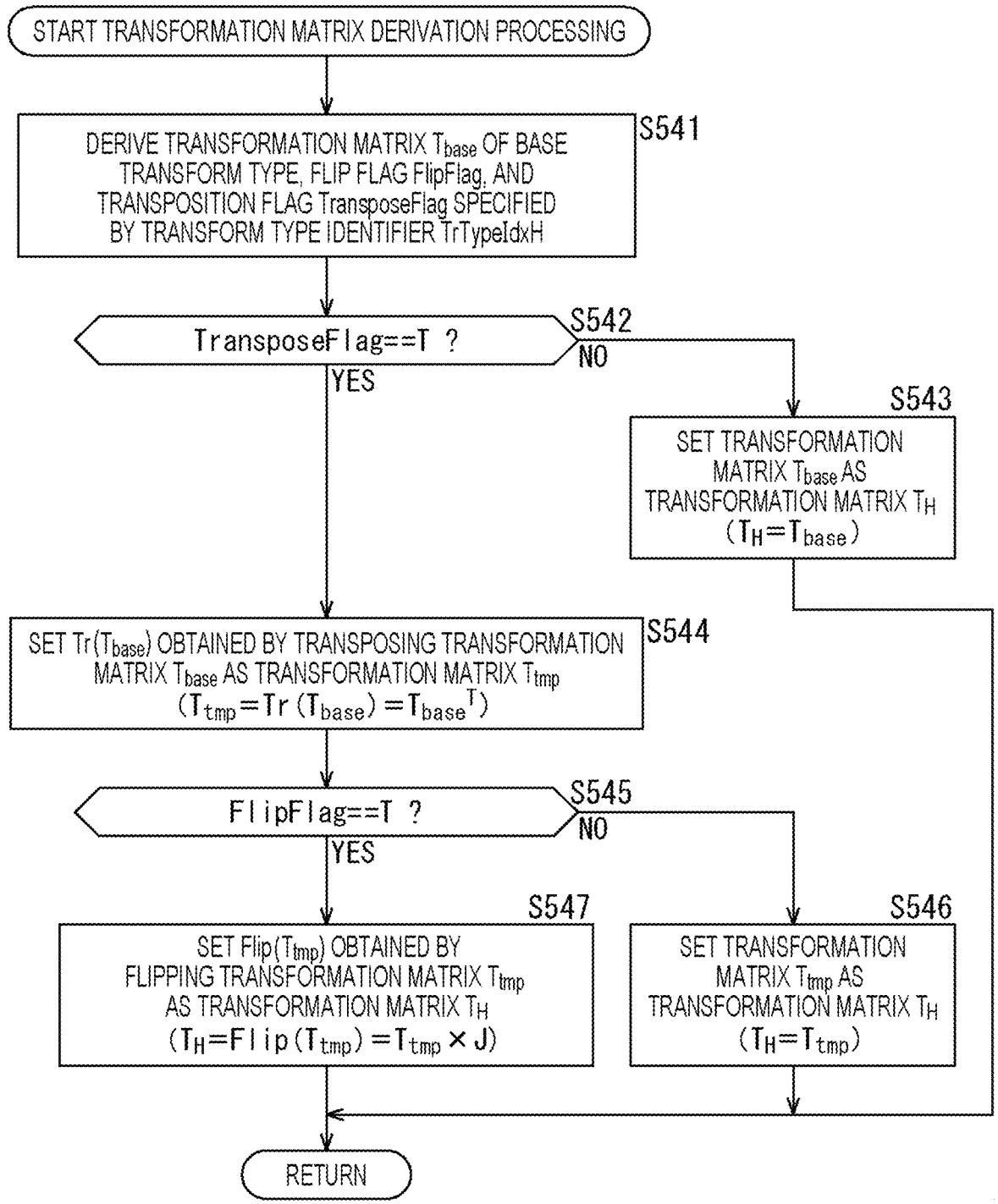
FIG. 61 is a flowchart for describing an example of a flow of transformation matrix derivation processing.

Note that, in the case of the present example, in step S361 in FIG. 32, the transformation matrix derivation processing executed by the transformation matrix derivation unit 351 included in the primary vertical transform unit 313 is also performed by a flow similar to the flowchart in FIG. 61. For example, in the flowchart in FIG. 61, interpretation is simply made by replacing the transform type identifier TrTypeIdxH with TrTypeIdxV, and replacing the transformation matrix $T_H$ with the transformation matrix $T_V$.

Furthermore, in the case of the present example, in step S441 in FIG. 41, the transformation matrix derivation processing executed by the transformation matrix derivation unit 421 included in the inverse primary vertical transform unit 412 is also performed by a flow similar to the flowchart in FIG. 61. For example, in the flowchart in FIG. 61, interpretation is simply made by replacing the transform type identifier TrTypeIdxH with TrTypeIdxV, and replacing the transformation matrix $T_H$ with the transformation matrix $T_V$.

Moreover, in the case of the present example, in step S461 in FIG. 42, the transformation matrix derivation processing executed by the transformation matrix derivation unit 451 included in the inverse primary horizontal transform unit 413 is also performed by a flow similar to the flowchart in FIG. 61.

Therefore, description of the processing is omitted.

3. SECOND EMBODIMENT

3-1. Common Concept

<Prediction Residual Permutation Operation>

In the first embodiment, operating the transformation matrix to generate another transformation matrix has been described. However, not only a transformation matrix but also a prediction residual may be operated. That is, a prediction residual of an image may be operated for permutation, the prediction residual operated for permutation may be orthogonally transformed using a transformation matrix serving as a base, and coefficient data obtained by orthogonally transforming the prediction residual may be encoded to generate a bit stream.

For example, an image processing apparatus may include an operation unit configured to perform an operation for permutation for a prediction residual of an image, an orthogonal transform unit configured to orthogonally transform the prediction residual operated for permutation by the operation unit, using a transformation matrix serving as a base, and an encoding unit configured to encode coefficient data obtained by orthogonally transforming the prediction residual by the orthogonal transform unit to generate a bit stream.

Even in this case, two-dimensional orthogonal transform equivalent to the case of the first embodiment can be implemented. That is, orthogonal transform using another transformation matrix can be substantially implemented by orthogonal transform using a certain transformation matrix. Therefore, an increase in the number of transformation matrices prepared for orthogonal transform can be suppressed, and an increase in memory capacity required for orthogonal transform can be suppressed, similarly to the case of the first embodiment.

Furthermore, since the number of operations can be reduced as compared with the case of the first embodiment, an increase in a processing amount of orthogonal transform can be suppressed.

Furthermore, a bit stream may be decoded to obtain coefficient data that is an orthogonally transformed prediction residual of an image, the obtained coefficient data may be inversely orthogonally transformed, and an inverse orthogonal transform result of the obtained coefficient data may be permuted.

For example, the image processing apparatus may include a decoding unit configured to decode a bit stream to obtain coefficient data that is an orthogonally transformed prediction residual of an image, an inverse orthogonal transform unit configured to inversely orthogonally transform the coefficient data obtained by the decoding unit, and an operation unit configured to perform an operation for permutation for an inverse orthogonal transform result of the coefficient data obtained by the inverse orthogonal transform unit.

Even in this case, inverse two-dimensional orthogonal transform equivalent to the case of the first embodiment can be implemented. That is, inverse orthogonal transform by another transformation matrix can be substantially implemented by inverse orthogonal transform using a certain transformation matrix. Therefore, an increase in the number of transformation matrices prepared for inverse orthogonal transform can be suppressed, and an increase in memory capacity required for inverse orthogonal transform can be suppressed, similarly to the case of the first embodiment. Furthermore, since the number of operations can be reduced as compared with the case of the first embodiment, an increase in a processing amount of inverse orthogonal transform can be suppressed.

More specific description will be given. When focusing on a spatial symmetric property of two different two-dimensional orthogonal transforms (including a prediction residual), there are some cases where axial symmetry exists between one-dimensional orthogonal transforms in a certain direction (horizontal direction or vertical direction), such as between a transformation matrix of DST7 and a transformation matrix of FlipDST7 that is a flipped transformation matrix of DST7. Furthermore, as for the prediction residual, there are some cases where an axial symmetric property exists between prediction residuals in a certain direction (horizontal direction or vertical direction), such as between a prediction residual (X) and a flipped prediction residual (X·J).

Figure 63:
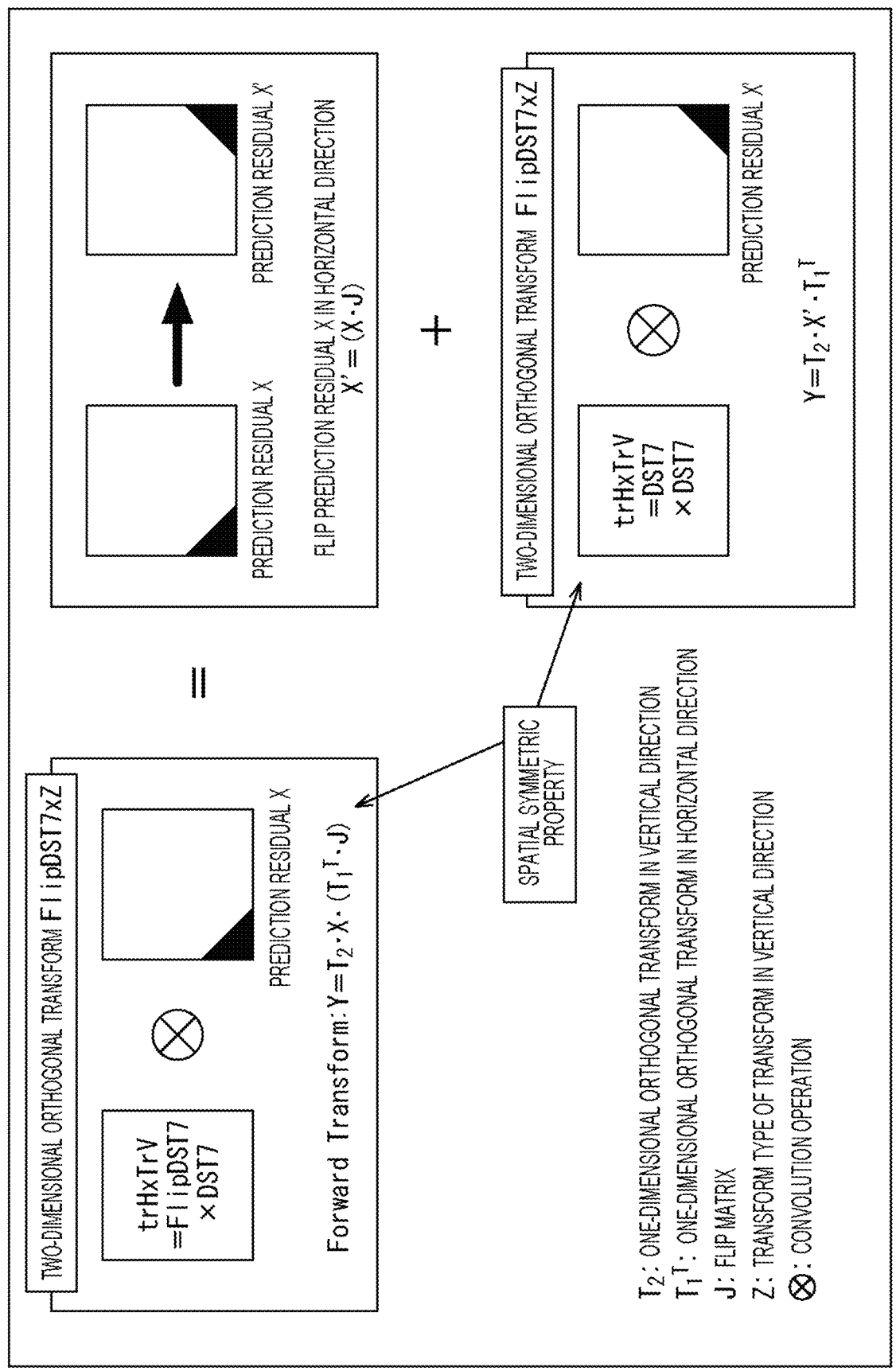
FIG. 63 is a diagram for describing a spatial symmetric property of two-dimensional orthogonal transform.

In such a case, for example, as illustrated in FIG. 63, by orthogonally transforming a flipped original prediction residual, using a first transformation matrix, orthogonal transform of the original prediction residual using a second transformation matrix that is the flipped first transformation matrix can be substituted.

In the case of the example in FIG. 63, on the left side in FIG. 63, vertical one-dimensional orthogonal transform using the first transformation matrix, and horizontal one-dimensional orthogonal transform using the flipped first transformation matrix are performed for the original prediction residual, as in the following expression (53).

[Math. 49]

$$Y = T^2 \cdot X \cdot (T_1^T \cdot J) \tag{53}$$

Meanwhile, on the right side in FIG. 63, flip of the prediction residual (the expression (54) below) and vertical and horizontal one-dimensional orthogonal transforms using the first transformation matrix for the flipped prediction residual (the expression (55) below) are illustrated.

[Math. 50]

$$X' = (X \cdot J) \tag{54}$$

$$Y = T_2 \cdot X' \cdot T_1^T \tag{5}$$

Such two two-dimensional orthogonal transforms have a spatial symmetric property. Thus, one can be substituted by the other.

In other words, in the case where a spatial symmetric property is present between a base transformation matrix (transform type) and a transformation matrix used for orthogonal transform of a prediction residual, which is derived using the base transformation matrix, orthogonal transform using another transformation matrix (orthogonal transform for a prediction residual before flip, using a transformation matrix derived using a base transformation matrix) can be substituted by flipping the prediction residual in the direction of the spatial symmetric property, and orthogonally transforming the flipped prediction residual, using the base transformation matrix.

That is, the operation unit may flip the prediction residual in the spatial symmetric direction between one-dimensional orthogonal transforms, and the orthogonal transform unit may orthogonally transform the prediction residual flipped by the operation unit, using the transformation matrix serving as a base. By doing so, orthogonal transform equivalent to orthogonal transform using another transformation matrix can be performed. That is, as described above, orthogonal transform using another transformation matrix can be substantially implemented. Therefore, an increase in the number of transformation matrices prepared for the orthogonal transform can be suppressed, and an increase in the memory capacity required for the orthogonal transform can be suppressed.

This similarly applies to the inverse orthogonal transform. That is, the coefficient data obtained by decoding a bit stream may be inversely orthogonally transformed using the base transformation matrix, and an inverse orthogonal transform result may be flipped in the spatial symmetric direction between one-dimensional orthogonal transforms by the operation unit. With the configuration, the inverse orthogonal transform using another transformation matrix can be substantially implemented. Therefore, an increase in the number of transformation matrices prepared for the inverse orthogonal transform can be suppressed, and an increase in memory capacity required for the inverse orthogonal transform can be suppressed.

Figure 64:
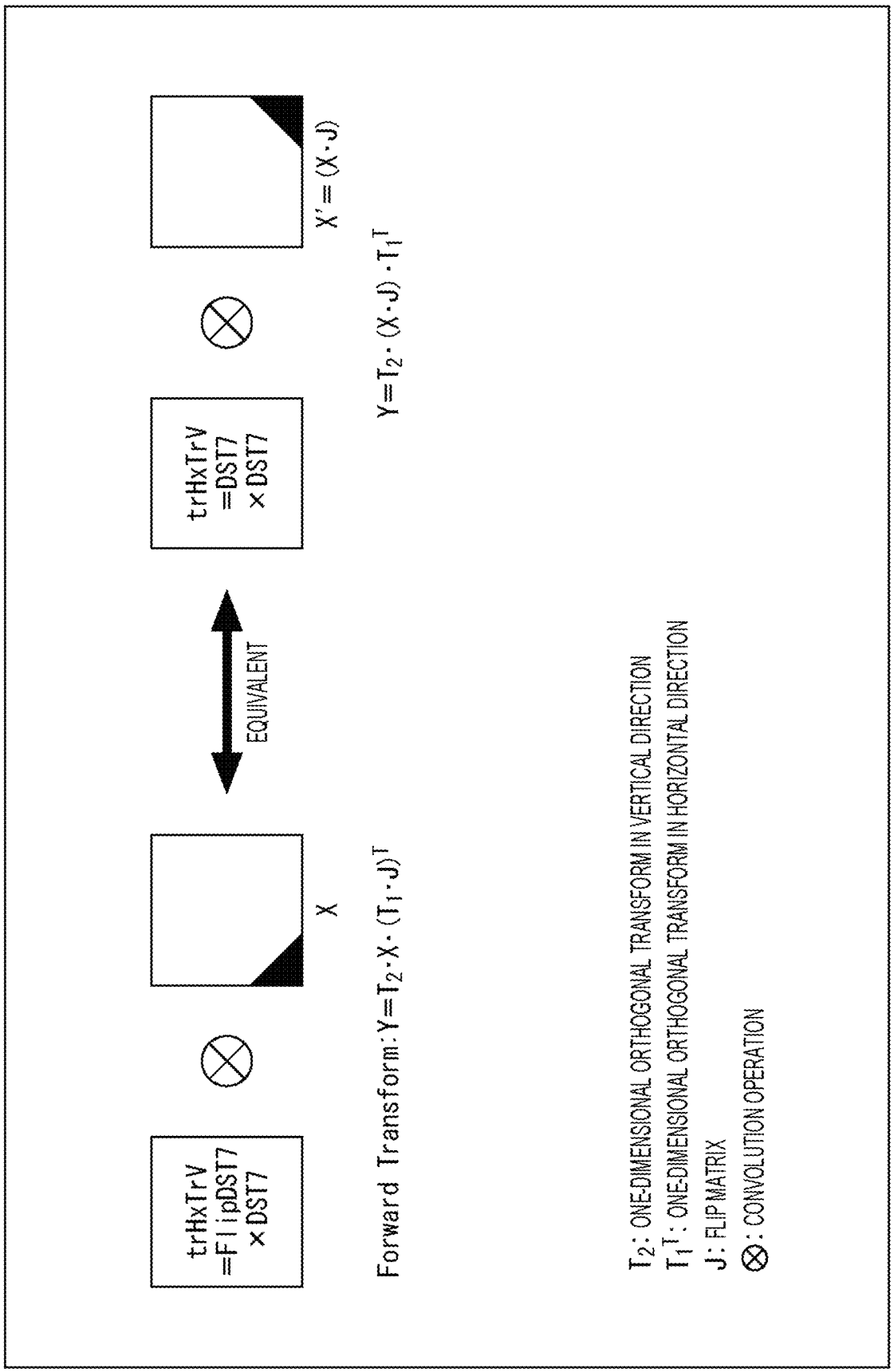
FIG. 64 is a diagram for describing a horizontal symmetric property.

For example, the left side in FIG. 64 illustrates two-dimensional orthogonal transform in which horizontal one-dimensional orthogonal transform using FlipDST7 that is a flipped transformation matrix of DST7, and vertical one-dimensional orthogonal transform using a transformation matrix of DST7 are performed for a prediction residual X. Furthermore, the right side in FIG. 64 illustrates two-dimensional orthogonal transform in which horizontal and vertical one-dimensional orthogonal transforms using the transformation matrix of DST7 are performed for a prediction residual X' (=X·J) obtained by horizontally flipping the prediction residual X. These are horizontally symmetric with each other and are equivalent. Therefore, for example, the former two-dimensional orthogonal transform can be substituted by the latter two-dimensional orthogonal transform. Note that the former two-dimensional orthogonal transform is expressed by the following expression (56), and the latter two-dimensional orthogonal transform is expressed by the following expression (57).

[Math. 51]

$$Y = T_2 \cdot X \cdot (T_1 \cdot J)^T \tag{56}$$

$$Y = T_2 \cdot (X \cdot J) \cdot T_1^T \tag{57}$$

That is, for example, in a case where a horizontal symmetric property is present between a base transformation matrix (transform type), and a transformation matrix to be used for prediction residual orthogonal transform, the transformation matrix being derived using the base transformation matrix, the operation unit may horizontally flip the prediction residual, and the orthogonal transform unit may orthogonally transform the prediction residual horizontally flipped by the operation unit, using the base transformation matrix. By doing so, orthogonal transform using another transformation matrix having a horizontal symmetric property with the orthogonal transform using the base transformation matrix can be substantially implemented.

This similarly applies to the inverse orthogonal transform. That is, in a case where a horizontal symmetric property is present between a base transformation matrix (transform type), and a transformation matrix to be used for coefficient data inverse orthogonal transform, the transformation matrix being derived using the base transformation matrix, the inverse orthogonal transform unit may inversely orthogonally transform the coefficient data obtained by decoding the bit stream, using the base transformation matrix, and the operation unit may horizontally flip an inverse orthogonal transform result. By doing so, inverse orthogonal transform using another transformation matrix having a horizontal symmetric property with the inverse orthogonal transform using the base transformation matrix can be substantially implemented.

Figure 65:
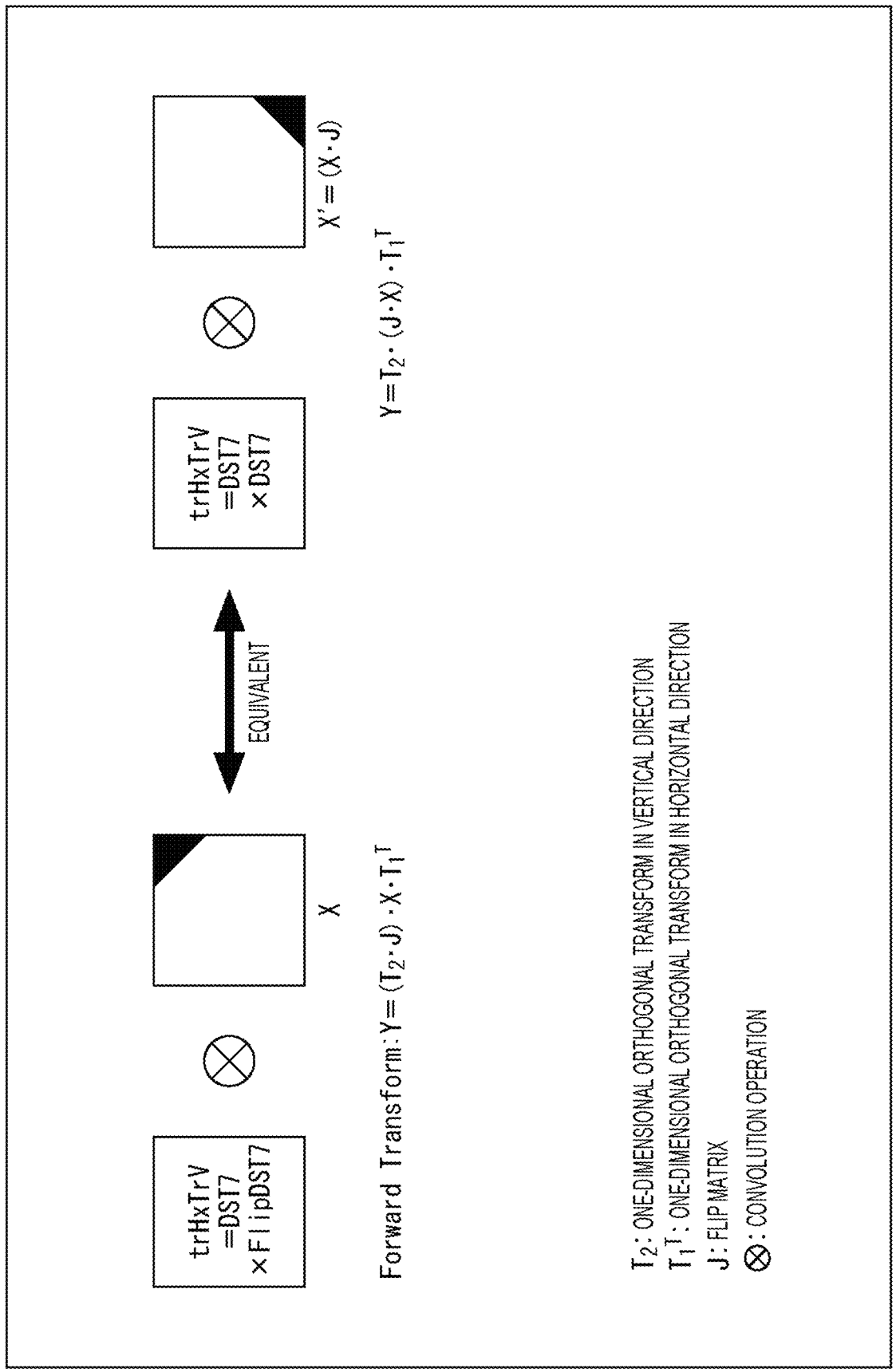
FIG. 65 is a diagram for describing a vertical symmetric property.

Furthermore, for example, the left side in FIG. 65 illustrates two-dimensional orthogonal transform in which horizontal one-dimensional orthogonal transform using the transformation matrix of DST7, and vertical one-dimensional orthogonal transform using FlipDST7 that is the flipped transformation matrix of DST7 are performed for the prediction residual X. Furthermore, the right side in FIG. 65 illustrates two-dimensional orthogonal transform in which horizontal and vertical one-dimensional orthogonal transforms using the transformation matrix of DST7 are performed for the prediction residual X' (=J·X) obtained by vertically flipping the prediction residual X. These are vertically symmetric with each other and are equivalent. Therefore, for example, the former two-dimensional orthogonal transform can be substituted by the latter two-dimensional orthogonal transform. Note that the former two-dimensional orthogonal transform is expressed by the following expression (58), and the latter two-dimensional orthogonal transform is expressed by the following expression (59).

[Math. 52]

$$Y = (T_2 \cdot J) \cdot X \cdot T_1^T \tag{58}$$

$$Y = T_2 \cdot (J \cdot X) \cdot T_1^T \tag{59}$$

That is, for example, in a case where a vertical symmetric property is present between a base transformation matrix (transform type), and a transformation matrix to be used for prediction residual orthogonal transform, the transformation matrix being derived using the base transformation matrix, the operation unit may vertically flip the prediction residual, and the orthogonal transform unit may orthogonally transform the prediction residual vertically flipped by the operation unit, using the base transformation matrix. By doing so, orthogonal transform using another transformation matrix having a vertical symmetric property with the orthogonal transform using the base transformation matrix can be substantially implemented.

This similarly applies to the inverse orthogonal transform. That is, in a case where a vertical symmetric property is present between a base transformation matrix (transform type), and a transformation matrix to be used for coefficient data inverse orthogonal transform, the transformation matrix being derived using the base transformation matrix, the inverse orthogonal transform unit may inversely orthogonally transform the coefficient data obtained by decoding the bit stream, using the base transformation matrix, and the operation unit may vertically flip an inverse orthogonal transform result. By doing so, inverse orthogonal transform using another transformation matrix having a vertical symmetric property with the inverse orthogonal transform using the base transformation matrix can be substantially implemented.

Figure 66:
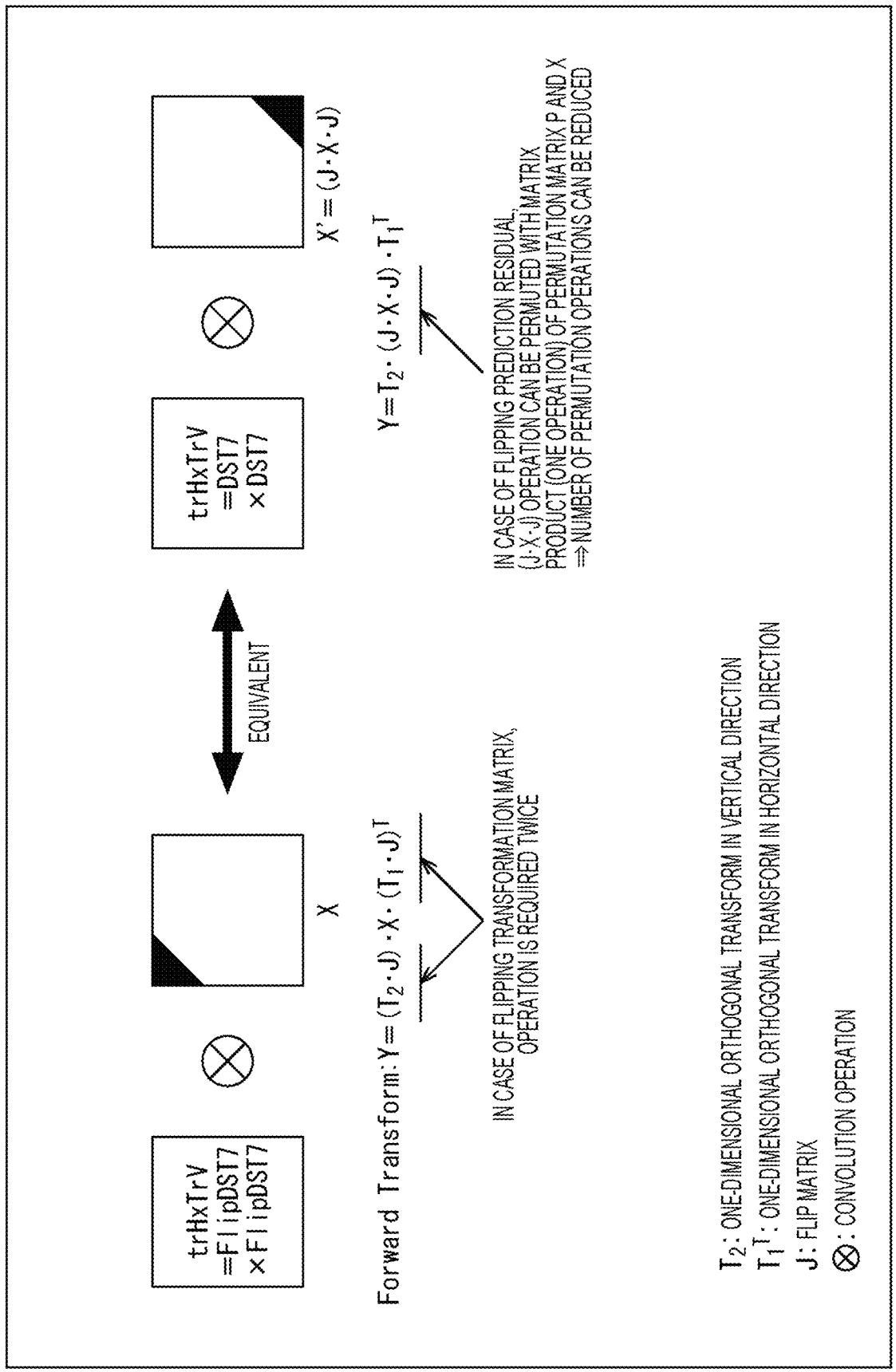
FIG. 66 is a diagram for describing horizontal and vertical symmetric properties.

Moreover, for example, the left side in FIG. 66 illustrates two-dimensional orthogonal transform in which horizontal and vertical one-dimensional orthogonal transforms using FlipDST7 that is the flipped transformation matrix of DST7 are performed for the prediction residual X. Furthermore, the right side in FIG. 66 illustrates two-dimensional orthogonal transform in which horizontal and vertical one-dimensional orthogonal transforms using the transformation matrix of DST7 are performed for the prediction residual X' (=J·X·J) obtained by horizontally and vertically flipping the prediction residual X. These are horizontally and vertically symmetric with each other and are equivalent. Therefore, for example, the former two-dimensional orthogonal transform can be substituted by the latter two-dimensional orthogonal transform. Note that the former two-dimensional orthogonal transform is expressed by the following expression (60), and the latter two-dimensional orthogonal transform is expressed by the following expression (61).

[Math. 53]

$$Y=(T_2 \cdot J) \cdot X \cdot (T_1 \cdot J)^T \quad (60)$$

$$Y=T_2 \cdot (J \cdot X \cdot J) \cdot (T_1^T) \quad (61)$$

That is, for example, in a case where horizontal and vertical symmetric properties are present between a base transformation matrix (transform type), and a transformation matrix to be used for prediction residual orthogonal transform, the transformation matrix being derived using the base transformation matrix, the operation unit may horizontally and vertically flip the prediction residual, and the orthogonal transform unit may orthogonally transform the prediction residual horizontally and vertically flipped by the operation unit, using the base transformation matrix. By doing so, orthogonal transform using another transformation matrix having horizontal and vertical symmetric properties with the orthogonal transform using the base transformation matrix can be substantially implemented.

This similarly applies to the inverse orthogonal transform. That is, in a case where horizontal and vertical symmetric properties are present between a base transformation matrix (transform type), and a transformation matrix to be used for coefficient data inverse orthogonal transform, the transformation matrix being derived using the base transformation matrix, the inverse orthogonal transform unit may inversely orthogonally transform the coefficient data obtained by decoding the bit stream, using the base transformation matrix, and the operation unit may horizontally and vertically flip an inverse orthogonal transform result. By doing so, inverse orthogonal transform using another transformation matrix having horizontal and vertical symmetric properties with the inverse orthogonal transform using the base transformation matrix can be substantially implemented.

Note that, in the case of the above expression (60), transformation matrices $T_1$ and $T_2$ are flipped, so that the operation is required twice. In contrast, in the case of the above expression (61), the flip of the prediction residual (J·X·J) can be permuted with a matrix product of a permutation matrix P and the prediction residual X. That is, the operation is required once. Therefore, the number of operations can be reduced as compared with the case of the above expression (60) (in the case of flipping the transformation matrix), and an increase in the processing amount of the orthogonal transform/inverse orthogonal transform can be suppressed (the orthogonal transform/inverse orthogonal transforms can be more easily performed). That is, an increase in the load of the orthogonal transform/inverse orthogonal transform processing can be suppressed. Furthermore, the orthogonal transform/inverse orthogonal transform can be performed at higher speed.

<Sign Inversion of Transformation Matrix>

An operation of a transformation matrix may be applied in addition to the permutation operation of the prediction residual. For example, the derivation unit may derive the second transformation matrix using the first transformation matrix, the operation unit may flip the prediction residual in a spatial symmetric direction between one-dimensional orthogonal transforms, and the orthogonal transform unit may orthogonally transform the prediction residual flipped by the operation unit, using the second transformation matrix derived by the derivation unit. By doing so, orthogonal transform using another transformation matrix can be substantially implemented. Therefore, an increase in the number of transformation matrices prepared for the orthogonal transform can be suppressed, and an increase in the memory capacity required for the orthogonal transform can be suppressed.

This similarly applies to the inverse orthogonal transform. For example, the derivation unit may derive the second transformation matrix using the first transformation matrix, the inverse orthogonal transform unit may inversely orthogonally transform the coefficient data obtained by the decoding unit, using the second transformation matrix derived by the derivation unit, and the operation unit may permute the inverse orthogonal transform result of the coefficient data obtained by the inverse orthogonal transform unit. By doing so, inverse orthogonal transform using another transformation matrix can be substantially implemented. Therefore, an increase in the number of transformation matrices prepared for the inverse orthogonal transform can be suppressed, and an increase in the memory capacity required for the inverse orthogonal transform can be suppressed.

Note that, in the derivation in the orthogonal transform or the inverse orthogonal transform, the derivation unit may derive the second transformation matrix having the same number of rows and the same number of columns as the first transformation matrix. In a case of changing the number of rows and columns, there is a possibility that the waveform type unintentionally changes. Therefore, by setting the number of rows and columns to be the same as those of the first transformation matrix, the possibility of an unintended change in the waveform type can be suppressed and the second transformation matrix can be more easily derived.

Furthermore, in the derivation of the second transformation matrix, the derivation unit may invert the sign of an odd-numbered row vector of the first transformation matrix to derive the second transformation matrix. By performing orthogonal transform by permuting the prediction residual, using the second transformation matrix derived as described above, orthogonal transform for a prediction residual, using another transformation matrix where an even-numbered row vector is axially symmetric and an odd-numbered row vector is point-symmetric with respect to the first transformation matrix can be implemented (substituted). Furthermore, by performing inverse orthogonal transform using the second transformation matrix derived as described above, and permuting an inverse orthogonal transform result, as described above, inverse orthogonal transform using another transformation matrix where an even-numbered row vector is axially symmetric and an odd-numbered row vector is point-symmetric with respect to the first transformation matrix can be implemented (substituted).

<Prediction Residual Operation Example>

A list of prediction residual operation examples for substituting the orthogonal transform/inverse orthogonal transform using another transformation matrix is illustrated in FIG. 67.

In the table illustrated in FIG. 67, the operation of the first row example from the top except the uppermost row of item names focuses on the fact that an axial symmetric property is present between one-dimensional orthogonal transforms in a certain direction (one or both of horizontal direction and vertical direction) in two different two-dimensional orthogonal transforms.

In this case, the operation unit flips the prediction residual in the spatial symmetric direction between one-dimensional orthogonal transforms, and the orthogonal transform unit orthogonally transforms the prediction residual flipped by the operation unit, using the transformation matrix serving as a base. More specifically, the operation unit flips the prediction residual, and the orthogonal transform unit uses the transformation matrix of DST7 as a base transformation matrix $T_{base}$ and orthogonally transforms the flipped prediction residual using the transformation matrix of DST7. By doing so, orthogonal transform for an unflipped prediction residual using the transformation matrix of FlipDST7 can be substituted. Note that the direction of flipping the prediction residual corresponds to the spatial symmetric direction (one or both of the horizontal direction and vertical direction).

This similarly applies to the inverse orthogonal transform. The inverse orthogonal transform unit inversely orthogonally transforms the coefficient data obtained by decoding a bit stream, using the base transformation matrix, and the operation unit flips an inverse orthogonal transform result in a spatial symmetric direction between one-dimensional orthogonal transforms. More specifically, the inverse orthogonal transform unit inversely orthogonally transforms the coefficient data, using the transformation matrix of DST7, and the operation unit flips an inverse orthogonal transform result. By doing so, the inverse orthogonal transform of the coefficient data using the transformation matrix of FlipDST7 can be substituted. Note that the direction of flipping the inverse orthogonal transform result corresponds to the spatial symmetric direction (one or both of the horizontal direction and vertical direction).

By applying such an operation for the prediction residual (including the inverse orthogonal transform result), it becomes unnecessary to prepare the transformation matrix of FlipDST7 as a candidate for a transformation matrix to be used for orthogonal transform/inverse orthogonal transform. That is, the number of unique transform types can be reduced, similarly to the case of the first embodiment. That is, an increase in the LUT size can be suppressed. Furthermore, by performing the orthogonal transform/inverse orthogonal transform involving such an operation for the prediction residual (including the inverse orthogonal transform result), similar coding efficiency to the case of the orthogonal transform/inverse orthogonal transform using the transformation matrix of FlipDST7 can be obtained.

Furthermore, since the two-dimensional flip operation for the prediction residual (including the inverse orthogonal transform result) can be performed by a collective operation, the number of flip operations can be reduced, as compared with the case of the orthogonal transform/inverse orthogonal transform using the transformation matrix of FlipDST7. Therefore, an increase in the processing amount of the orthogonal transform/inverse orthogonal transform (the orthogonal transform/inverse orthogonal transform can be more easily performed). That is, an increase in the load of the orthogonal transform/inverse orthogonal transform processing can be suppressed. Furthermore, the orthogonal transform/inverse orthogonal transform can be performed at higher speed.

Furthermore, the operation one row below the first row example (the second row from the top) focuses on similarity between one-dimensional orthogonal transforms in a certain direction (one or both of the horizontal direction and vertical direction) in the two different two-dimensional orthogonal transforms More specifically, attention is paid to an axial symmetric property in even-numbered row vectors and a point-symmetric property in odd-numbered row vectors.

In this case, the derivation unit derives the second transformation matrix, using the first transformation matrix, the operation unit permutes the prediction residual of an image, and the orthogonal transform unit orthogonally transforms the prediction residual permuted by the operation unit, using the second transformation matrix derived by the derivation unit. More specifically, the derivation unit inverts the sign of an odd-numbered row vector of the transformation matrix of DST7, the operation unit flips the prediction residual, and the orthogonal transform unit orthogonally transforms the flipped prediction residual, using a transformation matrix obtained by inverting the sign of the odd-numbered row vector of the transformation matrix of DST7, which has been derived by the derivation unit. By doing so, the orthogonal transform of an unflipped prediction residual using the transformation matrix of DCT8 can be substituted.

Note that the direction of flipping the prediction residual corresponds to the spatial symmetric direction (one or both of the horizontal direction and vertical direction). Further, since the operation for the transformation matrix is only the sign inversion for the odd-numbered row vector, the number of rows and columns of the transformation matrix derived by the derivation unit are the same as those of DST7.

This similarly applies to the inverse orthogonal transform. The derivation unit derives the second transformation matrix, using the first transformation matrix, the inverse orthogonal transform unit inversely orthogonally transforms the coefficient data obtained by decoding a bit stream, using the second transformation matrix, and the operation unit flips an inverse orthogonal transform result in the spatial symmetric direction between one-dimensional orthogonal transforms. More specifically, the derivation unit inverts the sign of an odd-numbered row vector of the transformation matrix of DST7, the inverse orthogonal transform unit inversely orthogonally transforms the coefficient data, using the transformation matrix of DST7 with the inverted sign of the odd-numbered row vector, and the operation unit flips an inverse orthogonal transform result. By doing so, the inverse orthogonal transform of the coefficient data using the transformation matrix of DCT8 can be substituted.

Note that the direction of flipping the inverse orthogonal transform result corresponds to the spatial symmetric direction (one or both of the horizontal direction and vertical direction). Further, since the operation for the transformation matrix is only the sign inversion for the odd-numbered row vector, the number of rows and columns of the transformation matrix derived by the derivation unit are the same as those of DST7.

By applying such an operation for the prediction residual (including the inverse orthogonal transform result), it becomes unnecessary to prepare the transformation matrix of DCT8 as a candidate for a transformation matrix to be used for orthogonal transform/inverse orthogonal transform. That is, the number of unique transform types can be reduced, similarly to the case of the first embodiment. That is, an increase in the LUT size can be suppressed. Furthermore, by performing the orthogonal transform/inverse orthogonal transform involving such an operation for the prediction residual (including the inverse orthogonal transform result), the same coding efficiency as the case of the orthogonal transform/inverse orthogonal transform using the transformation matrix of DCT can be obtained.

Furthermore, the operation one row below the second row example (the third row from the top) focuses on an axial symmetric property between one-dimensional orthogonal transforms in a certain direction (one or both of horizontal direction and vertical direction) in two different two-dimensional orthogonal transforms. This operation is the same as the operation of the first row from the top.

Note that, in this case, the transformation matrix of DCT8 is used as the base transformation matrix $T_{base}$. Therefore, by doing so, the orthogonal transform of an unflipped prediction residual using the transformation matrix of FlipDCT8 can be substituted. This similarly applies to the inverse orthogonal transform. That is, by doing so, the inverse orthogonal transform of the coefficient data using the transformation matrix of FlipDCT8 can be substituted.

Furthermore, the operation one row below the third row example (the fourth row from the top) focuses on similarity between one-dimensional orthogonal transforms in a certain direction (one or both of horizontal direction and vertical direction) (an axial symmetric property of even-numbered row vectors, and a point-symmetric property of odd-numbered row vectors) in two different two-dimensional orthogonal transforms. This operation is the same as the operation of the second row from the top.

Note that, in this case, the transformation matrix of DCT8 is used as the base transformation matrix $T_{base}$. Therefore, by doing so, the orthogonal transform of an unflipped prediction residual using the transformation matrix of DST7 can be substituted. This similarly applies to the inverse orthogonal transform. That is, by doing so, the inverse orthogonal transform of the coefficient data using the transformation matrix of DST7 can be substituted.

Note that each of the above-described derivation examples may be performed independently or may be performed in combination of a plurality of derivation examples. Furthermore, in the above-described example, an example of a base transform type (first transform type) has been described using DST7 or DCT8. However, the derivation can be implemented by replacing the transform type with a transform type having the same type of waveform shape, as illustrated in FIG. 8. For example, DST7 may be replaced with another orthogonal transform having the same type of waveform shape, such as DST4, DST8, or DST3. Similarly, DCT8 may be replaced with another orthogonal transform having the same type of waveform shape, such as DCT3, DCT7, or DCT4.

<Flow of Configuration and Processing>

A configuration of an image encoding device 100 that performs such a prediction residual permutation operation is similar to the case of the first embodiment. Then, in the image encoding device 100, an orthogonal transform unit 113 performs processing to which the above-described present technology is applied, as an operation unit and an orthogonal transform unit. Furthermore, the encoding unit 115 performs processing to which the above-described present technology is applied, as an encoding unit. Furthermore, an inverse orthogonal transform unit 118 performs processing to which the above-described present technology is applied, as an inverse orthogonal transform unit and an operation unit. Therefore, the image encoding device 100 can suppress an increase in the memory capacity required for the orthogonal transform/inverse orthogonal transform.

Furthermore, the configuration of the orthogonal transform unit 113 is similar to the case of the first embodiment. Then, in the orthogonal transform unit 113, a primary transform unit 152 performs processing to which the above-described present technology is applied, as an operation unit and an orthogonal transform unit. That is, the operation unit permutes the prediction residual of an image, and the orthogonal transform unit performs primary transform for the prediction residual permuted by the operation unit, using the transformation matrix serving as a base. Therefore, an increase in the memory capacity required for the primary transform can be suppressed.

Note that, as described above, the primary transform unit 152 performs the primary horizontal transform and the primary vertical transform as the primary transform. That is, the operation unit permutes the prediction residual of an image, and the orthogonal transform unit performs, for the permuted prediction residual, horizontal one-dimensional orthogonal transform using a second transformation matrix for horizontal one-dimensional orthogonal transform serving as a base, and further, vertical one-dimensional orthogonal transform using the second transformation matrix for vertical one-dimensional orthogonal transform serving as a base, as the primary transform. Therefore, an increase in the memory capacity required for the primary transform where the horizontal one-dimensional orthogonal transform and the vertical one-dimensional orthogonal transform are performed can be suppressed.

Note that a flow of image encoding processing executed by the image encoding device 100 is similar to the case of the first embodiment. That is, in the image encoding processing of the above flow, processing to which the above-described present technology is applied is performed as processing of step S106. Furthermore, processing to which the above-described present technology is applied is performed as processing of step S109. Moreover, processing to which the above-described present technology is applied is performed as processing of step S113. Therefore, by executing the image encoding processing, an increase in the memory capacity required for the orthogonal transform/inverse orthogonal transform can be suppressed.

Furthermore, a flow of orthogonal transform processing executed in step S106 of the image encoding processing is similar to the case of the first embodiment. That is, in the orthogonal transform processing of the above flow, processing to which the above-described present technology is applied is performed as processing of step S132. Therefore, by executing the orthogonal transform processing, an increase in the memory capacity required for the primary transform can be suppressed.

Furthermore, processing is similar on a decoding side. That is, a configuration of an image decoding device 200 that performs such a permutation operation of the inverse orthogonal transform result is similar to the case of the first embodiment. Then, in the image decoding device 200, an inverse orthogonal transform unit 214 performs processing to which the above-described present technology is applied, as an inverse orthogonal transform unit and an operation unit. Furthermore, the decoding unit 212 performs processing to which the above-described present technology is applied, as a decoding unit. Therefore, the image decoding device 200 can suppress an increase in the memory capacity required for the inverse orthogonal transform.

Furthermore, a configuration of an inverse orthogonal transform unit 214 is similar to the case of the first embodiment. Then, in the inverse orthogonal transform unit 214, an inverse primary transform unit 253 performs processing to which the above-described present technology is applied, as an inverse orthogonal transform unit and an operation unit. That is, the inverse orthogonal transform unit performs inverse primary transform for an inverse secondary transform result, using a transformation matrix serving as a base, and the operation unit permutes an obtained inverse primary transform result. Therefore, an increase in the memory capacity required for the inverse primary transform can be suppressed.

Note that the above-described inverse primary transform unit 253 performs the inverse primary vertical transform and the inverse primary horizontal transform as the inverse primary transform. That is, the inverse orthogonal transform unit performs, for the inverse secondary transform result, vertical inverse one-dimensional orthogonal transform using a second transformation matrix for vertical inverse one-dimensional orthogonal transform serving as a base and further, horizontal inverse one-dimensional orthogonal transform using a second transformation matrix for horizontal inverse one-dimensional orthogonal transform serving as a base, as the inverse primary transform. Therefore, an increase in the memory capacity required for the primary transform in which the vertical inverse one-dimensional orthogonal transform and the horizontal inverse one-dimensional orthogonal transform are performed can be suppressed.

Note that a flow of image decoding processing executed by the image decoding device 200 is similar to the case of the first embodiment. That is, in the image decoding processing of the above flow, processing to which the above-described present technology is applied is performed as processing of step S202. Furthermore, processing to which the above-described present technology is applied is performed as processing of step S204. Therefore, by executing the image decoding processing, an increase in the memory capacity required for the inverse orthogonal transform can be suppressed.

Furthermore, a flow of inverse orthogonal transform processing executed in step S204 of the image decoding processing is similar to the case of the first embodiment. That is, in the inverse orthogonal transform processing of the above flow, processing to which the above-described present technology is applied is performed as processing of step S233. Therefore, by executing the inverse orthogonal transform processing, an increase in the memory capacity required for the inverse primary transform can be suppressed.

3-2. Example 2-1

<Concept>

Next, each derivation example described with reference to FIG. 67 will be described in more detail. First, in the table illustrated in FIG. 67, the operation of the first row example from the top except the uppermost row of item names focuses on an axial symmetric property between one-dimensional orthogonal transforms in a certain direction (one or both of horizontal direction and vertical direction) in two different two-dimensional orthogonal transforms.

In this case, the operation unit flips the prediction residual. The orthogonal transform unit orthogonally transforms the flipped prediction residual, using the base transformation matrix (transformation matrix of DST7). By doing so, the orthogonal transform of the prediction residual using the transformation matrix of FlipDST7 (see <2-2. Example 1-1>) that is the flipped transformation matrix of DST7 can be substituted.

This similarly applies to the inverse orthogonal transform. In this case, the inverse orthogonal transform unit inversely orthogonally transforms the coefficient data, using the base transformation matrix (transformation matrix of DST7), and the operation unit flips the inverse orthogonal transform result. By doing so, the inverse orthogonal transform of the coefficient data (transform coefficient Coeff_IQ) using the transformation matrix of FlipDST7 that is the flipped transformation matrix of DST7 can be substituted.

By applying such an operation for the prediction residual (including the inverse orthogonal transform result), it becomes unnecessary to prepare the transformation matrix of FlipDST7 as a candidate for a transformation matrix to be used for orthogonal transform/inverse orthogonal transform. That is, the number of unique transform types can be reduced, similarly to the case of the first embodiment.

In this case, as illustrated in the table in FIG. 68, the five types of transformation matrices required in the case of the technology described in Non-Patent Document 1 (see the table A in FIG. 6) can be reduced to four types. Therefore, the total LUT size can be about 47 KB. That is, the size of the LUT can be reduced (by about 53 KB (the table A in FIG. 6)) as compared with the case of the technology described in Non-Patent Document 1. That is, an increase in the size of the LUT can be suppressed.

Furthermore, since the two-dimensional flip operation for the prediction residual (including the inverse orthogonal transform result) can be performed by a collective operation, the number of flip operations can be reduced, as compared with the case of the orthogonal transform/inverse orthogonal transform using the transformation matrix of FlipDST7. Therefore, an increase in the processing amount of the orthogonal transform/inverse orthogonal transform (the orthogonal transform/inverse orthogonal transform can be more easily performed).

Furthermore, by performing the orthogonal transform/inverse orthogonal transform involving such an operation for the prediction residual (including the inverse orthogonal transform result), similar coding efficiency to the case of the orthogonal transform/inverse orthogonal transform using the transformation matrix of FlipDST7 can be obtained.

<Primary Transform Unit>

Figure 69:
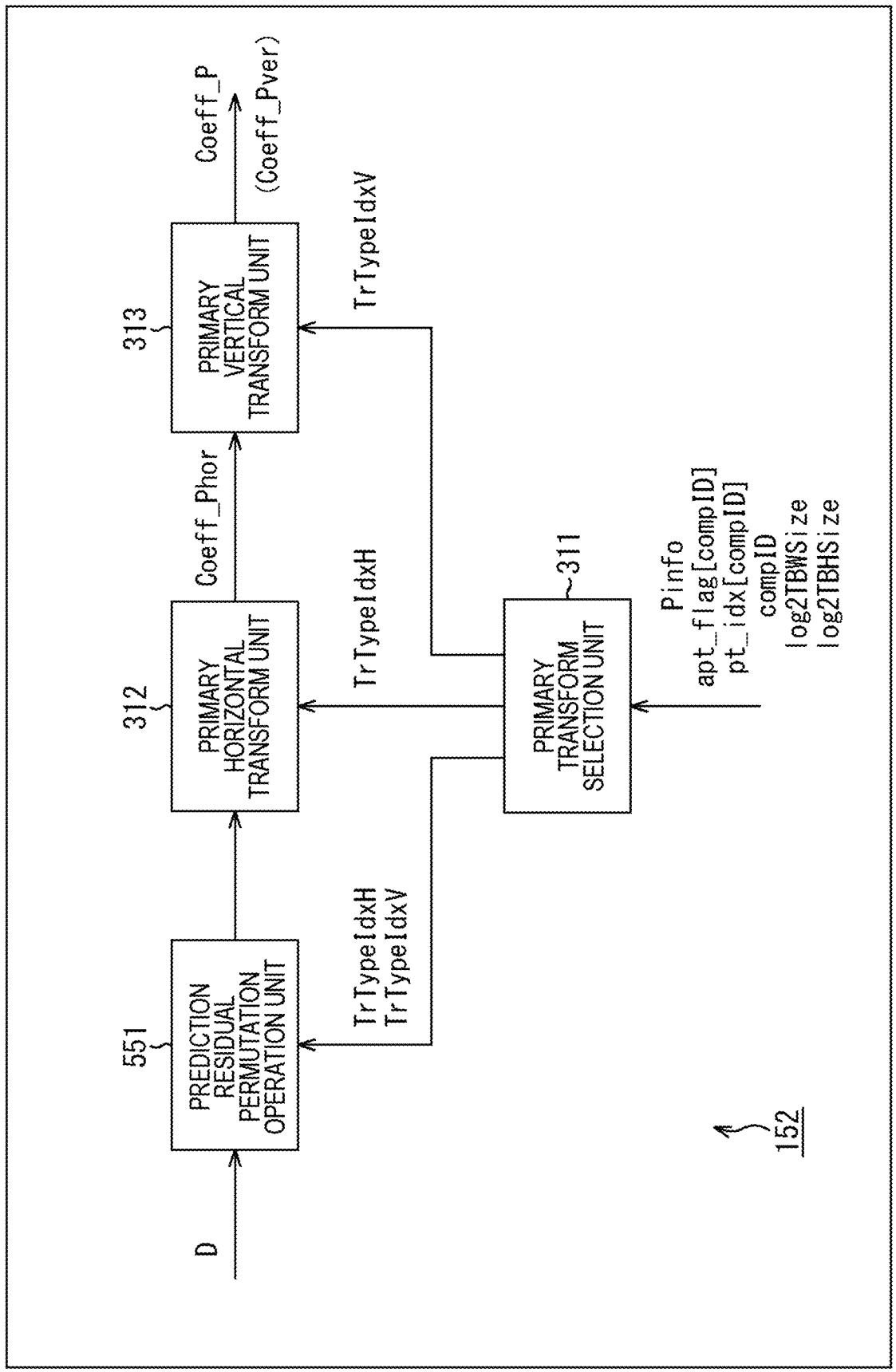
FIG. 69 is a block diagram illustrating a main configuration example of a primary transform unit.

Next, configurations, processing, and the like for performing such processing will be described. FIG. 69 is a block diagram illustrating a main configuration example of the primary transform unit 152 in this case. As illustrated in FIG. 69, the primary transform unit 152 in this case includes a prediction residual permutation operation unit 551, in addition to the configuration illustrated in FIG. 22.

A primary transform selection unit 311 supplies a derived transform type identifier TrTypeIdxH of primary horizontal transform and a derived transform type identifier TrTypeIdxV of primary vertical transform to the prediction residual permutation operation unit 551.

The prediction residual permutation operation unit 551 uses a prediction residual D supplied from a switch 151, the transform type identifier TrTypeIdxH of primary horizontal transform, and the transform type identifier TrTypeIdxV of primary vertical transform as inputs. The prediction residual permutation operation unit 551 flips the prediction residual D according to the transform type identifier TrTypeIdxH and the transform type identifier TrTypeIdxV. The prediction residual permutation operation unit 551 supplies a flipped prediction residual $D_{flip}$ to a primary horizontal transform unit 312.

In the primary transform unit 152 having the above configuration, the prediction residual permutation operation unit 551 performs processing to which the above-described present technology is applied, as an operation unit. The primary horizontal transform unit 312 and a primary vertical transform unit 313 perform performs processing to which the above-described present technology is applied as orthogonal transform units.

That is, the primary horizontal transform unit 312 performs horizontal one-dimensional orthogonal transform for the flipped prediction residual $D_{flip}$, using the transformation matrix for horizontal one-dimensional orthogonal transform serving as a base, as an orthogonal transform unit. Therefore, the primary horizontal transform unit 312 can suppress an increase in the memory capacity required for the horizontal one-dimensional orthogonal transform.

Furthermore, the primary vertical transform unit 313 performs vertical one-dimensional orthogonal transform for a transform coefficient Coeff_Phor after primary horizontal transform, using the transformation matrix for vertical one-dimensional orthogonal transform serving as a base, as an orthogonal transform unit. Therefore, the primary vertical transform unit 313 can suppress an increase in the memory capacity required for the vertical one-dimensional orthogonal transform.

<Flow of Primary Transform Processing>

Next, an example of a flow of processing performed by the above-described configuration will be described. Next, an example of a flow of the primary transform processing executed in step S132 in FIG. 14 in this case will be described with reference to the flowchart in FIG. 70.

When the primary transform processing is started, in step S561, the primary transform selection unit 311 of the primary transform unit 152 selects the transform type identifier TrTypeIdxH (or the transform type TrTypeH) of primary horizontal transform and the transform type identifier TrTypeIdxV (or the transform type TrTypeV) of primary vertical transform.

In step S562, the prediction residual permutation operation unit 551 executes prediction residual permutation operation processing, and flips the prediction residual D according to the transform type identifier TrTypeIdxH and the transform type identifier TrTypeIdxV obtained in step S561 to derive the flipped prediction residual $D_{flip}$.

In step S563, the primary horizontal transform unit 312 performs primary horizontal transform processing to perform primary horizontal transform for the flipped prediction residual $D_{flip}$ obtained in step S562, using a transformation matrix corresponding to the transform type identifier TrTypeIdxH of primary horizontal transform obtained in step S561.

In step S564, the primary vertical transform unit 313 performs primary vertical transform processing to perform primary vertical transform for the transform coefficient Coeff_Phor after primary horizontal transform obtained in the processing in step S563, using a transformation matrix corresponding to the transform type identifier TrTypeIdxV of primary vertical transform obtained in step S561.

When the processing in step S564 ends, the primary transform processing ends and the processing returns to FIG. 14.

In the above primary transform processing, processing to which the above-described present technology is applied is performed as each processing of step S562 to S564. Therefore, by executing the primary transform processing, an increase in the memory capacity required for the primary horizontal transform processing and the primary vertical transform processing can be suppressed.

<Flow of Prediction Residual Permutation Operation Processing>

A flow of the prediction residual permutation operation processing executed in step S562 in FIG. 70 will be described with reference to the flowchart in FIG. 71.

When the prediction residual permutation operation processing is started, in step S581, the prediction residual permutation operation unit 551 derives a flip flag FlipFlagH corresponding to the transform type identifier TrTypeIdxH (or the transform type TrTypeH) of primary horizontal transform and a flip flag FlipFlagV corresponding to the transform type identifier TrTypeIdxV (or the transform type TrTypeV) of primary vertical transform. At that time, the prediction residual permutation operation unit 551 obtains the flip flag FlipFlagH and the flip flag FlipFlagV by reference to a correspondence table (LUT_TrTypeIdxToFlipFlag) as illustrated in FIG. 72, for example. Derivation of these flip flags can be expressed as, for example, the following expression (62) and expression (63).

[Math. 54]

$$\text{FlipFlag}H = \text{LUT\_TrTypeIdxToFlipFlag}[\text{TrTypeIdx}H] \quad (62)$$

$$\text{FlipFlag}V = \text{LUT\_TrTypeIdxToFlipFlag}[\text{TrTypeIdx}V] \quad (63)$$

In step S582, the prediction residual permutation operation unit 551 determines whether or not the flip flag FlipFlagH and the flip flag FlipFlagV derived in step S581 satisfy a condition expressed in the following expression (64).

[Math. 55]

$$\text{FlipFlag}H == T \&\& \text{FlipFlag}V == F \quad (64)$$

In a case where it is determined that the condition is satisfied, that is, in a case where FlipFlagH is determined to be true (1) and FlipFlagV is determined to be false (0), the processing proceeds to step S583.

In step S583, the prediction residual permutation operation unit 551 horizontally flips the prediction residual D to obtain the flipped prediction residual $D_{flip}$. When this operation is expressed as a matrix, the operation can be expressed as the following expression (65).

[Math. 56]

$$D_{flip} = \text{Flip}H(D) = D \times J \quad (65)$$

Here, x is an operator representing a matrix product, FlipH (X) is an operator representing a flip operation for a matrix X in the horizontal direction, and a flip matrix J corresponding to FlipH (·) is a matrix obtained by right-left inverting a unit matrix I of N rows and N columns. Furthermore, in a case of expressing this operation as an operation for each element, the prediction residual permutation operation unit 551 sets an (i, . . . , N−1−j) component of the prediction residual D as the i-row j-column component ((i, j) component) of the flipped prediction residual $D_{flip}$, as in the following expression (66).

[Math. 57]

$$D_{flip}[i,j]=D[i,N-1-j]$$

$$\text{for } i,j=0,\ldots,M-1, j=0,\ldots,N-1 \quad (66)$$

Note that the size of the prediction residual D is a width N and a height M (M rows and N columns). N and M satisfy the following expressions (67) and (68).

[Math. 58]

$$N=1<<\log 2TBWSize \quad (67)$$

$$M=1<<\log 2TBHSize \quad (68)$$

When the processing in step S583 ends, the processing proceeds to step S588. Furthermore, in step S582, in a case where it is determined that the condition is not satisfied, that is, in a case where FlipFlagH is determined to be false (0) or FlipFlagV is determined to be true (1), the processing proceeds to step S584.

In step S584, the prediction residual permutation operation unit 551 determines whether or not the flip flag FlipFlagH and the flip flag FlipFlagV derived in step S581 satisfy a condition expressed in the following expression (69).

[Math. 59]

$$\text{FlipFlag}H==F\&\&\text{FlipFlag}V==T \quad (69)$$

In a case where it is determined that the condition is satisfied, that is, in a case where FlipFlagH is determined to be false (0) and FlipFlagV is determined to be true (1), the processing proceeds to step S585.

In step S585, the prediction residual permutation operation unit 551 vertically flips the prediction residual D to obtain the flipped prediction residual $D_{flip}$. When this operation is expressed as a matrix, the operation can be expressed as the following expression (70).

[Math. 60]

$$D_{flip}=\text{Flip}V(D)=J\times D \quad (70)$$

Here, x is an operator representing a matrix product, FlipV (X) is an operator representing a flip operation for a matrix X in the vertical direction, and a flip matrix J corresponding to FlipV (·) is a matrix obtained by right-left inverting a unit matrix I of M rows and M columns. Furthermore, in a case of expressing this operation as an operation for each element, the prediction residual permutation operation unit 551 sets an (M−1−i, j) component of the prediction residual D as the i-row j-column component ((i, j) component) of the flipped prediction residual $D_{flip}$, as in the following expression (71). Note that the size of the prediction residual D is a width N and a height M (M rows and N columns), and N and M satisfy the above-described expressions (67) and (68).

[Math. 61]

$$D_{flip}[i,j]=D[M-1-i,j]$$

$$\text{for } i=0,\ldots,N-1, j=0,\ldots,M-1 \quad (71)$$

When the processing in step S585 ends, the processing proceeds to step S588. Furthermore, in step S584, in a case where it is determined that the condition is not satisfied, that is, in a case where FlipFlagH is determined to be true (1) or FlipFlagV is determined to be false (0), the processing proceeds to step S586.

In step S586, the prediction residual permutation operation unit 551 determines whether or not the flip flag FlipFlagH and the flip flag FlipFlagV derived in step S581 satisfy a condition expressed in the following expression (72).

[Math. 62]

$$\text{FlipFlag}H==T\&\&\text{FlipFlag}V==T \quad (72)$$

In a case where it is determined that the condition is satisfied, that is, in a case where FlipFlagH is determined to be true (1) and FlipFlagV is determined to be true (1), the processing proceeds to step S587.

In step S587, the prediction residual permutation operation unit 551 horizontally and vertically flips the prediction residual D to obtain the flipped prediction residual $D_{flip}$. When this operation is expressed as a matrix, the operation can be expressed as the following expression (73).

[Math. 63]

$$D_{flip}=\text{Flip}H(\text{Flip}V(D))=J_2\times D\times J_1 \quad (73)$$

Here, x is an operator representing a matrix product, a flip matrix $J_1$ is a matrix obtained by inverting a unit matrix I of N rows and N columns, and a flip matrix $J_2$ is a matrix obtained by inverting a unit matrix I of M rows and M columns. Note that the flip matrix J is equivalent to the flip matrix J even when transposed ($J^T$=J). Furthermore, in a case of expressing this operation as an operation for each element, the prediction residual permutation operation unit 551 sets an (M−i−1, N−j−1) component of the prediction residual D as the i-row j-column component ((i, j) component) of the flipped prediction residual $D_{flip}$, as in the following expression (74). Note that the size of the prediction residual D is a width N and a height M (M rows and N columns), and N and M satisfy the above-described expressions (67) and (68).

[Math. 64]

$$D_{flip}[i,j]=D[M-1-i,N-1-j]$$

$$\text{for } i=0,\ldots,M-1, j=0,\ldots,N-1 \quad (74)$$

When the processing in step S587 ends, the processing proceeds to step S588.

In step S588, the prediction residual permutation operation unit 551 sets the flipped prediction residual $D_{flip}$ as the prediction residual D, as in the following expression (75). That is, the primary horizontal transform processing (step S563 in FIG. 70) is performed for the prediction residual D (flipped prediction residual $D_{flip}$).

[Math. 65]

$$D=D_{flip} \quad (75)$$

Figure 70:
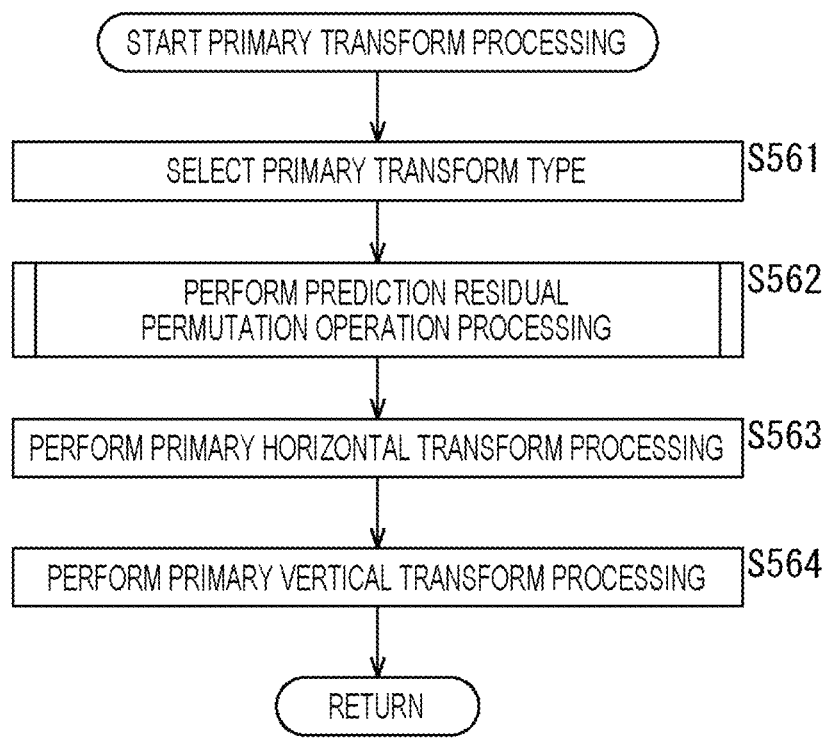
FIG. 70 is a flowchart for describing an example of a flow of primary transform processing.
Figure 71:
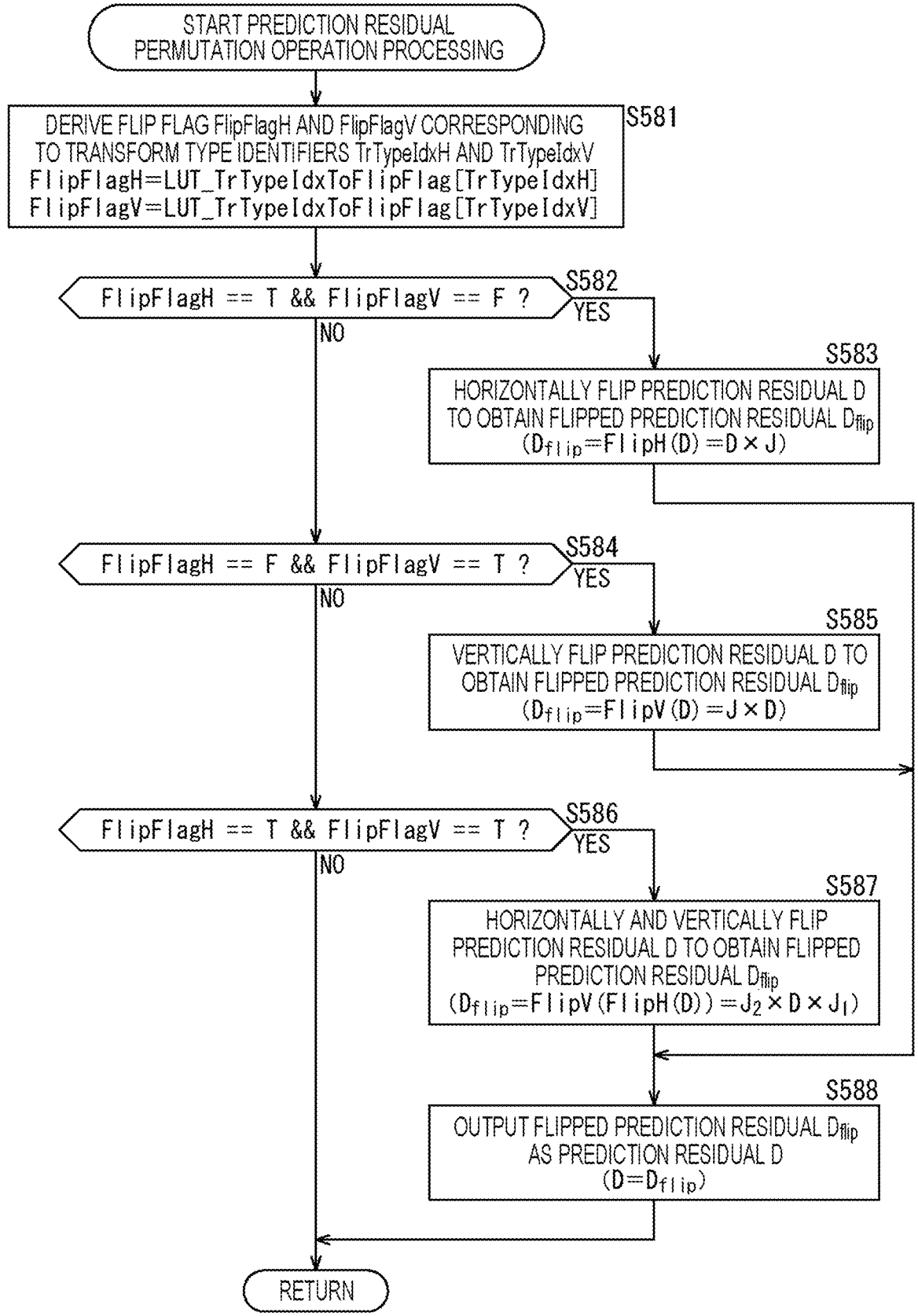
FIG. 71 is a flowchart for describing an example of a flow of prediction residual permutation operation processing.

When the processing in step S588 ends, the prediction residual permutation operation processing ends and the processing returns to FIG. 70. Furthermore, in step S586, in a case where it is determined that the condition is not satisfied, that is, in a case where FlipFlagH is determined to be false (0) or FlipFlagV is determined to be false (0), the prediction residual permutation operation processing ends and the processing returns to FIG. 70.

By performing the prediction residual permutation operation processing as described above, the prediction residual permutation operation unit 551 can flip the prediction residual in the spatial symmetric direction of the two-dimensional orthogonal transform (including the prediction residual) (that is, the direction corresponding to the transform type identifier TrTypeIdxH (or the transform type TrTypeH) of primary horizontal transform and the transform type identifier TrTypeIdxV (or the transform type TrTypeV) of primary vertical transform.

<Inverse Primary Transform Unit>

Figure 73:
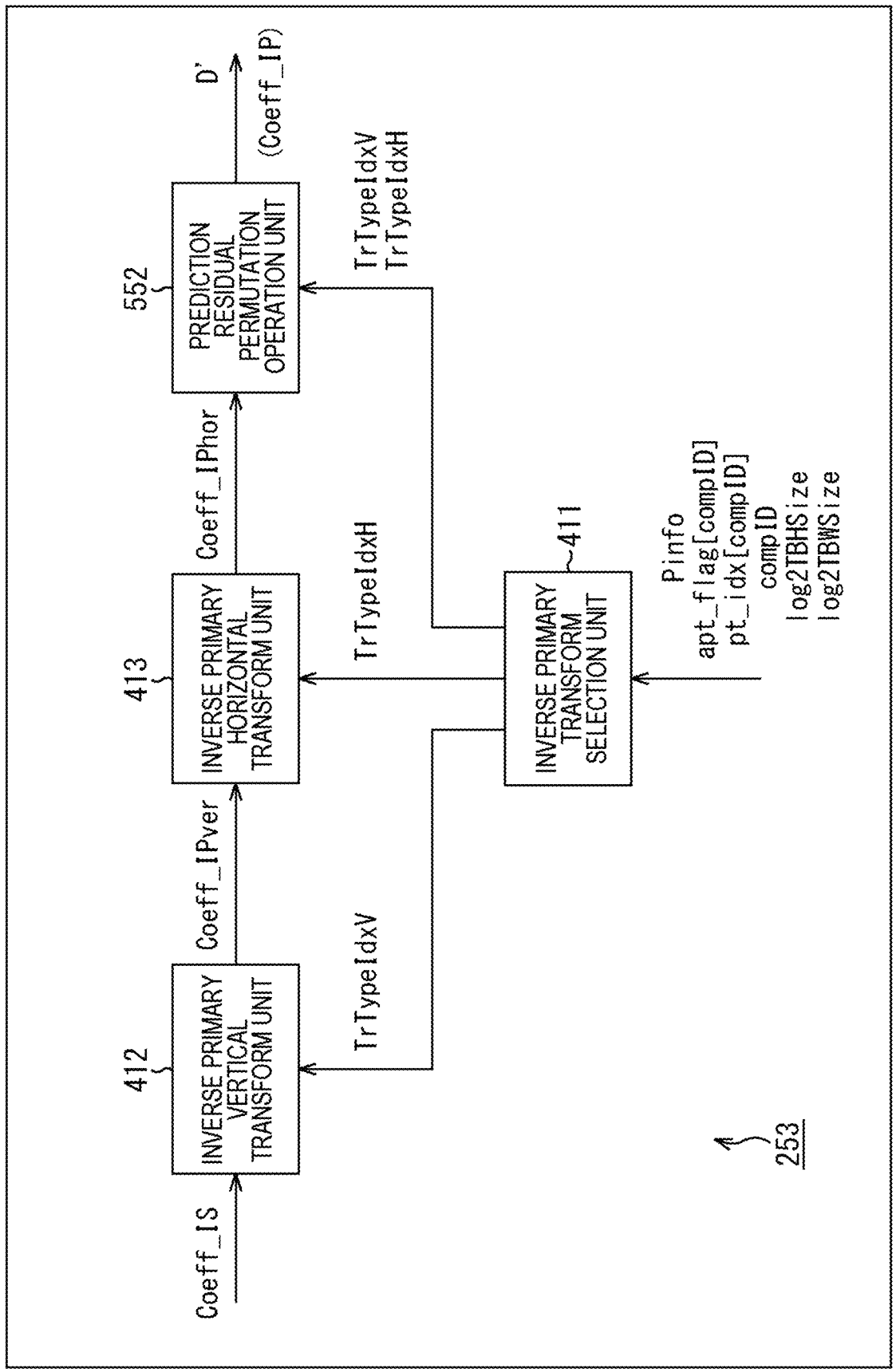
FIG. 73 is a block diagram illustrating a main configuration example of an inverse primary transform unit.

Next, a configuration of the image decoding device 200 in the case of the present embodiment will be described. FIG. 73 is a block diagram illustrating a main configuration example of the inverse primary transform unit 253 (FIG. 16) in this case. As illustrated in FIG. 73, the inverse primary transform unit 253 in this case includes a prediction residual permutation operation unit 552, in addition to the configuration illustrated in FIG. 34.

An inverse primary transform selection unit 411 supplies the derived transform type identifier TrTypeIdxV of inverse primary vertical transform and the derived transform type identifier TrTypeIdxH of inverse primary vertical transform to the prediction residual permutation operation unit 551. Furthermore, an inverse primary horizontal transform unit 413 supplies the derived transform coefficient Coeff_IPhor after inverse primary horizontal transform to the prediction residual permutation operation unit 552.

The prediction residual permutation operation unit 552 uses the transform coefficient Coeff_IPhor after inverse primary horizontal transform supplied from the inverse primary horizontal transform unit 413, and the transform type identifier TrTypeIdxH (or the transform type TrTypeH) of primary horizontal transform and the transform type identifier TrTypeIdxV (or the transform type TrTypeV) of primary vertical transform as inputs. The prediction residual permutation operation unit 552 flips the transform coefficient Coeff_IPhor after inverse primary horizontal transform according to the transform type identifier TrTypeIdxH (or the transform type TrTypeH) and the transform type identifier TrTypeIdxV (or the transform type TrTypeV). The prediction residual permutation operation unit 552 outputs a flipped transform coefficient Coeff_IPhor (transform coefficient Coeff_IP after inverse primary transform) to the outside of the inverse primary transform unit 253 (supplies the same to a calculation unit 215) as the prediction residual D'.

In the inverse primary transform unit 253 having the above configuration, the prediction residual permutation operation unit 552 performs processing to which the above-described present technology is applied, as an operation unit. An inverse primary vertical transform unit 412 and the inverse primary horizontal transform unit 413 perform processing to which the above-described present technology is applied, as inverse orthogonal transform units, respectively.

That is, the inverse primary vertical transform unit 412 performs vertical inverse one-dimensional orthogonal transform for a transform coefficient Coeff_IS after inverse secondary transform, using a transformation matrix for vertical inverse one-dimensional orthogonal transform serving as a base, as an inverse orthogonal transform unit. By flipping the transform coefficient by the prediction residual permutation operation unit 552 afterward, as described above, vertical inverse one-dimensional orthogonal transform using another transformation matrix can be substituted. Therefore, the inverse primary vertical transform unit 412 can suppress an increase in the memory capacity required for the vertical inverse one-dimensional orthogonal transform.

Furthermore, the inverse primary horizontal transform unit 413 performs horizontal inverse one-dimensional orthogonal transform for a transform coefficient Coeff_IPver after inverse primary vertical transform, using a transformation matrix for horizontal inverse one-dimensional orthogonal transform serving as a base, as an inverse orthogonal transform unit. By flipping the transform coefficient by the prediction residual permutation operation unit 552 afterward, as described above, vertical horizontal inverse one-dimensional orthogonal transform using another transformation matrix can be substituted. Therefore, the inverse primary horizontal transform unit 413 can suppress an increase in the memory capacity required for the horizontal inverse one-dimensional orthogonal transform.

<Flow of Inverse Primary Transform Processing>

Figure 74:
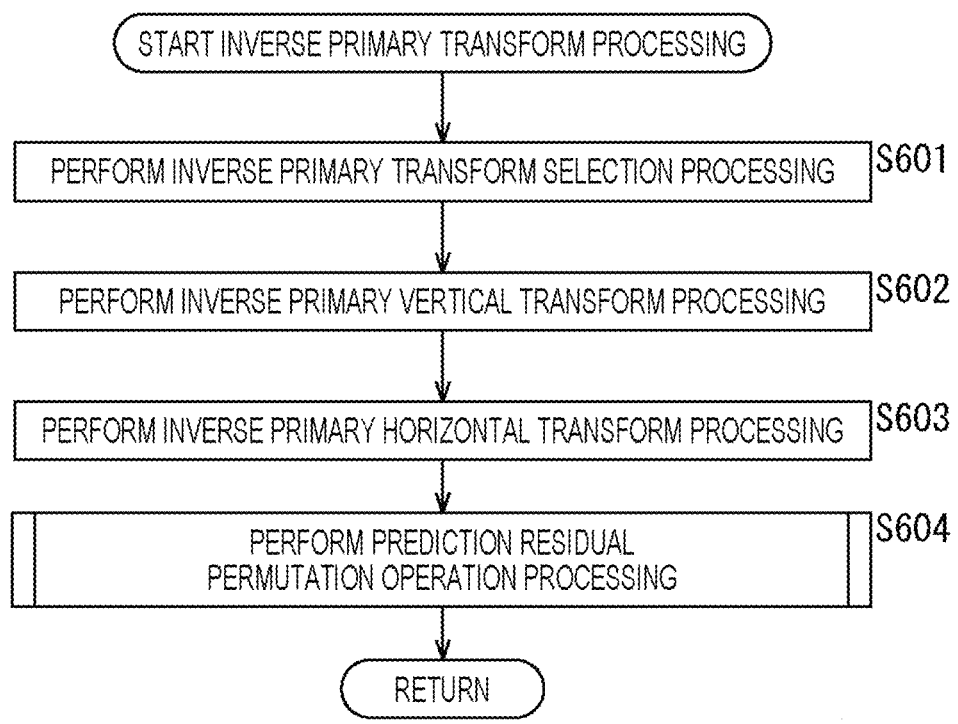
FIG. 74 is a flowchart for describing an example of a flow of inverse primary transform processing.

Next, an example of a flow of processing performed by the above-described configuration will be described. Next, an example of a flow of inverse primary transform processing executed in step S233 in FIG. 18 in this case will be described with reference to the flowchart in FIG. 74.

When the inverse primary transform processing is started, in step S601, the inverse primary transform selection unit 411 of the inverse primary transform unit 253 performs the inverse primary transform selection processing to select the transform type identifier TrTypeIdxV (or the transform type TrTypeV) of inverse primary vertical transform and the transform type identifier TrTypeIdxH (or the transform type TrTypeH) of inverse primary horizontal transform.

In step S602, the inverse primary vertical transform unit 412 performs the inverse primary vertical transform processing to perform vertical inverse one-dimensional orthogonal transform for the transform coefficient Coeff_IS after inverse secondary transform, using the transformation matrix corresponding to the transform type identifier TrTypeIdxV of inverse primary vertical transform obtained in step S601.

In step S603, the inverse primary horizontal transform unit 413 performs the inverse primary horizontal transform processing to perform horizontal inverse one-dimensional orthogonal transform for the transform coefficient Coeff_IPver after inverse primary vertical transform derived in step S602, using the transformation matrix corresponding to the transform type identifier TrTypeIdxH of inverse primary horizontal transform obtained in step S601.

In step S604, the prediction residual permutation operation unit 552 performs the prediction residual permutation operation processing, and flips the transform coefficient Coeff_IPhor after inverse primary horizontal transform derived in step S603, using the transform type identifier TrTypeIdxV of inverse primary vertical transform and the transform type identifier TrTypeIdxH of inverse primary horizontal transform obtained in step S601, to obtain the transform coefficient Coeff_IP (prediction residual D') after inverse primary transform.

The prediction residual permutation operation processing is performed by a flow similar to the example described with reference to the flowchart in FIG. 71. Therefore, the description regarding FIG. 71 can be applied to the processing in step S604, for example, by appropriately replacing the prediction residual D with the transform coefficient Coeff_IPhor, and thus description thereof is omitted.

When the processing in step S604 ends, the inverse primary transform processing ends and the processing returns to FIG. 18.

In the above inverse primary transform processing, processing to which the above-described present technology is applied is performed as each processing of step S602 or S604. Therefore, by executing the inverse primary transform processing, an increase in the memory capacity required for the inverse primary vertical transform processing or the inverse primary horizontal transform processing can be suppressed.

3-3. Example 2-2

<Concept>

Next, the second row example from the top except the uppermost row of item names in the table illustrated in FIG. 67 will be described. This operation focuses on the similarity between one-dimensional orthogonal transforms in a certain direction (one or both of the horizontal direction and vertical direction) in the two different two-dimensional orthogonal transforms More specifically, attention is paid to an axial symmetric property in even-numbered row vectors and a point-symmetric property in odd-numbered row vectors.

In this case, the derivation unit derives the second transformation matrix, using the first transformation matrix, the operation unit permutes the prediction residual, and the orthogonal transform unit orthogonally transforms the permuted prediction residual, using the second transformation matrix. For example, the transformation matrix of DST7 is used as the base transformation matrix, the derivation unit inverts the sign of an odd-numbered row vector of the transformation matrix of DST7, the operation unit flips the prediction residual, and the orthogonal transform unit orthogonally transforms the flipped prediction residual, using the transformation matrix of DST7 with the inverted sign of the odd-numbered row vector. By doing so, the orthogonal transform of the prediction residual using the transformation matrix (that is, DCT8 (see <2-3. Example 1-2>)) that is obtained by flipping the transformation matrix of DST7 and inverting the sign of an odd-numbered row vector of the flipped transformation matrix can be substituted.

This similarly applies to the inverse orthogonal transform. In this case, the derivation unit derives the second transformation matrix, using the first transformation matrix, the inverse orthogonal transform unit inversely orthogonally transforms the coefficient data, using the second transformation matrix, and the operation unit permutes the inverse orthogonal transform result. For example, the transformation matrix of DST7 is used as the base transformation matrix, the derivation unit inverts the sign of an odd-numbered row vector of the transformation matrix of DST7, the inverse orthogonal transform unit inversely orthogonally transforms the coefficient data, using the transformation matrix of DST7 with the inverted sign of the odd-numbered row vector, and the operation unit flips an inverse orthogonal transform result. By doing so, the inverse orthogonal transform of the coefficient data (transform coefficient Coeff_IQ) using the transformation matrix (that is, DCT8 (see <2-3. Example 1-2>)) that is obtained by flipping the transformation matrix of DST7 and inverting the sign of an odd-numbered row vector of the flipped transformation matrix can be substituted.

By applying such an operation for the prediction residual (including the inverse orthogonal transform result), it becomes unnecessary to prepare the transformation matrix of DCT8 as a candidate for a transformation matrix to be used for orthogonal transform/inverse orthogonal transform. That is, the number of unique transform types can be reduced, similarly to the case of the first embodiment.

In this case, as illustrated in the table in FIG. 75, the five types of transformation matrices required in the case of the technology described in Non-Patent Document 1 (see the table A in FIG. 6) can be reduced to four types. Therefore, the total LUT size can be about 47 KB. That is, the size of the LUT can be reduced (by about 53 KB (the table A in FIG. 6)) as compared with the case of the technology described in Non-Patent Document 1. That is, an increase in the size of the LUT can be suppressed.

<Transformation Matrix Derivation Unit>

In this case, the primary transform unit 152 has a similar configuration to the case of <3-2. Example 2-1>. Furthermore, the primary horizontal transform unit 312 has a similar configuration to the case of <3-2. Example 2-1>. Furthermore, the primary vertical transform unit 313 has a similar configuration to the case of <3-2. Example 2-1>. Note that an inner configuration of a transformation matrix derivation unit 321 of the primary horizontal transform unit 312 and an inner configuration of a transformation matrix derivation unit 351 of the primary vertical transform unit 313 are different from the case of <3-2. Example 2-1>.

Figure 76:
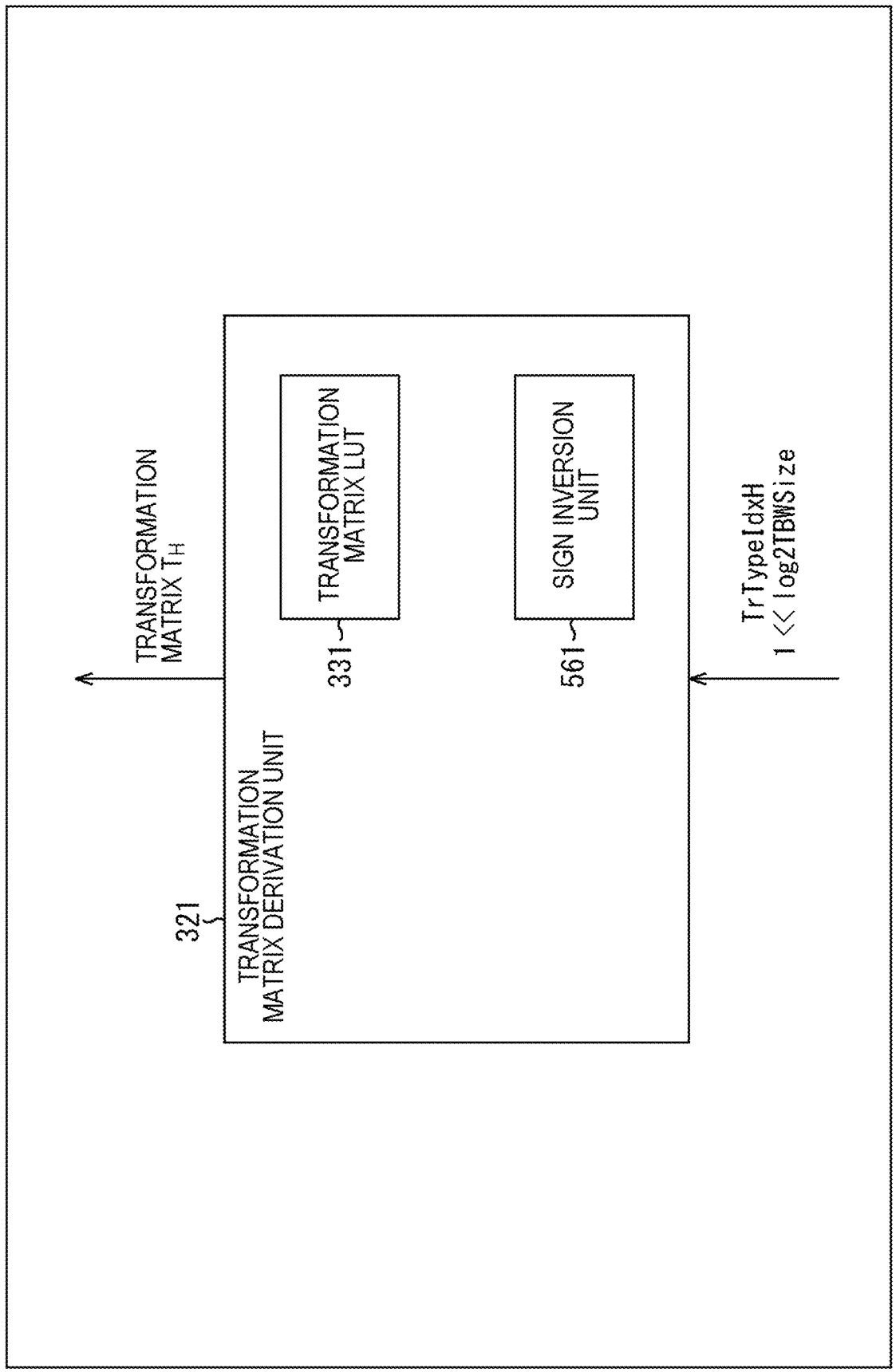
FIG. 76 is a block diagram illustrating a main configuration example of a transformation matrix derivation unit.

FIG. 76 is a block diagram illustrating a main configuration example of the transformation matrix derivation unit 321 included in the primary horizontal transform unit 312 in this case. As illustrated in FIG. 76, the transformation matrix derivation unit 321 in this case includes a transformation matrix LUT 331 and a sign inversion unit 561. Note that, in FIG. 76, arrows representing data transfer are omitted, but in the transformation matrix derivation unit 321, arbitrary data can be transferred between arbitrary processing units (processing blocks).

The sign inversion unit 561 is a processing unit similar to the sign inversion unit 501 (FIG. 46), and uses a transformation matrix T of N rows and N columns as an input, inverts the sign of a predetermined portion of the transformation matrix T, and performs sign inversion, and outputs a transformation matrix $T_{InvSign}$ after the sign inversion. In this derivation example (Example 2-2), the transformation matrix derivation unit 321 inverts the sign of an odd-order row vector of the base transformation matrix $T_{base}$ of N rows and N columns selected in the transformation matrix LUT 331 via the sign inversion unit 561 to derive the transformation matrix $T_{InvSign}$. The transformation matrix derivation unit 321 outputs the transformation matrix $T_{InvSign}$ to the outside of the transformation matrix derivation unit 321 (supplies the same to a matrix calculation unit 322) as a transformation matrix $T_H$.

As described above, the transformation matrix derivation unit 321 can implement the "operation of the base transformation matrix $T_{base}$" in primary horizontal transform, which is the second row example from the top of the table illustrated in FIG. 67, using the sign inversion unit 561.

<Transformation Matrix Derivation Unit>

Figure 77:
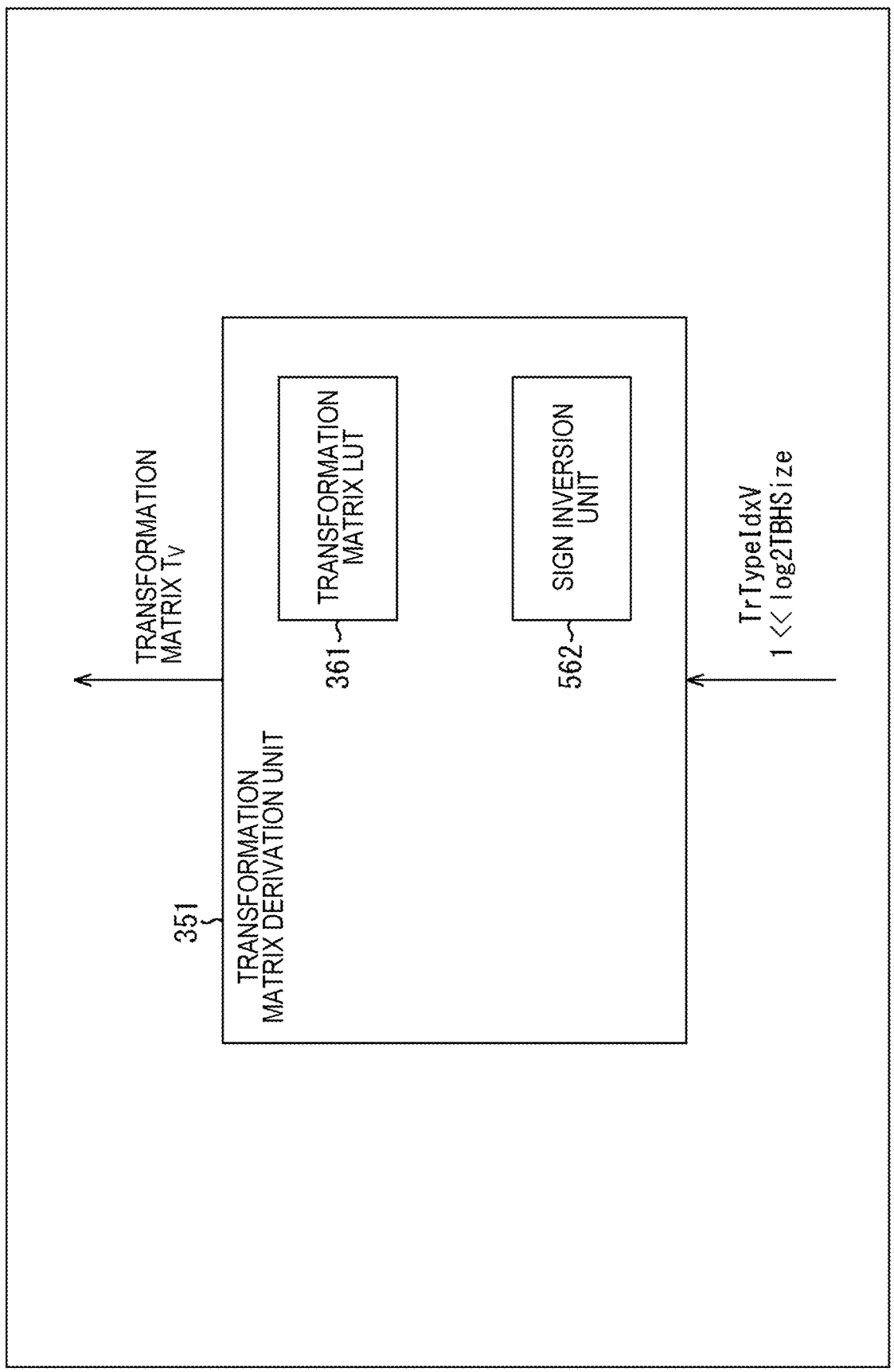
FIG. 77 is a block diagram illustrating a main configuration example of a transformation matrix derivation unit.

FIG. 77 is a block diagram illustrating a main configuration example of the transformation matrix derivation unit 351 included in the primary vertical transform unit 313 in this case. As illustrated in FIG. 77, the transformation matrix derivation unit 351 in this case includes a transformation matrix LUT 361 and a sign inversion unit 562, similarly to the case of the transformation matrix derivation unit 321.

Note that, in FIG. 77, arrows representing data transfer are omitted, but in the transformation matrix derivation unit 351, arbitrary data can be transferred between arbitrary processing units (processing blocks).

The sign inversion unit 562 is a processing unit similar to the sign inversion unit 502 (FIG. 47), and uses a transformation matrix T of N rows and N columns as an input, inverts the sign of a predetermined portion of the transformation matrix T, and performs sign inversion, and outputs a transformation matrix $T_{InvSign}$ after the sign inversion. In this derivation example (Example 2-2), the transformation matrix derivation unit 351 inverts the sign of an odd-order row vector of the base transformation matrix $T_{base}$ of N rows and N columns selected in the transformation matrix LUT 361 via the sign inversion unit 562 to derive the transformation matrix $T_{InvSign}$. The sign inversion unit 562 outputs the transformation matrix $T_{InvSign}$ to the outside of the transformation matrix derivation unit 351 (supplies the same to a matrix calculation unit 352) as a transformation matrix $T_V$.

As described above, the transformation matrix derivation unit 351 can implement the "operation of the base transformation matrix $T_{base}$" in primary vertical transform, which is the second row example from the top of the table illustrated in FIG. 67, using the sign inversion unit 562.

<Flow of Transformation Matrix Derivation Processing>

Since the primary transform processing in this case is performed by a flow similar to the case of <3-2. Example 2-1> (performed by a flow similar to the flowchart in FIG. 70), description thereof is basically omitted.

Note that, in this case, in step S581 of the prediction residual permutation operation processing (FIG. 71) executed in step S562 in FIG. 70, the prediction residual permutation operation unit 551 obtains a flip flag FlipFlagH and a flip flag FlipFlagV by reference to a correspondence table (LUT_TrTypeIdxToFlipFlag) illustrated in FIG. 79, instead of the correspondence table illustrated in FIG. 72.

Furthermore, in this case, the primary horizontal transform processing executed in step S563 in FIG. 70 is performed by a flow similar to the case of <2-2. Example 1-1> (performed by a flow similar to the flowchart in FIG. 28) but the transformation matrix derivation processing executed in step S321 in FIG. 28 is performed by a flow different from the case in FIG. 30.

Figure 78:
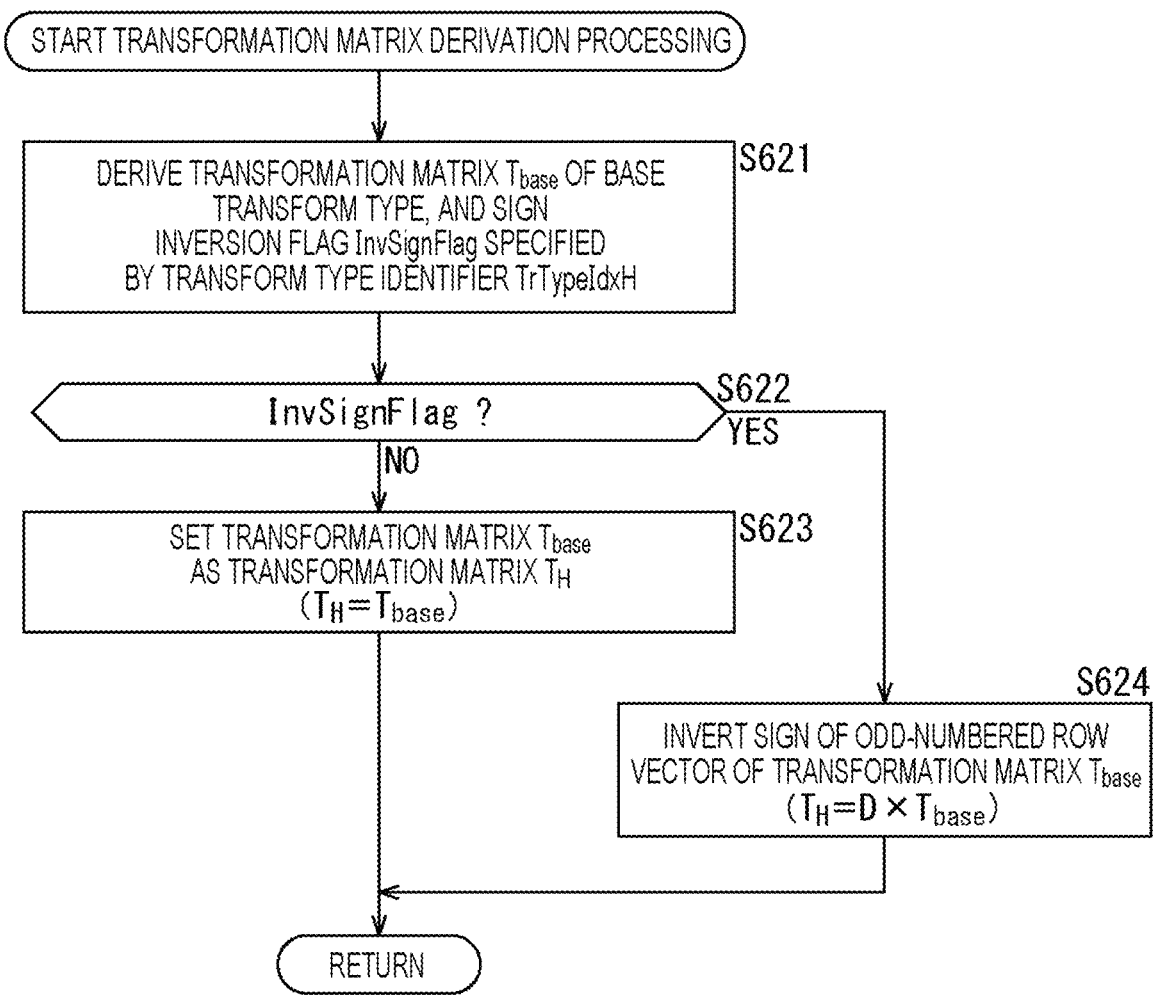
FIG. 78 is a flowchart for describing an example of a flow of transformation matrix derivation processing.

An example of a flow of the transformation matrix derivation processing executed by the transformation matrix derivation unit 321 in the primary horizontal transform unit 312 in step S321 in FIG. 28 in this case will be described with reference to the flowchart in FIG. 78.

When the transformation matrix derivation processing is started, in step S621, the transformation matrix derivation unit 321 derives a base transformation matrix $T_{base}$ of the base transform type corresponding to the transform type identifier TrTypeIdxH and the sign inversion flag InvSignFlag by reference to the correspondence table (LUT_TrTypeIdxToFlipFlag) illustrated in FIG. 79, for example.

In step S622, the transformation matrix derivation unit 321 determines whether or not the sign inversion flag InvSignFlag derived in step S621 is true (1). In a case where the sign inversion flag InvSignFlag is determined to be false (0), the processing proceeds to step S623.

In step S623, the transformation matrix derivation unit 321 reads the base transformation matrix $T_{base}$ (DST7) derived in step S621 from the transformation matrix LUT 331, and sets the base transformation matrix $T_{base}$ as the transformation matrix $T_H$. This can be expressed as in the following expression (76).

[Math. 66]

$$T_H = T_{base} \quad (76)$$

When the processing in step S623 ends, the transformation matrix derivation processing ends and the processing returns to FIG. 28. Furthermore, in step S622, in a case where the sign inversion flag InvSignFlag is determined to be true (1), the processing proceeds to step S624.

In step S624, the transformation matrix derivation unit 321 reads the base transformation matrix $T_{base}$ (DST7) derived in step S621 from the transformation matrix LUT 331, inverts the sign of an odd-numbered row vector of the base transformation matrix $T_{base}$ (DST7) via the sign inversion unit 561, and sets the base transformation matrix $T_{base}$ with the inverted sign as the transformation matrix $T_H$. This can be expressed as in the following expression (77).

[Math. 67]

$$T_H = D \times T_{base} \quad (77)$$

Here, x is an operator representing a matrix product, and a sign inversion matrix D is a diagonal matrix including Diag $(1, -1, \ldots, (-1)^{N-1})$ When the processing in step S624 ends, the transformation matrix derivation processing ends and the processing returns to FIG. 28.

<Flow of Transformation Matrix Derivation Processing>

Since the flow of the transformation matrix derivation processing executed in step S361 (FIG. 32) of the primary vertical transform processing is similar to the case of the transformation matrix derivation processing executed in the primary horizontal transform described with reference to the flowchart in FIG. 78, description thereof is omitted. In the description in FIG. 78, the transform type identifier TrTypeIdxH is simply replaced with the transform type identifier TrTypeIdxV, and the transformation matrix $T_H$ is simply replaced with the transformation matrix $T_V$.

<Transformation Matrix Derivation Unit>

Next, a configuration of the image decoding device 200 in the case will be described. Since configurations of the inverse primary transform unit 253, the inverse primary vertical transform unit 412, the inverse primary horizontal transform unit 413, and the like included in the image decoding device 200 in this case are similar to the case of <2-2. Example 1-1>, description thereof is omitted.

Figure 80:
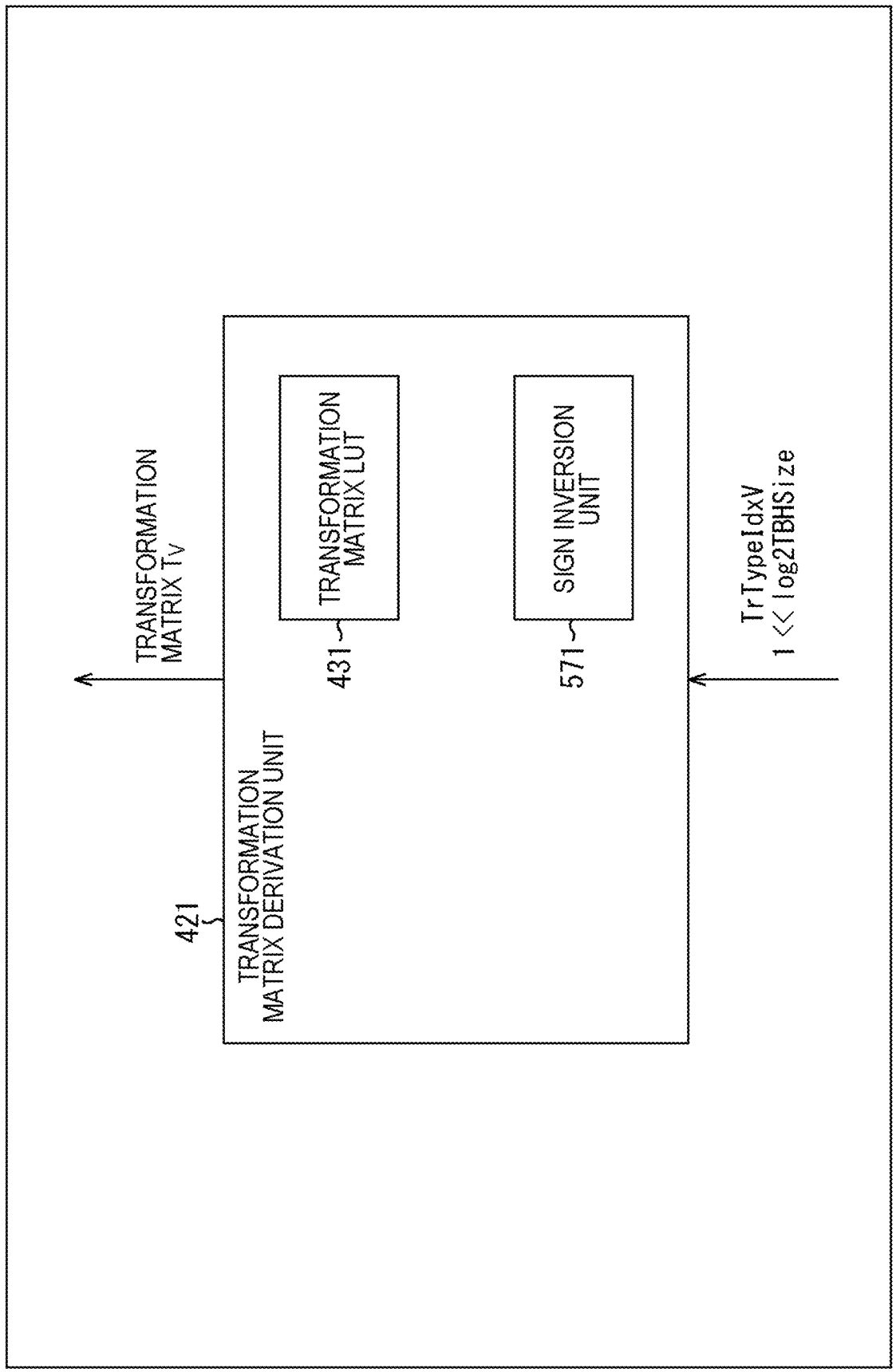
FIG. 80 is a block diagram illustrating a main configuration example of a transformation matrix derivation unit.

FIG. 80 is a block diagram illustrating a main configuration example of a transformation matrix derivation unit 421 (a transformation matrix derivation unit 421 included in the inverse primary vertical transform unit 412) in this case. As illustrated in FIG. 80, the transformation matrix derivation unit 421 in this case includes a transformation matrix LUT 431 and a sign inversion unit 571, similarly to the transformation matrix derivation unit 321. Note that, in FIG. 80, arrows representing data transfer are omitted, but in the transformation matrix derivation unit 421, arbitrary data can be transferred between arbitrary processing units (processing blocks).

The transformation matrix LUT 431 is similar to that in the case of FIG. 36. The sign inversion unit 571 is a processing unit similar to the sign inversion unit 501, and uses a transformation matrix T of N rows and N columns as an input, inverts the sign of a predetermined portion of the transformation matrix T, and outputs the transformation matrix $T_{InvSign}$ after sign inversion. In this derivation example (Example 2-2), the transformation matrix derivation unit 421 inverts the sign of an odd-order row vector of the base transformation matrix $T_{base}$ of N rows and N columns selected in the transformation matrix LUT 431 via the sign inversion unit 571 to derive the transformation matrix $T_{InvSign}$. The sign inversion unit 571 outputs the transformation matrix $T_{InvSign}$ to the outside of the transformation matrix derivation unit 421 (supplies the same to the matrix calculation unit 422) as the transformation matrix $T_V$.

As described above, the transformation matrix derivation unit 421 can implement the "operation of the base transformation matrix $T_{base}$" in inverse primary vertical transform, which is the second row example from the top of the table illustrated in FIG. 67, using the sign inversion unit 571.

<Transformation Matrix Derivation Unit>

Figure 81:
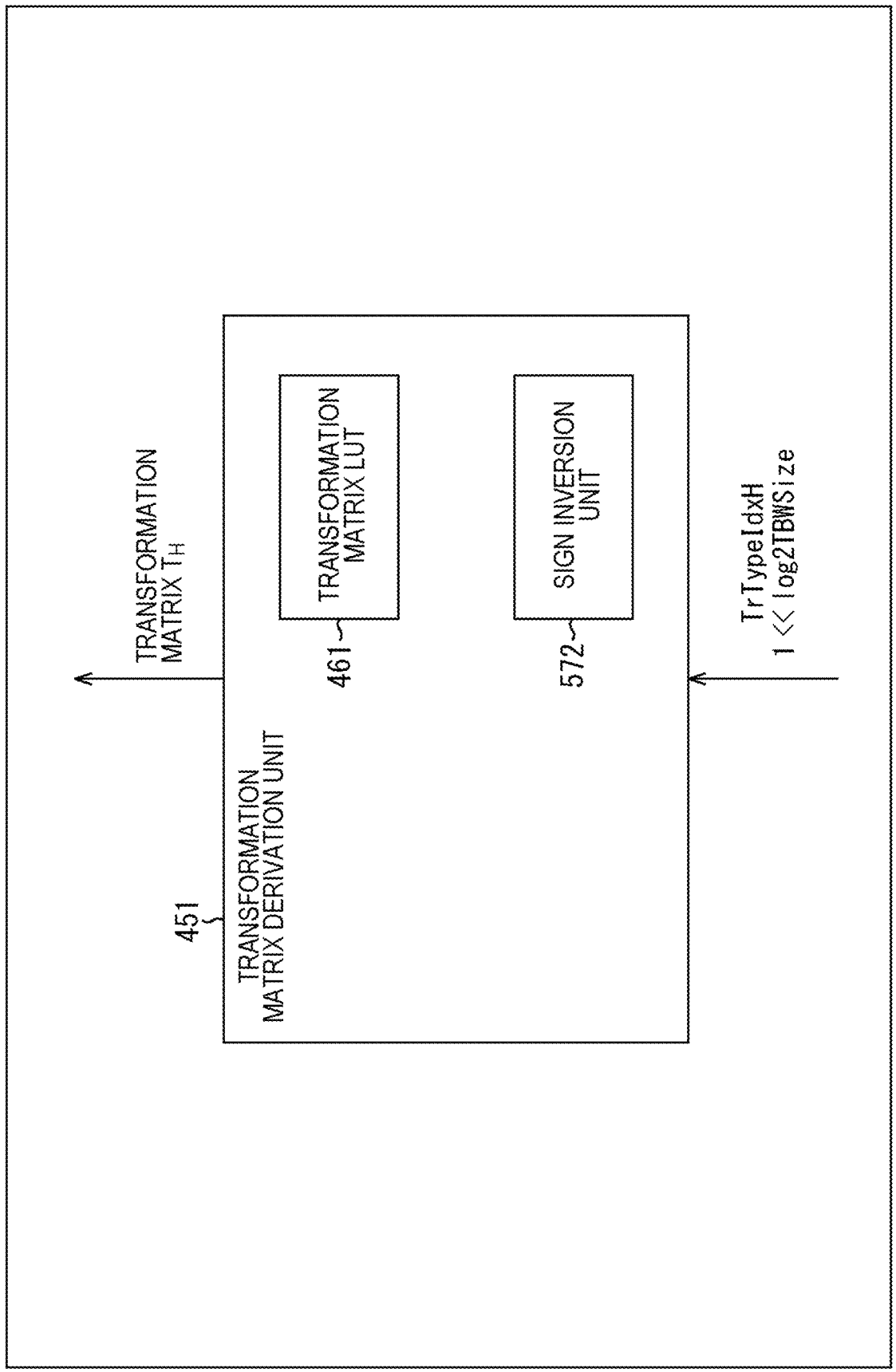
FIG. 81 is a block diagram illustrating a main configuration example of a transformation matrix derivation unit.

FIG. 81 is a block diagram illustrating a main configuration example of the transformation matrix derivation unit 451 included in the inverse primary horizontal transform unit 413 in this case. As illustrated in FIG. 81, the transformation matrix derivation unit 451 in this case includes a transformation matrix LUT 461 and a sign inversion unit 572, similarly to the transformation matrix derivation unit 421. Note that, in FIG. 81, arrows representing data transfer are omitted, but in the transformation matrix derivation unit 451, arbitrary data can be transferred between arbitrary processing units (processing blocks).

The transformation matrix LUT 461 is similar to that in the case of FIG. 80. The sign inversion unit 572 is a processing unit similar to the sign inversion unit 571, and uses a transformation matrix T of N rows and N columns as an input, inverts the sign of a predetermined portion of the transformation matrix T, and performs sign inversion, and outputs a transformation matrix $T_{InvSign}$ after the sign inversion. In this derivation example (Example 2-2), the transformation matrix derivation unit 451 inverts the sign of an odd-order row vector of the base transformation matrix $T_{base}$ of N rows and N columns selected in the transformation matrix LUT 461 via the sign inversion unit 572 to derive the transformation matrix $T_{InvSign}$. The sign inversion unit 572 outputs the transformation matrix $T_{InvSign}$ to the outside of the transformation matrix derivation unit 451 (supplies the same to a matrix calculation unit 452) as the transformation matrix $T_H$.

As described above, the transformation matrix derivation unit 451 can implement the "operation of the base transformation matrix $T_{base}$" in inverse primary vertical transform, which is the second row example from the top of the table illustrated in FIG. 67, using the sign inversion unit 512.

<Flow of Transformation Matrix Derivation Processing>

Note that the transformation matrix derivation unit 421 and the transformation matrix derivation unit 451 perform the transformation matrix derivation processing by a flow similar to the case described with reference to the flowchart in FIG. 78, and thus description of the processing is omitted.

3-4. Example 2-3

<Concept>

Next, the third row example from the top except the uppermost row of item names in the table illustrated in FIG. 67 will be described. This example focuses on axial symmetry between one-dimensional orthogonal transforms in a certain direction (one or both of the horizontal direction and vertical direction) in two different two-dimensional orthogonal transform, similarly to the first row example from the top.

In this case, the operation unit flips the prediction residual. The orthogonal transform unit orthogonally transforms the flipped prediction residual, using the base transformation matrix (transformation matrix of DCT8). By doing so, the orthogonal transform of the prediction residual using the transformation matrix of FlipDCT8 (see <2-4. Example 1-3>) that is the flipped transformation matrix of DCT8 can be substituted.

This similarly applies to the inverse orthogonal transform. In this case, the inverse orthogonal transform unit inversely orthogonally transforms the coefficient data, using the base transformation matrix (transformation matrix of DCT8), and the operation unit flips the inverse orthogonal transform result. By doing so, the inverse orthogonal transform of the coefficient data (transform coefficient Coeff_IQ) using the transformation matrix of FlipDCT8 that is the flipped transformation matrix of DCT8 can be substituted.

By applying such an operation for the prediction residual (including the inverse orthogonal transform result), it becomes unnecessary to prepare the transformation matrix of FlipDCT8 as a candidate for a transformation matrix to be used for orthogonal transform/inverse orthogonal transform. That is, the number of unique transform types can be reduced, similarly to the case of the first embodiment.

Note that, in this case, in the prediction residual permutation operation processing (FIG. 71), the correspondence table (LUT_TrTypeIdxToFlipFlag) illustrated in FIG. 82 is simply referred to instead of the correspondence table illustrated in FIG. 72.

Furthermore, processing is similar even in the case of inverse orthogonal transform, and processing similar to the case of orthogonal transform is only required to be performed with a configuration similar to the case of orthogonal transform.

3-5. Example 2-4

<Concept>

Next, the fourth row example from the top except the uppermost row of item names in the table illustrated in FIG. 67 will be described. This example focuses on similarity between one-dimensional orthogonal transforms in a certain direction (one or both of horizontal direction and vertical direction) (an axial symmetric property of even-numbered row vectors, and a point-symmetric property of odd-numbered row vectors) in two different two-dimensional orthogonal transforms, similarly to the second row example from the top. This operation is the same as the operation of the second row from the top.

In this case, the derivation unit derives the second transformation matrix from the first transformation matrix, and the operation unit flips the prediction residual D. The orthogonal transform unit orthogonally transforms the flipped prediction residual, using the transformation matrix of DST7 that is obtained by inverting the sign of the base transformation matrix (transformation matrix of DCT8). By doing so, the orthogonal transform of the prediction residual using the transformation matrix of DST7 (see <2-5. Example 1-4>) that is obtained by flipping the transformation matrix of DCT8 and inverting the sign can be substituted.

This similarly applies to the inverse orthogonal transform. In this case, the derivation unit inverts the sign of an odd-numbered row vector of the transformation matrix of DCT8, the inverse orthogonal transform unit inversely orthogonally transforms the coefficient data, using the transformation matrix of DCT8 with the inverted sign of the odd-numbered row vector (that is, DST7), and the operation unit flips an inverse orthogonal transform result. By doing so, the inverse orthogonal transform of the coefficient data (transform coefficient Coeff_IQ) using the transformation matrix of DST7 that is obtained by flipping the transformation matrix of DCT8 and inverting the sign.

By applying such an operation for the prediction residual (including the inverse orthogonal transform result), it becomes unnecessary to prepare the transformation matrix of DST7 as a candidate for a transformation matrix to be used for orthogonal transform/inverse orthogonal transform. That is, the number of unique transform types can be reduced, similarly to the case of the first embodiment.

Note that, in this case, in the prediction residual permutation operation processing (FIG. 71), the correspondence table (LUT_TrTypeIdxToFlipFlag) illustrated in FIG. 83 is simply referred to instead of the correspondence table illustrated in FIG. 79.

Furthermore, processing is similar even in the case of inverse orthogonal transform, and processing similar to the case of orthogonal transform is only required to be performed with a configuration similar to the case of orthogonal transform.

4. THIRD EMBODIMENT

4-1. Common Concept

<Derivation of Transformation Matrix Using Submatrix>

In the first embodiment, derivation of another transformation matrix using a transformation matrix has been description. However, the embodiment is not limited thereto, and a submatrix that is a part of a transformation matrix is prepared, and the transformation matrix may be derived using the submatrix.

That is, a transformation matrix may be derived using a submatrix configuring a part of the transformation matrix, a prediction residual of an image may be orthogonally transformed using the derived transformation matrix, and coefficient data obtained by orthogonally transforming the prediction residual may be encoded to generate a bit stream.

For example, an image processing apparatus may include a derivation unit configured to derive a transformation matrix, using a submatrix configuring a part of the transformation matrix, an orthogonal transform unit configured to orthogonally transform a prediction residual of an image, using the transformation matrix derived by the derivation unit, and an encoding unit configured to encode coefficient data obtained by orthogonally transforming the prediction residual by the orthogonal transform unit to generate a bit stream.

With the configuration, it is only required to hold the submatrix (it is not necessary to hold all the transformation matrices). Therefore, an increase in memory capacity required for the orthogonal transform can be suppressed.

Furthermore, a bit stream may be decoded to obtain coefficient data that is an orthogonally transformed prediction residual of an image, a transformation matrix may be derived using a submatrix configuring a part of the transformation matrix, and the obtained coefficient data may be inversely orthogonally transformed using the derived transformation matrix.

For example, the image processing apparatus may include a decoding unit configured to decode a bit stream to obtain coefficient data that is an orthogonally transformed prediction residual of an image, a derivation unit configured to derive a transformation matrix, using a submatrix configuring a part of the transformation matrix, and an inverse orthogonal transform unit configured to inversely orthogonally transform the coefficient data obtained by the decoding unit, using the transformation matrix derived by the derivation unit.

With the configuration, it is only required to hold the submatrix (it is not necessary to hold all the transformation matrices). Therefore, an increase in the memory capacity required for the inverse orthogonal transform can be suppressed.

<Example of Relationship Between Submatrix and Whole Transformation Matrix>

Figure 84:
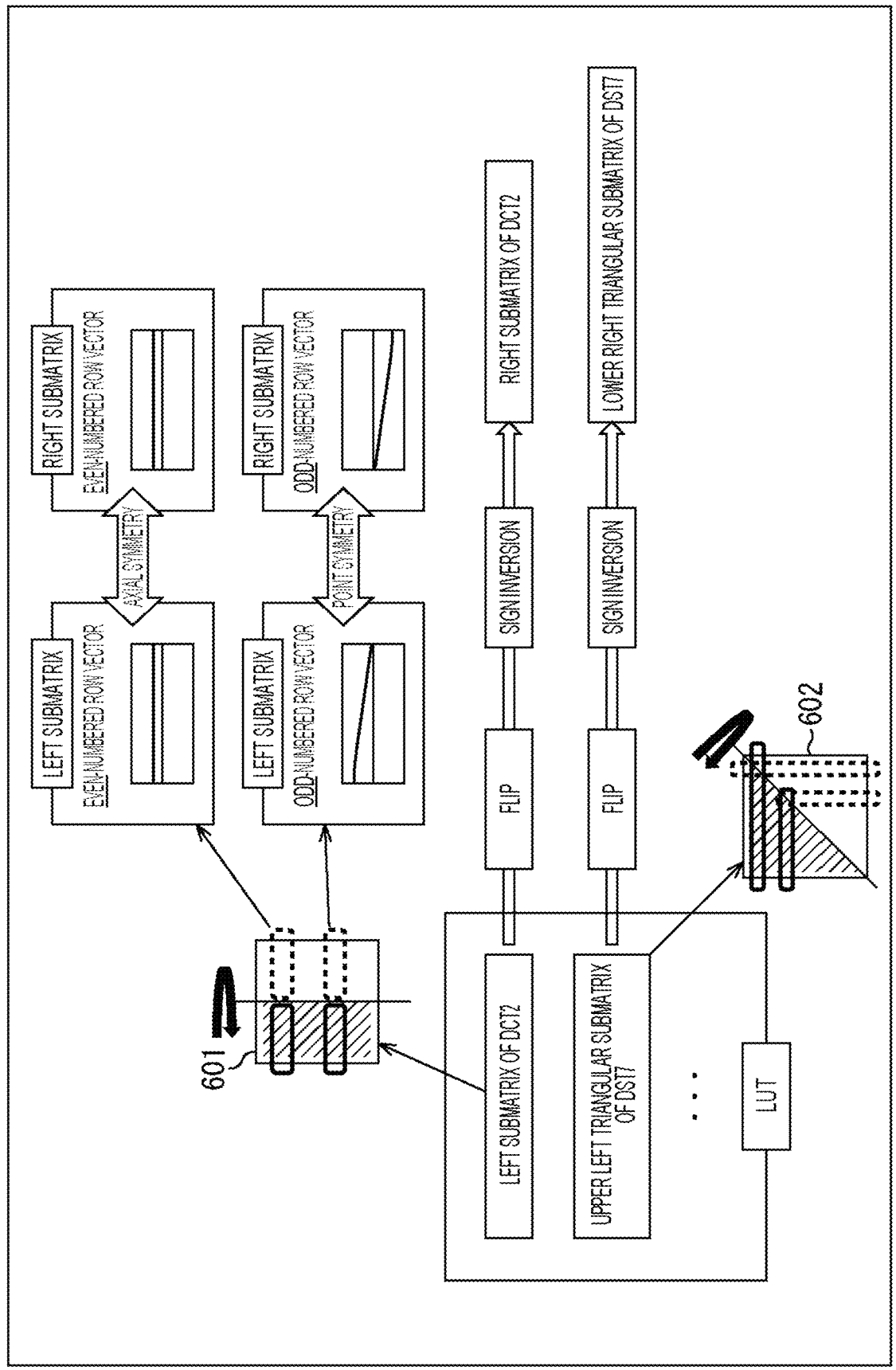
FIG. 84 is a diagram for describing derivation of a transformation matrix using a submatrix.

More specific description will be given. For example, as illustrated in FIG. 84, in a case of a transformation matrix 601 of DCT2, a waveform of an even-numbered row vector in a left portion and a waveform of an even-numbered row vector in a right portion are axially symmetric with each other. Furthermore, waveforms of odd-numbered row vectors in the left portion of the transformation matrix 601 are point-symmetric with each other.

Therefore, a submatrix constituting the right portion of the transformation matrix 601 of DCT2 can be derived by flipping a submatrix constituting the left portion of the transformation matrix 601 of DCT2 in a horizontal direction (row direction) around a column direction passing through a center of the transformation matrix 601, and inverting a sign of an odd-numbered row vector. That is, the transformation matrix 601 of DCT2 can be derived from the submatrix constituting the left portion.

Furthermore, for example, in a case of a transformation matrix 602 of DST7, a waveform of an even-numbered row vector of an upper left triangular portion and a waveform of an even-numbered column vector of a lower right triangular portion are axially symmetric with each other. Furthermore, a waveform of an odd-numbered row vector of the upper left triangular portion and a waveform of an odd-numbered column vector of the lower right triangular portion of the transformation matrix 602 are point-symmetric with each other.

Therefore, a submatrix constituting the upper left triangular portion of the transformation matrix 602 of DST7 can be derived by flipping a submatrix constituting the lower right triangular portion of the transformation matrix 602 of DST7 in an oblique direction from the upper left to lower right around a diagonal line connecting an upper right end and a lower left end of the transformation matrix 602, and inverting a sign of the odd-numbered column vector. That is, the transformation matrix 602 of DST7 can be derived from the submatrix constituting the upper left triangular portion.

That is, the transformation matrix LUT is only required to store a submatrix of a whole transformation matrix, the submatrix being able to derive the whole transformation matrix, instead of storing the whole transformation matrix. For example, the derivation unit may derive the (whole) transformation matrix, using the submatrix stored in the lookup table (transformation matrix LUT). With the configuration, an increase in the UT size can be suppressed as compared with the case of storing the whole transformation matrices of DCT2 and DST7. That is, an increase in the memory capacity required for the orthogonal transform/inverse orthogonal transform can be suppressed.

Furthermore, flip may be performed, as described above, as the operation for deriving the whole transformation matrix from the submatrix. Furthermore, the flipping direction is arbitrary. For example, the derivation unit may derive the transformation matrix by flipping the submatrix around an axis of a predetermined direction passing through a center of the transformation matrix and deriving a remaining submatrix of the transformation matrix. With the configuration, the whole transformation matrix can be derived from the submatrix by the simple operation.

Note that the flipping direction is arbitrary. For example, the derivation unit may flip the submatrix in a direction parallel to a row (the direction is also referred to as a row direction or a horizontal direction). Furthermore, for example, the derivation unit may flip the submatrix in a direction parallel to a column (the direction is also referred to as a column direction or a vertical direction). Moreover, for example, the derivation unit may flip the submatrix in a rotation direction around the center of the transformation matrix. Furthermore, for example, the derivation unit may flip the submatrix in an oblique direction around a diagonal line of the transformation matrix.

With the configurations, another submatrix having a symmetric property in various directions with respect to a submatrix can be derived from the submatrix by a simple operation, for example.

Furthermore, sign inversion may be performed, as described above, as the operation for deriving the whole transformation matrix from the submatrix. For example, the derivation unit may further invert the sign of an element of the flipped submatrix to derive the transformation matrix. With the configuration, various whole transformation matrices can be derived from the submatrix by the simple operation.

<Derivation Example>

FIG. 85 illustrates a list of derivation examples of a whole transformation matrix from a submatrix. Note that the submatrix to be used for derivation is also referred to as a base submatrix.

In the table illustrated in FIG. 85, derivation of the first row example from the top except the uppermost row of item names focuses on an axial symmetric property with respect to a vertical axis.

In this case, the submatrix is a left-half submatrix or a right-half submatrix of a transformation matrix, and the derivation unit derives the whole transformation matrix by flipping the submatrix in a row direction of the transformation matrix and further inverting a sign of an odd-numbered row vector of the flipped submatrix to derive the right-half submatrix or the left-half submatrix of the transformation matrix (that is, a remaining submatrix of the transformation matrix).

Figure 86:
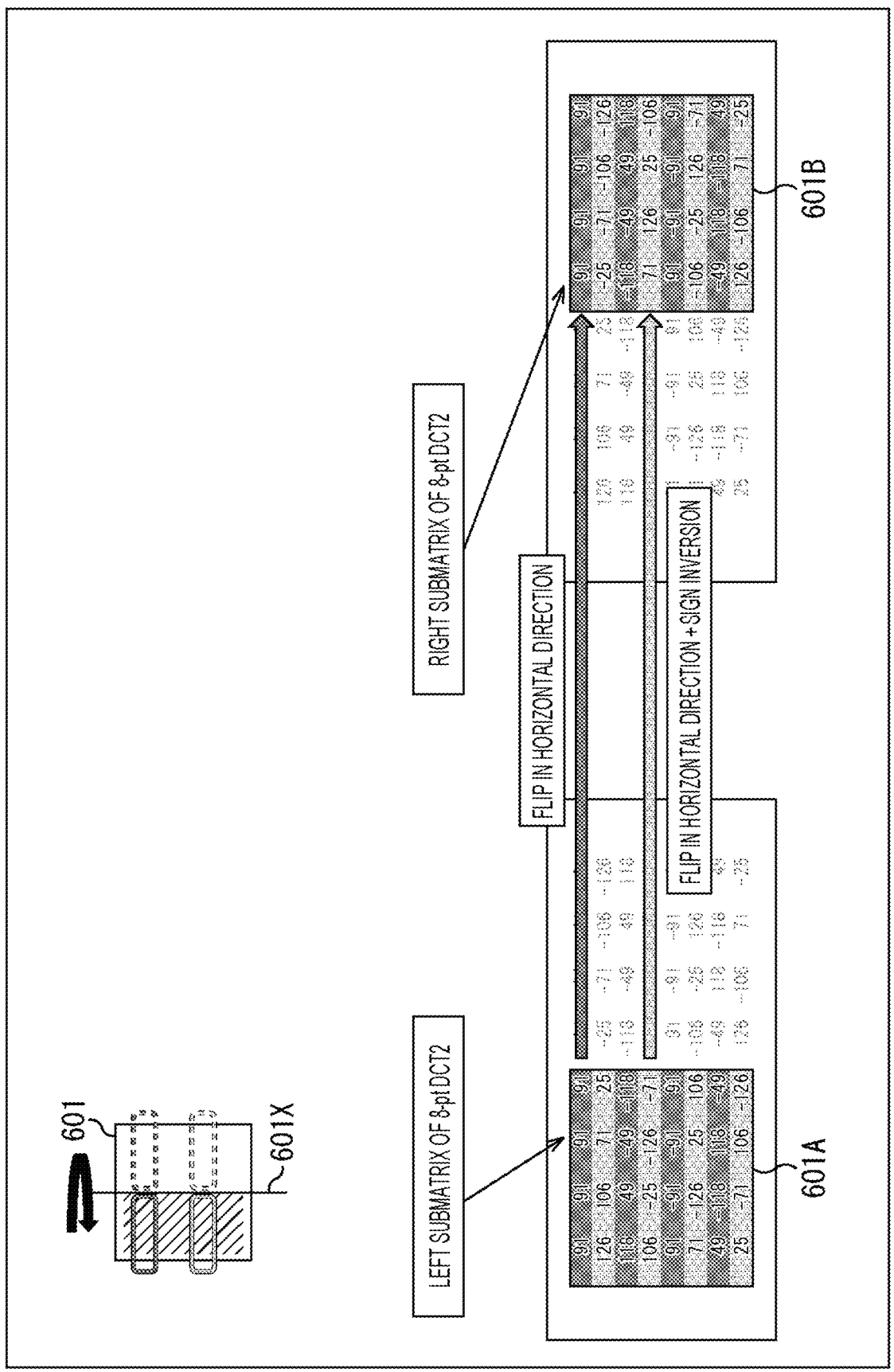
FIG. 86 is a diagram illustrating an example of a state of transformation matrix derivation.

For example, as illustrated in FIG. 86, the derivation unit flips a left-half submatrix 601A of the transformation matrix 601 having the transform type of DCT2 around an axis 601X in a direction (column direction) parallel to a column passing through the transformation matrix 601 (that is, flip is made in the horizontal direction). Moreover, the derivation unit inverts the sign of an odd-numbered row vector. By doing so, a right-half submatrix 601B of the transformation matrix 601 is derived. That is, the whole transformation matrix 601 is derived. When such derivation is expressed as an operation expression for each element, where a transformation matrix to be derived is a transformation matrix T of N rows and N columns, and a submatrix to be used for the derivation is C, the derivation can be expressed as the following expression (78).

[Math. 68]

$$\text{sign}=(y\%2==0)?1:-1$$

$$T[y,N-1-x]=\text{sign}*C[y,x]$$

$$\text{for } x=0,\ldots,N/2-1, y=0,\ldots,N-1 \tag{78}$$

Since the whole transformation matrix can be derived from the submatrix by applying such derivation, it becomes unnecessary to prepare the whole transformation matrix 601 of DCT2 as a candidate of a transformation matrix to be used for orthogonal transform/inverse orthogonal transform (it is only required to prepare the submatrix 601A). That is, the information amount of this candidate can be reduced to half. That is, an increase in the LUT size can be suppressed. Furthermore, by performing orthogonal transform/inverse orthogonal transform using the derived transformation matrix, the same coding efficiency as a case of using the transformation matrix 601 of DCT2 for the orthogonal transform/inverse orthogonal transform can be obtained.

Note that the transform type is not limited to the above-described example as long as the transformation matrix to which such derivation is applied has an element having the above-described symmetric property. For example, the transform type may be DST2.

Furthermore, in the above description, derivation of the right-half submatrix (the whole transformation matrix) from the left-half submatrix has been described. However, the embodiment is not limited to the example, and for example, the left-half submatrix (the whole transformation matrix) may be derived from the right-half submatrix.

Furthermore, derivation of an example one row below the first row example (the second row example from the top) focuses on an axial symmetric property with respect to a horizontal axis.

In this case, the submatrix is an upper-half submatrix or a lower-half submatrix of the transformation matrix, and the derivation unit derives the whole transformation matrix by flipping the submatrix in a column direction of the transformation matrix, further inverting a sign of an odd-numbered column vector of the flipped submatrix, and deriving the lower-half submatrix or the upper-half submatrix of the transformation matrix (that is, a remaining submatrix of the transformation matrix).

Figure 87:
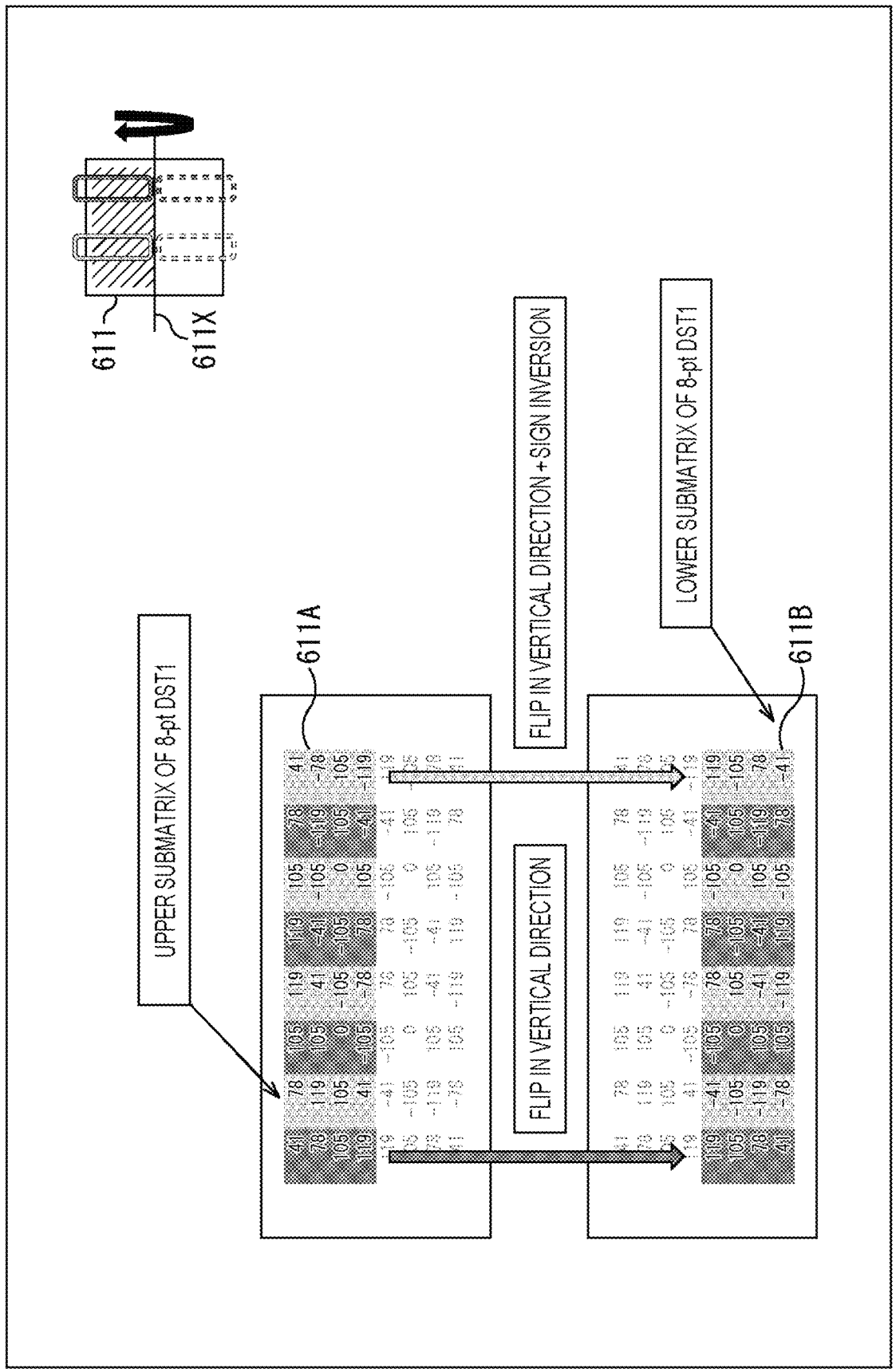
FIG. 87 is a diagram illustrating an example of a state of transformation matrix derivation.

For example, as illustrated in FIG. 87, the derivation unit flips an upper-half submatrix 611A of a transformation matrix 611 having the transform type of DST1 around an axis 611X in a direction (row direction) parallel to a row passing through a center of the transformation matrix 611 (that is, flip is made in the vertical direction). Moreover, the derivation unit inverts the sign of an odd-numbered column vector. By doing so, a lower-half submatrix 611B of the transformation matrix 611 is derived. That is, the whole transformation matrix 611 is derived. When such derivation is expressed as an operation expression for each element, where a transformation matrix to be derived is a transformation matrix T of N rows and N columns, and a submatrix to be used for the derivation is C, the derivation can be expressed as the following expression (79).

[Math. 69]

$$\text{sign}=(x\%2==0)?1:-1$$

$$T[N-1-y,x]=\text{sign}*C[y,x]$$

$$\text{for } x=0,\ldots,N-1\ y=0,\ldots,N/2-1 \tag{79}$$

Since the whole transformation matrix can be derived from the submatrix by applying such derivation, it becomes unnecessary to prepare the whole transformation matrix 611 of DST1 as a candidate of a transformation matrix to be used for orthogonal transform/inverse orthogonal transform (it is only required to prepare the submatrix 611A). That is, the information amount of this candidate can be reduced to half.

That is, an increase in the LUT size can be suppressed. Furthermore, by performing orthogonal transform/inverse orthogonal transform using the derived transformation matrix, the same coding efficiency as a case of using the transformation matrix 611 of DST1 for the orthogonal transform/inverse orthogonal transform can be obtained.

Note that the transform type is not limited to the above-described example as long as the transformation matrix to which such derivation is applied has an element having the above-described symmetric property. For example, the transform type may be DCT3, DCT1, or DST3.

Furthermore, in the above description, the lower-half submatrix (the whole transformation matrix) has been derived from the upper-half submatrix. However, the embodiment is not limited to the example, and for example, the upper-half submatrix (the whole transformation matrix) may be derived from the lower-half submatrix.

Furthermore, derivation of an example one row below the second row example (the third row example from the top) focuses on a point-symmetric property.

In this case, the submatrix is an upper-half submatrix or a lower-half submatrix of the transformation matrix, and the derivation unit derives the whole transformation matrix by flipping the submatrix in a rotation direction around a center of the transformation matrix and further inverting signs of an element having an even row number and an even column number and an element having an odd row number and an odd column number of the flipped submatrix to derive the lower-half submatrix or the upper-half submatrix of the transformation matrix (that is, a remaining submatrix of the transformation matrix).

Figure 88:
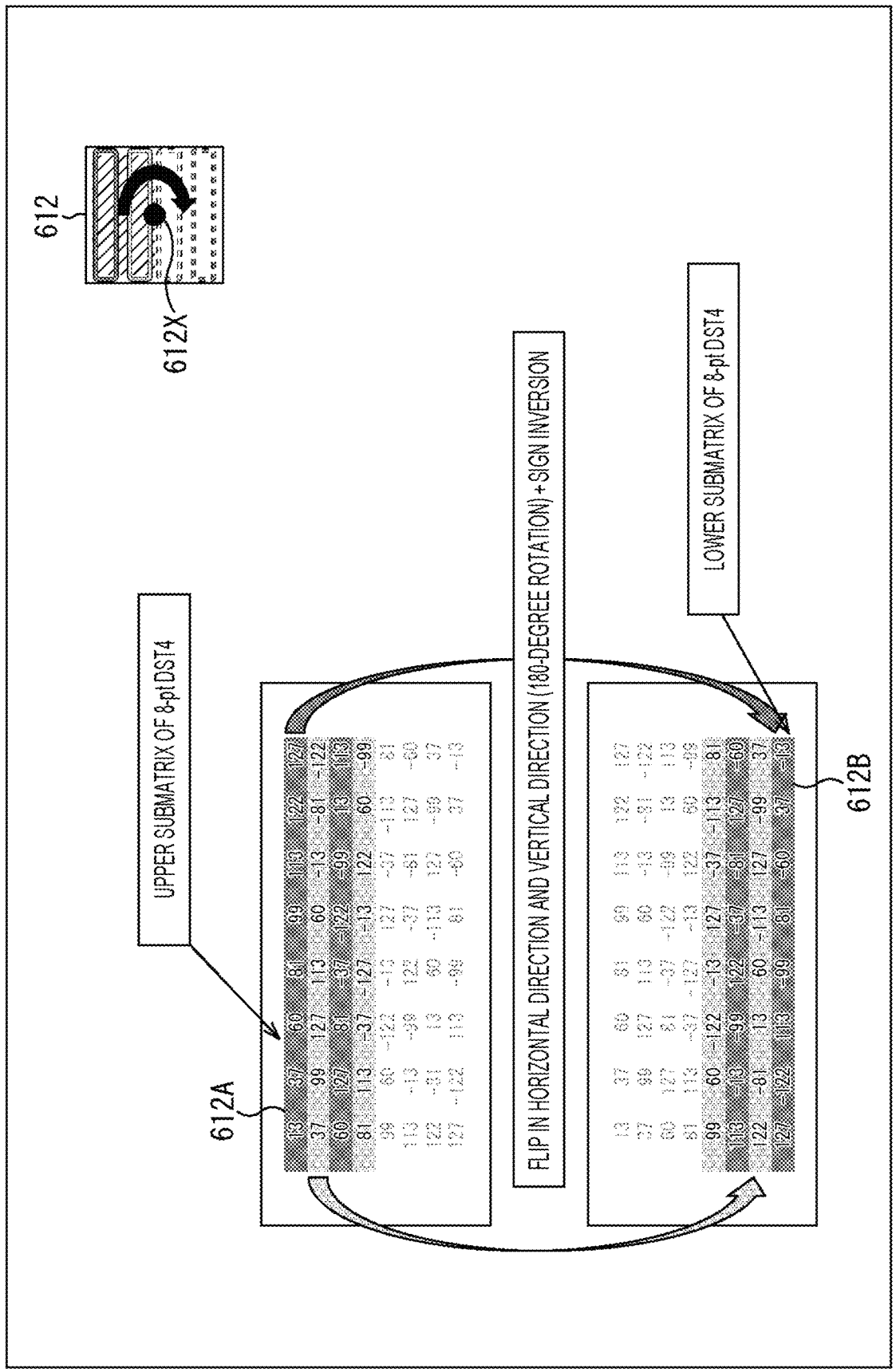
FIG. 88 is a diagram illustrating an example of a state of transformation matrix derivation.

For example, as illustrated in FIG. 88, the derivation unit flips an upper-half submatrix 612A of a transformation matrix 612 having the transform type of DST4 in a rotation direction around a center 612X of the transformation matrix 612. Moreover, the derivation unit inverts signs of an element having an even row number and an even column number and an element having an odd row number and an odd column number. By doing so, a lower-half submatrix 612B of the transformation matrix 612 is derived. That is, the whole transformation matrix 612 is derived. When such derivation is expressed as an operation expression for each element, where a transformation matrix to be derived is a transformation matrix T of N rows and N columns, and a submatrix to be used for the derivation is C, the derivation can be expressed as the following expression (80).

[Math. 70]

$$\text{sign}=(x\%2==1||y\%2==1)?1:-1$$

$$T[N-1-y,N-1-x]=\text{sign}*C[y,x]$$

$$\text{for } x=0, \ldots, N-1, y=0, \ldots, N/2-1 \quad (80)$$

Since the whole transformation matrix can be derived from the submatrix by applying such derivation, it becomes unnecessary to prepare the whole transformation matrix 612 of DST4 as a candidate of a transformation matrix to be used for orthogonal transform/inverse orthogonal transform (it is only required to prepare the submatrix 612A). That is, the information amount of this candidate can be reduced to half. That is, an increase in the LUT size can be suppressed. Furthermore, by performing orthogonal transform/inverse orthogonal transform using the derived transformation matrix, the same coding efficiency as a case of using the transformation matrix 612 of DST4 for the orthogonal transform/inverse orthogonal transform can be obtained.

Note that the transform type is not limited to the above-described example as long as the transformation matrix to which such derivation is applied has an element having the above-described symmetric property. For example, the transform type may be DCT4.

Furthermore, in the above description, the lower-half submatrix (the whole transformation matrix) has been derived from the upper-half submatrix. However, the embodiment is not limited to the example, and for example, the upper-half submatrix (the whole transformation matrix) may be derived from the lower-half submatrix.

Furthermore, derivation of an example one row below the third row example (the fourth row example from the top) focuses on a symmetric property with respect to a diagonal axis.

In this case, the submatrix is a submatrix of an upper right triangular portion or a submatrix of a lower left triangular portion of the transformation matrix, and the derivation unit derives the transformation matrix by transposing the submatrix to derive the submatrix of a lower left triangular portion or the submatrix of an upper right triangular portion of the transformation matrix.

Figure 89:
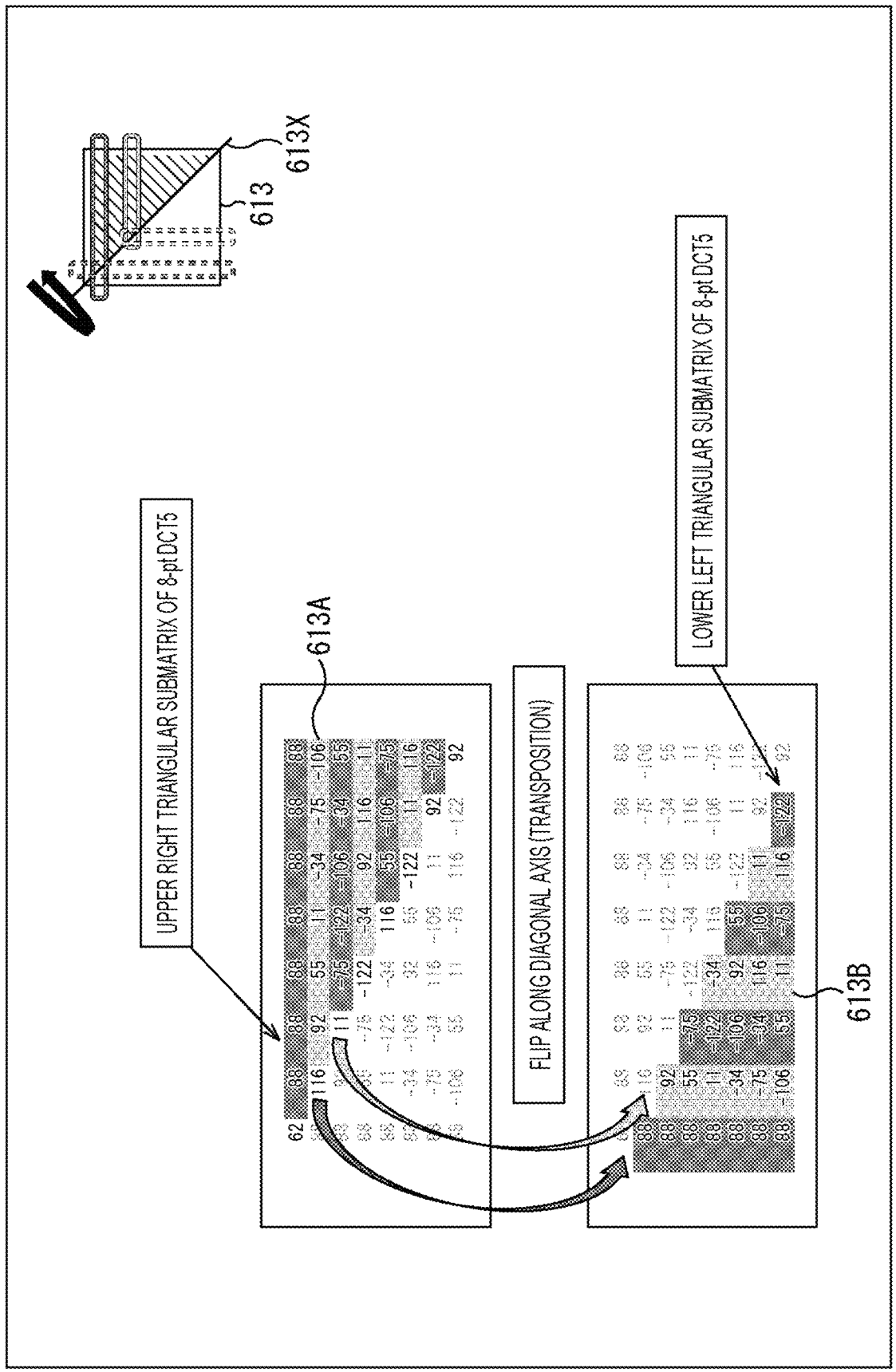
FIG. 89 is a diagram illustrating an example of a state of transformation matrix derivation.

For example, as illustrated in FIG. 89, the derivation unit flips a submatrix 613A of an upper right triangular portion of a transformation matrix 613 having the transform type of DCT5 around a diagonal line connecting an upper left end and a lower right end of the transformation matrix 613. By doing so, a submatrix 613B of a lower left triangular portion of the transformation matrix 613 is derived. That is, the whole transformation matrix 613 is derived. When such derivation is expressed as an operation expression for each element, where a transformation matrix to be derived is a transformation matrix T of N rows and N columns, and a submatrix to be used for the derivation is C, the derivation can be expressed as the following expression (81).

[Math. 71]

$$T[x,y]=C[y,x]$$

$$\text{for } y=1, \ldots, N-1, x=y, \ldots, N-1 \quad (81)$$

Since the whole transformation matrix can be derived from the submatrix by applying such derivation, it becomes unnecessary to prepare the whole transformation matrix 613 of DCT5 as a candidate of a transformation matrix to be used for orthogonal transform/inverse orthogonal transform (it is only required to prepare the submatrix 613A). That is, the information amount of this candidate can be reduced to half. That is, an increase in the LUT size can be suppressed. Furthermore, by performing orthogonal transform/inverse orthogonal transform using the derived transformation matrix, the same coding efficiency as a case of using the transformation matrix 613 of DCT5 for the orthogonal transform/inverse orthogonal transform can be obtained.

Note that, as illustrated in FIG. 89, transposition is equivalent to flip around a diagonal line connecting an upper left end and a lower right end of a transformation matrix. That is, the transposition is included in the flip (one of flip operations).

Furthermore, the transform type is not limited to the above-described example as long as the transformation matrix to which such derivation is applied has an element having the above-described symmetric property. For example, the transform type may be DST5, DCT4, or DCT8.

Furthermore, in the above description, derivation of the submatrix (whole transformation matrix) of a lower left triangular portion from the submatrix of an upper right triangular portion has been described. However, the embodiment is not limited thereto, and a submatrix (whole transformation matrix) of an upper right triangular portion may be derived from the submatrix of a lower left triangular portion, for example.

Furthermore, derivation of an example one row below the fourth row example (the fifth row example from the top) focuses on a symmetric property with respect to a diagonal axis at a cross position.

In this case, the submatrix is a submatrix of an upper left triangular portion or a submatrix of a lower right triangular portion of the transformation matrix, and the derivation unit is configured to derive the transformation matrix by flipping the submatrix in an oblique direction having, as an axis, a diagonal line connecting an upper right end and a lower left end of the transformation matrix, further inverting signs of an element having an even row number and an even column number and an element having an odd row number and an odd column number of the flipped submatrix, and deriving the submatrix of a lower right triangular portion or the submatrix of an upper left triangular portion of the transformation matrix.

Figure 90:
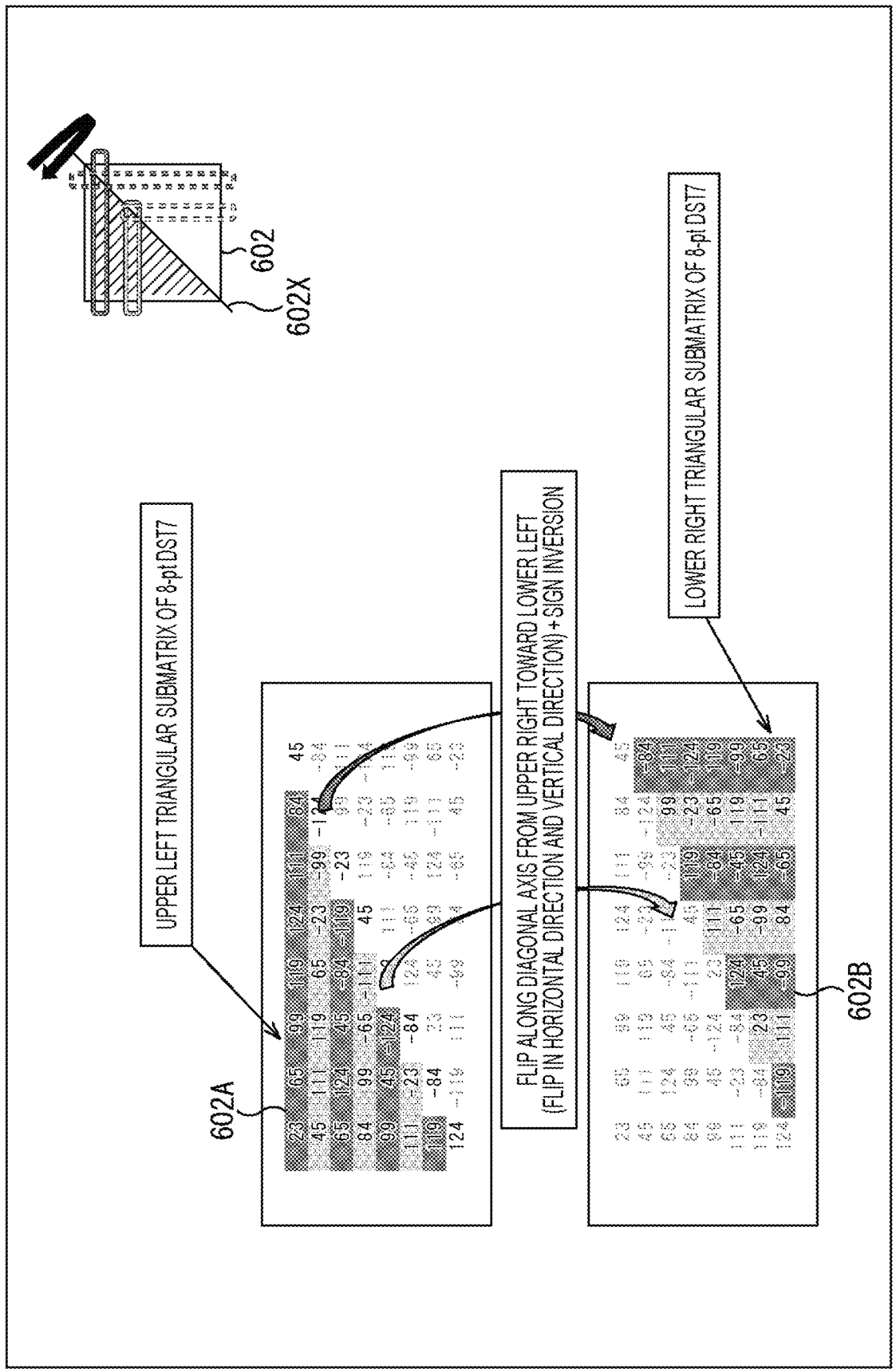
FIG. 90 is a diagram illustrating an example of a state of transformation matrix derivation.

For example, as illustrated in FIG. 90, the derivation unit flips a submatrix 602A of an upper left triangular portion of a transformation matrix 602 having the transform type of DST7 around a diagonal line connecting an upper right end and a lower left end of the transformation matrix 602. Moreover, the derivation unit inverts signs of an element having an even row number and an even column number and an element having an odd row number and an odd column number. By doing so, a submatrix 602B of a lower right triangular portion of the transformation matrix 602 is derived. That is, the whole transformation matrix 602 is derived. When such derivation is expressed as an operation expression for each element, where a transformation matrix to be derived is a transformation matrix T of N rows and N columns, and a submatrix to be used for the derivation is C, the derivation can be expressed as the following expression (82).

[Math. 72]

$$T[x,y]=sign*C[y,x]$$

$$\text{for } y=1, \ldots, N-1, x=0, \ldots, N-1-y \quad (82)$$

Since the whole transformation matrix can be derived from the submatrix by applying such derivation, it becomes unnecessary to prepare the whole transformation matrix 602 of DST7 as a candidate of a transformation matrix to be used for orthogonal transform/inverse orthogonal transform (it is only required to prepare the submatrix 602A). That is, the information amount of this candidate can be reduced to half. That is, an increase in the LUT size can be suppressed. Furthermore, by performing orthogonal transform/inverse orthogonal transform using the derived transformation matrix, the same coding efficiency as a case of using the transformation matrix 602 of DST7 for the orthogonal transform/inverse orthogonal transform can be obtained.

Note that the flip in the oblique direction having, as an axis, a diagonal line connecting an upper right end and a lower left end of the transformation matrix in this case is also included in the "transposition" (one of transposition operations) because rows and columns are interchanged.

Note that the transform type is not limited to the above-described example as long as the transformation matrix to which such derivation is applied has an element having the above-described symmetric property. For example, the transform type may be DST6.

Furthermore, in the above description, derivation of the submatrix (whole transformation matrix) of the lower right triangular portion from the submatrix of the upper left triangular portion has been described. However, the embodiment is not limited thereto, and the submatrix (whole transformation matrix) of the upper left triangular portion may be derived from the submatrix of the lower right triangular portion, for example.

Furthermore, derivation of examples one row below the fifth row example (the sixth to eighth row examples) focuses on axial symmetric property with respect to a vertical axis, an axial symmetric property with respect to a horizontal axis, and a point-symmetric property.

In this case, the submatrix is the upper left quarter submatrix of the transformation matrix, and the derivation unit flips the submatrix in the row direction of the transformation matrix and further inverts a sign of an odd-numbered row vector of the flipped submatrix to derive the upper right quarter submatrix of the transformation matrix, flips the submatrix in the column direction of the transformation matrix and further inverts a sign of an odd-numbered column vector of the flipped submatrix to derive the lower left quarter submatrix of the transformation matrix, and flips the submatrix in the rotation direction around the center of the transformation matrix and further inverts signs of an element having an even row number and an even column number and an element having an odd row number and an odd column number of the flipped submatrix to derive the lower right quarter submatrix of the transformation matrix.

Figure 91:
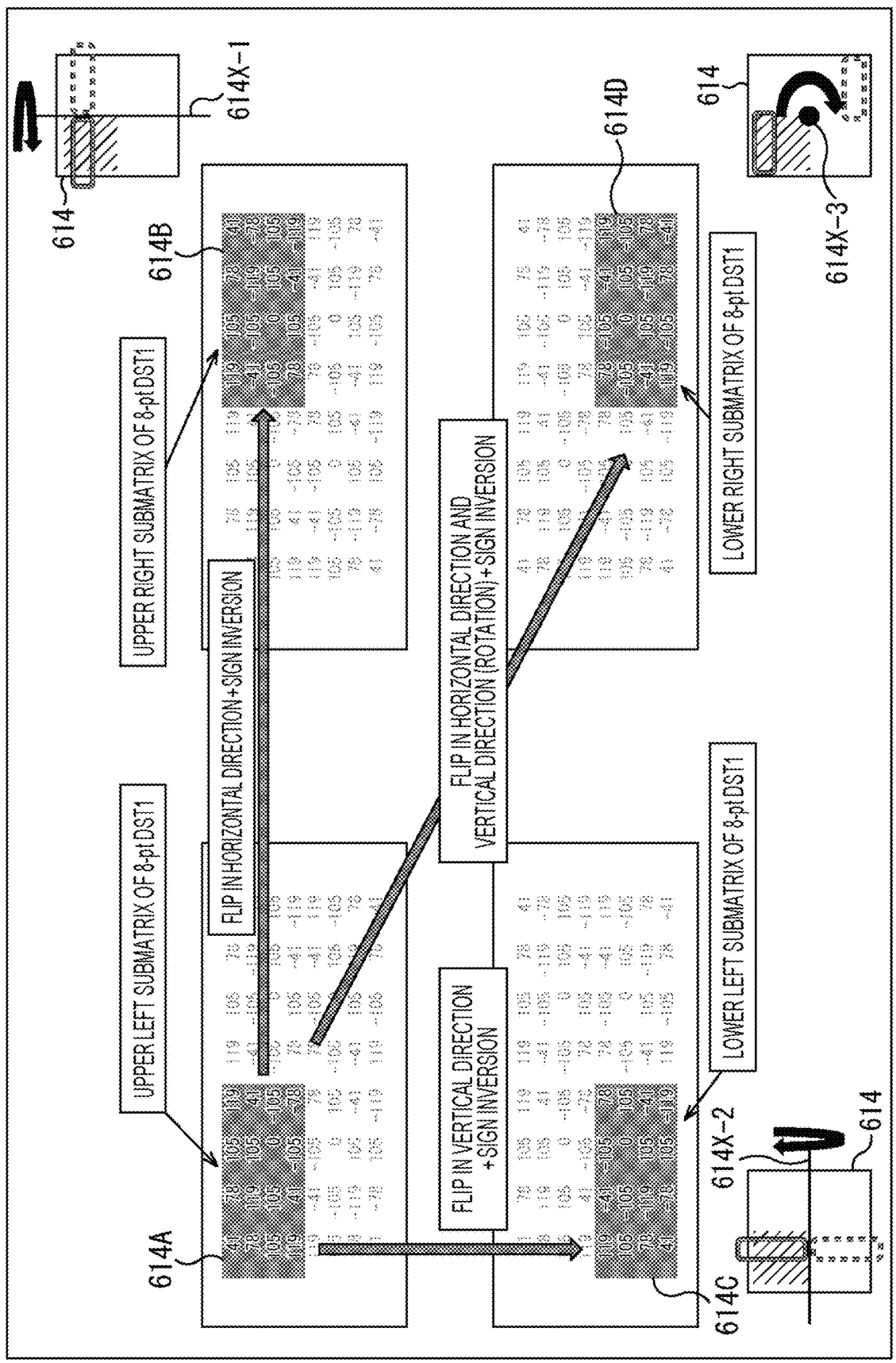
FIG. 91 is a diagram illustrating an example of a state of transformation matrix derivation.

For example, as illustrated in FIG. 91, the derivation unit flips an upper left quarter submatrix 614A of a transformation matrix 614 having the transform type of DST1 around an axis 614X-1 in a direction (column direction) parallel to a column passing through a center of the transformation matrix 614 (that is, flip is made in the horizontal direction). Moreover, the derivation unit inverts the sign of an odd-numbered row vector. By doing so, an upper right quarter submatrix 614B of the transformation matrix 614 is derived.

Furthermore, the derivation unit flips an upper left quarter submatrix 614A of a transformation matrix 614 having the transform type of DST1 around an axis 614X-2 in a direction (row direction) parallel to a row passing through a center of the transformation matrix 614 (that is, flip is made in the vertical direction). Moreover, the derivation unit inverts the sign of an odd-numbered column vector. By doing so, a lower left quarter submatrix 614C of the transformation matrix 614 is derived.

Moreover, the derivation unit flips an upper left quarter submatrix 614A of a transformation matrix 614 having the transform type of DST1 in a rotation direction around a center 614X-3 of the transformation matrix 614. Moreover, the derivation unit inverts signs of an element having an even row number and an even column number and an element having an odd row number and an odd column number. By doing so, a lower right quarter submatrix 614D of the transformation matrix 614 is derived.

That is, the whole transformation matrix 614 is derived. When such derivation is expressed as an operation expression for each element, where a transformation matrix to be derived is a transformation matrix T of N rows and N columns, and a submatrix to be used for the derivation is C, the derivation can be expressed as the following expressions (83) to (85).

[Math. 73]

[Upper Right Portion Matrix]

$sign=(y\%2==0)?1:-1$ $T[y,N-1-x]=sign*C[y,x]$ for $x=0,\ldots,N/2-1, y=0,\ldots,N/2-1$ (83)

[Lower Left Portion Matrix]

$sign=(x\%2==0)?1:-1$ $T[N-1-y,x]=sign*C[y,x]$ for $x=0,\ldots,N/2-1, y=0,\ldots,N/2-1$ (84)

[Lower Right Portion Matrix]

$sign=(x\%2==1||y\%2==1)?1:-1$ $T[N-1-y,N-1-x]=sign*C[y,x]$ for $x=0,\ldots,N/2-1, y=0,\ldots,N/2-1$ (85)

Since the whole transformation matrix can be derived from the submatrix by applying such derivation, it becomes unnecessary to prepare the whole transformation matrix 614 of DST1 as a candidate of a transformation matrix to be used for orthogonal transform/inverse orthogonal transform (it is only required to prepare the submatrix 614A). That is, the information amount of this candidate can be reduced to one fourth. That is, an increase in the LUT size can be suppressed. Furthermore, by performing orthogonal transform/inverse orthogonal transform using the derived transformation matrix, the same coding efficiency as a case of using the transformation matrix 614 of DST1 for the orthogonal transform/inverse orthogonal transform can be obtained.

Note that the transform type is not limited to the above-described example as long as the transformation matrix to which such derivation is applied has an element having the above-described symmetric property. For example, the transform type may be DCT1.

Furthermore, in the above-description, derivation of the remaining submatrix from the upper left quarter submatrix has been described. However, the embodiment is not limited thereto, and for example, the remaining submatrix may be derived from the upper right quarter submatrix, from the lower left quarter submatrix, or from the lower right quarter submatrix.

<Transformation Matrix Derivation Unit>

A configuration of an image encoding device 100 that derives a transformation matrix from such a submatrix is similar to the case of the first embodiment. Then, in the image encoding device 100, an orthogonal transform unit 113 performs processing to which the above-described present technology is applied, as a derivation unit and an orthogonal transform unit. Furthermore, the encoding unit 115 performs processing to which the above-described present technology is applied, as an encoding unit. Furthermore, the inverse orthogonal transform unit 118 performs processing to which the above-described present technology is applied, as an inverse orthogonal transform unit and a derivation unit. Therefore, the image encoding device 100 can suppress an increase in the memory capacity required for the orthogonal transform/inverse orthogonal transform.

Furthermore, the configuration of the orthogonal transform unit 113 is similar to the case of the first embodiment. Then, in the orthogonal transform unit 113, a primary transform unit 152 performs processing to which the above-described present technology is applied, as a derivation unit and an orthogonal transform unit. That is, the derivation unit derives the whole transformation matrix, using the submatrix constituting a part of the transformation matrix, and the orthogonal transform unit performs primary transform for the prediction residual, using the transformation matrix derived by the derivation unit. Therefore, an increase in the memory capacity required for the primary transform can be suppressed.

Note that, as described above, the primary transform unit 152 performs the primary horizontal transform and the primary vertical transform as the primary transform. That is, the derivation unit derives the transformation matrix for horizontal one-dimensional orthogonal transform and the transformation matrix for vertical one-dimensional orthogonal transform, and the orthogonal transform unit performs, as the primary transform, horizontal one-dimensional orthogonal transform, using the transformation matrix for horizontal one-dimensional orthogonal transform derived by the derivation unit, and further, vertical one-dimensional orthogonal transform, using the transformation matrix for vertical one-dimensional orthogonal transform derived by the derivation unit. Therefore, an increase in the memory capacity required for the primary transform where the horizontal one-dimensional orthogonal transform and the vertical one-dimensional orthogonal transform are performed can be suppressed.

Note that, in this case, the primary transform unit 152 has a similar configuration to the case of <2-2. Example 1-1>. Furthermore, a primary horizontal transform unit 312 has a similar configuration to the case of <2-2. Example 1-1>. Furthermore, a primary vertical transform unit 313 has a similar configuration to the case of <2-2. Example 1-1>. Note that an inner configuration of a transformation matrix derivation unit 321 of the primary horizontal transform unit 312 and an inner configuration of a transformation matrix derivation unit 351 of the primary vertical transform unit 313 are different from the case of <2-2. Example 1-1>.

Figure 92:
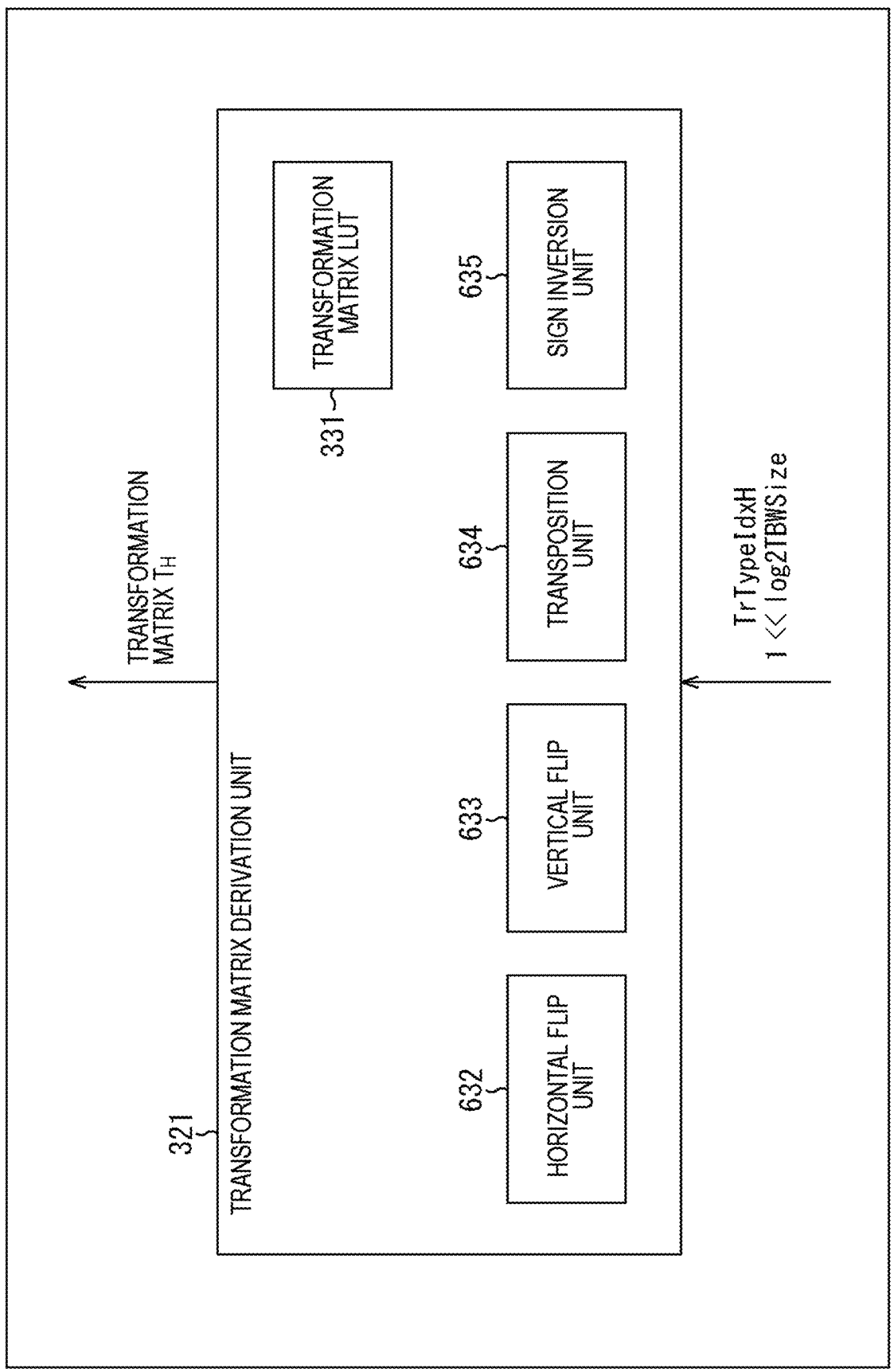
FIG. 92 is a block diagram illustrating a main configuration example of a transformation matrix derivation unit.

FIG. 92 is a block diagram illustrating a main configuration example of the transformation matrix derivation unit 321 included in the primary horizontal transform unit 312 in this case. As illustrated in FIG. 92, the transformation matrix derivation unit 321 in this case includes a transformation matrix LUT 331, a horizontal flip unit 632, a vertical flip unit 633, a transposition unit 634, and a sign inversion unit 635. Note that, in FIG. 92, arrows representing data transfer are omitted, but in the transformation matrix derivation unit 321, arbitrary data can be transferred between arbitrary processing units (processing blocks).

The horizontal flip unit 632 flips an input submatrix in the horizontal direction (row direction) around a straight line in the column direction passing through a center of a transformation matrix and outputs the flipped submatrix. The vertical flip unit 633 flips an input submatrix in the vertical direction (column direction) around a straight line in the row direction passing through the center of the transformation matrix and outputs the flipped submatrix. The transposition unit 634 transposes (obliquely flips) an input submatrix and outputs the transposed submatrix. The sign inversion unit 635 inverts a sign of a part of an input submatrix and outputs the submatrix after sign inversion.

For example, in the case of the first row derivation example from the top except the uppermost row of item names in the table illustrated in FIG. 85, the transformation matrix derivation unit 321 reads the left-half (or right-half) submatrix of the transformation matrix from the transformation matrix LUT 331, and flips the submatrix in the row direction (horizontal direction) via the horizontal flip unit 632 and further inverts the sign of an odd-numbered row vector of the flipped submatrix via the sign inversion unit 635 to derive the remaining submatrix of the transformation matrix. By the processing, all of submatrices of the transformation matrix can be obtained. That is, the whole transformation matrix is derived. The transformation matrix derivation unit 321 outputs the derived (whole) transformation matrix to the outside of the transformation matrix derivation unit 321 (supplies the same to the matrix calculation unit 322) as the transformation matrix $T_H$.

Furthermore, for example, in the case of the second row derivation example from the top of the table illustrated in FIG. 85, the transformation matrix derivation unit 321 reads the upper-half (or lower-half) submatrix of the transformation matrix from the transformation matrix LUT 331, and flips the submatrix in the column direction (vertical direction) via the vertical flip unit 633 and further inverts the sign of an odd-numbered column vector of the flipped submatrix via the sign inversion unit 635 to derive the remaining submatrix of the transformation matrix. By the processing, all of submatrices of the transformation matrix can be obtained. That is, the whole transformation matrix is derived. The transformation matrix derivation unit 321 outputs the derived (whole) transformation matrix to the outside of the transformation matrix derivation unit 321 (supplies the same to the matrix calculation unit 322) as the transformation matrix $T_H$.

Furthermore, for example, in the case of the third derivation example from the top of the table illustrated in FIG. 85, the transformation matrix derivation unit 321 reads the upper-half (or lower-half) submatrix of the transformation matrix from the transformation matrix LUT 331, flips the submatrix in the row direction (horizontal direction) via the horizontal flip unit 632, further flips the horizontally flipped submatrix in the column direction (vertical direction) via the vertical flip unit 633, and inverts the signs of an element having an even row number and an even column number and an element having an odd row number and an odd column number of the derived submatrix via the sign inversion unit 635 to derive the remaining submatrix of the transformation matrix. By the processing, all of submatrices of the transformation matrix can be obtained. That is, the whole transformation matrix is derived. The transformation matrix derivation unit 321 outputs the derived (whole) transformation matrix to the outside of the transformation matrix derivation unit 321 (supplies the same to the matrix calculation unit 322) as the transformation matrix $T_H$.

Furthermore, for example, in the case of the fourth derivation example from the top of the table illustrated in FIG. 85, the transformation matrix derivation unit 321 reads a submatrix of the upper right triangular portion (or the lower left triangular portion) of the transformation matrix from the transformation matrix LUT 331 and transposes the submatrix around the straight line connecting the upper left end and the lower right end of the transformation matrix via the transposition unit 634 to derive the remaining submatrix of the transformation matrix. By the processing, all of submatrices of the transformation matrix can be obtained. That is, the whole transformation matrix is derived. The transformation matrix derivation unit 321 outputs the derived (whole) transformation matrix to the outside of the transformation matrix derivation unit 321 (supplies the same to the matrix calculation unit 322) as the transformation matrix $T_H$.

Furthermore, for example, in the case of the fifth row derivation example from the top of the table illustrated in FIG. 85, the transformation matrix derivation unit 321 reads the submatrix of the upper left triangular portion (or lower right triangular portion) of the transformation matrix from the transformation matrix LUT 331, transposes the submatrix around the straight line connecting the upper right end and the lower left end of the transformation matrix via the transposition unit 634, and inverts the signs of an element having an even row number and an even column number and an element having an odd row number and an odd column number of the derive submatrix via the sign inversion unit 635 to derive the remaining submatrix of the transformation matrix. By the processing, all of submatrices of the transformation matrix can be obtained. That is, the whole transformation matrix is derived. The transformation matrix derivation unit 321 outputs the derived (whole) transformation matrix to the outside of the transformation matrix derivation unit 321 (supplies the same to the matrix calculation unit 322) as the transformation matrix $T_H$.

Moreover, for example, in the case of the sixth derivation example from the top illustrated in FIG. 85, the transformation matrix derivation unit 321 reads the upper left quarter submatrix of the transformation matrix from the transformation matrix LUT 331. The transformation matrix derivation unit 321 flips the submatrix in the row direction (horizontal direction) via the horizontal flip unit 632 and further inverts the sign of an odd-numbered row vector of the flipped submatrix via the sign inversion unit 635 to derive the upper right quarter submatrix of the transformation matrix.

Furthermore, the transformation matrix derivation unit 321 flips the upper left quarter submatrix in the column direction (vertical direction) via the vertical flip unit 633 and further inverts the sign of an odd-numbered column vector of the flipped submatrix via the sign inversion unit 635 to derive the lower left quarter submatrix of the transformation matrix.

Furthermore, the transformation matrix derivation unit 321 flips the upper left quarter submatrix in the row direction (horizontal direction) via the horizontal flip unit 632, further flips the horizontally flipped submatrix in the column direction (vertical direction) via the vertical flip unit 633, and inverts the signs of an element having an even row number and an even column number and an element having an odd row number and an odd column number of the derived submatrix via the sign inversion unit 635 to derive the lower right quarter submatrix of the transformation matrix.

That is, by the processing, all of submatrices of the transformation matrix can be obtained. That is, the whole transformation matrix is derived. The transformation matrix derivation unit 321 outputs the derived (whole) transformation matrix to the outside of the transformation matrix derivation unit 321 (supplies the same to the matrix calculation unit 322) as the transformation matrix $T_H$.

With the above-described configuration, the transformation matrix derivation unit 321 can implement each derivation example of the table illustrated in FIG. 85.

<Transformation Matrix Derivation Unit>

Figure 93:
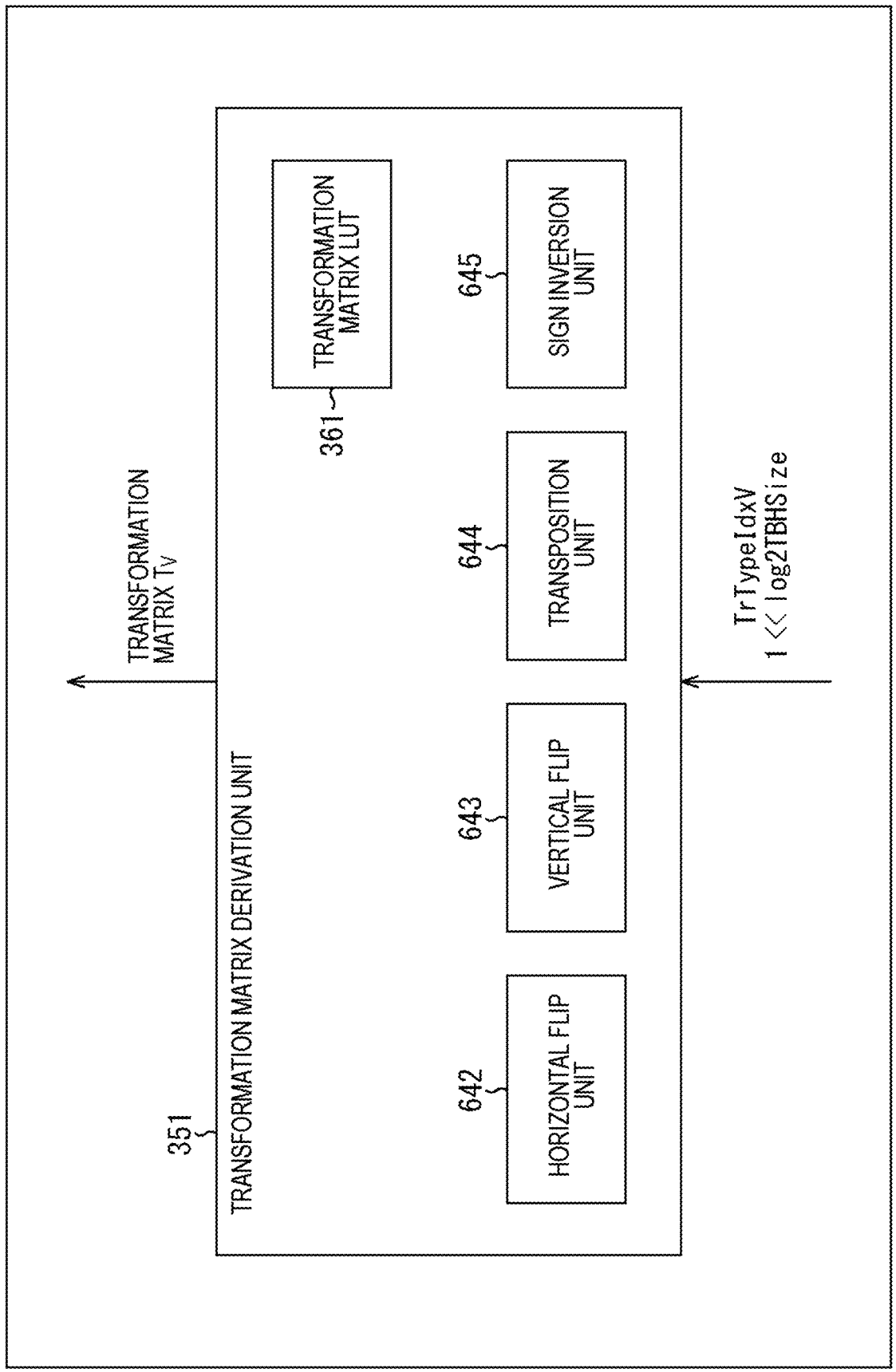
FIG. 93 is a block diagram illustrating a main configuration example of a transformation matrix derivation unit.

FIG. 93 is a block diagram illustrating a main configuration example of the transformation matrix derivation unit 351 included in the primary vertical transform unit 313 in this case. As illustrated in FIG. 93, the transformation matrix derivation unit 351 in this case includes a transformation matrix LUT 361, a horizontal flip unit 642, a vertical flip unit 643, a transposition unit 644, and a sign inversion unit 645, similarly to the case of the transformation matrix derivation unit 321. Note that, in FIG. 93, arrows representing data transfer are omitted, but in the transformation matrix derivation unit 351, arbitrary data can be transferred between arbitrary processing units (processing blocks).

The horizontal flip unit 642 is a processing unit similar to the horizontal flip unit 632. The vertical flip unit 643 is a processing unit similar to the vertical flip unit 633. The transposition unit 644 is a processing unit similar to the transposition unit 634. The sign inversion unit 645 is a processing unit similar to the sign inversion unit 635.

The transformation matrix derivation unit 351 reads a predetermined submatrix of the transformation matrix from the transformation matrix LUT 361, and derives a remaining submatrix from the submatrix by any of the methods of the derivation examples illustrated in the table in FIG. 85, appropriately via the horizontal flip unit 632 to the sign inversion unit 635. That is, the whole transformation matrix is derived. The transformation matrix derivation unit 351 outputs the derived (whole) transformation matrix to the outside of the transformation matrix derivation unit 351 (supplies the same to a matrix calculation unit 352) as the transformation matrix $T_V$.

With the above-described configuration, the transformation matrix derivation unit 351 can implement each derivation example of the table illustrated in FIG. 85.

<Flow of Transformation Matrix Derivation Processing>

Since the primary transform processing in this case is performed by a flow similar to the case of <2-2. Example 1-1> (performed by a flow similar to the flowchart in FIG. 27), description thereof is basically omitted.

Furthermore, in this case, the primary horizontal transform processing executed in step S302 in FIG. 27 is performed by a flow similar to the case of <2-2. Example 1-1> (performed by a flow similar to the flowchart in FIG. 28) but the transformation matrix derivation processing executed in step S321 in FIG. 28 is performed by a flow different from the case in FIG. 30.

An example of a flow of the transformation matrix derivation processing executed by the transformation matrix derivation unit 321 in the primary horizontal transform unit 312 in step S321 in FIG. 28 in this case will be described with reference to the flowchart in FIG. 94.

When the transformation matrix derivation processing is started, in step S701, the transformation matrix derivation unit 321 reads a submatrix C corresponding to a transform type identifier TrTypeIdxH from the transformation matrix LUT 331 by reference to the correspondence table illustrated in FIG. 95, for example.

In step S702, the transformation matrix derivation unit 321 derives a transformation matrix $T_H$ of the transform type corresponding to the transform type identifier TrTypeIdxH from the submatrix C on the basis of a predetermined derivation method (any of the derivation methods illustrated in the table in FIG. 85) appropriately using the horizontal flip unit 632 to the sign inversion unit 635.

When the processing in step S702 ends, the transformation matrix derivation processing ends and the processing returns to FIG. 28.

<Flow of Transformation Matrix Derivation Processing>

Note that, in this case, the primary vertical transform processing executed in step S303 in FIG. 27 is performed by a flow similar to the case of <2-2. Example 1-1> (performed by a flow similar to the flowchart in FIG. 32). Note that the transformation matrix derivation processing executed in step S361 in FIG. 32 is performed by a flow similar to the case of the flowchart in FIG. 94.

Therefore, the description is omitted. In the description in FIG. 94, the transform type identifier TrTypeIdxH is simply replaced with a transform type identifier TrTypeIdxV, and the transformation matrix $T_H$ is simply replaced with a transformation matrix $T_V$.

<Transformation Matrix Derivation Unit>

Next, a configuration of the image decoding device 200 in the case will be described. Since configurations of the inverse primary transform unit 253, the inverse primary vertical transform unit 412, the inverse primary horizontal transform unit 413, and the like included in the image decoding device 200 in this case are similar to the case of <2-2. Example 1-1>, description thereof is omitted.

That is, the inverse orthogonal transform unit may perform inverse secondary transform for the coefficient data obtained by the decoding unit, and further perform inverse primary transform for an inverse secondary transform result, using the transformation matrix derived by the derivation unit.

Furthermore, the derivation unit may derive the transformation matrix for horizontal inverse one-dimensional orthogonal transform and the transformation matrix for vertical inverse one-dimensional orthogonal transform, and the inverse orthogonal transform unit may perform the horizontal inverse one-dimensional orthogonal transform using the transformation matrix for horizontal inverse one-dimensional orthogonal transform derived by the derivation unit and further perform the vertical inverse one-dimensional orthogonal transform using the transformation matrix for vertical inverse one-dimensional orthogonal transform derived by the derivation unit, as the inverse primary transform.

Figure 96:
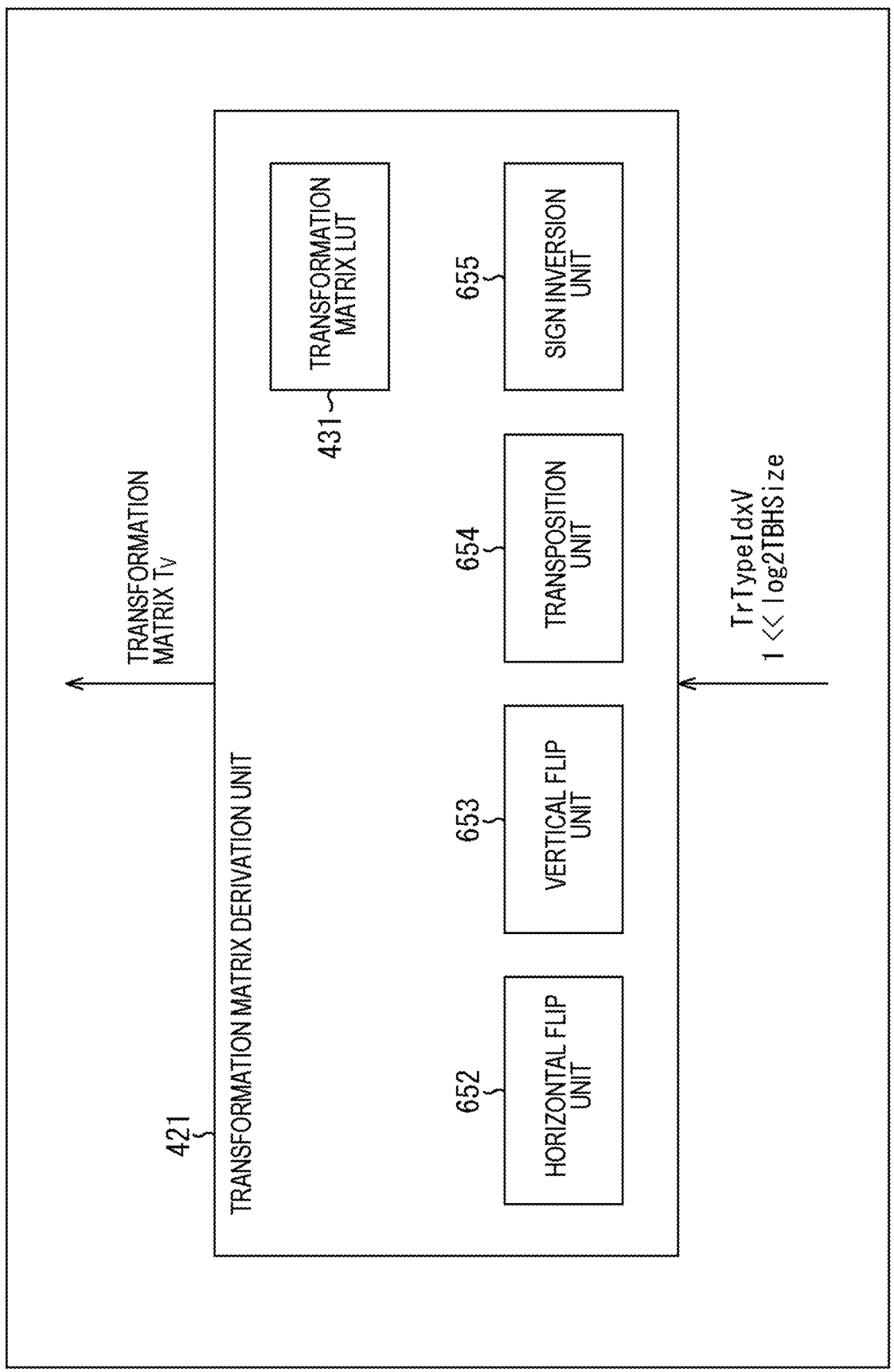
FIG. 96 is a block diagram illustrating a main configuration example of a transformation matrix derivation unit.

FIG. 96 is a block diagram illustrating a main configuration example of a transformation matrix derivation unit 421 included in the inverse primary vertical transform unit 412 in this case. As illustrated in FIG. 96, the transformation matrix derivation unit 421 in this case includes a transformation matrix LUT 431, a horizontal flip unit 652, a vertical flip unit 653, a transposition unit 654, and a sign inversion unit 655, similarly to the transformation matrix derivation unit 321. Note that, in FIG. 96, arrows representing data transfer are omitted, but in the transformation matrix derivation unit 421, arbitrary data can be transferred between arbitrary processing units (processing blocks).

The horizontal flip unit 652 is a processing unit similar to the horizontal flip unit 632. The vertical flip unit 653 is a processing unit similar to the vertical flip unit 633. The transposition unit 654 is a processing unit similar to the transposition unit 634. The sign inversion unit 655 is a processing unit similar to the sign inversion unit 635.

In the inverse orthogonal transform (inverse primary vertical transform), the transformation matrix derivation unit 421 reads a predetermined submatrix of the transformation matrix from the transformation matrix LUT 431, and derives a remaining submatrix from the submatrix by any of the methods of the derivation examples illustrated in the table in FIG. 85, appropriately via the horizontal flip unit 652 to the sign inversion unit 655. That is, the whole transformation matrix is derived. The transformation matrix derivation unit 421 outputs the derived (whole) transformation matrix to the outside of the transformation matrix derivation unit 421 (supplies the same to the matrix calculation unit 422) as the transformation matrix $T_V$.

With the above-described configuration, the transformation matrix derivation unit 421 can implement each derivation example of the table illustrated in FIG. 85.

<Transformation Matrix Derivation Unit>

Figure 97:
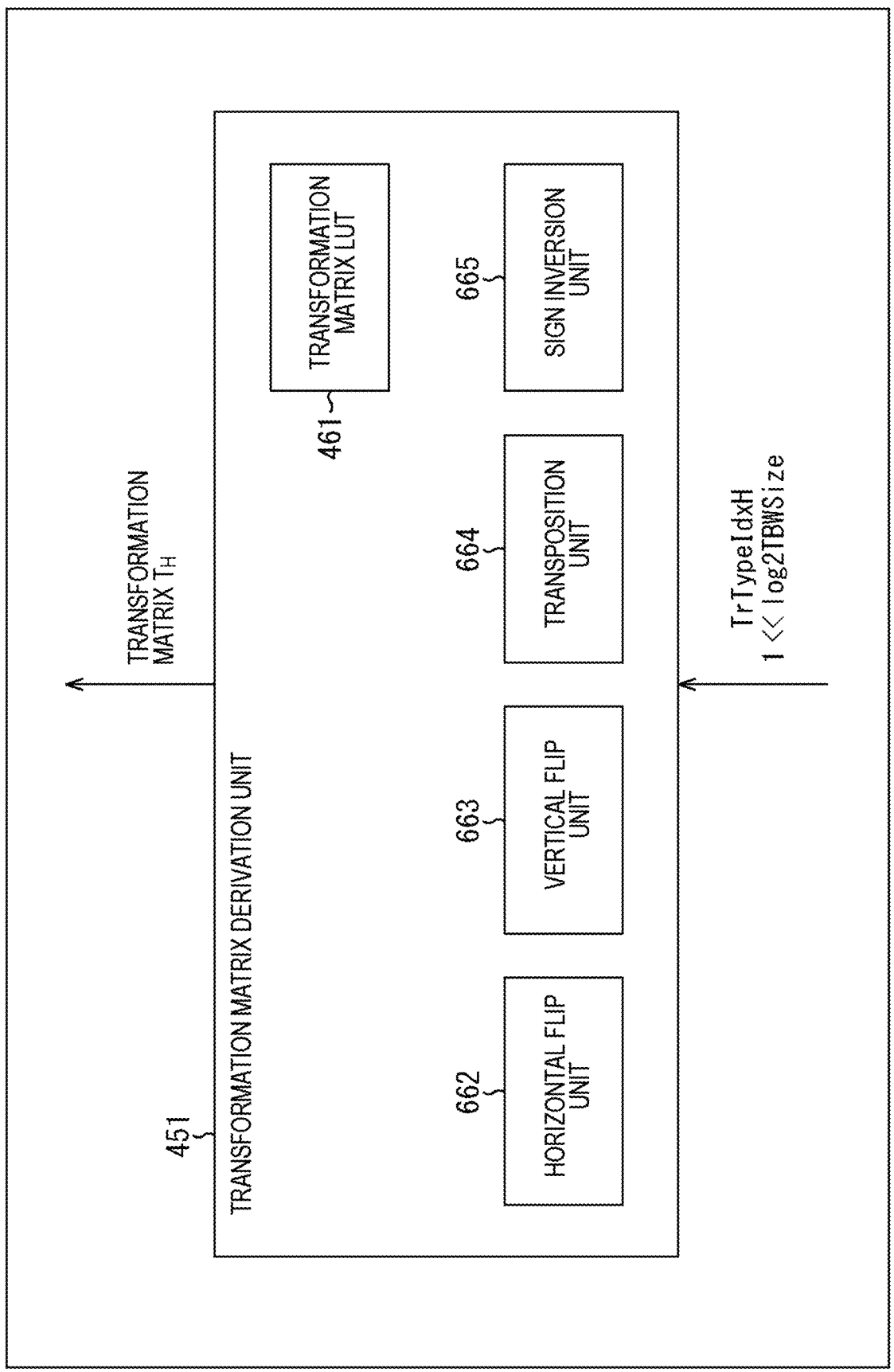
FIG. 97 is a block diagram illustrating a main configuration example of a transformation matrix derivation unit.

FIG. 97 is a block diagram illustrating a main configuration example of a transformation matrix derivation unit 451 included in the inverse primary horizontal transform unit 413 in this case. As illustrated in FIG. 97, the transformation matrix derivation unit 451 in this case includes a transformation matrix LUT 461, a horizontal flip unit 662, a vertical flip unit 663, a transposition unit 664, and a sign inversion unit 665, similarly to the transformation matrix derivation unit 421. Note that, in FIG. 97, arrows representing data transfer are omitted, but in the transformation matrix derivation unit 451, arbitrary data can be transferred between arbitrary processing units (processing blocks).

The horizontal flip unit 662 is a processing unit similar to the horizontal flip unit 632. The vertical flip unit 663 is a processing unit similar to the vertical flip unit 633. The transposition unit 664 is a processing unit similar to the transposition unit 634. The sign inversion unit 665 is a processing unit similar to the sign inversion unit 635.

In the inverse orthogonal transform (inverse primary horizontal transform), the transformation matrix derivation unit 451 reads a predetermined submatrix of the transformation matrix from the transformation matrix LUT 431, and derives a remaining submatrix from the submatrix by any of the methods of the derivation examples illustrated in the table in FIG. 85, appropriately via the horizontal flip unit 662 to the sign inversion unit 665. That is, the whole transformation matrix is derived. The transformation matrix derivation unit 451 outputs the derived (whole) transformation matrix to the outside of the transformation matrix derivation unit 451 (supplies the same to the matrix calculation unit 452) as the transformation matrix $T_V$.

With the above-described configuration, the transformation matrix derivation unit 451 can implement each derivation example of the table illustrated in FIG. 85.

<Flow of Transformation Matrix Derivation Processing>

The inverse primary transform processing in this case is performed by a flow similar to the case of <2-2. Example 1-1> (performed by a flow similar to the flowchart in FIG. 39). Furthermore, the inverse primary transform selection processing executed in step S401 in FIG. 39 is performed by a flow similar to the case of <2-2. Example 1-1> (performed by a flow similar to the flowchart in FIG. 40). Furthermore, the inverse primary vertical transform processing executed in step S402 in FIG. 39 is performed by a flow similar to the case of <2-2. Example 1-1> (performed by a flow similar to the flowchart in FIG. 41). Therefore, description of the above processing is basically omitted.

Figure 94:
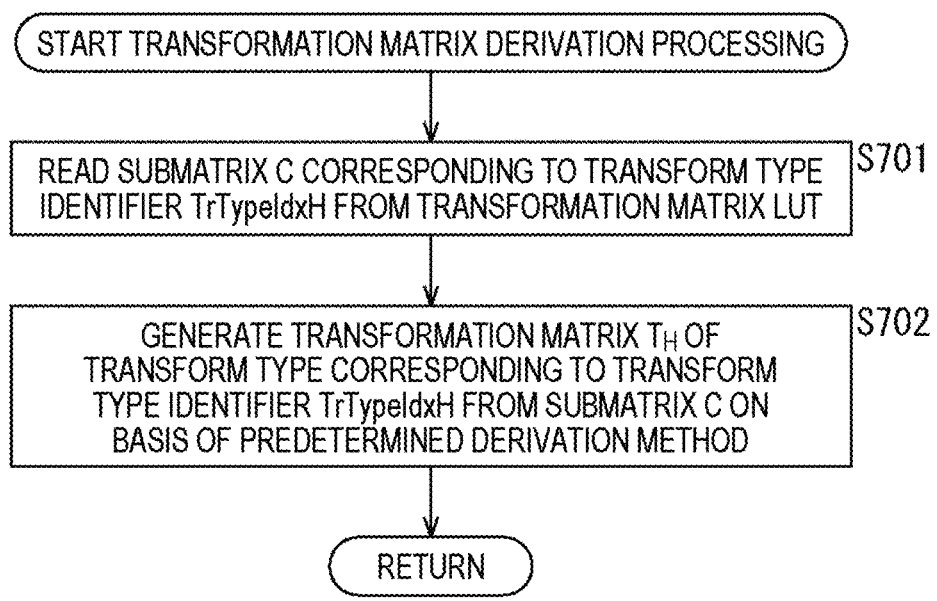
FIG. 94 is a flowchart for describing an example of a flow of transformation matrix derivation processing.

Note that the transformation matrix derivation processing (step S441 in FIG. 41) executed in the inverse primary vertical transform processing is performed by a flow similar to the case of the flowchart in FIG. 94. Therefore, the description is omitted.

<Flow of Transformation Matrix Derivation Processing>

Note that, in this case, the inverse primary horizontal transform processing executed in step S403 in FIG. 39 is performed by a flow similar to the case of <2-2. Example 1-1> (performed by a flow similar to the flowchart in FIG. 42). Therefore, the description is omitted.

Note that the transformation matrix derivation processing (step S461 in FIG. 42) executed in the inverse primary horizontal transform processing is performed by a flow similar to the case of the flowchart in FIG. 94.

Therefore, the description is omitted.

5. FOURTH EMBODIMENT

5-1. Common Concept

<Combination of Embodiments>

The first to third embodiments have been described. These embodiments may be combined and applied. For example, the method described in Example 1-1 and the method described in the third embodiment may be applied in combination to the method described in Non-Patent Document 1.

That is, a derivation unit may derive a first transformation matrix, using a submatrix, and further derive a second transformation matrix, using the derived first transformation matrix, and an orthogonal transform unit may orthogonally transform a prediction residual, using the second transformation matrix derived by the derivation unit.

At that time, the derivation unit may derive the second transformation matrix of a different transform type from the first transformation matrix, using the first transformation matrix. Furthermore, the derivation unit may flip or transpose the first transformation matrix to derive the second transformation matrix.

In this case, as illustrated in the table in FIG. 98, the five types of transformation matrices required in the case of the technology described in Non-Patent Document 1 (see the table A in FIG. 6) can be reduced to three types, and moreover, it is only required to prepare submatrices for the three types of transformation matrices. Therefore, the total LUT size can be about 20 KB. That is, the size of the LUT can be reduced (by about 53 KB (the table A in FIG. 6)) as compared with the case of the technology described in Non-Patent Document 1. That is, an increase in the size of the LUT can be suppressed.

<Transformation Matrix Derivation Unit>

Also in this case, configurations of an image encoding device 100 and an image decoding device 200 are basically similar to those of the first embodiment. However, only configurations of transformation matrix derivation units are different from those of the first embodiment.

Figure 99:
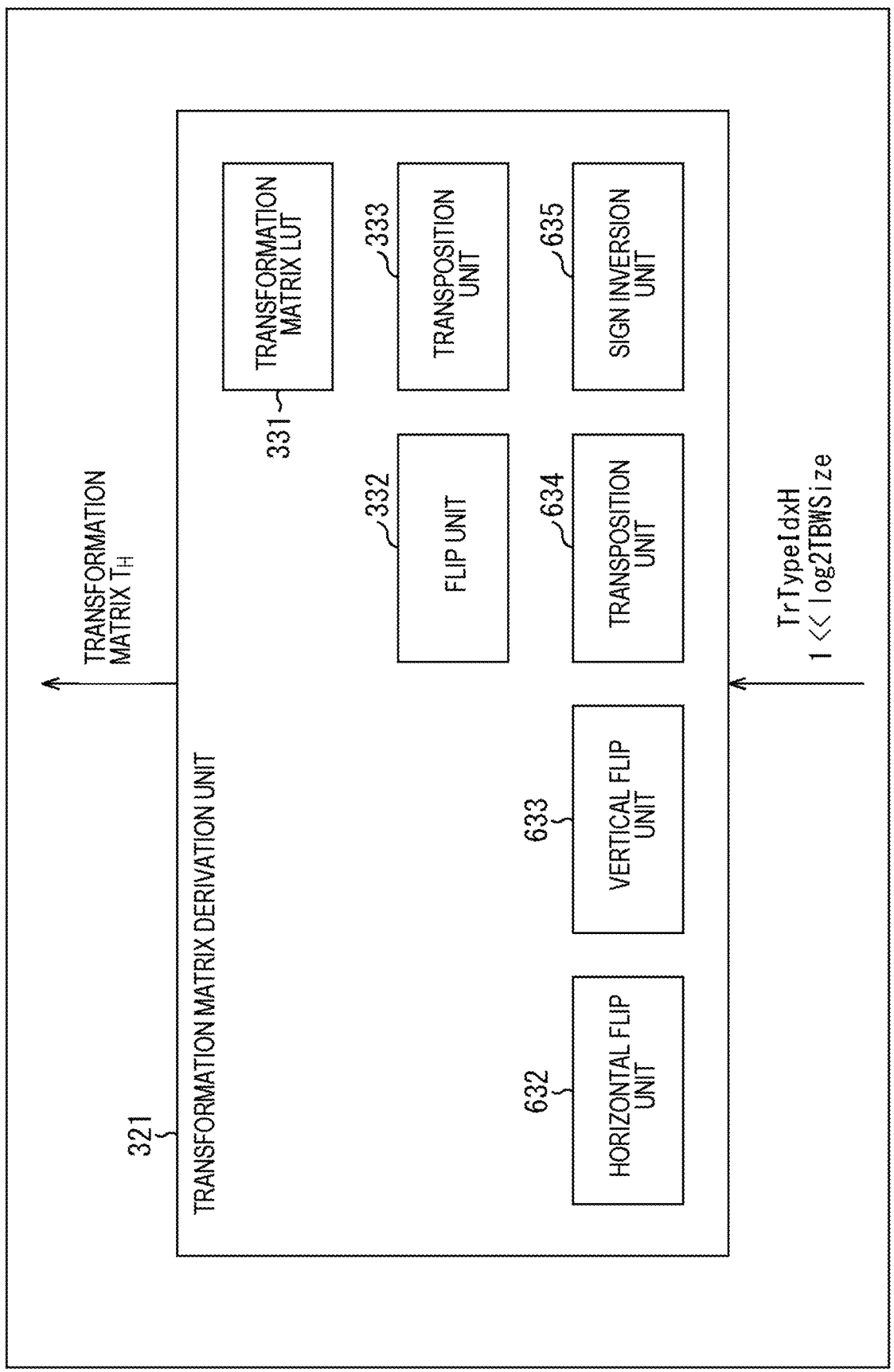
FIG. 99 is a block diagram illustrating a main configuration example of a transformation matrix derivation unit.

For example, FIG. 99 illustrated a main configuration example of a transformation matrix derivation unit 321 in this case. As illustrated in FIG. 99, the transformation matrix derivation unit 321 in this case is only required to have both the configuration (FIG. 24) of Example 1-1 and the configuration (FIG. 92) of the third embodiment. That is, the transformation matrix derivation unit 321 in this case includes a transformation matrix LUT 331, a flip unit 332, a transposition unit 333, a horizontal flip unit 632, a vertical flip unit 633, a transposition unit 634, and a sign inversion unit 635.

<Flow of Transformation Matrix Derivation Processing>

Figure 100:
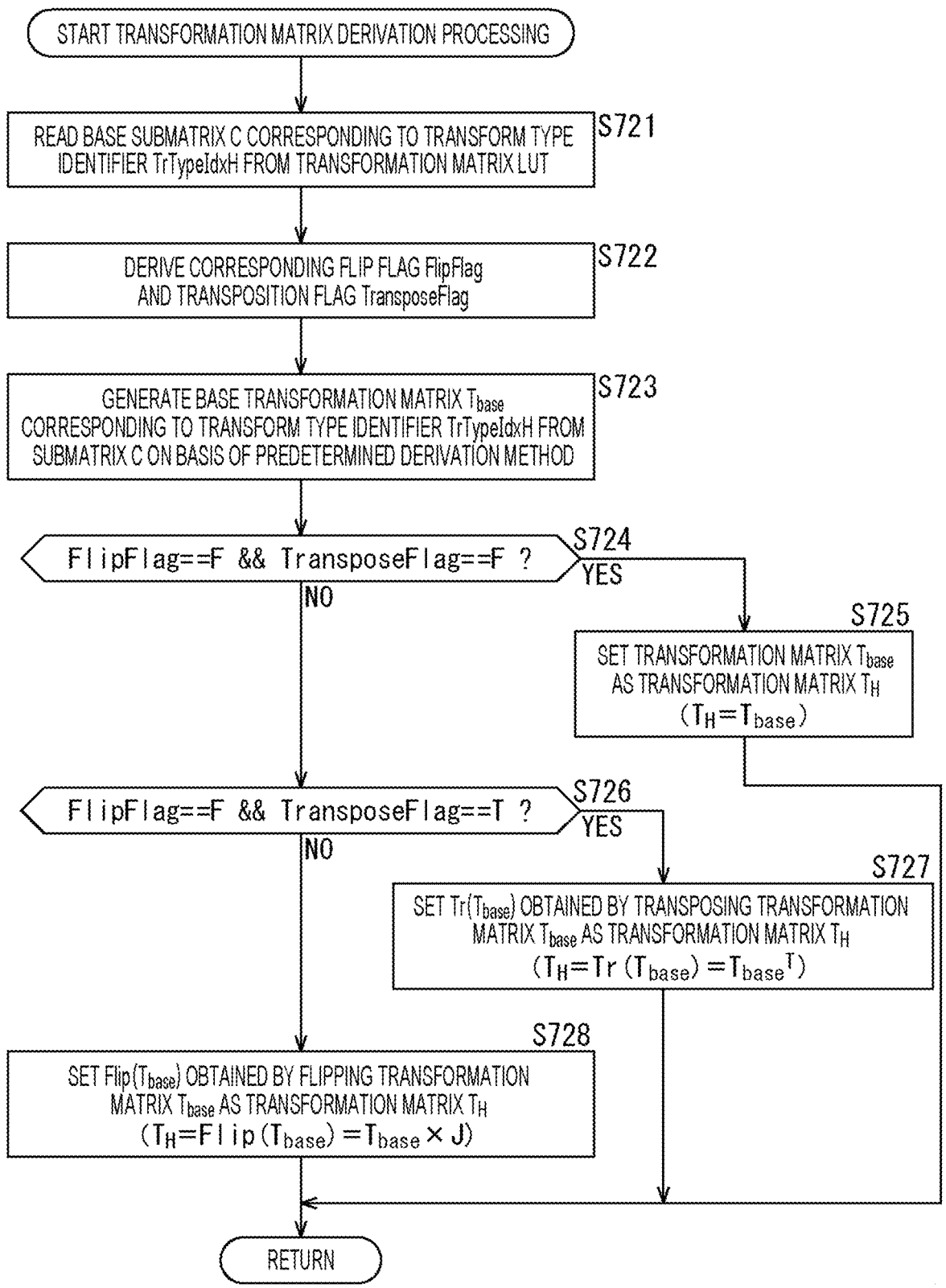
FIG. 100 is a flowchart for describing an example of a flow of transformation matrix derivation processing.

An example of a flow of transformation matrix derivation processing executed in primary horizontal transform processing by the transformation matrix derivation processing will be described with reference to the flowchart in FIG. 100.

When the transformation matrix derivation processing is started, in step S721, the transformation matrix derivation unit 321 reads a base submatrix C corresponding to a transform type identifier TrTypeIdxH from the transformation matrix LUT 331 by reference to the correspondence table illustrated in FIG. 101.

In step S722, the transformation matrix derivation unit 321 derives a flip flag FlipFlag and a transposition flag TransposeFlag corresponding to the transform type identifier TrTypeIdxH (sets a value) on the basis of the correspondence table.

In step S723, the transformation matrix derivation unit 321 generates a base transformation matrix $T_{base}$ corresponding to the transform type identifier TrTypeIdxH from the submatrix C on the basis of a predetermined derivation method, appropriately using the horizontal flip unit 632 to the sign inversion unit 635.

Then, the transformation matrix derivation unit 321 executes each processing from steps S724 to S728, appropriately using the flip unit 332 and the transposition unit 333, similarly to each processing from step S342 to S346 in FIG. 30. That is, the first transformation matrix is appropriately transformed to the second transformation matrix.

When the processing in step S728 ends, the transformation matrix derivation processing ends and the processing returns to FIG. 28.

Note that all of a transformation matrix derivation unit 351 included in a primary vertical transform unit 313, a transformation matrix derivation unit 421 included in an inverse primary vertical transform unit 412, and a transformation matrix derivation unit 451 included in an inverse primary horizontal transform unit 413 have similar configurations to the case described with reference to FIG. 99. Therefore, description of the processing is omitted.

Furthermore, all of transformation matrix derivation processing executed in primary vertical transform processing, transformation matrix derivation processing executed in inverse primary vertical transform processing, and transformation matrix derivation processing executed in inverse primary horizontal transform processing are executed by flows similar to the case described with reference to the flowchart in FIG. 100. Therefore, description of the processing is omitted.

By doing so, effects of both Example 1-1 and the third embodiment can be obtained.

Note that the combination of the embodiments (examples) is arbitrary, and is not limited to this example. For example, the method described in the third embodiment can be combined with each example of the first embodiment. Furthermore, the method described in the third embodiment can be combined with the method described in the second embodiment.

6. APPENDIX

<Computer>

The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like.

FIG. 102 is a block diagram illustrating a configuration example of hardware of a computer that executes the above-described series of processing by a program.

In a computer 800 illustrated in FIG. 102, a central processing unit (CPU) 801, a read only memory (ROM) 802, and a random access memory (RAM) 803 are mutually connected by a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disk, a magneto-optical disk, or a semiconductor memory.

In the computer configured as described above, the CPU 801 loads, for example, a program stored in the storage unit 813 into the RAM 803 and executes the program via the input/output interface 810 and the bus 804, so that the above-described series of processing is performed. Furthermore, the RAM 803 appropriately stores data and the like necessary for the CPU 801 to execute the various types of processing.

The program executed by the computer (CPU 801) can be recorded on the removable medium 821 as a package medium or the like, for example, and applied. In that case, the program can be installed to the storage unit 813 via the input/output interface 810 by attaching the removable medium 821 to the drive 815.

Furthermore, this program can be provided via a wired or wireless transmission medium such as a local area network, the Internet, or digital broadcast. In that case, the program can be received by the communication unit 814 and installed in the storage unit 813.

Other than the above method, the program can be installed in the ROM 802 or the storage unit 813 in advance.

<Units of Information and Processing>

The data unit in which various types of information described above are set and the data unit to be processed by various types of processing are arbitrary, and are not limited to the above-described examples. For example, these pieces of information and processing may be set for each transform unit (TU), transformation block (TB), prediction unit (PU), prediction block (PB), coding unit (CU), largest coding unit (LCU), subblock, block, tile, slice, picture, sequence, or component, or data in these data units may be used. Of course, this data unit can be set for each information and processing, and the data units of all pieces of information and processing need not to be unified. Note that the storage location of these pieces of information is arbitrary, and may be stored in a header, a parameter, or the like of the above-described data unit. Furthermore, the information may be stored in a plurality of locations.

<Control Information>

Control information regarding the present technology described in the above embodiments may be transmitted from the encoding side to the decoding side. For example, control information (for example, enabled_flag) for controlling whether or not application of the above-described present technology is to be permitted (or prohibited) may be transmitted.

Furthermore, for example, control information indicating an object to which the above-described present technology is applied (or an object to which the present technology is not applied) may be transmitted. For example, control information for specifying a block size (upper limit, lower limit, or both) to which the present technology is applied (or application is permitted or prohibited), a frame, a component, a layer, or the like may be transmitted.

<Applicable Object of Present Technology>

The present technology can be applied to any image encoding/decoding method. That is, specifications of various types of processing regarding image encoding/decoding such as transform (inverse transform), quantization (inverse quantization), encoding (decoding), and prediction are arbitrary and are not limited to the above-described examples as long as no contradiction occurs with the above-described present technology. Furthermore, part of the processing may be omitted as long as no contradiction occurs with the above-described present technology.

Furthermore, the present technology can be applied to a multi-view image encoding/decoding system that performs encoding/decoding of a multi-view image including images of a plurality of viewpoints (views). In this case, the present technology is simply applied to encoding/decoding of each viewpoint (view).

Furthermore, the present technology can be applied to a hierarchical image encoding (scalable encoding)/decoding system that encodes/decodes a hierarchical image that is multi-layered (hierarchized) so as to have a scalability function for a predetermined parameter. In this case, the present technology is simply applied to encoding/decoding of each layer (layer).

The image encoding devices 100 and the image decoding devices 200 according to the above-described embodiments can be applied to, for example, transmitters and receivers (such as television receivers and mobile phones) in satellite broadcasting, cable broadcasting such as cable TV, distribution on the Internet, and distribution to terminals by cellular communication, or various electronic devices such as devices (for example, hard disk recorders and cameras) that record images on media such as optical disks, magnetic disks, and flash memories, and reproduce images from these storage media.

Furthermore, the present technology can be implemented as any configuration to be mounted on a device that configures arbitrary device or system, such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit (that is, a configuration of a part of the device), for example.

Moreover, the present technology can also be applied to a network system including a plurality of devices. For example, the present technology can be applied to a cloud service that provides a service regarding an image (moving image) to an arbitrary terminal such as a computer, an audio visual (AV) device, a portable information processing terminal, or an internet of things (IoT) device.

Note that the systems, apparatuses, processing units, and the like to which the present technology is applied can be used in arbitrary fields such as traffic, medical care, crime prevention, agriculture, livestock industry, mining, beauty, factory, household appliance, weather, and natural surveillance, for example.

Furthermore, uses in the arbitrary fields are also arbitrary.

For example, the present technology can be applied to systems and devices provided for providing content for appreciation and the like. Furthermore, for example, the present technology can also be applied to systems and devices used for traffic, such as traffic condition monitoring and automatic driving control. Moreover, for example, the present technology can also be applied to systems and devices provided for security. Furthermore, for example, the present technology can be applied to systems and devices provided for automatic control of machines and the like. Moreover, for example, the present technology can also be applied to systems and devices provided for agriculture or livestock industry. Furthermore, the present technology can also be applied to systems and devices that monitor nature states such as volcanos, forests, and ocean, wildlife, and the like. Moreover, for example, the present technology can also be applied to systems and devices provided for sports.

OTHERS

Note that the "flag" in the present specification is information for identifying a plurality of states, and includes not only information used for identifying two states of true (1) and false (0) but also information capable of identifying three or more states. Therefore, the value that the "flag" can take may be, for example, a binary value of I/O or may be a ternary value or more. That is, the number of bits constituting the "flag" is arbitrary, and may be 1 bit or a plurality of bits. Furthermore, the identification information (including flag) is assumed to be in not only a form of including the identification information in a bit stream but also a form of including difference information of the identification information from certain reference information in a bit stream. Therefore, in the present specification, the "flag" and "identification information" include not only the information itself but also the difference information for the reference information.

Furthermore, various types of information (metadata and the like) regarding coded data (bit stream) may be transmitted or recorded in any form as long as the various types of information are associated with the coded data. Here, the term "associate" means that, for example, one data can be used (linked) when the other data is processed. That is, data associated with each other may be collected as one data or may be individual data. For example, information associated with coded data (image) may be transmitted on a transmission path different from that of the coded data (image). Furthermore, for example, information associated with coded data (image) may be recorded on a different recording medium (or another recording area of the same recording medium) from the coded data (image). Note that this "association" may be a part of data instead of entire data. For example, an image and information corresponding to the image may be associated with each other in an arbitrary unit such as a plurality of frames, one frame, or a part in a frame.

Note that, in the present specification, terms such as "combining", "multiplexing", "adding", "integrating", "including", "storing", and "inserting" mean putting a plurality of things into one, such as putting coded data and metadata into one data, and means one method of the above-described "association".

Furthermore, embodiments of the present technology are not limited to the above-described embodiments, and various modifications can be made without departing from the gist of the present technology.

Furthermore, for example, the present technology can be implemented as any configuration constituting a device or a system, such as a processor as a system large scale integration (LSI) or the like, a module using a plurality of processors or the like, a unit using a plurality of modules or the like, or a set in which other functions are added to the unit (that is, a configuration of a part of the device), for example.

Note that, in this specification, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one casing are both systems.

Further, for example, the configuration described as one device (or processing unit) may be divided into and configured as a plurality of devices (or processing units). On the contrary, the configuration described a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Further, for example, in the present technology, a configuration of cloud computing in which one function is shared and processed in cooperation by a plurality of devices via a network can be adopted.

Furthermore, for example, the above-described program can be executed by an arbitrary device. In that case, the device is only required to have necessary functions (functional blocks and the like) and obtain necessary information.

Further, for example, the steps described in the above-described flowcharts can be executed by one device or can be executed by a plurality of devices in a shared manner. Furthermore, in the case where a plurality of processes is included in one step, the plurality of processes included in the one step can be executed by one device or can be shared and executed by a plurality of devices. In other words, the plurality of processes included in one step can be executed as processes of a plurality of steps. Conversely, the processing described as a plurality of steps can be collectively executed as one step.

Note that, in the program executed by the computer, the processing of the steps describing the program may be executed in chronological order according to the order described in the present specification, or may be individually executed in parallel or at necessary timing when a call is made, for example. That is, the processing of each step may be executed in an order different from the above-described order as long as no contradiction occurs. Further, the processing of the steps describing the program may be executed in parallel with the processing of another program, or may be executed in combination with the processing of another program.

Note that the plurality of present technologies described in the present specification can be implemented independently of one another as a single unit as long as there is no inconsistency. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

Note that the present technology can also have the following configurations.

(1) An image processing apparatus including:
a derivation unit configured to derive a second transformation matrix using a first transformation matrix;
an orthogonal transform unit configured to orthogonally transform a prediction residual of an image, using the second transformation matrix derived by the derivation unit; and
an encoding unit configured to encode coefficient data obtained by orthogonally transforming the prediction residual by the orthogonal transform unit to generate a bit stream.

(2) The image processing apparatus according to (1), in which
the derivation unit derives the second transformation matrix of a transform type different from that of the first transformation matrix, using the first transformation matrix.

(3) The image processing apparatus according to (1) or (2), in which
the derivation unit derives the second transformation matrix having a same number of rows and a same number of columns as the first transformation matrix, using the first transformation matrix.

(4) The image processing apparatus according to any one of (1) to (3), in which
the derivation unit derives the second transformation matrix by an operation for an element of the first transformation matrix.

(5) The image processing apparatus according to (4), in which
the operation includes rearrangement of elements.

(6) The image processing apparatus according to (4) or (5), in which
the derivation unit derives the second transformation matrix by performing the operation a plurality of times.

(7) The image processing apparatus according to any one of (1) to (6), in which
the derivation unit derives the second transformation matrix, using the first transformation matrix to be stored in a lookup table.

(8) The image processing apparatus according to any one of (1) to (7), in which
the orthogonal transform unit performs primary transform for the prediction residual, using the second transformation matrix derived by the derivation unit, and further performs secondary transform for a result of the primary transform.

(9) The image processing apparatus according to (8), in which
the derivation unit derives the second transformation matrix for horizontal one-dimensional orthogonal transform and the second transformation matrix for vertical one-dimensional orthogonal transform, and
the orthogonal transform unit performs, as the primary transform,
the horizontal one-dimensional orthogonal transform, using the second transformation matrix for horizontal one-dimensional orthogonal transform derived by the derivation unit, and further,
the vertical one-dimensional orthogonal transform, using the second transformation matrix for vertical one-dimensional orthogonal transform derived by the derivation unit.

(10) The image processing apparatus according to any one of (1) to (9), in which
the derivation unit flips the first transformation matrix and derives the second transformation matrix.

(11) The image processing apparatus according to any one of (1) to (10), in which
the derivation unit transposes the first transformation matrix and derives the second transformation matrix.

(12) The image processing apparatus according to any one of (1) to (11), in which
the derivation unit flips the first transformation matrix, inverts a sign of an odd-numbered row vector, of the flipped first transformation matrix, and derives the second transformation matrix.

(13) The image processing apparatus according to any one of (1) to (12), in which
the derivation unit flips the first transformation matrix, transposes the flipped first transformation matrix, and derives the second transformation matrix.

(14) The image processing apparatus according to any one of (1) to (13), in which
the derivation unit transposes the first transformation matrix, flips the transposed first transformation matrix, and derives the second transformation matrix.

(15) The image processing apparatus according to any one of (1) to (14), in which
the derivation unit derives the second transformation matrix in which a lowest-order row vector has a waveform of a desired type, using the first transformation matrix.

(16) The image processing apparatus according to any one of (1) to (15), in which
the derivation unit derives the second transformation matrix in which the lowest-order row vector has a flat-type waveform, using the first transformation matrix.

(17) The image processing apparatus according to any one of (1) to (16), in which
the derivation unit derives the second transformation matrix in which the lowest-order row vector has an increasing-type waveform, using the first transformation matrix.

(18) The image processing apparatus according to any one of (1) to (17), in which
the derivation unit derives the second transformation matrix in which the lowest-order row vector has a decreasing-type waveform, using the first transformation matrix.

(19) The image processing apparatus according to any one of (1) to (18), in which
the derivation unit derives the second transformation matrix in which the lowest-order row vector has a chevron-type waveform, using the first transformation matrix.

(20) An image processing method including:
deriving a second transformation matrix using a first transformation matrix;
orthogonally transforming a prediction residual of an image, using the derived second transformation matrix; and
encoding coefficient data obtained by orthogonally transforming the prediction residual to generate a bit stream.

(21) An image processing apparatus including:
a decoding unit configured to decode a bit stream to obtain coefficient data that is an orthogonally transformed prediction residual of an image;
a derivation unit configured to derive a second transformation matrix, using a first transformation matrix; and
an inverse orthogonal transform unit configured to inversely orthogonally transform the coefficient data obtained by the decoding unit, using the second transformation matrix derived by the derivation unit.

(22) The image processing apparatus according to (21), in which
the derivation unit derives the second transformation matrix of a transform type different from that of the first transformation matrix, using the first transformation matrix.

(23) The image processing apparatus according to (21) or (22), in which
the derivation unit derives the second transformation matrix having a same number of rows and a same number of columns as the first transformation matrix, using the first transformation matrix.

(24) The image processing apparatus according to any one of (21) to (23), in which
the derivation unit derives the second transformation matrix by an operation for an element of the first transformation matrix.

(25) The image processing apparatus according to (24), in which
the operation includes rearrangement of elements.

(26) The image processing apparatus according to (24) or (25), in which
the derivation unit derives the second transformation matrix by performing the operation a plurality of times.

(27) The image processing apparatus according to any one of (21) to (26), in which
the derivation unit derives the second transformation matrix, using the first transformation matrix to be stored in a lookup table.

(28) The image processing apparatus according to any one of (21) to (27), in which
the inverse orthogonal transform unit performs inverse secondary transform for the coefficient data, and further performs inverse primary transform for a result of the inverse secondary transform, using the second transformation matrix derived by the derivation unit.

(29) The image processing apparatus according to (28), in which
the derivation unit derives the second transformation matrix for horizontal inverse one-dimensional orthogonal transform and the second transformation matrix for vertical inverse one-dimensional orthogonal transform, and
the inverse orthogonal transform unit performs, as the inverse primary transform,
the horizontal inverse one-dimensional orthogonal transform, using the second transformation matrix for horizontal inverse one-dimensional orthogonal transform derived by the derivation unit, and further,
the vertical inverse one-dimensional orthogonal transform, using the second transformation matrix for vertical inverse one-dimensional orthogonal transform derived by the derivation unit.

(30) The image processing apparatus according to any one of (21) to (29), in which
the derivation unit flips the first transformation matrix and derives the second transformation matrix.

(31) The image processing apparatus according to any one of (21) to (30), in which
the derivation unit transposes the first transformation matrix and derives the second transformation matrix.

(32) The image processing apparatus according to any one of (21) to (31), in which
the derivation unit flips the first transformation matrix, inverts a sign of an odd-numbered row vector, of the flipped first transformation matrix, and derives the second transformation matrix.

(33) The image processing apparatus according to any one of (21) to (32), in which
the derivation unit flips the first transformation matrix, transposes the flipped first transformation matrix, and derives the second transformation matrix.

(34) The image processing apparatus according to any one of (21) to (33), in which
the derivation unit transposes the first transformation matrix, flips the transposed first transformation matrix, and derives the second transformation matrix.

(35) The image processing apparatus according to any one of (21) to (34), in which
the derivation unit derives the second transformation matrix in which a lowest-order row vector has a waveform of a desired type, using the first transformation matrix.

(36) The image processing apparatus according to any one of (21) to (35), in which
the derivation unit derives the second transformation matrix in which the lowest-order row vector has a flat-type waveform, using the first transformation matrix.

(37) The image processing apparatus according to any one of (21) to (36), in which the derivation unit derives the second transformation matrix in which the lowest-order row vector has an increasing-type waveform, using the first transformation matrix.

(38) The image processing apparatus according to any one of (21) to (37), in which the derivation unit derives the second transformation matrix in which the lowest-order row vector has a decreasing-type waveform, using the first transformation matrix.

(39) The image processing apparatus according to any one of (21) to (38), in which the derivation unit derives the second transformation matrix in which the lowest-order row vector has a chevron-type waveform, using the first transformation matrix.

(40) An image processing method including:

decoding a bit stream to obtain coefficient data that is an orthogonally transformed prediction residual of an image;

deriving a second transformation matrix, using a first transformation matrix; and inversely orthogonally transforming the obtained coefficient data, using the derived second transformation matrix.

(41) An image processing apparatus including:

an operation unit configured to perform an operation for permutation for a prediction residual of an image;

an orthogonal transform unit configured to orthogonally transform the prediction residual operated for permutation by the operation unit, using a transformation matrix serving as a base; and an encoding unit configured to encode coefficient data obtained by orthogonally transforming the prediction residual by the orthogonal transform unit to generate a bit stream.

(42) The image processing apparatus according to (41), in which the operation unit flips the prediction residual in a spatial symmetric direction between one-dimensional orthogonal transforms, and the orthogonal transform unit orthogonally transforms the prediction residual flipped by the operation unit, using the transformation matrix.

(43) The image processing apparatus according to (41) or (42), in which the operation unit horizontally flips the prediction residual, and the orthogonal transform unit orthogonally transforms the prediction residual horizontally flipped by the operation unit, using the transformation matrix.

(44) The image processing apparatus according to any one of (41) to (43), in which the operation unit vertically flips the prediction residual, and the orthogonal transform unit orthogonally transforms the prediction residual vertically flipped by the operation unit, using the transformation matrix.

(45) The image processing apparatus according to any one of (41) to (44), in which the operation unit horizontally and vertically flips the prediction residual, and the orthogonal transform unit orthogonally transforms the prediction residual horizontally and vertically flipped by the operation unit, using the transformation matrix.

(46) The image processing apparatus according to any one of (41) to (45), further including:

a derivation unit configured to derive a second transformation matrix using a first transformation matrix, in which the orthogonal transform unit is configured to orthogonally transform the prediction residual flipped by the operation unit, using the second transformation matrix derived by the derivation unit.

(47) The image processing apparatus according to (46), in which the derivation unit derives the second transformation matrix having a same number of rows and a same number of columns as the first transformation matrix, using the first transformation matrix.

(48) The image processing apparatus according to (46) or (47), in which the derivation unit inverts a sign of an odd-numbered row vector, of the first transformation matrix, and derives the second transformation matrix.

(49) The image processing apparatus according to any one of (41) to (48), in which the orthogonal transform unit performs primary transform for the prediction residual operated for permutation by the operation unit, using a transformation matrix serving as a base, and further performs secondary transform for a result of the primary transform.

(50) An image processing method including:

performing an operation for permutation for a prediction residual of an image;

orthogonally transforming the prediction residual operated for permutation, using a transformation matrix serving as a base; and encoding coefficient data obtained by orthogonally transforming the prediction residual to generate a bit stream.

(51) An image processing apparatus including:

a decoding unit configured to decode a bit stream to obtain coefficient data that is an orthogonally transformed prediction residual of an image;

an inverse orthogonal transform unit configured to inversely orthogonally transform the coefficient data obtained by the decoding unit; and an operation unit configured to perform an operation for permutation for an inverse orthogonal transform result of the coefficient data obtained by the inverse orthogonal transform unit.

(52) The image processing apparatus according to (51), in which the operation unit flips the inverse orthogonal transform result in a spatial symmetric direction between one-dimensional orthogonal transforms.

(53) The image processing apparatus according to (51) or (52), in which the operation unit horizontally flips the inverse orthogonal transform result.

(54) The image processing apparatus according to any one of (51) to (53), in which the operation unit vertically flips the inverse orthogonal transform result.

(55) The image processing apparatus according to any one of (51) to (54), in which the operation unit horizontally and vertically flips the inverse orthogonal transform result.

(56) The image processing apparatus according to any one of (51) to (55), further including:

a derivation unit configured to derive a second transformation matrix using a first transformation matrix, in which the inverse orthogonal transform unit is configured to inversely orthogonally transform the coefficient data obtained by the decoding unit, using the second transformation matrix derived by the derivation unit, and the operation unit is configured to perform an operation for permutation for the inverse orthogonal transform result of the coefficient data obtained by the inverse orthogonal transform unit.

(57) The image processing apparatus according to (56), in which the derivation unit derives the second transformation matrix having a same number of rows and a same number of columns as the first transformation matrix, using the first transformation matrix.

(58) The image processing apparatus according to (56) or (57), in which the derivation unit inverts a sign of an odd-numbered row vector, of the first transformation matrix, and derives the second transformation matrix.

(59) The image processing apparatus according to any one of (51) to (58), in which the inverse orthogonal transform unit performs inverse secondary transform for the coefficient data obtained by the decoding unit, and further performs inverse primary transform for an inverse secondary transform result, using a transformation matrix serving as a base, and the operation unit performs an operation for permutation for an inverse primary transform result obtained by the inverse orthogonal transform unit.

(60) An image processing method including:

decoding a bit stream to obtain coefficient data that is an orthogonally transformed prediction residual of an image;

inversely orthogonally transforming the obtained coefficient data; and performing an operation for permutation for an inverse orthogonal transform result of the obtained coefficient data.

(61) An image processing apparatus including:

a derivation unit configured to derive a transformation matrix, using a submatrix configuring a part of the transformation matrix;

an orthogonal transform unit configured to orthogonally transform a prediction residual of an image, using the transformation matrix derived by the derivation unit; and an encoding unit configured to encode coefficient data obtained by orthogonally transforming the prediction residual by the orthogonal transform unit to generate a bit stream.

(62) The image processing apparatus according to (61), in which the derivation unit derives the transformation matrix, using the submatrix to be stored in a lookup table.

(63) The image processing apparatus according to (61) or (62), in which the orthogonal transform unit performs primary transform for the prediction residual, using the transformation matrix derived by the derivation unit, and further performs secondary transform for a result of the primary transform.

(64) The image processing apparatus according to (63), in which the derivation unit derives the transformation matrix for horizontal one-dimensional orthogonal transform and the transformation matrix for vertical one-dimensional orthogonal transform, and the orthogonal transform unit performs, as the primary transform, the horizontal one-dimensional orthogonal transform, using the transformation matrix for horizontal one-dimensional orthogonal transform derived by the derivation unit, and further, the vertical one-dimensional orthogonal transform, using the transformation matrix for vertical one-dimensional orthogonal transform derived by the derivation unit.

(65) The image processing apparatus according to any one of (61) to (64), in which the derivation unit derives the transformation matrix by flipping the submatrix around an axis of a predetermined direction passing through a center of the transformation matrix and deriving a remaining submatrix of the transformation matrix.

(66) The image processing apparatus according to (65), in which the derivation unit flips the submatrix in a direction parallel to a row.

(67) The image processing apparatus according to (65) or (66), in which the derivation unit flips the submatrix in a direction parallel to a column.

(68) The image processing apparatus according to any one of (65) to (67), in which the derivation unit flips the submatrix in a rotation direction around the center of the transformation matrix.

(69) The image processing apparatus according to any one of (65) to (68), in which the derivation unit flips the submatrix in an oblique direction around a diagonal line of the transformation matrix.

(70) The image processing apparatus according to any one of (65) to (69), in which the derivation unit further inverts a sign of an element of the flipped submatrix, and derives the transformation matrix.

(71) The image processing apparatus according to any one of (61) to (70), in which the submatrix is a left-half submatrix or a right-half submatrix of the transformation matrix, and the derivation unit is configured to derive the transformation matrix by flipping the submatrix in a row direction of the transformation matrix, further inverting a sign of an odd-numbered row vector of the flipped submatrix, and deriving the right-half submatrix or the left-half submatrix of the transformation matrix.

(72) The image processing apparatus according to any one of (61) to (71), in which the submatrix is an upper-half submatrix or a lower-half submatrix of the transformation matrix, and the derivation unit is configured to derive the transformation matrix by flipping the submatrix in a column direction of the transformation matrix, further inverting a sign of an odd-numbered column vector of the flipped submatrix, and deriving the lower-half submatrix or the upper-half submatrix of the transformation matrix.

(73) The image processing apparatus according to any one of (61) to (72), in which the submatrix is an upper-half submatrix or a lower-half submatrix of the transformation matrix, and the derivation unit is configured to derive the transformation matrix by flipping the submatrix in a rotation direction around a center of the transformation matrix, further inverting signs of an element having an even row number and an even column number and an element having an odd row number and an odd column number of the flipped submatrix, and deriving the lower-half submatrix or the upper-half submatrix of the transformation matrix.

(74) The image processing apparatus according to any one of (61) to (73), in which the submatrix is a submatrix of an upper right triangular portion or a submatrix of a lower left triangular portion of the transformation matrix, and the derivation unit is configured to derive the transformation matrix by transposing the submatrix to derive the submatrix of a lower left triangular portion or the submatrix of an upper right triangular portion of the transformation matrix.

(75) The image processing apparatus according to any one of (61) to (74), in which the submatrix is a submatrix of an upper left triangular portion or a submatrix of a lower right triangular portion of the transformation matrix, and the derivation unit is configured to derive the transformation matrix by flipping the submatrix in an oblique direction having, as an axis, a diagonal line connecting an upper right end and a lower left end of the transformation matrix, further inverting signs of an element having an even row number and an even column number and an element having an odd row number and an odd column number of the flipped submatrix, and deriving the submatrix of a lower right triangular portion or the submatrix of an upper left triangular portion of the transformation matrix.

(76) The image processing apparatus according to any one of (61) to (75), in which the submatrix is an upper left quarter submatrix of the transformation matrix, and the derivation unit is configured to derive the transformation matrix by flipping the submatrix in a row direction of the transformation matrix, further inverting a sign of an odd-numbered row vector of the flipped submatrix, and deriving an upper right quarter submatrix of the transformation matrix, flipping the submatrix in a column direction of the transformation matrix, further inverting a sign of an odd-numbered column vector of the flipped submatrix, and deriving a lower left quarter submatrix of the transformation matrix, and flipping the submatrix in a rotation direction around a center of the transformation matrix, further inverting signs of an element having an even row number and an even column number and an element having an odd row number and an odd column number of the flipped submatrix, and deriving a lower right quarter submatrix of the transformation matrix.

(77) The image processing apparatus according to any one of (61) to (76), in which the derivation unit derives a first transformation matrix, using the submatrix, and further derives a second transformation matrix, using the derived first transformation matrix, and the orthogonal transform unit orthogonally transforms the prediction residual, using the second transformation matrix derived by the derivation unit.

(78) The image processing apparatus according to (77), in which the derivation unit derives the second transformation matrix of a transform type different from that of the first transformation matrix, using the first transformation matrix.

(79) The image processing apparatus according to (77) or (78), in which the derivation unit flips or transposes the first transformation matrix and derives the second transformation matrix.

(80) An image processing method including:

deriving a transformation matrix using a submatrix configuring a part of the transformation matrix;

orthogonally transforming a prediction residual of an image, using the derived transformation matrix; and encoding coefficient data obtained by orthogonally transforming the prediction residual to generate a bit stream.

(81) An image processing apparatus including:

a decoding unit configured to decode a bit stream to obtain coefficient data that is an orthogonally transformed prediction residual of an image;

a derivation unit configured to derive a transformation matrix, using a submatrix configuring a part of the transformation matrix; and an inverse orthogonal transform unit configured to inversely orthogonally transform the coefficient data obtained by the decoding unit, using the transformation matrix derived by the derivation unit.

(82) The image processing apparatus according to (81), in which the derivation unit derives the transformation matrix, using the submatrix to be stored in a lookup table.

(83) The image processing apparatus according to (81) or (82), in which the inverse orthogonal transform unit performs inverse secondary transform for the coefficient data obtained by the decoding unit, and further performs inverse primary transform for an inverse secondary transform result, using the transformation matrix derived by the derivation unit.

(84) The image processing apparatus according to (83), in which the derivation unit derives the transformation matrix for horizontal inverse one-dimensional orthogonal transform and the transformation matrix for vertical inverse one-dimensional orthogonal transform, and the inverse orthogonal transform unit performs, as the inverse primary transform, the horizontal inverse one-dimensional orthogonal transform, using the transformation matrix for horizontal inverse one-dimensional orthogonal transform derived by the derivation unit, and further, the vertical inverse one-dimensional orthogonal transform, using the transformation matrix for vertical inverse one-dimensional orthogonal transform derived by the derivation unit.

(85) The image processing apparatus according to any one of (81) to (84), in which the derivation unit derives the transformation matrix by flipping the submatrix around an axis of a predetermined direction passing through a center of the transformation matrix and deriving a remaining submatrix of the transformation matrix.

(86) The image processing apparatus according to (85), in which the derivation unit flips the submatrix in a direction parallel to a row.

(87) The image processing apparatus according to (85) or (86), in which the derivation unit flips the submatrix in a direction parallel to a column.

(88) The image processing apparatus according to any one of (85) to (87), in which the derivation unit flips the submatrix in a rotation direction around the center of the transformation matrix.

(89) The image processing apparatus according to any one of (85) to (88), in which the derivation unit flips the submatrix in an oblique direction around a diagonal line of the transformation matrix.

(90) The image processing apparatus according to any one of (85) to (89), in which
the derivation unit further inverts a sign of an element of the flipped submatrix, and derives the transformation matrix.

(91) The image processing apparatus according to any one of (81) to (90), in which
the submatrix is a left-half submatrix or a right-half submatrix of the transformation matrix, and
the derivation unit is configured to derive the transformation matrix by flipping the submatrix in a row direction of the transformation matrix, further inverting a sign of an odd-numbered row vector of the flipped submatrix, and deriving the right-half submatrix or the left-half submatrix of the transformation matrix.

(92) The image processing apparatus according to any one of (81) to (91), in which
the submatrix is an upper-half submatrix or a lower-half submatrix of the transformation matrix, and
the derivation unit is configured to derive the transformation matrix by flipping the submatrix in a column direction of the transformation matrix, further inverting a sign of an odd-numbered column vector of the flipped submatrix, and deriving the lower-half submatrix or the upper-half submatrix of the transformation matrix.

(93) The image processing apparatus according to any one of (81) to (92), in which
the submatrix is an upper-half submatrix or a lower-half submatrix of the transformation matrix, and
the derivation unit is configured to derive the transformation matrix by flipping the submatrix in a rotation direction around a center of the transformation matrix, further inverting signs of an element having an even row number and an even column number and an element having an odd row number and an odd column number of the flipped submatrix, and deriving the lower-half submatrix or the upper-half submatrix of the transformation matrix.

(94) The image processing apparatus according to any one of (81) to (93), in which
the submatrix is a submatrix of an upper right triangular portion or a submatrix of a lower left triangular portion of the transformation matrix, and
the derivation unit is configured to derive the transformation matrix by transposing the submatrix to derive the submatrix of a lower left triangular portion or the submatrix of an upper right triangular portion of the transformation matrix.

(95) The image processing apparatus according to any one of (81) to (94), in which
the submatrix is a submatrix of an upper left triangular portion or a submatrix of a lower right triangular portion of the transformation matrix, and
the derivation unit is configured to derive the transformation matrix by flipping the submatrix in an oblique direction having, as an axis, a diagonal line connecting an upper right end and a lower left end of the transformation matrix, further inverting a sign of an odd-numbered row vector, and deriving the submatrix of a lower right triangular portion or the submatrix of an upper left triangular portion of the transformation matrix.

(96) The image processing apparatus according to any one of (81) to (95), in which
the submatrix is an upper left quarter submatrix of the transformation matrix, and
the derivation unit is configured to derive the transformation matrix by
flipping the submatrix in a row direction of the transformation matrix, further inverting a sign of an odd-numbered row vector of the flipped submatrix, and deriving an upper right quarter submatrix of the transformation matrix,
flipping the submatrix in a column direction of the transformation matrix, further inverting a sign of an odd-numbered column vector of the flipped submatrix, and deriving a lower left quarter submatrix of the transformation matrix, and
flipping the submatrix in a rotation direction around a center of the transformation matrix, further inverting signs of an element having an even row number and an even column number and an element having an odd row number and an odd column number of the flipped submatrix, and deriving a lower right quarter submatrix of the transformation matrix.

(97) The image processing apparatus according to any one of (81) to (96), in which
the derivation unit derives a first transformation matrix, using the submatrix, and further derives a second transformation matrix, using the derived first transformation matrix, and
the inverse orthogonal transform unit inversely orthogonally transforms the coefficient data, using the second transformation matrix derived by the derivation unit.

(98) The image processing apparatus according to (97), in which
the derivation unit derives the second transformation matrix of a transform type different from that of the first transformation matrix, using the first transformation matrix.

(99) The image processing apparatus according to (97) or (98), in which
the derivation unit flips or transposes the first transformation matrix and derives the second transformation matrix.

(100) An image processing method including:
decoding a bit stream to obtain coefficient data that is an orthogonally transformed prediction residual of an image;
deriving a transformation matrix, using a submatrix configuring a part of the transformation matrix; and
inversely orthogonally transforming the obtained coefficient data, using the derived transformation matrix.

REFERENCE SIGNS LIST

100 Image encoding device
101 Control unit
113 Orthogonal transform unit
115 Encoding unit
118 Inverse orthogonal transform unit
152 Primary transform unit
200 Image decoding device
212 Decoding unit
214 Inverse orthogonal transform unit
253 Inverse primary transform unit
311 Primary transform selection unit
312 Primary horizontal transform unit
313 Primary vertical transform unit
321 Transformation matrix derivation unit
331 Transformation matrix LUT
332 Flip unit
333 Transposition unit
351 Transformation matrix derivation unit
361 Transformation matrix LUT
362 Flip unit
363 Transposition unit
411 Inverse primary transform selection unit
412 Inverse primary vertical transform unit
413 Inverse primary horizontal transform unit 421 Transformation matrix derivation unit
431 Transformation matrix LUT
432 Flip unit
433 Transposition unit
451 Transformation matrix derivation unit
461 Transformation matrix LUT
462 Flip unit
463 Transposition unit
501, 502, 511, and 512 Sign inversion unit
551 and 552 Prediction residual permutation operation unit
561, 562, 571, and 572 Sign inversion unit
632 Horizontal flip unit
633 Vertical flip unit
634 Transposition unit
635 Sign inversion unit
642 Horizontal flip unit
643 Vertical flip unit
644 Transposition unit
645 Sign inversion unit
652 Horizontal flip unit
653 Vertical flip unit
654 Transposition unit
655 Sign inversion unit
662 Horizontal flip unit
663 Vertical flip unit
664 Transposition unit
665 Sign inversion unit

The invention claimed is:
1. An image processing apparatus comprising:
circuitry configured to
derive a transformation matrix, using a submatrix configuring a part of the transformation matrix, wherein the submatrix takes up less memory than the transformation matrix but is sufficient that the transformation matrix can be derived solely from the submatrix;
orthogonally transform a prediction residual of an image, using the transformation matrix; and
encode coefficient data obtained by orthogonally transforming the prediction residual to generate a bit stream.
2. The image processing apparatus according to claim 1, wherein
the circuitry is configured to derive the transformation matrix, using the submatrix to be stored in a lookup table.
3. The image processing apparatus according to claim 1, wherein
the circuitry is configured to perform primary transform for the prediction residual, using the transformation matrix, and further perform secondary transform for a result of the primary transform.
4. The image processing apparatus according to claim 3, wherein
the circuitry is configured to
derive the transformation matrix for horizontal one-dimensional orthogonal transform and the transformation matrix for vertical one-dimensional orthogonal transform, and
perform, as the primary transform,
the horizontal one-dimensional orthogonal transform, using the transformation matrix for horizontal one-dimensional orthogonal transform, and further,
the vertical one-dimensional orthogonal transform, using the transformation matrix for vertical one-dimensional orthogonal transform.
5. The image processing apparatus according to claim 1, wherein
the circuitry is configured to derive the transformation matrix by flipping the submatrix around an axis of a predetermined direction passing through a center of the transformation matrix and deriving a remaining submatrix of the transformation matrix.
6. The image processing apparatus according to claim 5, wherein
the circuitry is further configured to invert a sign of an element of the flipped submatrix, and derive the transformation matrix.
7. The image processing apparatus according to claim 1, wherein
the submatrix is a left-half submatrix or a right-half submatrix of the transformation matrix, and
the circuitry is configured to derive the transformation matrix by flipping the submatrix in a row direction of the transformation matrix, further inverting a sign of an odd-numbered row vector of the flipped submatrix, and deriving the right-half submatrix or the left-half submatrix of the transformation matrix.
8. The image processing apparatus according to claim 1, wherein
the submatrix is an upper-half submatrix or a lower-half submatrix of the transformation matrix, and
the circuitry is configured to derive the transformation matrix by flipping the submatrix in a column direction of the transformation matrix, further inverting a sign of an odd-numbered column vector of the flipped submatrix, and deriving the lower-half submatrix or the upper-half submatrix of the transformation matrix.
9. The image processing apparatus according to claim 1, wherein
the submatrix is an upper-half submatrix or a lower-half submatrix of the transformation matrix, and
the circuitry is configured to derive the transformation matrix by flipping the submatrix in a rotation direction around a center of the transformation matrix, further inverting signs of an element having an even row number and an even column number and an element having an odd row number and an odd column number of the flipped submatrix, and deriving the lower-half submatrix or the upper-half submatrix of the transformation matrix.
10. The image processing apparatus according to claim 1, wherein
the submatrix is a submatrix of an upper right triangular portion or a submatrix of a lower left triangular portion of the transformation matrix, and
the circuitry is configured to derive the transformation matrix by transposing the submatrix to derive the submatrix of a lower left triangular portion or the submatrix of an upper right triangular portion of the transformation matrix.
11. The image processing apparatus according to claim 1, wherein
the submatrix is a submatrix of an upper left triangular portion or a submatrix of a lower right triangular portion of the transformation matrix, and
the circuitry is configured to derive the transformation matrix by flipping the submatrix in an oblique direction having, as an axis, a diagonal line connecting an upper right end and a lower left end of the transformation matrix, further inverting signs of an element having an even row number and an even column number and an element having an odd row number and an odd column number of the flipped submatrix, and deriving the submatrix of a lower right triangular portion or the submatrix of an upper left triangular portion of the transformation matrix.

12. The image processing apparatus according to claim 1, wherein the submatrix is an upper left quarter submatrix of the transformation matrix, and the circuitry is configured to derive the transformation matrix by flipping the submatrix in a row direction of the transformation matrix, further inverting a sign of an odd-numbered row vector of the flipped submatrix, and deriving an upper right quarter submatrix of the transformation matrix, flipping the submatrix in a column direction of the transformation matrix, further inverting a sign of an odd-numbered column vector of the flipped submatrix, and deriving a lower left quarter submatrix of the transformation matrix, and flipping the submatrix in a rotation direction around a center of the transformation matrix, further inverting signs of an element having an even row number and an even column number and an element having an odd row number and an odd column number of the flipped submatrix, and deriving a lower right quarter submatrix of the transformation matrix.

13. The image processing apparatus according to claim 1, wherein the circuitry is configured to derive a first transformation matrix, using the submatrix, and further derive a second transformation matrix, using the derived first transformation matrix, and the circuitry is configured to orthogonally transform the prediction residual, using the second transformation matrix derived by the derivation unit.

14. The image processing apparatus according to claim 1, wherein the circuitry is configured to orthogonally transform the prediction residual, using a transform unit (TU) of a quad-tree block structure or a quad tree plus binary tree (QTBT) block structure as a unit of processing.

15. The image processing apparatus according to claim 1, wherein the circuitry is configured to encode the coefficient data, using a coding unit (CU) of a quad-tree block structure or a quad tree plus binary tree (QTBT) block structure as a unit of processing.

16. An image processing method comprising:

deriving a transformation matrix using a submatrix configuring a part of the transformation matrix, wherein the submatrix takes up less memory than the transformation matrix but is sufficient that the transformation matrix can be derived solely from the submatrix;

orthogonally transforming a prediction residual of an image, using the derived transformation matrix; and encoding coefficient data obtained by orthogonally transforming the prediction residual to generate a bit stream.

17. An image processing apparatus comprising:

circuitry configured to decode a bit stream to obtain coefficient data that is an orthogonally transformed prediction residual of an image;

derive a transformation matrix, using a submatrix configuring a part of the transformation matrix, wherein the submatrix takes up less memory than the transformation matrix but is sufficient that the transformation matrix can be derived solely from the submatrix; and inversely orthogonally transform the coefficient data, using the transformation matrix.

18. The image processing apparatus according to claim 17, wherein the circuitry is configured to perform inverse secondary transform for the coefficient data obtained by the decoding unit, and further perform inverse primary transform for a result of the inverse secondary transform, using the transformation matrix.

19. The image processing apparatus according to claim 18, wherein the circuitry is configured to derive the transformation matrix for horizontal inverse one-dimensional orthogonal transform and the transformation matrix for vertical inverse one-dimensional orthogonal transform, and the circuitry is configured to perform, as the inverse primary transform, the horizontal inverse one-dimensional orthogonal transform, using the transformation matrix for horizontal inverse one-dimensional orthogonal transform, and further, the vertical inverse one-dimensional orthogonal transform, using the transformation matrix for vertical inverse one-dimensional orthogonal transform.

20. The image processing apparatus according to claim 17, wherein the circuitry is configured to derive the transformation matrix by flipping the submatrix around an axis of a predetermined direction passing through a center of the transformation matrix and deriving a remaining submatrix of the transformation matrix.

21. The image processing apparatus according to claim 17, wherein the circuitry is configured to derive a first transformation matrix, using the submatrix, and further derive a second transformation matrix, using the derived first transformation matrix, and the circuitry is configured to inversely orthogonally transform the coefficient data, using the second transformation matrix.

22. The image processing apparatus according to claim 17, wherein the circuitry is configured to decode the bit stream, using a coding unit (CU) of a quad-tree block structure or a quad tree plus binary tree (QTBT) block structure as a unit of processing.

23. The image processing apparatus according to claim 17, wherein the circuitry is configured to inversely orthogonally transform the coefficient data, using a transform unit (TU) of a quad-tree block structure or a quad tree plus binary tree (QTBT) block structure as a unit of processing.

24. An image processing method comprising:

decoding a bit stream to obtain coefficient data that is an orthogonally transformed prediction residual of an image;

deriving a transformation matrix, using a submatrix configuring a part of the transformation matrix, wherein the submatrix takes up less memory than the transformation matrix but is sufficient that the transformation matrix can be derived solely from the submatrix; and inversely orthogonally transforming the obtained coefficient data, using the derived transformation matrix.

\* \* \* \* \*